United States Patent [19]

Grossberg et al.

[11] Patent Number: 4,852,018

[45] Date of Patent: Jul. 25, 1989

[54] MASSIVELY PARELLEL REAL-TIME NETWORK ARCHITECTURES FOR ROBOTS CAPABLE OF SELF-CALIBRATING THEIR OPERATING PARAMETERS THROUGH ASSOCIATIVE LEARNING

[75] Inventors: Stephen Grossberg, Newton Highlands; Michael Kuperstein, Brookline, both of Mass.

[73] Assignee: Trustees of Boston University, Boston, Mass.

[21] Appl. No.: 1,223

[22] Filed: Jan. 7, 1987

[51] Int. Cl.⁴ .................... G06F 15/20; G06F 15/42
[52] U.S. Cl. ............................ 364/513; 364/413.02
[58] Field of Search .............. 364/513, 413, 415, 417, 364/300, 200 MS File, 900 MS File, 413.02; 382/6, 14, 15; 128/731, 732, 733, 745; 351/203, 205, 211, 212, 224, 243, 246

[56] References Cited

U.S. PATENT DOCUMENTS

| | | | |
|---|---|---|---|
| 3,950,733 | 4/1976 | Cooper et al. | 364/900 |
| 4,044,243 | 8/1977 | Cooper et al. | 364/900 X |
| 4,254,474 | 3/1981 | Cooper et al. | 364/900 |
| 4,319,331 | 3/1982 | Elbaum et al. | 364/518 X |
| 4,326,259 | 4/1982 | Cooper et al. | 364/900 X |
| 4,450,530 | 5/1984 | Llinas et al. | 364/513 |
| 4,648,052 | 3/1987 | Friedman et al. | 364/415 X |
| 4,676,611 | 6/1987 | Nelson et al. | 351/211 X |

Primary Examiner—Joseph Ruggiero
Attorney, Agent, or Firm—Hamilton, Brook, Smith & Reynolds

[57] ABSTRACT

A real-time network enables robots to accurately learn sensory motor transformation and to self-train and self-calibrate operating parameters after accidents or with wear. Combinations of visual and present position signals are used to relearn a target position map. Target positions in body-centered. visually activated coordinates are mapped into target positions in motor coordinates which are compared with present positions in motor coordinates to generate motor commands. Feedback provides calibrated error signals for adjustment of learned gain with changes in the system due to aging, accidents and the like. A series of prestored motor commands may be performed with a later "go" command.

41 Claims, 67 Drawing Sheets

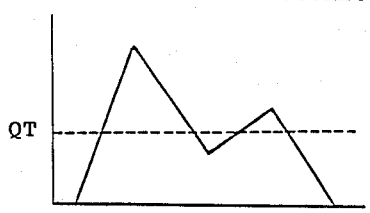
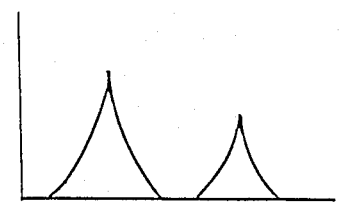
FIG. 6a
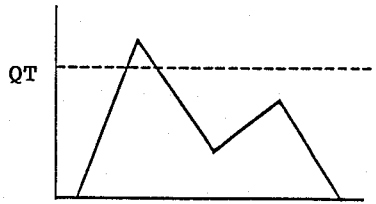
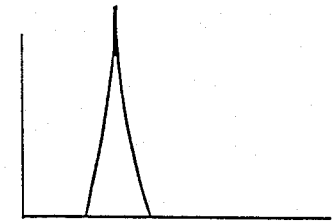
FIG. 6b
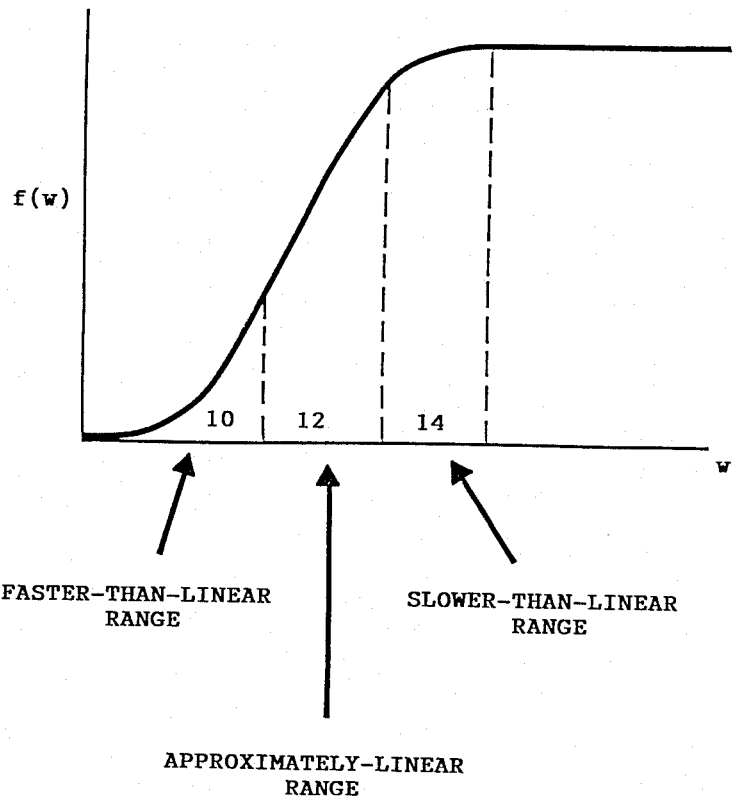
FIG. 7

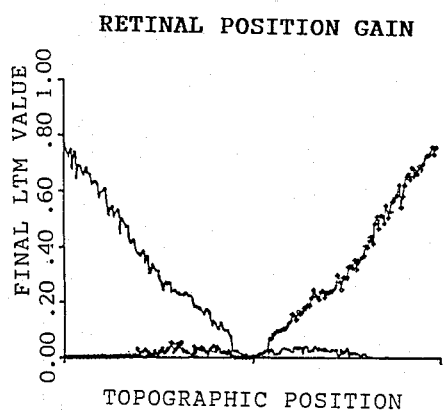
FIG. 16a1
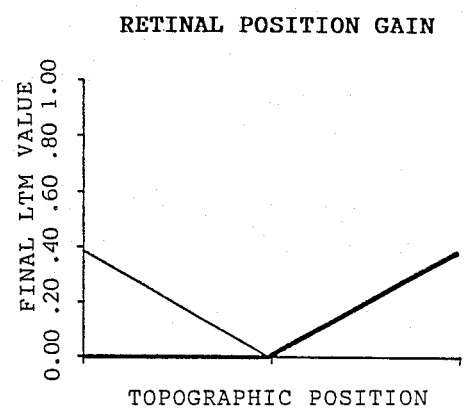
FIG. 16b1
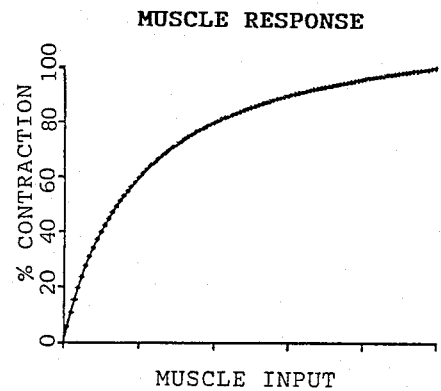
FIG. 16a2
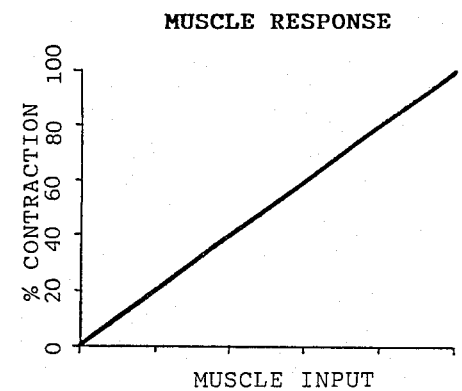
FIG. 16b2
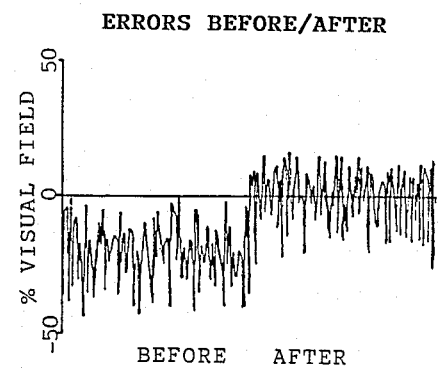
FIG. 16a3
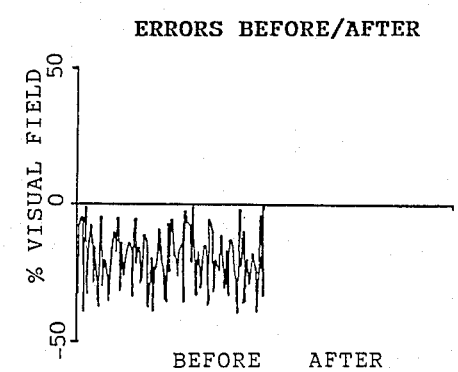
FIG. 16b3

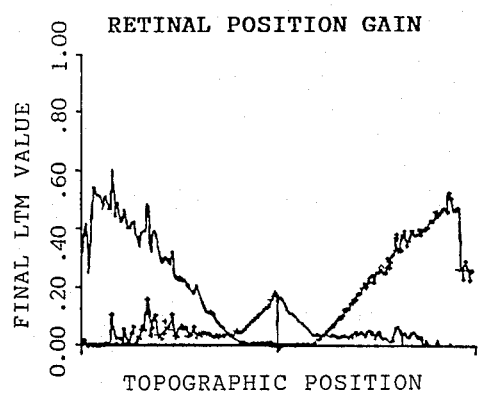
FIG. 18a1
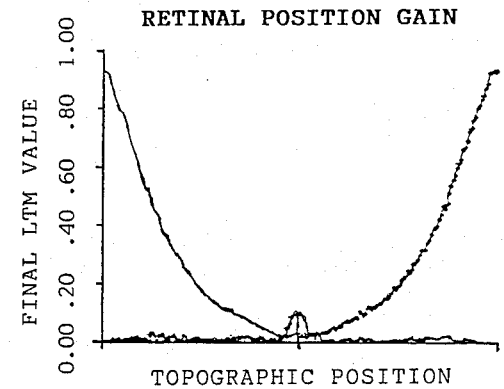
FIG. 18b1
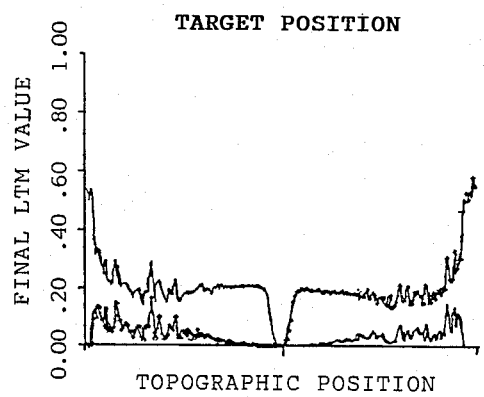
FIG. 18a2
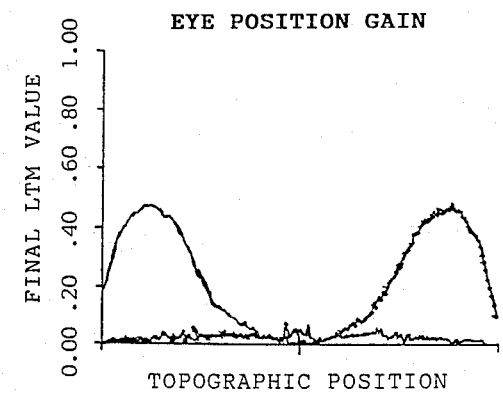
FIG. 18b2

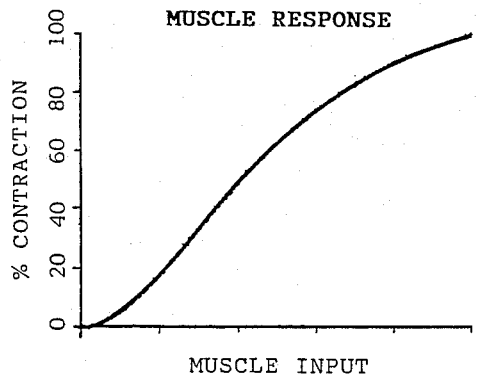
FIG. 18a3
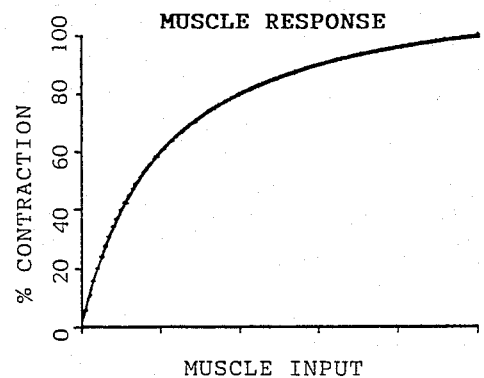
FIG. 18b3
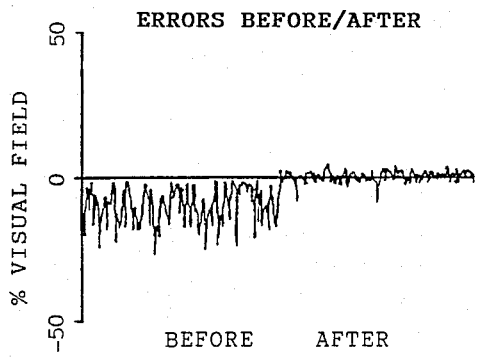
FIG. 18a4
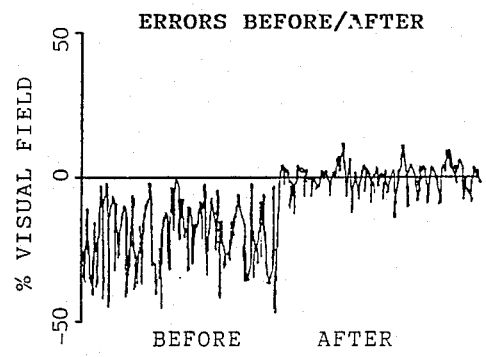
FIG. 18b4

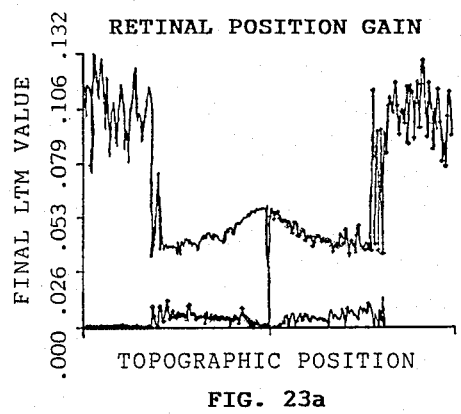
FIG. 23a RETINAL POSITION GAIN
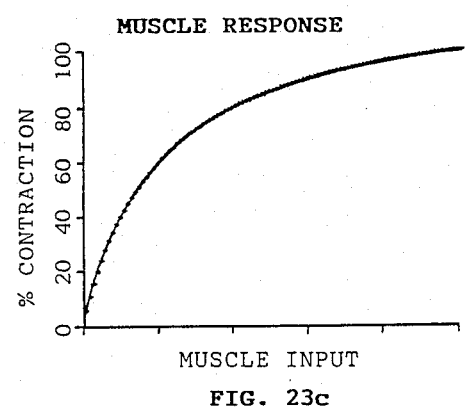
FIG. 23c MUSCLE RESPONSE
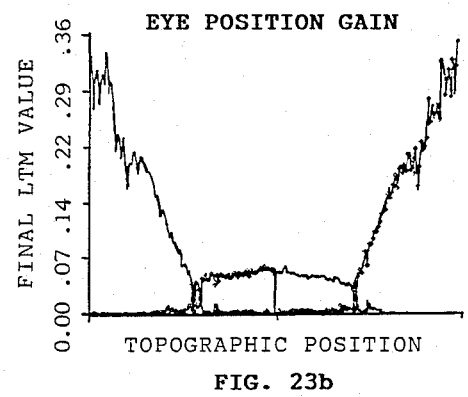
FIG. 23b EYE POSITION GAIN
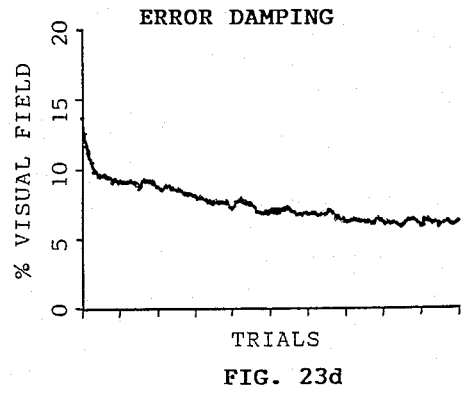
FIG. 23d ERROR DAMPING
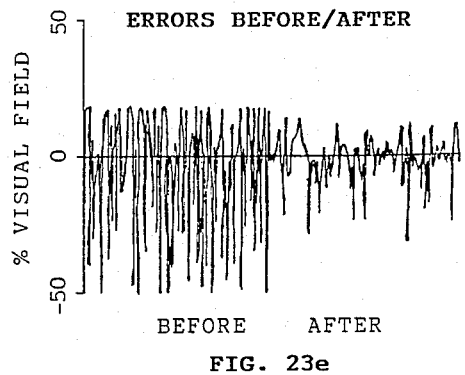
FIG. 23e ERRORS BEFORE/AFTER

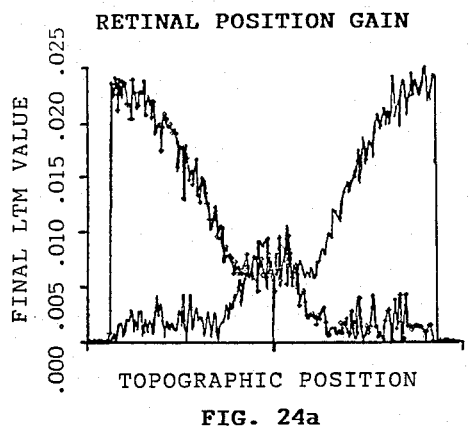
FIG. 24a — RETINAL POSITION GAIN
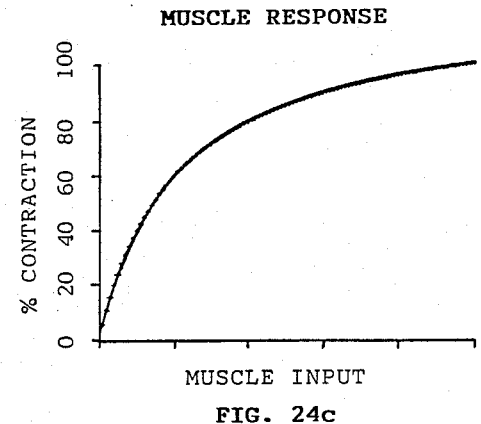
FIG. 24c — MUSCLE RESPONSE
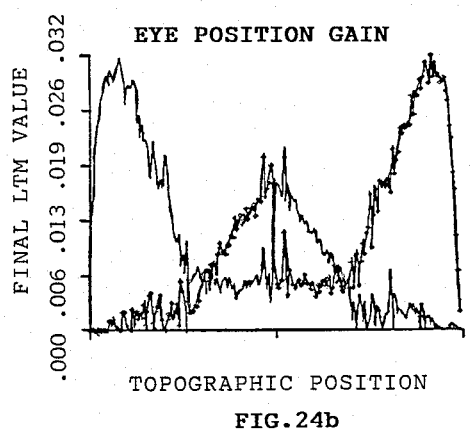
FIG. 24b — EYE POSITION GAIN
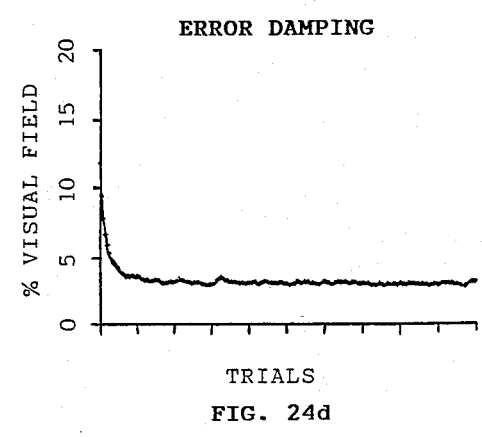
FIG. 24d — ERROR DAMPING
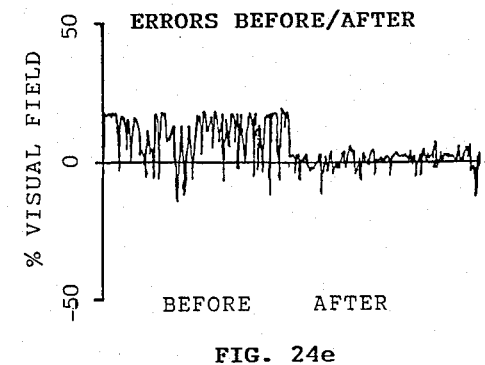
FIG. 24e — ERRORS BEFORE/AFTER

POSITION-THESHOLD-SLOPE MAP

MUSCLE REPRESENTATION

URM

RM

VECTOR

| $TPM_2$ | HMI | 12 → 11 → 8 → 9 → 10 | | | | | 14 |
|---|---|---|---|---|---|---|---|
| OFF | mismatch | OFF | ON | OFF | ON | OFF | OFF |
| ON | mismatch | ON | OFF | ON | OFF | ON | ON |
| ON | match | ON | OFF | OFF | ON | OFF | OFF |

FIG. 73

MASSIVELY PARELLEL REAL-TIME NETWORK ARCHITECTURES FOR ROBOTS CAPABLE OF SELF-CALIBRATING THEIR OPERATING PARAMETERS THROUGH ASSOCIATIVE LEARNING

GOVERNMENT SUPPORT

The Government has rights in this invention pursuant to contracts #1-RO1-NS18744-01A1 awarded by the National Institute of Health, AFOSR82-0148 and AFOSR85-0149 awarded by the Air Force Office of Scientific Research, ONRN00014-83-K0337 awarded by the Office of Naval Research, and NSF-IST-80-00257 and NSF-IST-841-7756 awarded by the National Science Foundation.

RELATED PUBLICATIONS

Neural Dynamics of Adaptive Sensory-Motor Control Ballistic Eye Movements by Steven Grossberg and Michael Kuperstein, 1986.

BACKGROUND OF THE INVENTION

Theories have been proposed on which it has been hoped that systems could be developed to explain the complex sensory-motor system such as the saccadic eye movement system. Saccadic eye movements are ballistic movements of great speed and accuracy in human beings. Once such a system has been developed which can account for the large behavioral and neural data base concerning this sensory-motor system, it can be adapted to a robot.

In the present invention, a number of specialized real-time circuits designs have been developed which collectively can be adapted to robots. The real-time circuits would allow a robot to automatically calibrate itself through processes of development and learning. For example, during the continued use of the robot, individual mechanical parts will begin to wear. As these parts wear, errors in performance by these wearing parts can be corrected by specialized real-time circuits adapted to the system.

DISCLOSURE OF THE INVENTION

In the present invention, a real-time network has been developed to enable robots to accurately learn sensory-motor transformation, even if system parameters differ due to imprecise manufacturing specifications. The design principles and mechanisms developed also allow the network to self-train and self-calibrate its own operating parameters after accidents which may occur in use or during wear of the individual components. Several of the circuits necessary to create this network are described below.

In one circuit, a system learns how to correct combinations of visual information detected by a photo-detection device, encoded in photo-detection or retinotopic coordinates, and present-position of the photo-detection device information, encoded in motor coordinates, into an egocentric or body-centered invariant, self-regulating target position map. In other words, combinations of visual and present-position signals are used to relearn a new globally self-consistent target position map.

In a second circuit transformations are learned such that target positions in body-centered, visually activated coordinates are mapped into target positions in motor coordinates in order to compare target positions in motor coordinates with present positions in motor coordinates to generate a motor command, or vector, that directs motors used to position the photo-detection device how far to move. This circuit, called a head-muscle interface circuit further computes the vector command in motor coordinates.

In order to correct movement gains activated by the movement command by visual error signals, a third circuit learns how to map the vector command which has been computed in vector coordinates by the second circuit above into retinotopic coordinates.

In a retinotopic command network, a fourth circuit, visually reactive retinotopic coordinate commands are processed in parallel in order to store movement commands, elicit unconditional movements, and generate sampling signals which can change the learned gain of the total movement command.

An adaptive gain stage included within the global network topographically organizes sampling signals for interacting with topographically organized error signals which may be generated from such things as visual position, visual slip, motor wear, a wide range of nonlinearities, etc. to change the learned gains of movements which will reduce these errors.

In a sixth circuit called an outflow-inflow interface circuit outflow, or feed forward, movement signals to the motor plant are compared with inflow, or feedback, signals from the motor plant to provide correctly calibrated error signals to the adaptive gain stage when the motor plant characteristics change their gain or become nonlinear.

As a part of the outflow-inflow interface circuit a motor linearization network enables the motor plant to operate linearly and with gains which utilize the full range of motor possibilities, even if the motor plant itself becomes extremely nonlinear due to aging, accidents, or environmental fluctuations. This part of the interface circuit enables the learned command structure to remain invariant even though the plant itself changes radically.

In a circuit called the predictive command network a series of motor commands are stored in memory at a planning stage and then automatically and accurately performed at an arbitrarily specified later stage simply by activating a one-dimensional "go" command. Readout of the planned movement sequence also automatically resets the planning stage and clears it for unbiased storage of the next series of planned movements.

In order to prevent the photo-detection device from drifting after a movement command has been processed, a tension equalization network automatically learns to balance whatever forces may exist to cause drifting until the next movement command occurs.

Once a movement command has been issued, a movement generator, called a saccade generator, modulates the amplitude of the movement command into a change in the duration, direction, and length of the controlled movement. This circuit is designed to be compatible with the total architecture in such a way that the movement command stored in the retinotopic command network can sample a visual error signal before the sampling signal is shut off by the visual input that gave rise to the visual error signal.

With the circuits above combined in a global network, a fundamental design of a robot which can continuously update its operating parameters as these parameters change during use can be developed.

BRIEF DESCRIPTION OF THE DRAWINGS

The foregoing and other objects, features, and advantages of the invention will be apparent from the following more particular description of the preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6a shows a graph of an input pattern transformed and stored in short term memory due to a particular setting of a quenching threshold network.

FIG. 6b is a graph of the input of FIG. 6a tranformed and stored in short term memory due to an alternate setting of a quenching threshold network.

FIG. 7 shows a graph of a sigmoid signal function used to define the quenching threshold.

FIGS. $16a_1$, $16a_2$, $16a_3$, $16b_1$, $16b_2$, and $16b_3$ depict computer simulation of saccadic error correction with sampling from retinal positions maps using a linear learning function.

FIGS. 17a–17d show graphic distributions depicting a computer simulation of saccadic error correction with sampling from an invariant target position map usiang a slower-than-linear muscle function and a linear learning function.

FIGS. $18a_1$–$18a_4$, $18b_1$–$18b_4$ show graphic distributions depicting computer simulation of saccadic error correction with two sampling maps A and B.

Figure 19A:
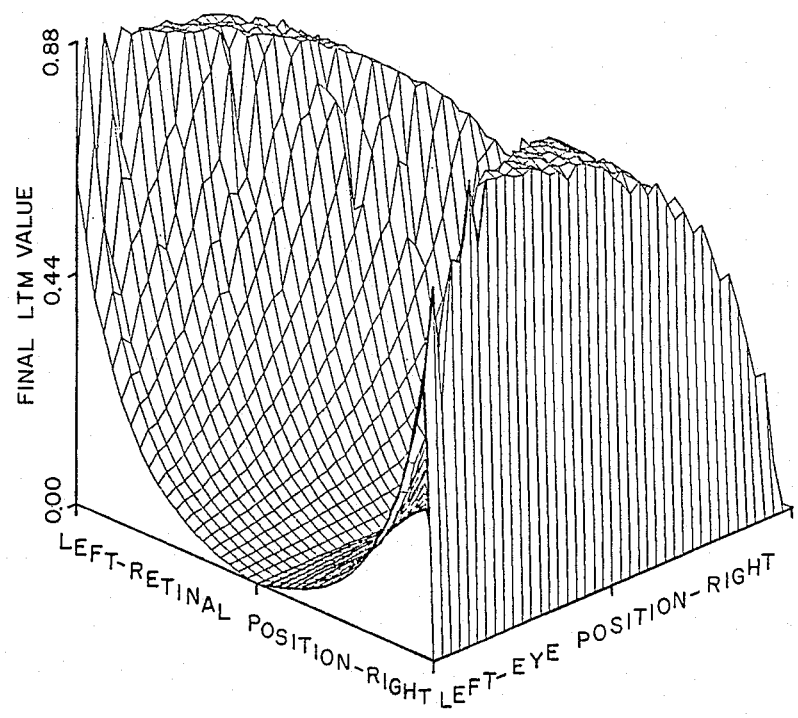
Figure 19B:
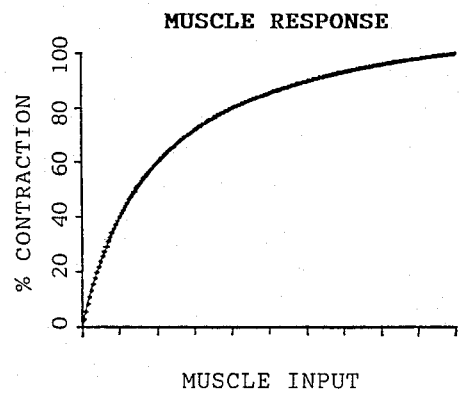
Figure 19C:
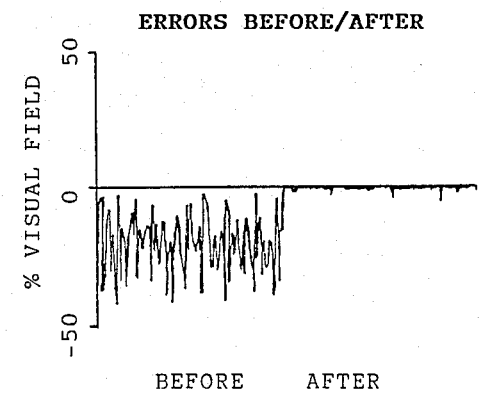
Figure 20A:
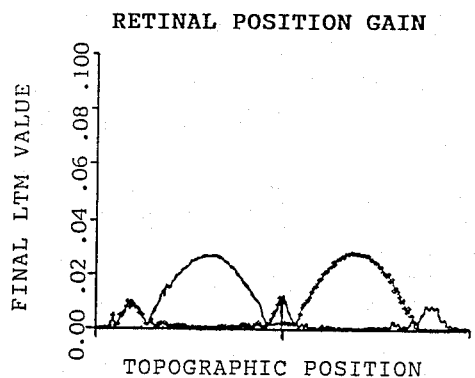
Figure 20D:
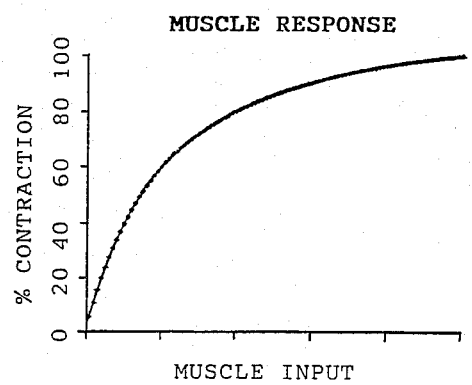
Figure 20B:
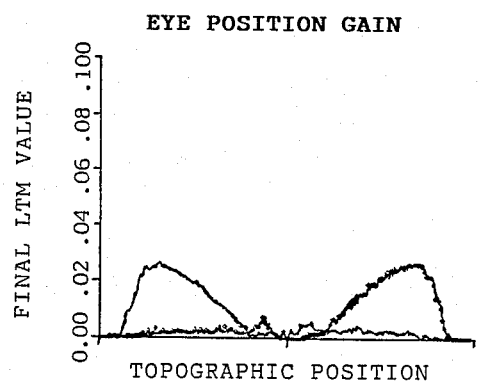
Figure 20E:
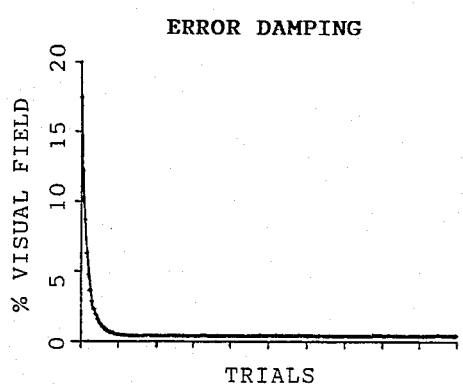
Figure 20C:
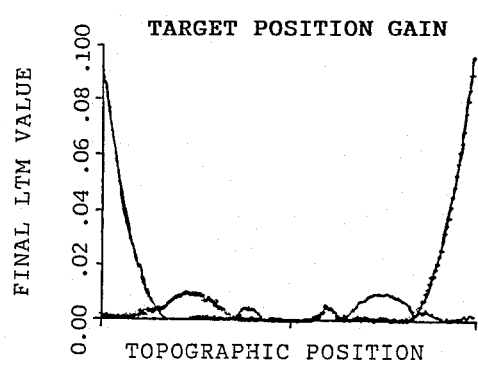
Figure 20F:
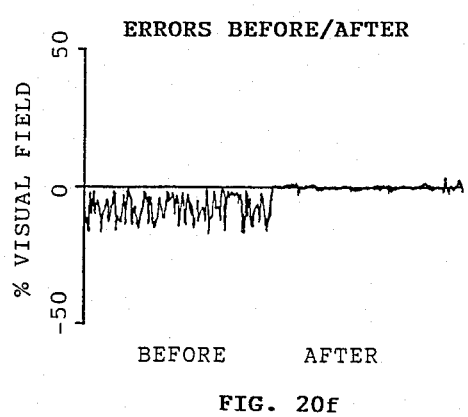
Figure 21A:
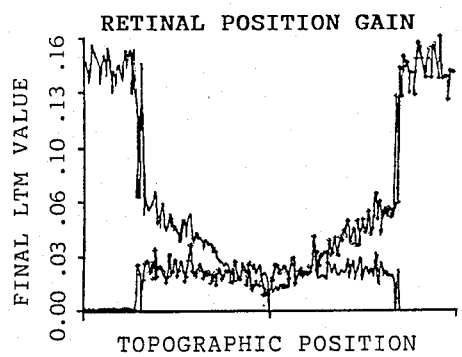
Figure 21C:
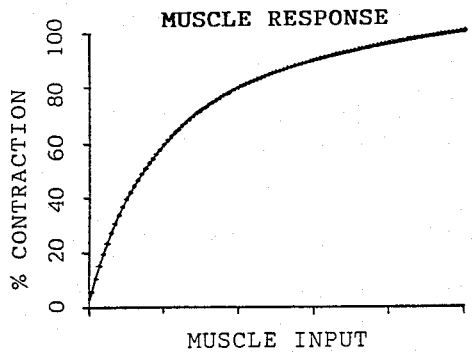
Figure 21B:
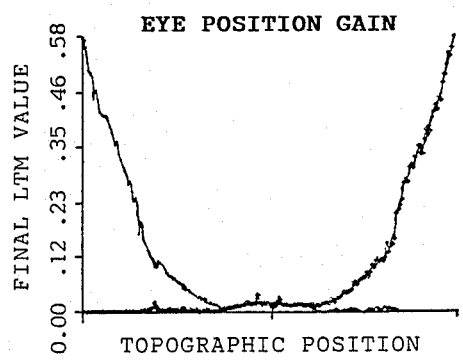
Figure 21D:
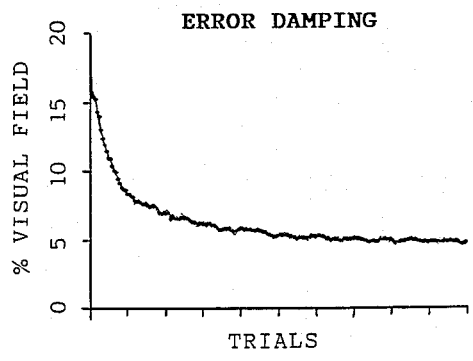
Figure 21E:
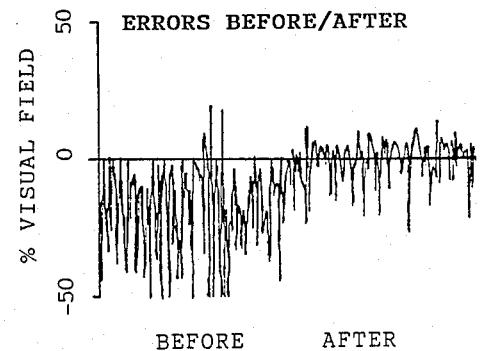
Figure 22A:
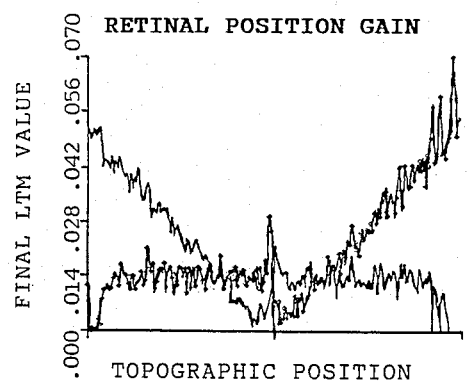
Figure 22C:
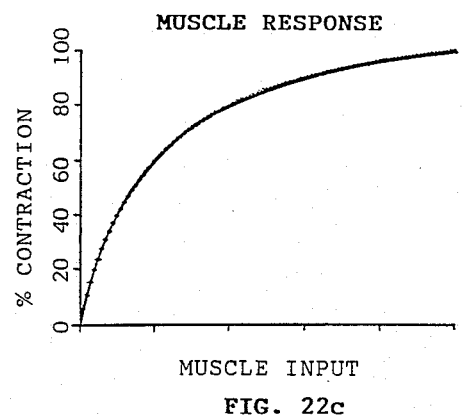
Figure 22B:
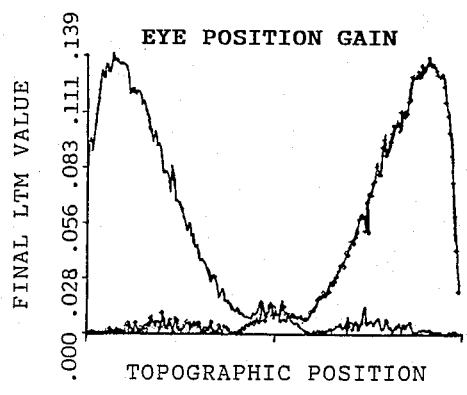
Figure 22D:
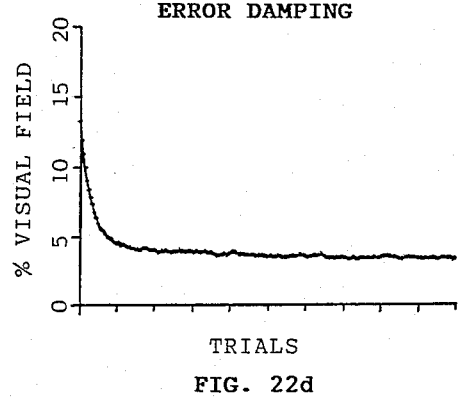
Figure 22E:
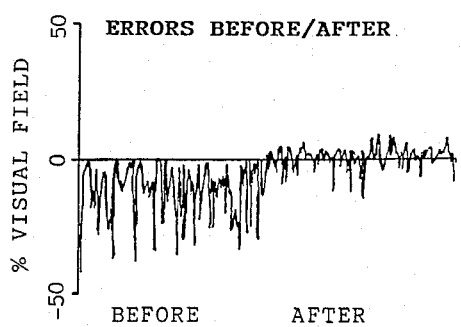
Figure 25A:
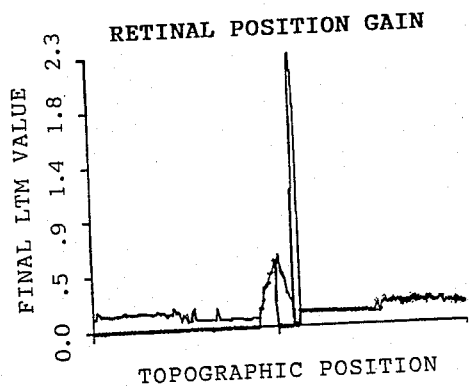
Figure 25B:
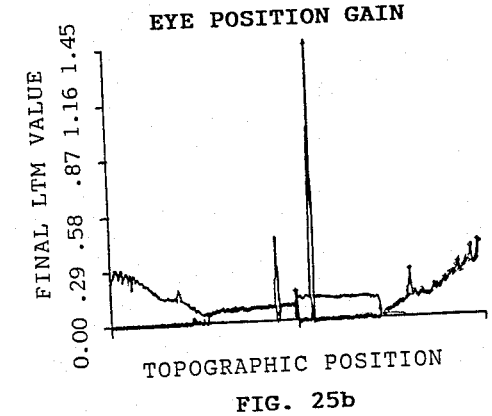
Figure 25C:
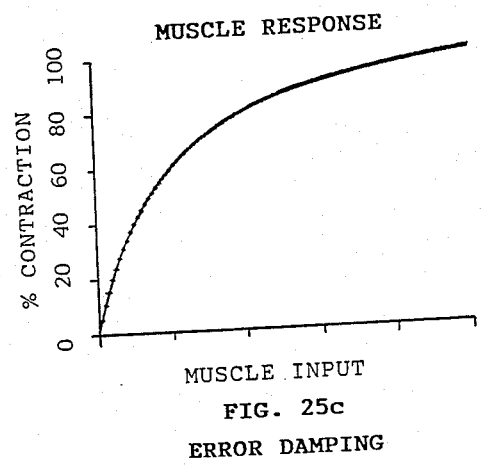
Figure 25D:
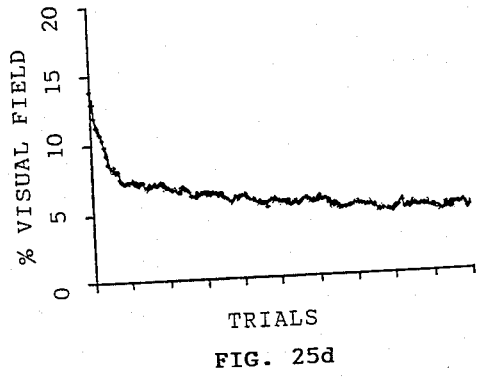
Figure 25E:
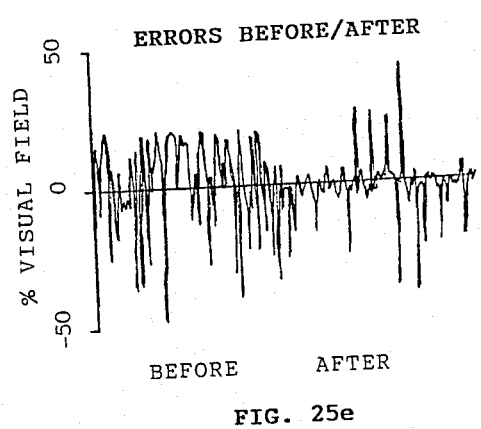
Figure 26A:
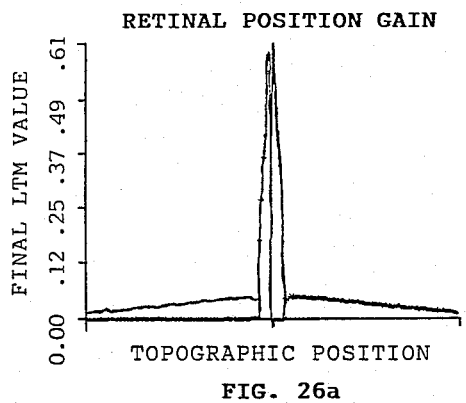
Figure 26C:
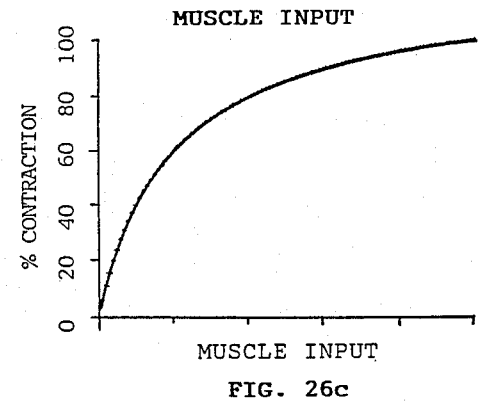
Figure 26B:
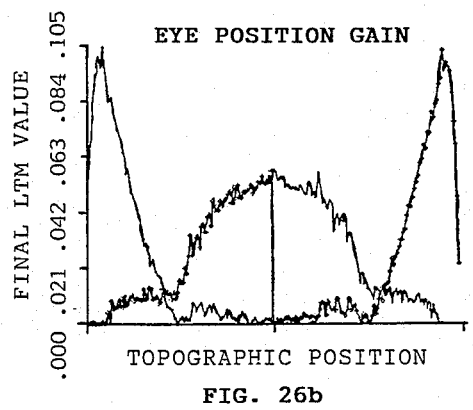
Figure 26D:
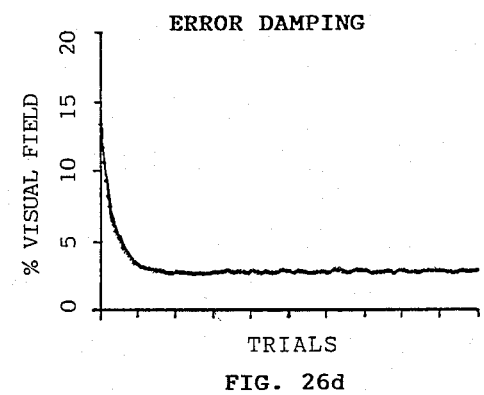
Figure 26E:
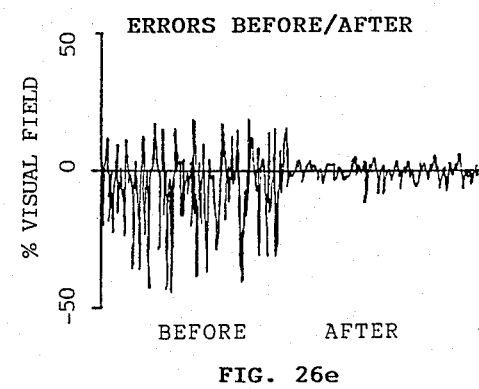

FIGS. 19a–19c show graphic distributions depicting a computer simulation of saccadic error correction with sampling from a non-invariant target position map using a slower-than-linear muscle function and a linear learning function.

FIGS. 20a–20f show graphic distributions depicting a computer simulation of saccadic error with simulations sampling from retinal position, invariant target position, and eye position maps using a slower-than-linear muscle function and a linear learning function.

FIGS. 21a–21e shows graphic distributions depicting a computer simulation of learning using a linear dynamic coast function, a state command rule, and a slower-than-linear muscle response.

FIGS. 22a–22e shows graphic distributions depicting a computer simulation of learning using a linear dynamic coast function, a dynamic command rule, and a slower-than-linear muscle response.

FIGS. 23a–23e shows graphic distributions depicting a computer simulation of learning using a slower-than-linear dynamic coast function, a state command rules, and a slower-than-linear muscle response.

FIGS. 24a–24e shows graphic distributions depicting a computer simulation of learning with a slower-than-linear coast function, a dynamic command rule, and a slower-than-linear muscle response.

FIGS. 25a–25e shows graphic distributions depicting a computer simulation of a sigmoid coast function, a static command rule, and a slower-than-linear muscle response.

FIGS. 26a–26e shows graphic distributions depicting a computer simulation of a sigmoid coast function, a dynamic command rule, and a slower-than-linear muscle response.

Figure 27:
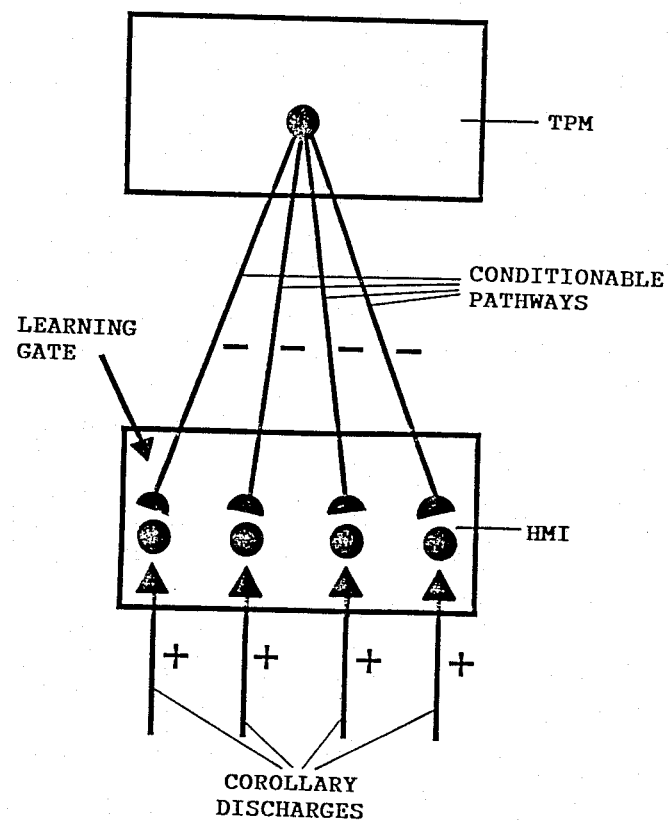

FIG. 27 is a view of a model depicting the recoding of a target position into muscle coordinates at a head-muscle interface, or HMI.

Figure 28:
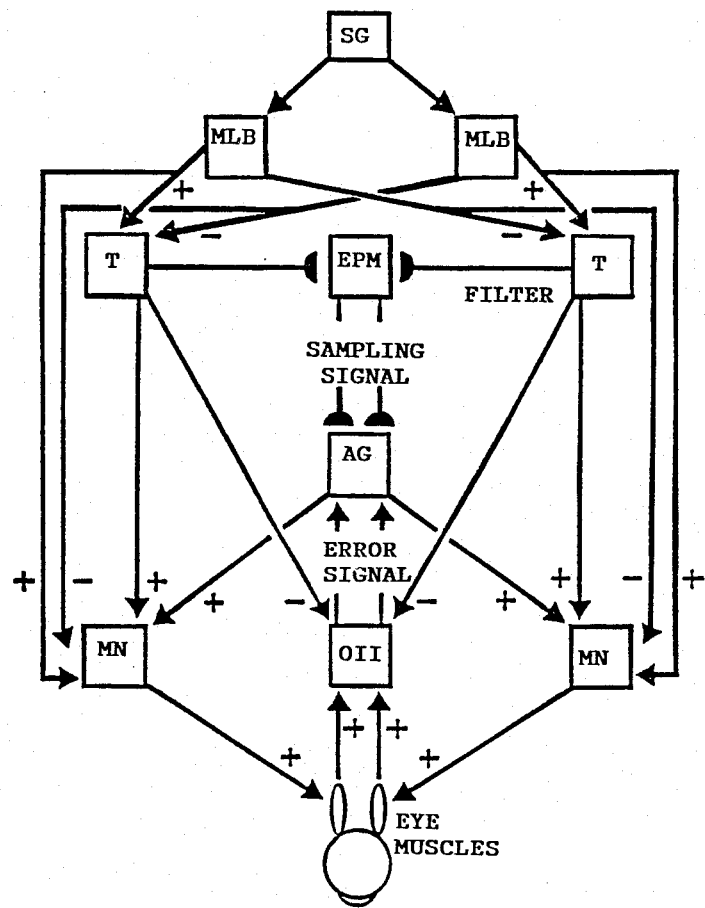

FIG. 28 is a view of a model depicting some finer details of the muscle linearization network.

Figure 29:
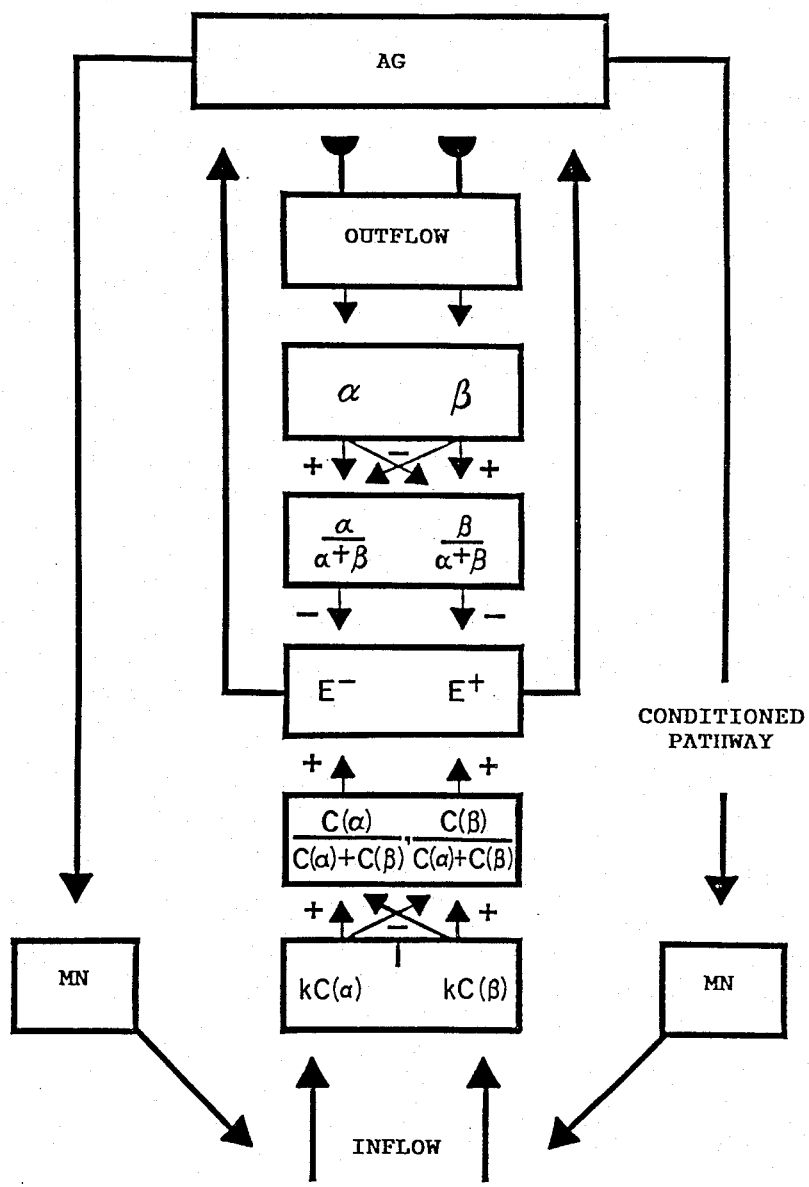

FIG. 29 is a view of a model depicting a microstructure of an outflow-inflow interface whose inflow signals vary monotonically with the amount of muscle contraction.

Figure 30:
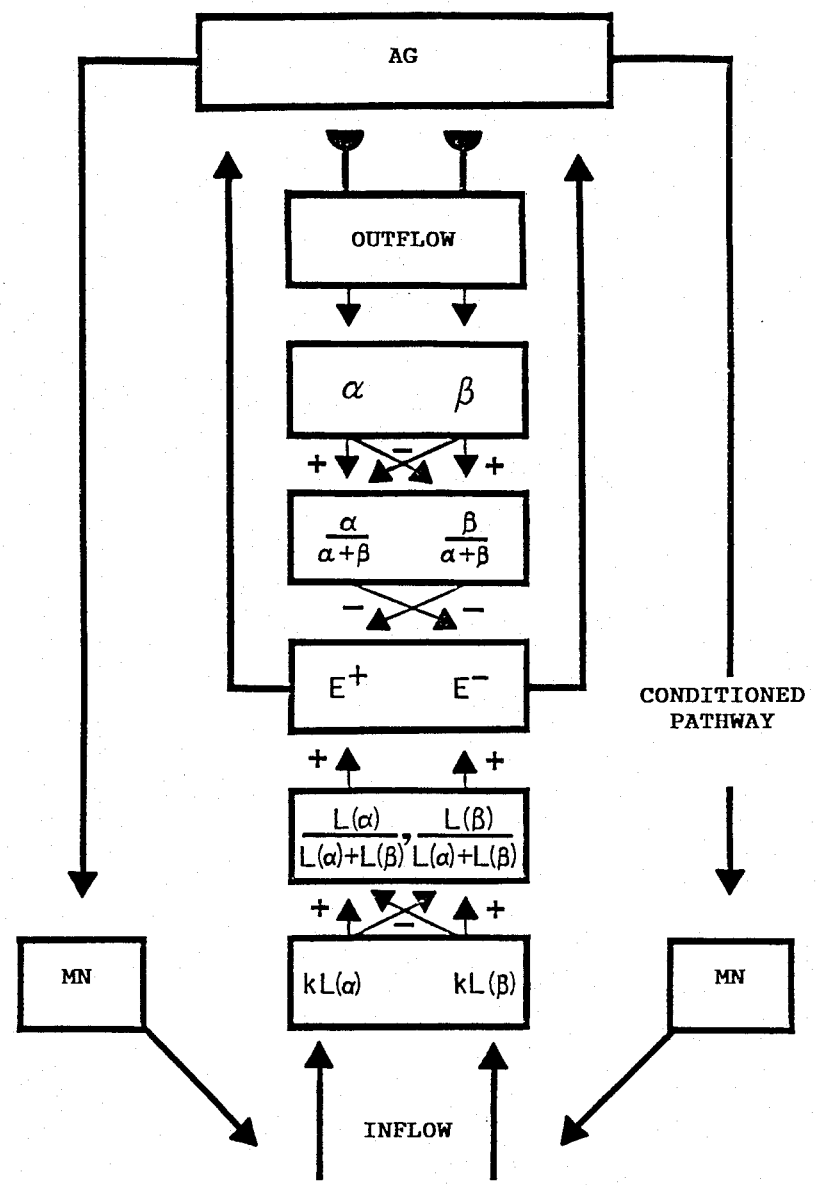

FIG. 30 is a view of a model showing a microstructure of an outflow-inflow interface whose inflow signals vary monotonically with muscle length.

Figure 31:
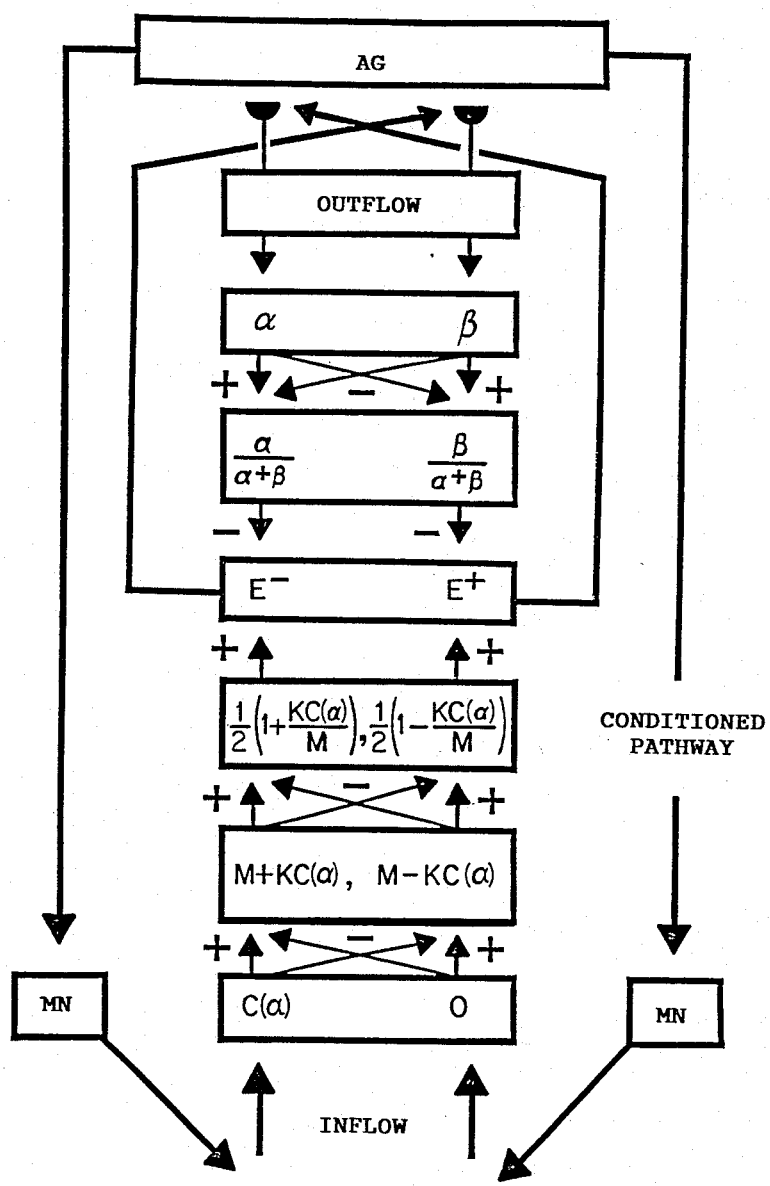

FIG. 31 is a view of a model showing a microstructure of an outflow-inflow interface whose inflow signals are derived only from the muscles that are actively contracting.

Figure 32:
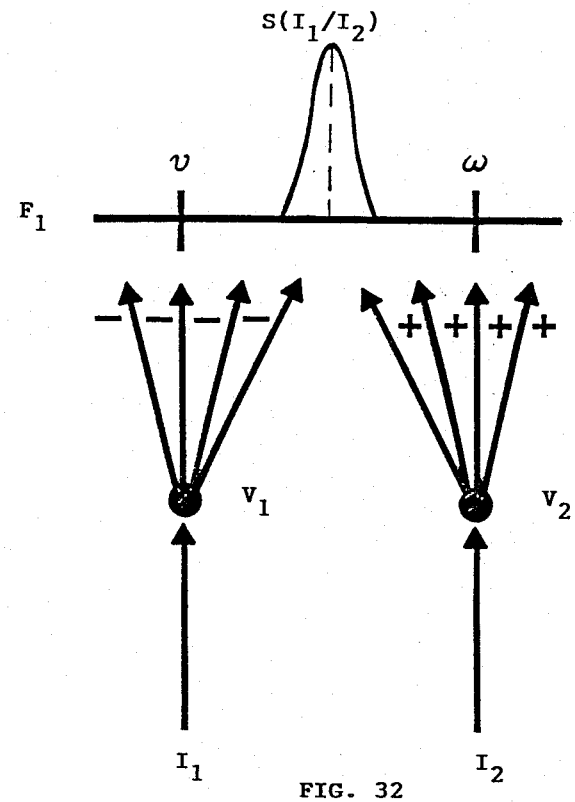

FIG. 32 is a view of a model which shows the mapping of an agonist-antagonist pair of cell populations into a spatial map.

Figure 33:
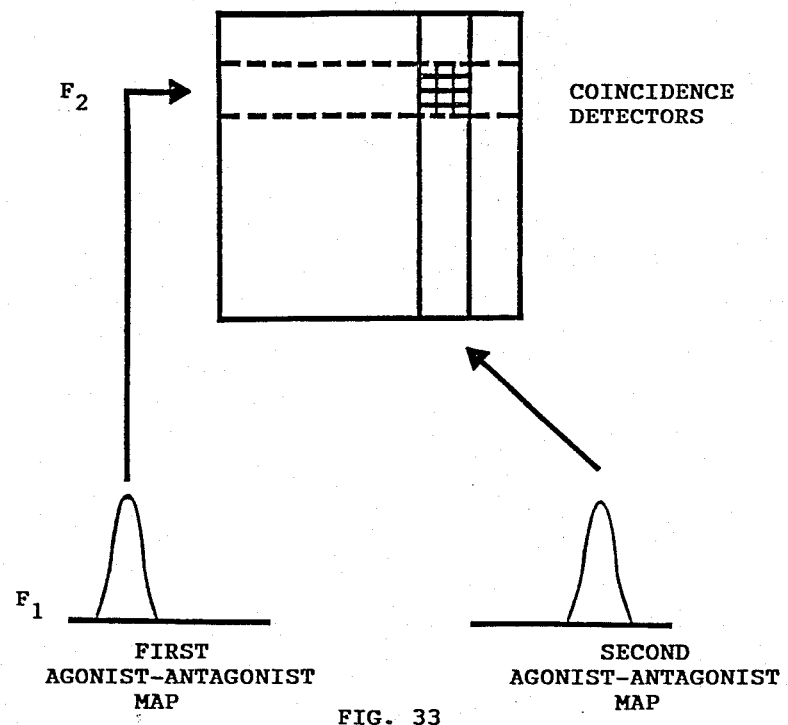

FIG. 33 is a view of a model showing the coincidence detectors at level $F_2$ selectively responding to pairs of spatial positions at $F_1$ which are activated by different agonist-antagonist cell populations.

Figure 34:
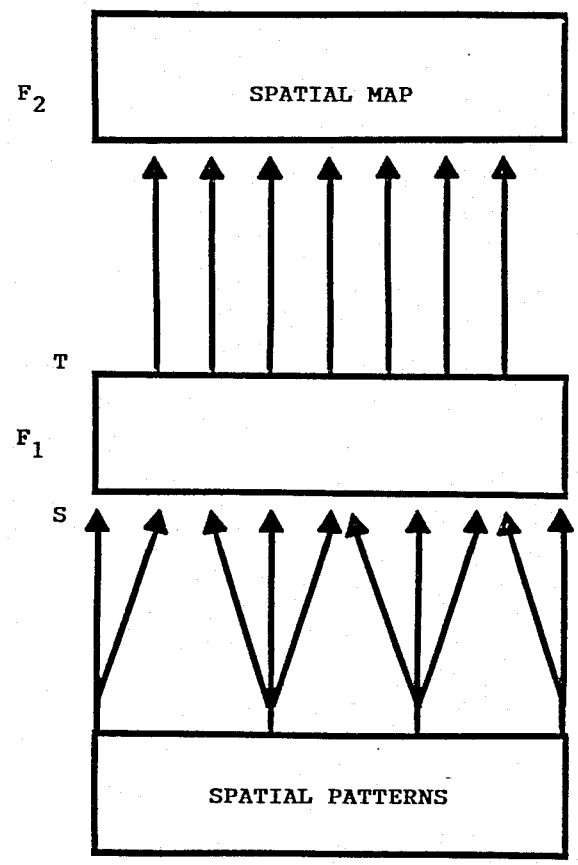

FIG. 34 is a view of a model depicting a position-threshold-slope shift (PTS).

Figure 35A:
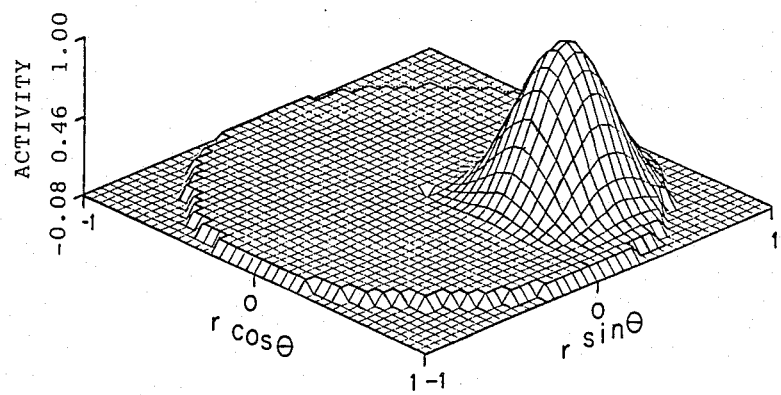
Figure 35B:
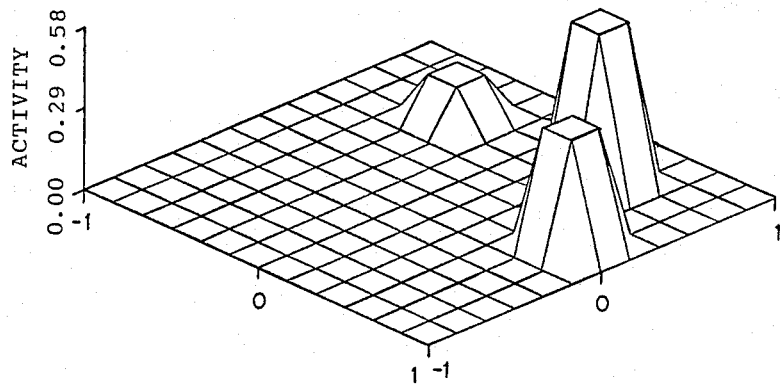

FIGS. 35a and 35b is a view of a model depicting computer simulations of a transformation from and HMI into a retinotopic map using a PTS shift.

Figure 36A:
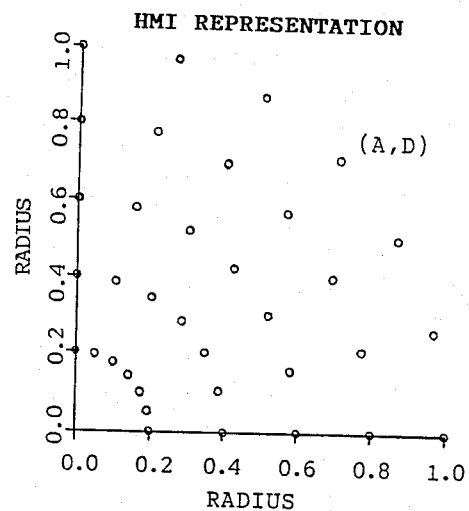
Figure 36B:
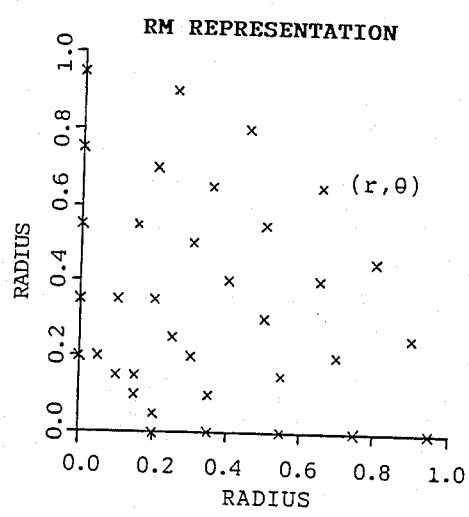

FIGS. 36a and b are views of graphic distributions depicting computer simulations of a tranformation from an HMI shown in (a) to a retinotopic map (RM) shown in (b).

Figure 37:
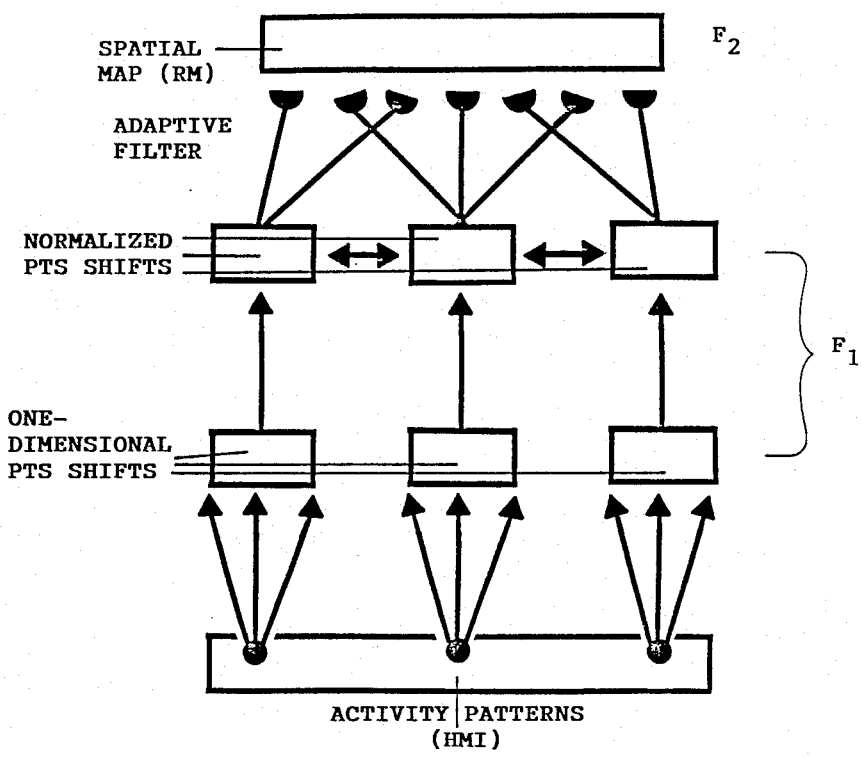

FIG. 37 is a view of a model depicting a self-organizing spatial map.

Figure 38A:
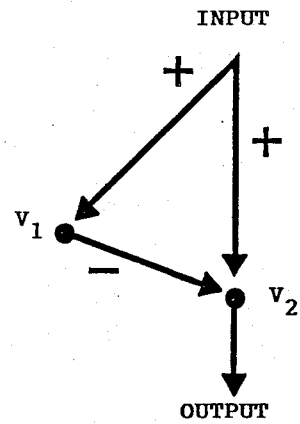

FIG. 38a is a view of a model circuit showing a feed forward inhibitory interneuron $V_1$ which accumulates the activity that counteracts the input a $V_2$.

Figure 38B:
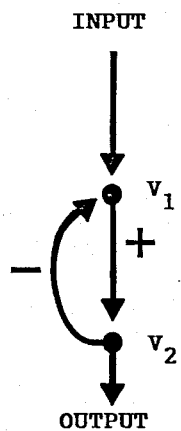

FIG. 38b is a view of an alternate model circuit showing a feedback inhibitory interneuron $V_2$ which accumulates the activity that counteracts the input of $V_1$.

Figure 39:
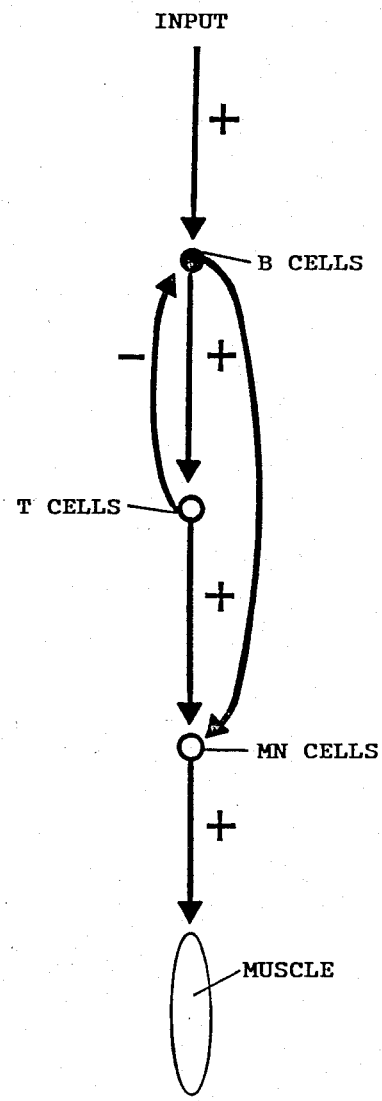

FIG. 39 shows a simple saccade generator circuit in which the duration of B cell activity increases with the intensity of the input.

Figure 40:
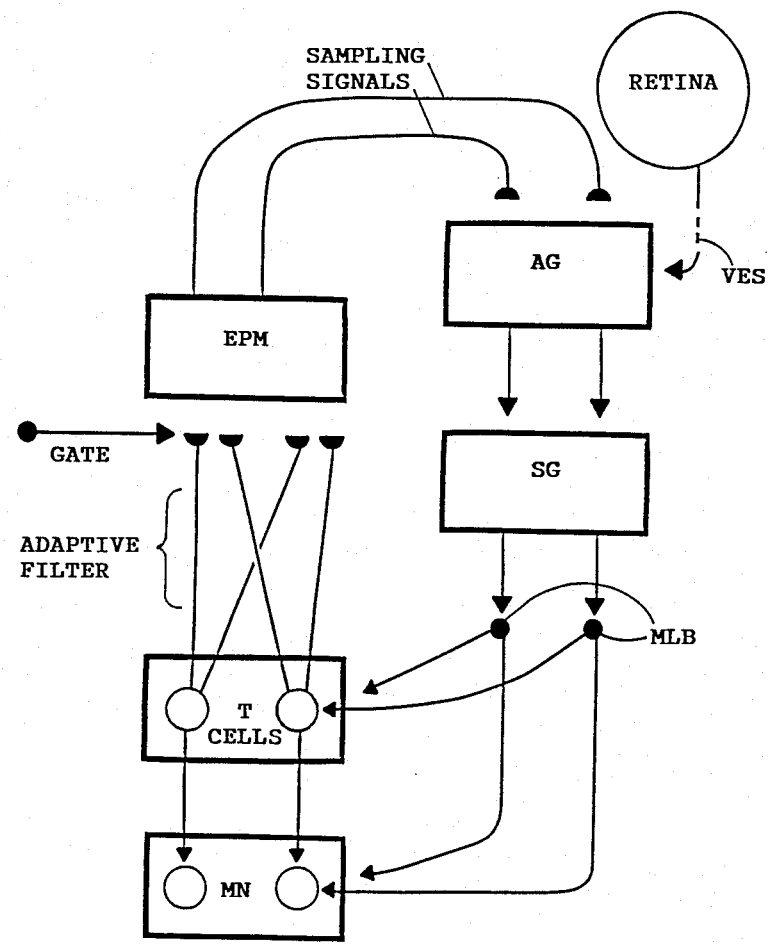

FIG. 40 shows a model depicting an eye position update network (EPUN).

Figure 41:
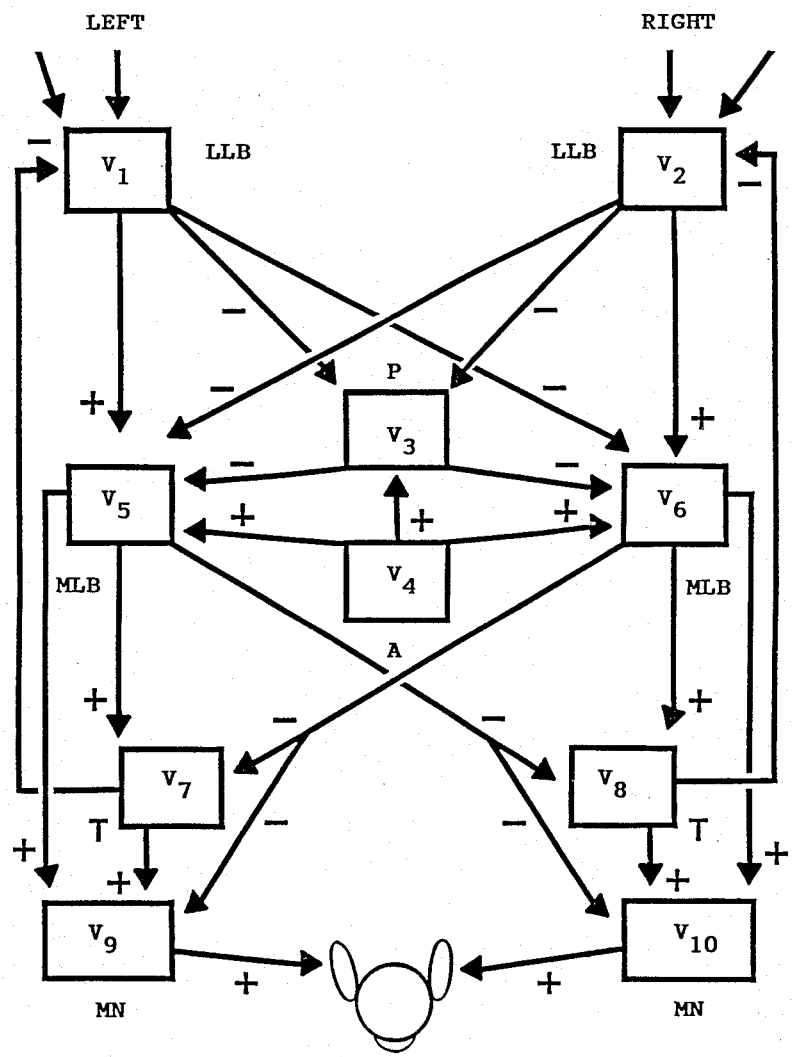

FIG. 41 shows a saccade generator (SG) circuit.

Figure 42:
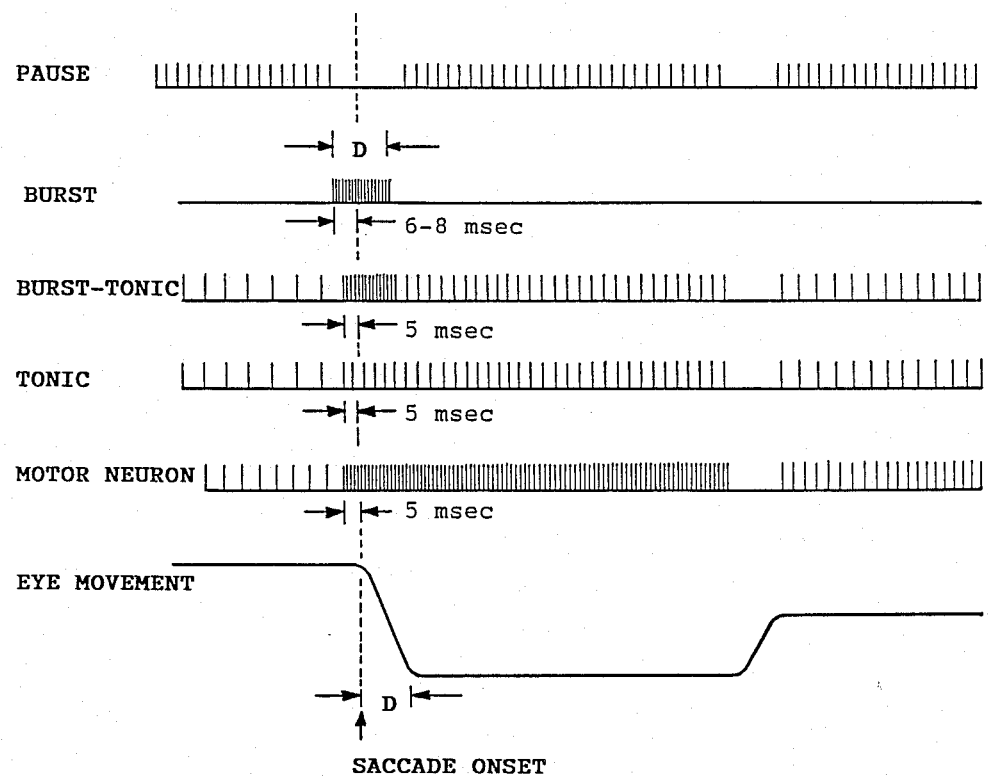

FIG. 42 shows a schematic representation of the electrical activity recorded from cells in a saccade generator.

Figure 43:
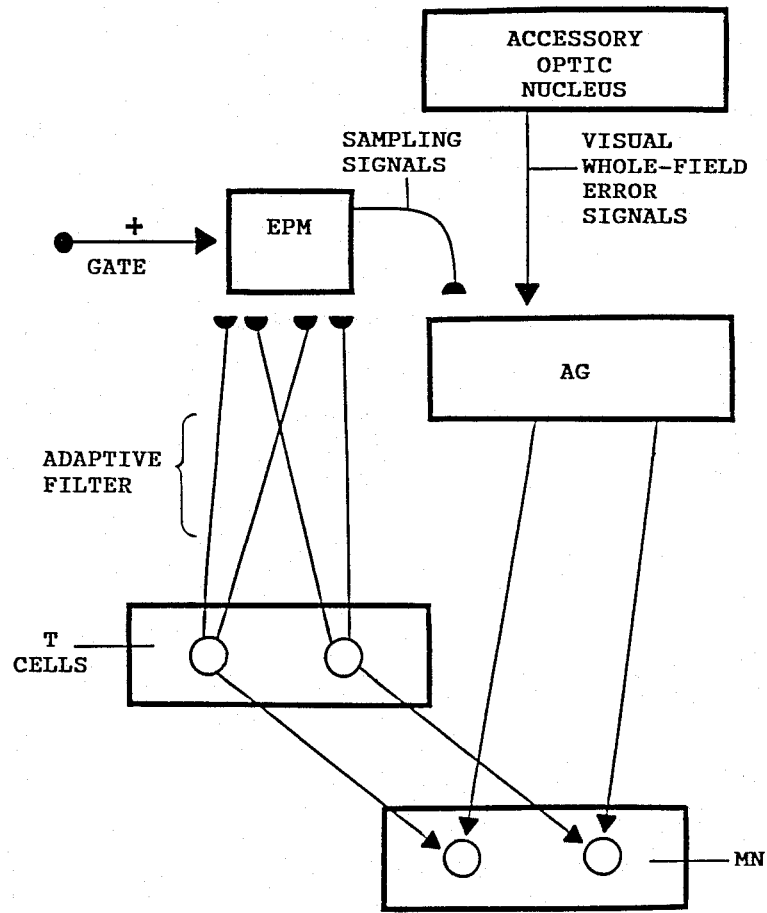

FIG. 43 shows a circuit diagram of a tension equalization network (TEN).

Figure 44:
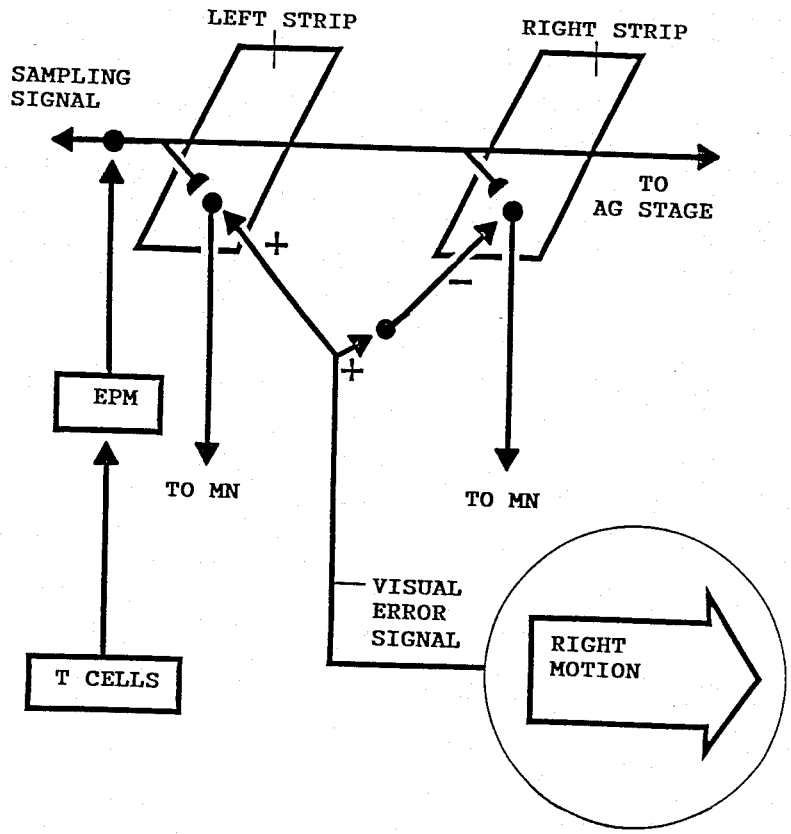

FIG. 44 shows a model which depicts the influence of whole-field visual error signals on the adaptive gain stage.

Figure 45:
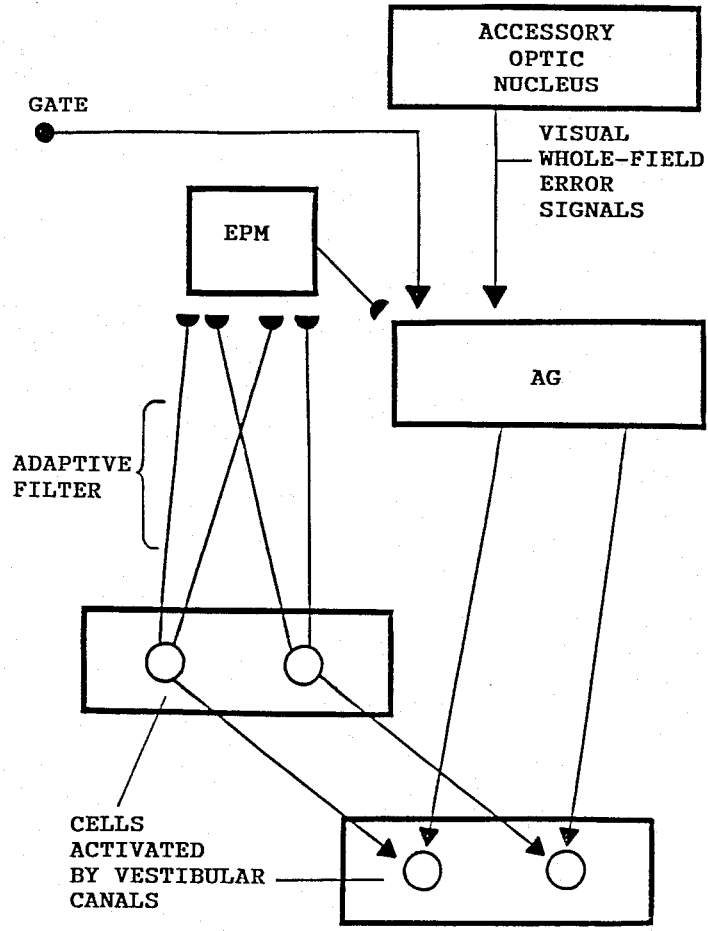

FIG. 45 shows a circuit diagram for vestibulo-ocular reflex adaptation.

Figure 46A:
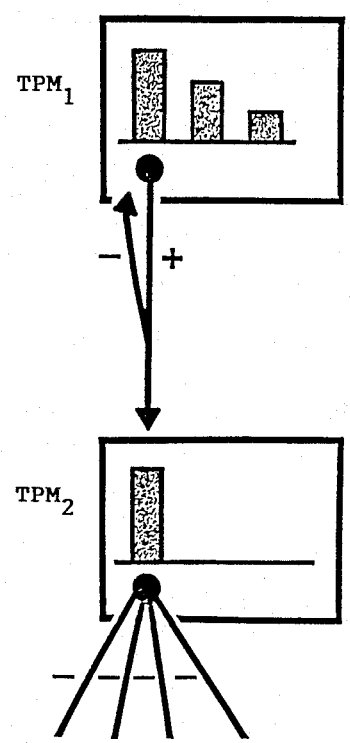

FIG. 46a shows a model depicting the read-out of the most active population in the first stage of the target position map ($TPM_1$) when it self-inhibits its activity as it is stored in the second stage of the target position map ($TPM_2$).

Figure 46B:
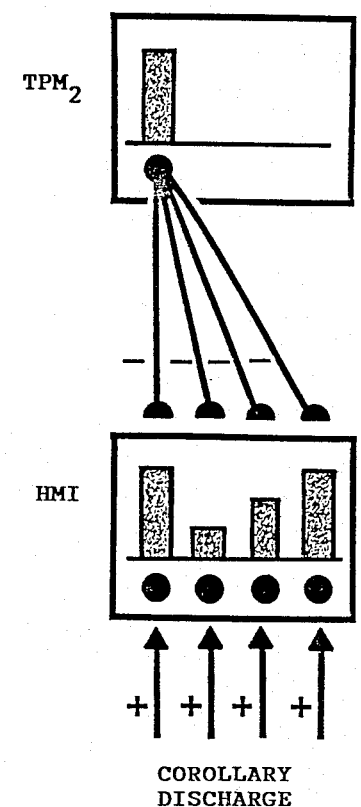

FIG. 46b shows a model depicting the $TPM_2$ activating its inhibitory conditioned pathways to the head-muscle interface (HMI), at which excitatory discharges are also received.

Figure 47A:
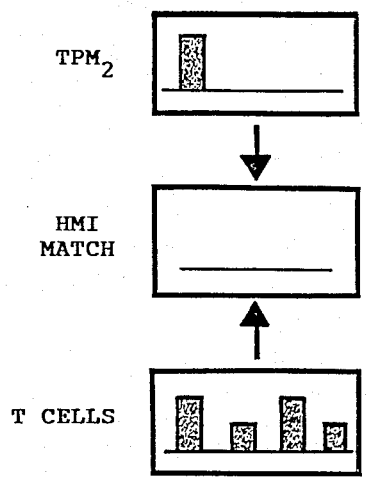
Figure 47B:
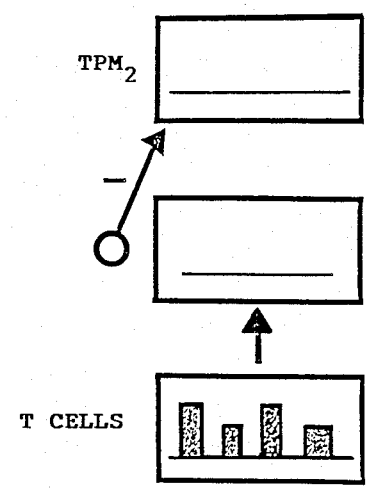
Figure 47C:
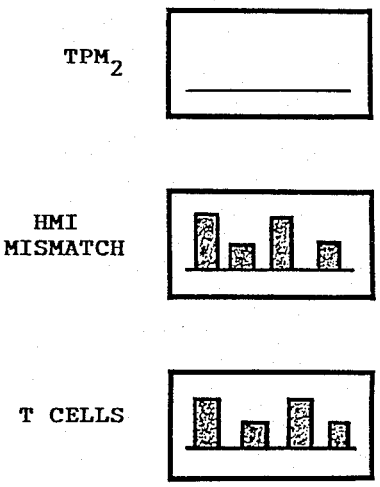

FIGS. 47a–47c shows the interactions between a target position map $TPM_2$ of FIGS. 46a and b, a head-muscle interface, and a tonic cell source of corollary discharges.

Figure 48:
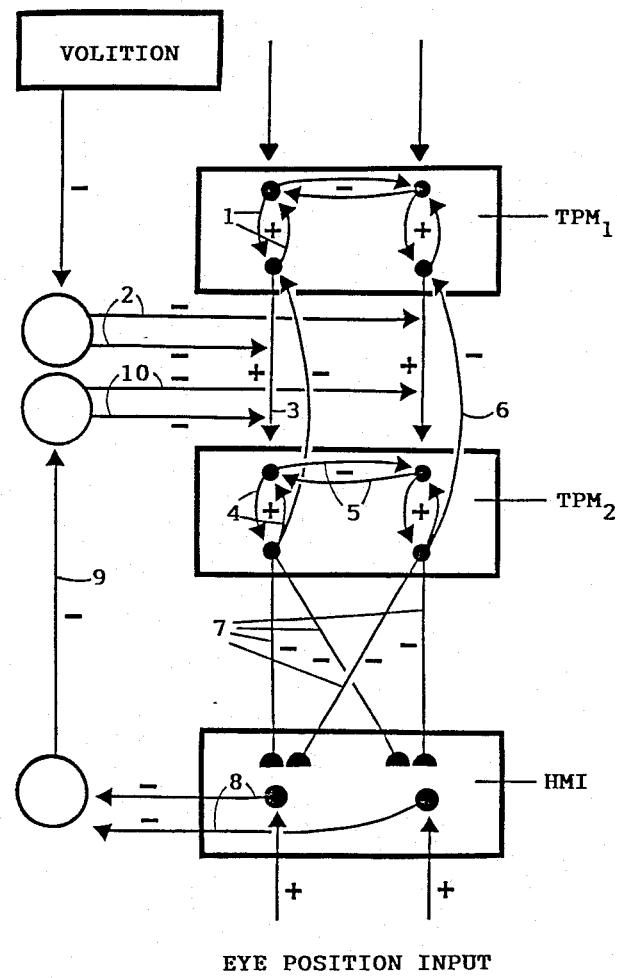

FIG. 48 shows a model depicting part of the predictive command network circuitry for storing.

Figure 49:
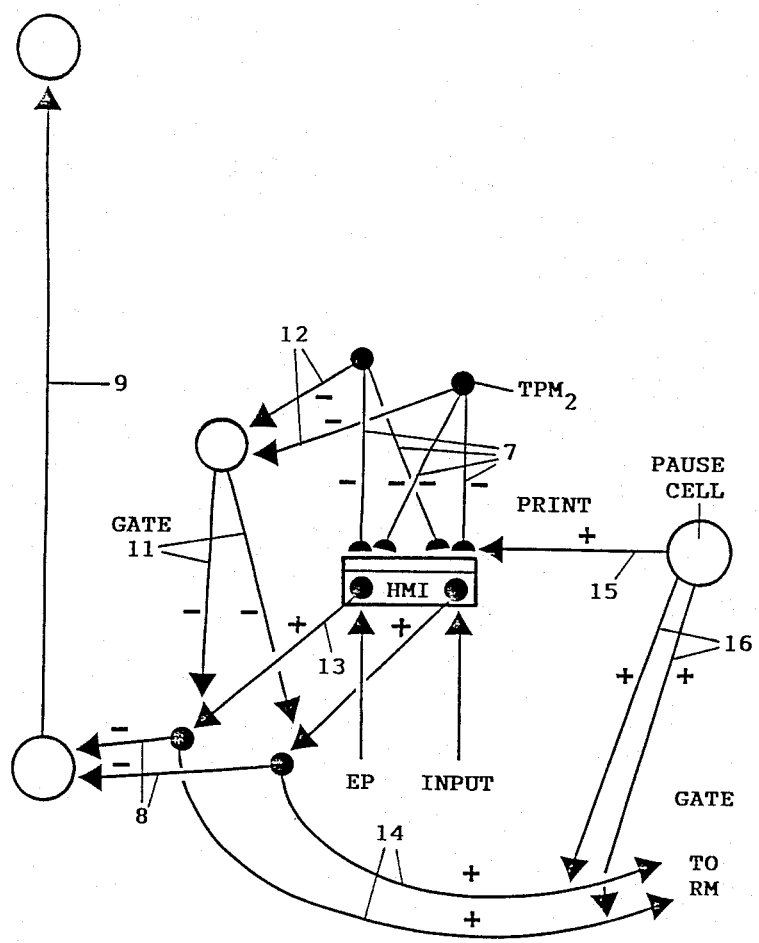

FIG. 49 shows a microcircuitry of the predictive $TPM_2$ and its HMI of FIGS. 46a and b.

Figure 50A:
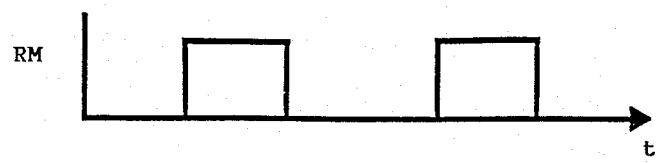
Figure 50B:
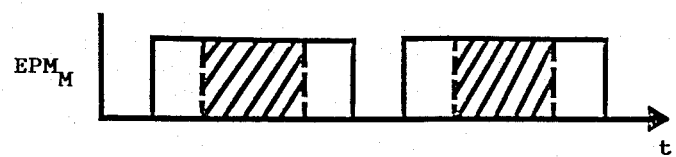
Figure 50C:
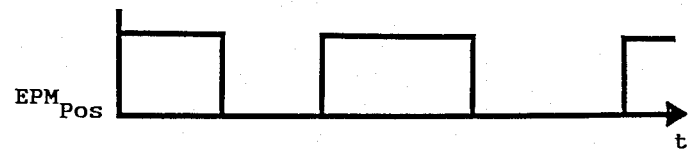

FIGS. 50a–50c shows the timing activity in the retinotopic map.

FIGS. $51a_1$, $51a_2$ and $51b$ show a possible circuit for direct recoding of retinotopic positions into difference vectors.

Figure 52:
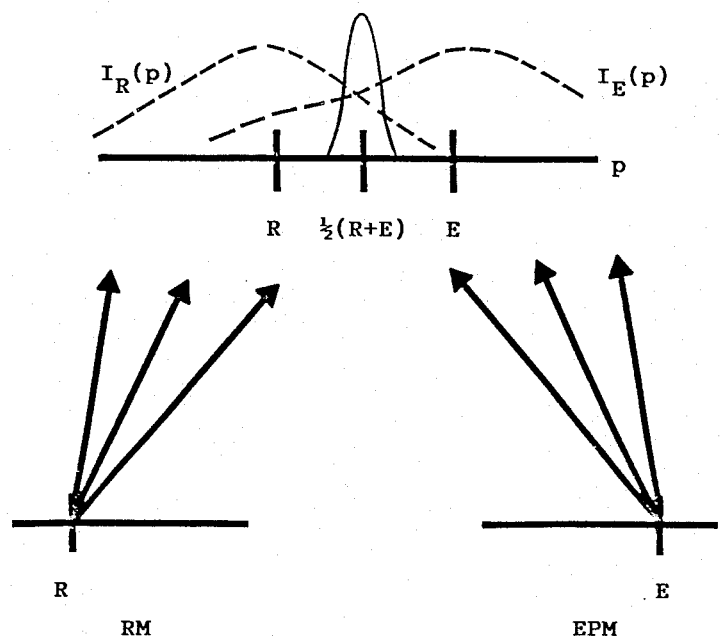

FIG. 52 shows a model for the generation of a one-dimensional target position map from a one-dimensional retinotopic map and eye position map.

Figure 53:
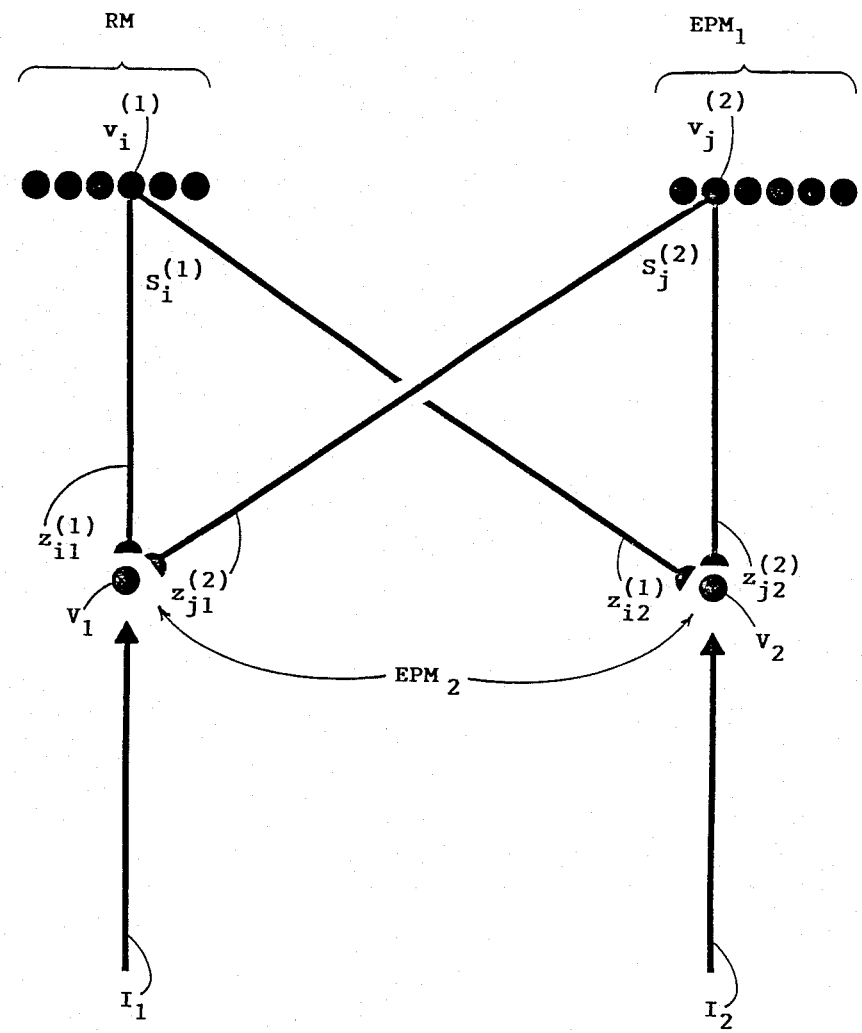

FIG. 53 is a view of an invariant self-regulating target position map having simultaneous sampling by a retinotopic map and an eye position map of another eye position map.

FIGS. 54a–54f show a graphic display depicting the expansion of LTM maps due to increase the number of cells in the RM and an $EPM_1$ which sample an $EPM_2$.

Figure 55A:
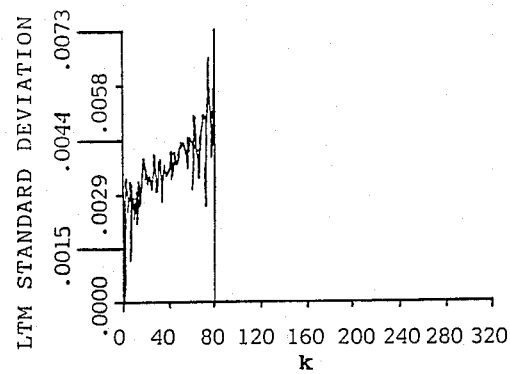
Figure 55B:
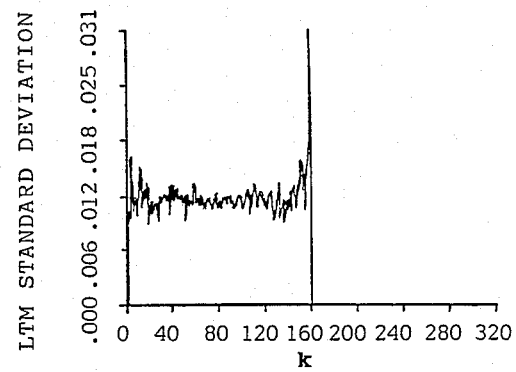
Figure 55C:
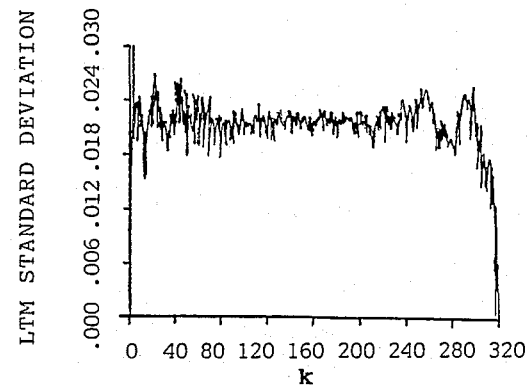

FIGS. 55a–55c shows graphic displays depicting the standard deviation $U_k^{(m)}$ in equation 10.34 which measures map invariance.

Figure 56A:
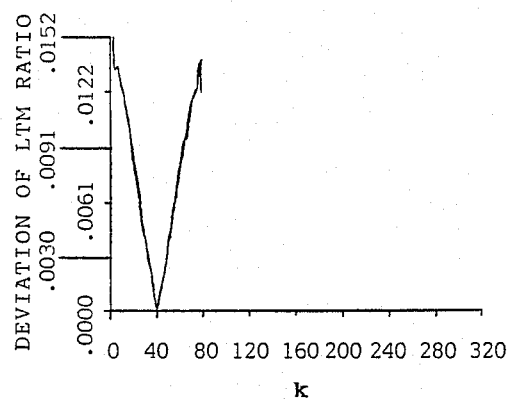
Figure 56B:
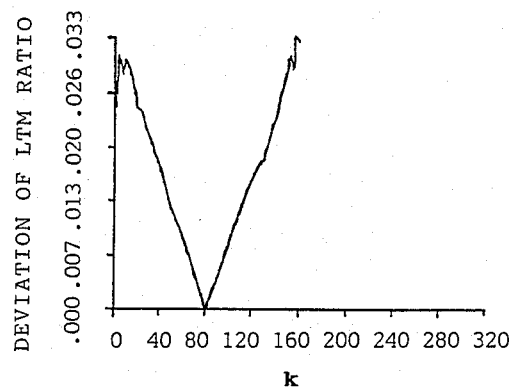
Figure 56C:
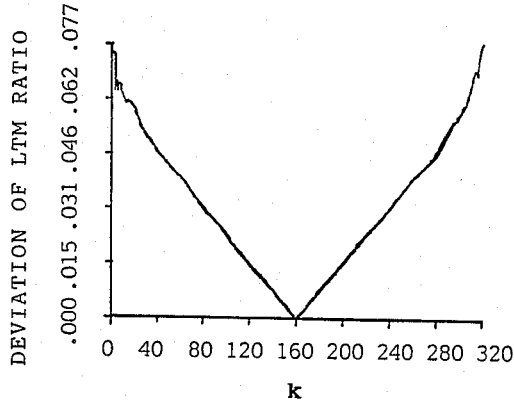

FIGS. 56a–56c shows graphic displays depicting the standard deviation $V_k^{(m)}$ in equation 10.35 which measures map invariance.

Figure 57:
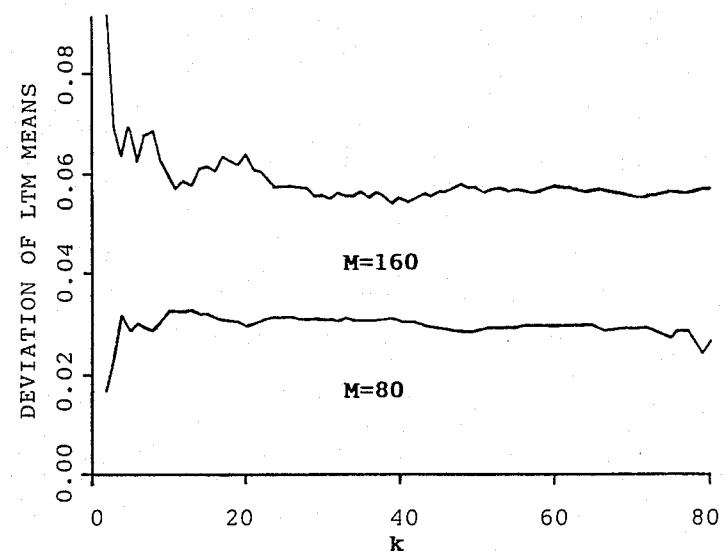
Figure 58A:
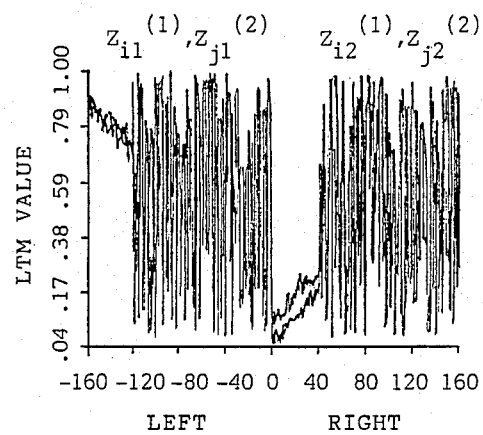
Figure 58B:
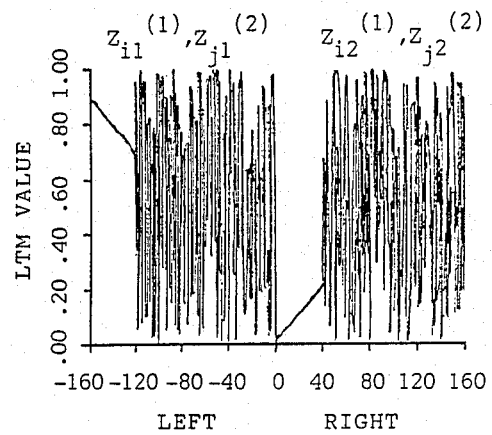
Figure 58C:
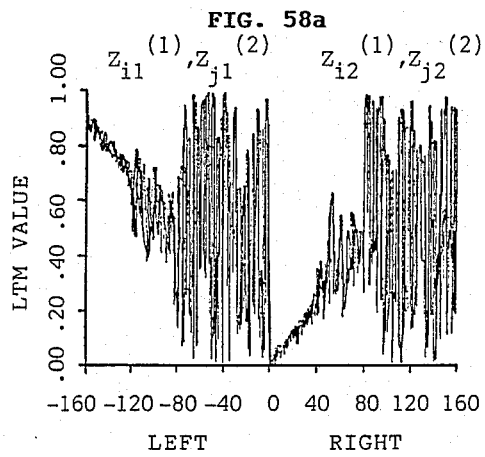
Figure 58D:
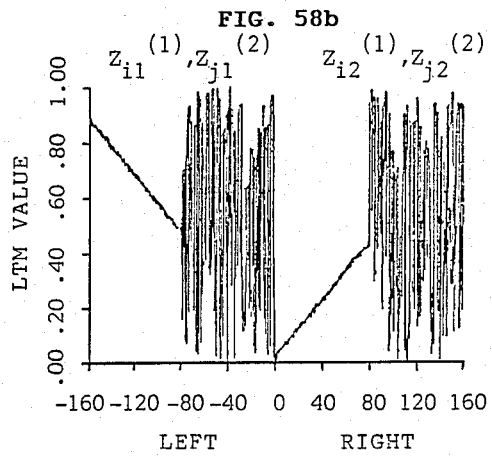
Figure 58E:
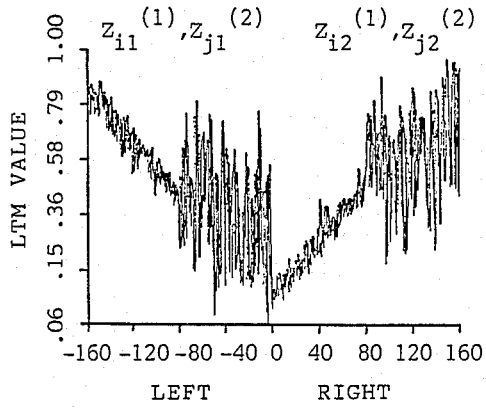
Figure 58F:
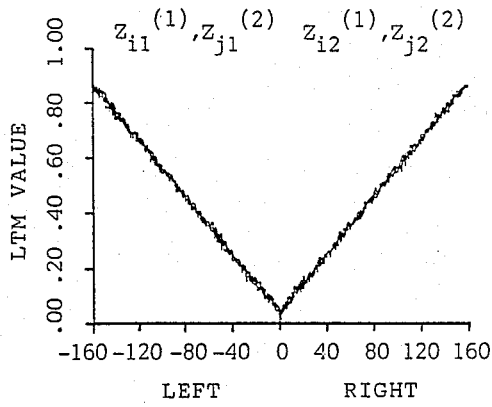

FIG. 57 shows graphic displays depicting the standard deviation $W_k^{(m,40)}$ in equation 10.36 which measures map self-regulation.

FIGS. 58a–58f show graphic displays depicting the expansion of LTM maps due to an increase of the number of cells in the RM and the $EPM_1$ which sample the $EPM_2$.

Figure 59:
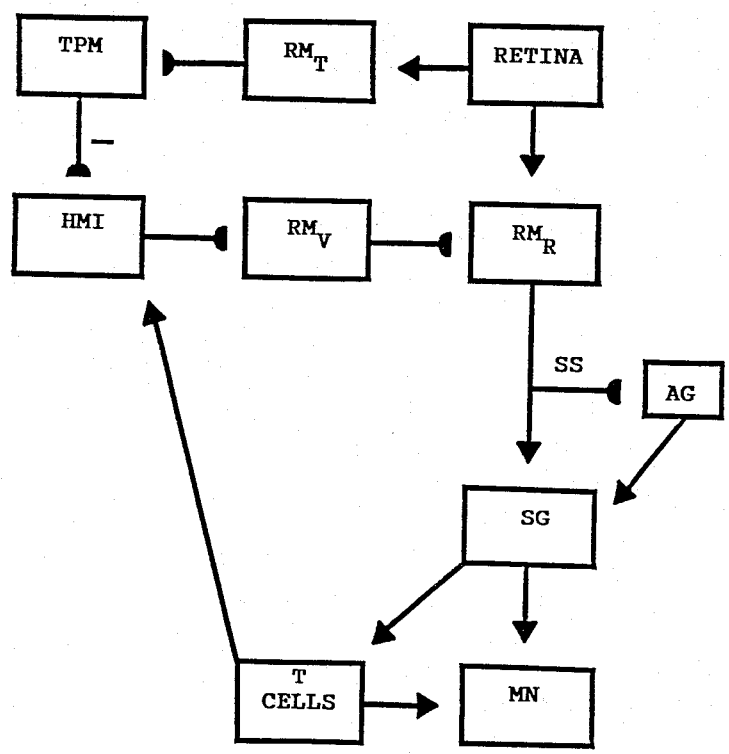

FIG. 59 is a view of a model which shows the interactions between the retinotopic command network and the vector command network.

Figure 60:
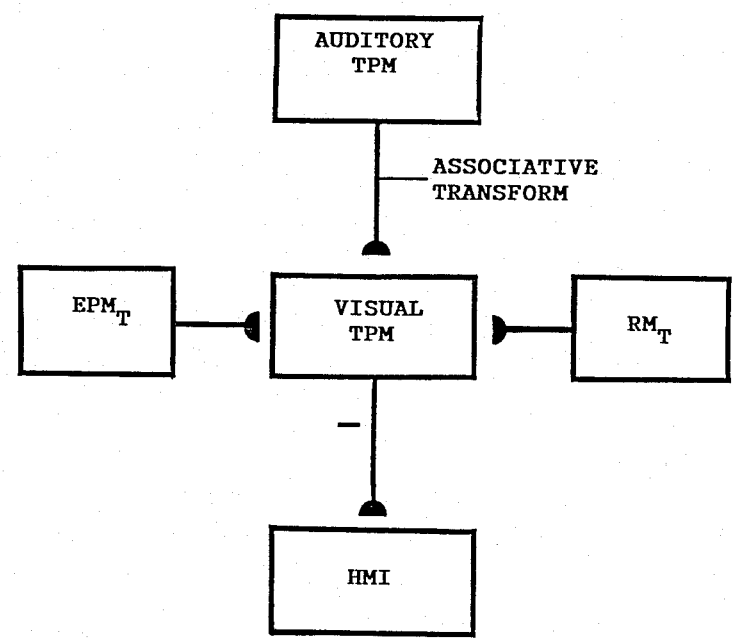

FIG. 60 is a view of a model which shows an auditory target position map (TPM), which can be associatively mapped upon a visual TPM because the two maps are dimensionally consistent.

Figure 61:
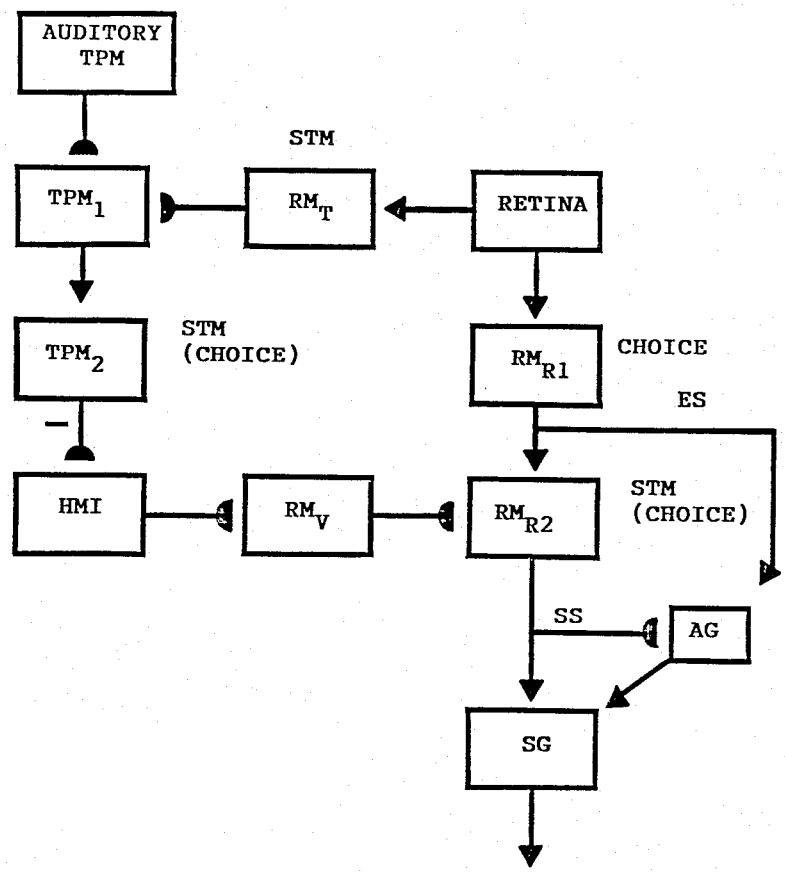

FIG. 61 is a view of a model which shows a refinement of the circuit in FIG. 59.

Figure 62:
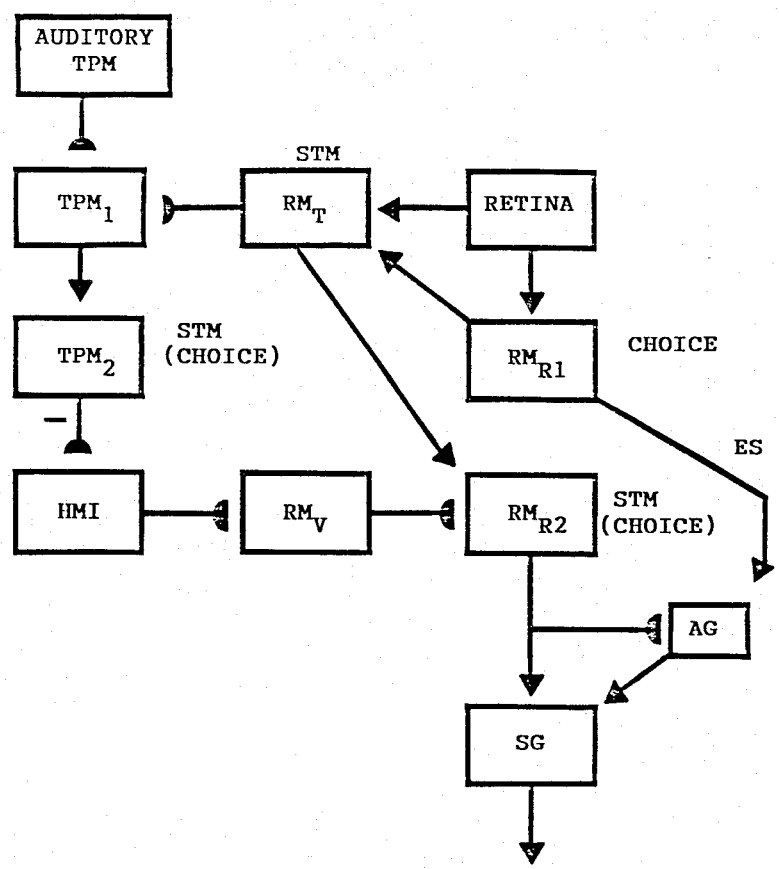

FIG. 62 is a view of a model which shows a variation on the circuit in FIG. 61.

Figure 63:
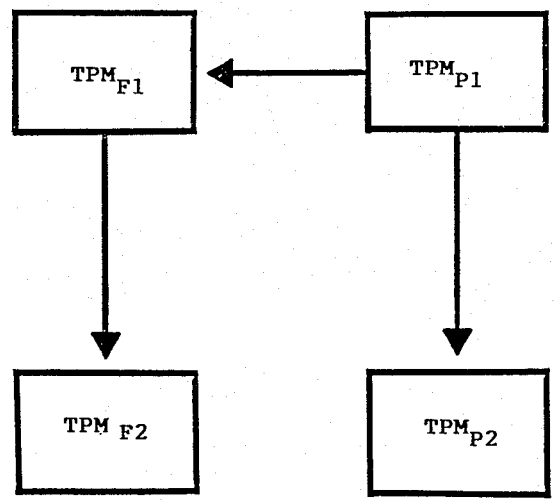

FIG. 63 is a view of a model which shows a possible circuit for connecting an attentionally modulated target position map ($TPM_{p1}$) with a predictive target position map ($TPM_{F1}$).

Figure 64A:
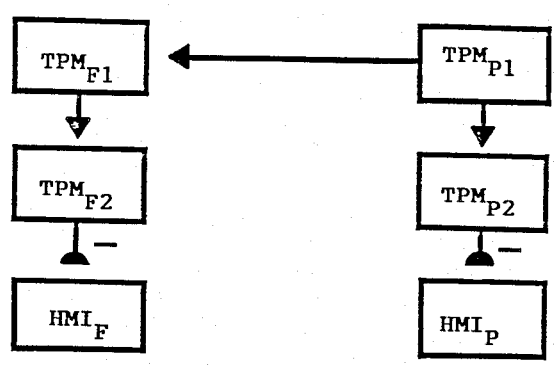
Figure 64B:
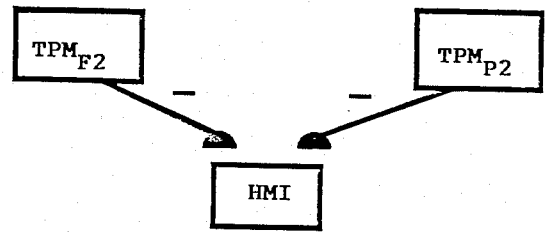
Figure 64C:
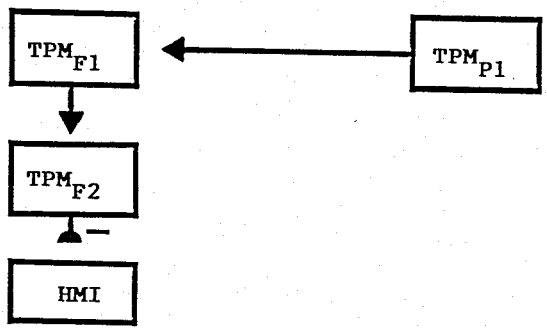

FIGS. 64a–64c are views of models which show possible circuits for attaching a head-muscle interface to a target position map.

Figure 65:
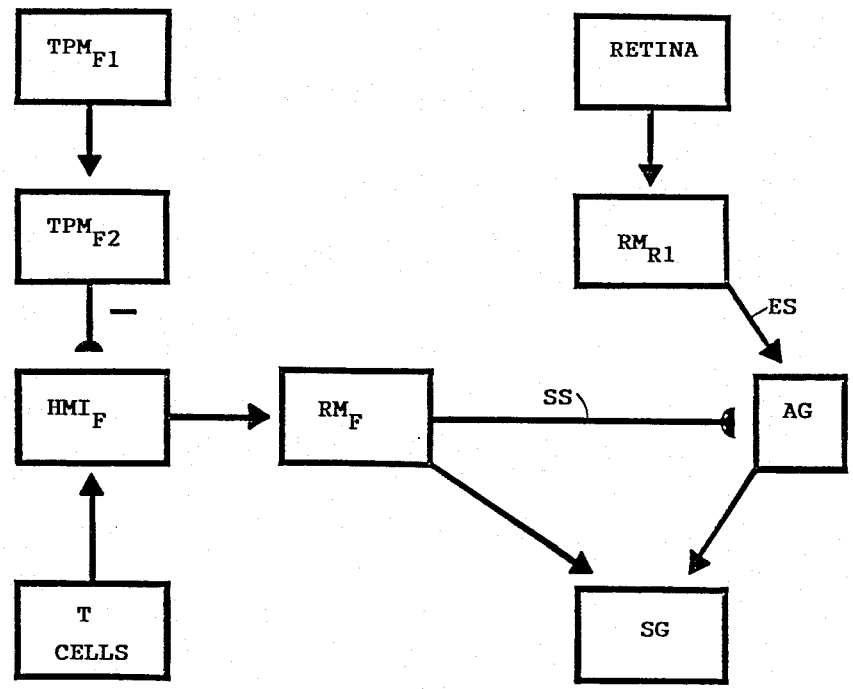

FIG. 65 is a view of a model which shows a circuit in which the predictive system controls its own unconditioned and conditioned movement pathways.

Figure 66:
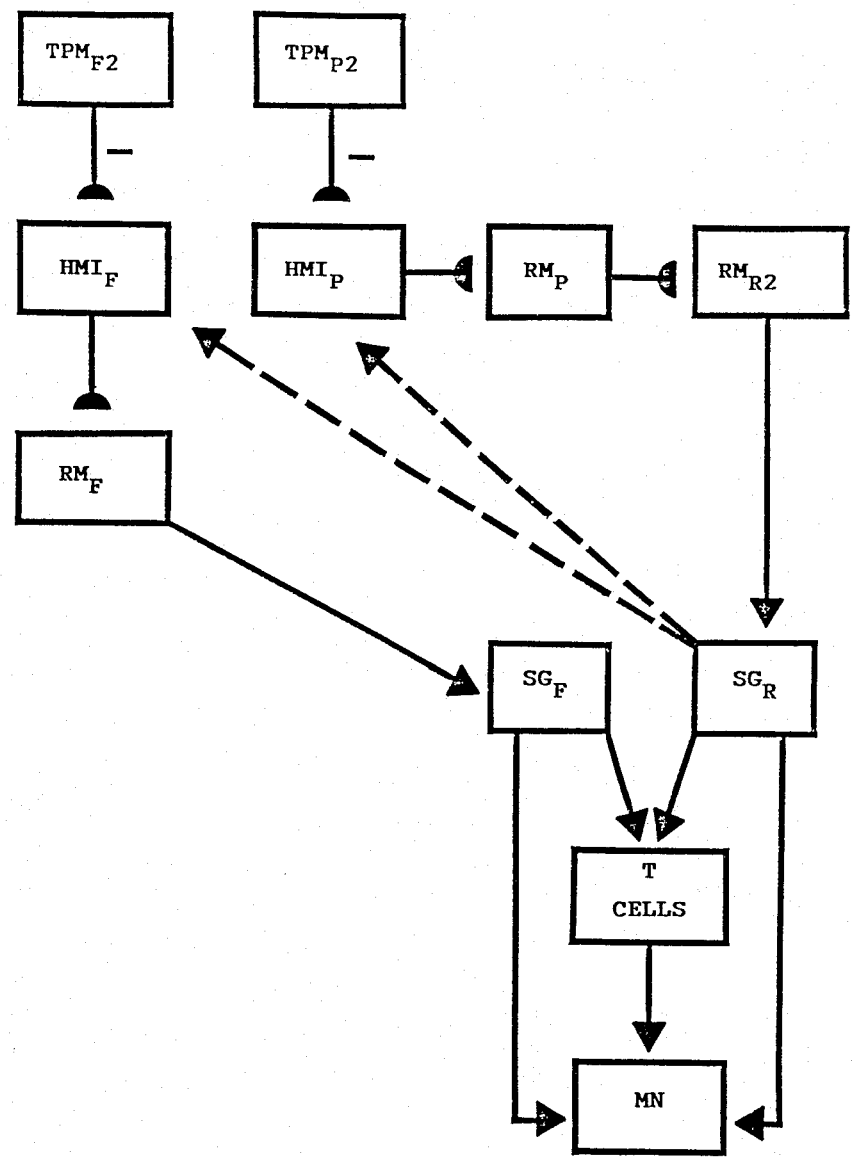

FIG. 66 is a view of a model which shows the regulation of target position learning within both the parietal head-muscle interface and the frontal head-muscle interface by the same source of gating signals.

Figure 67:
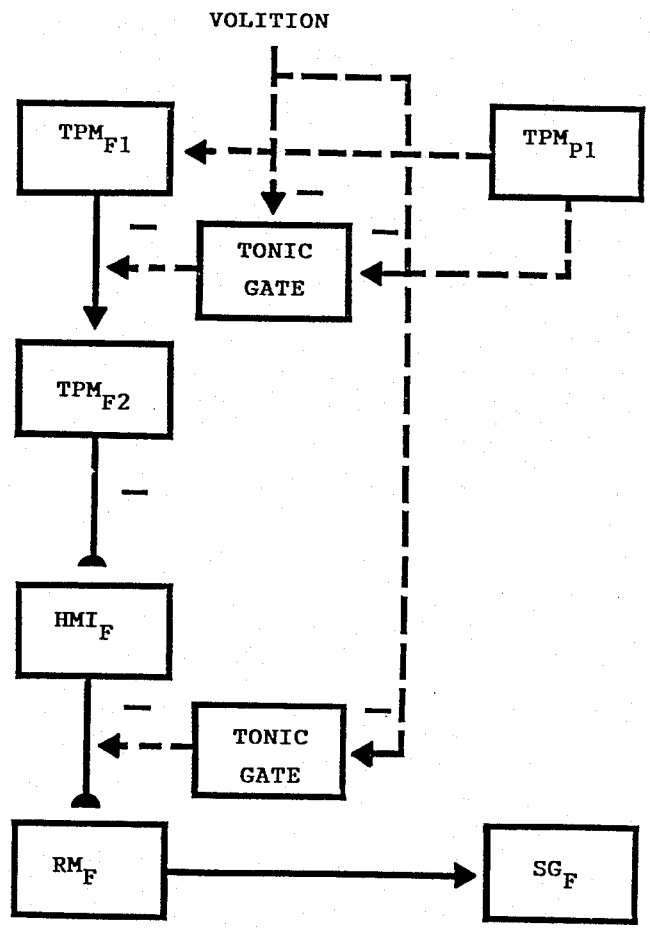

FIG. 67 is a view of the model which shows the gating signals which regulate the predictive, or frontal command system.

Figure 68:
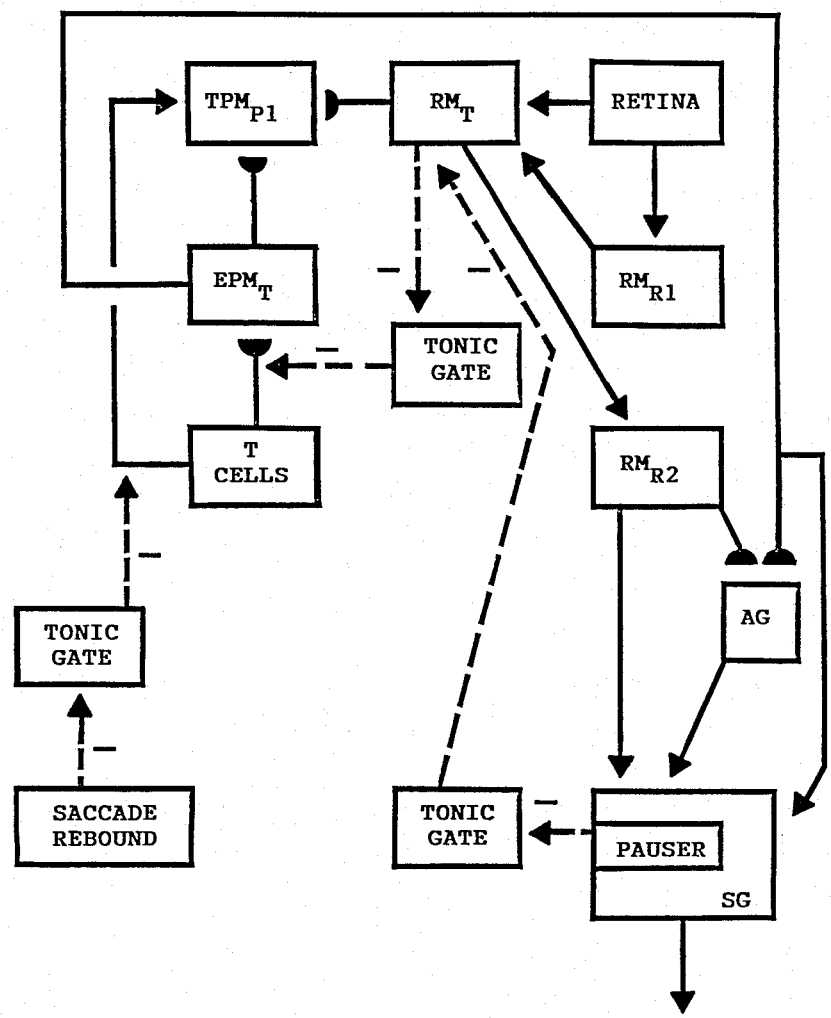

FIG. 68 is a view of a model which shows the gating of map reset events by signals from the saccade generator (SG).

Figure 69:
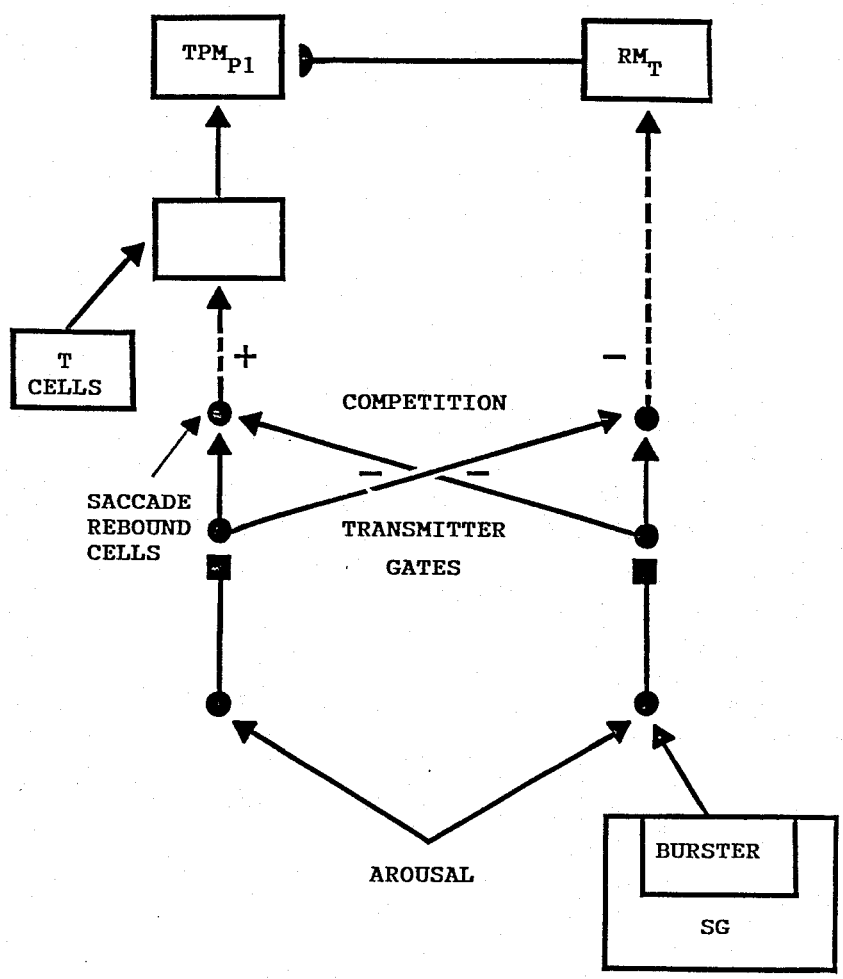

FIG. 69 is a view of a model depicting a possible mechanism giving rise to the saccade rebound cells of FIG. 68.

Figure 70:
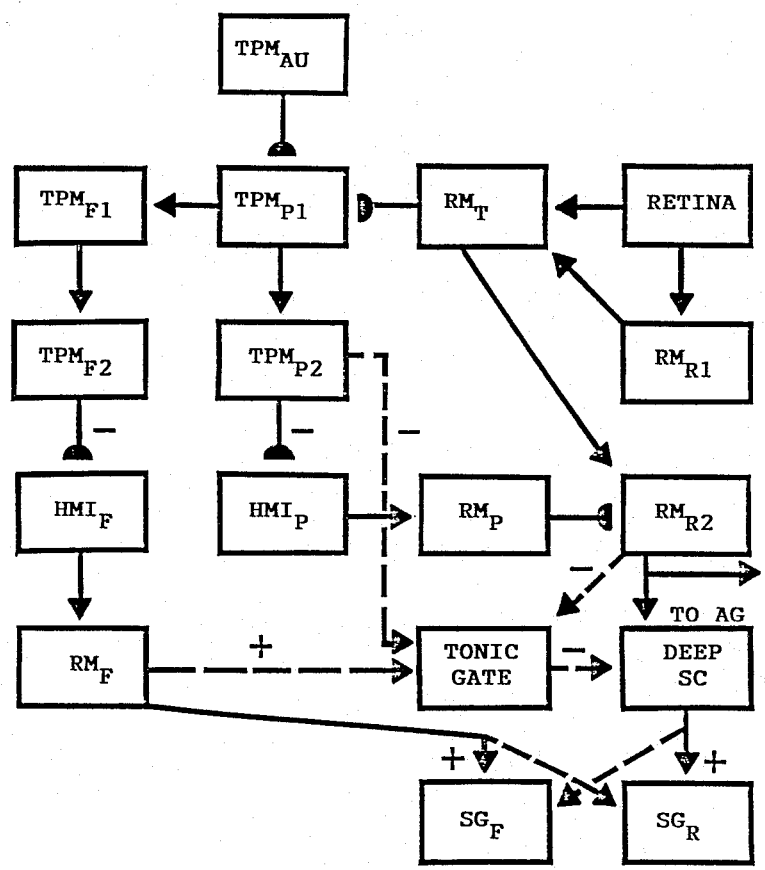

FIG. 70 is a view of a model depicting gating processes which regulate the flow of movement commands to the saccade generator.

Figure 71:
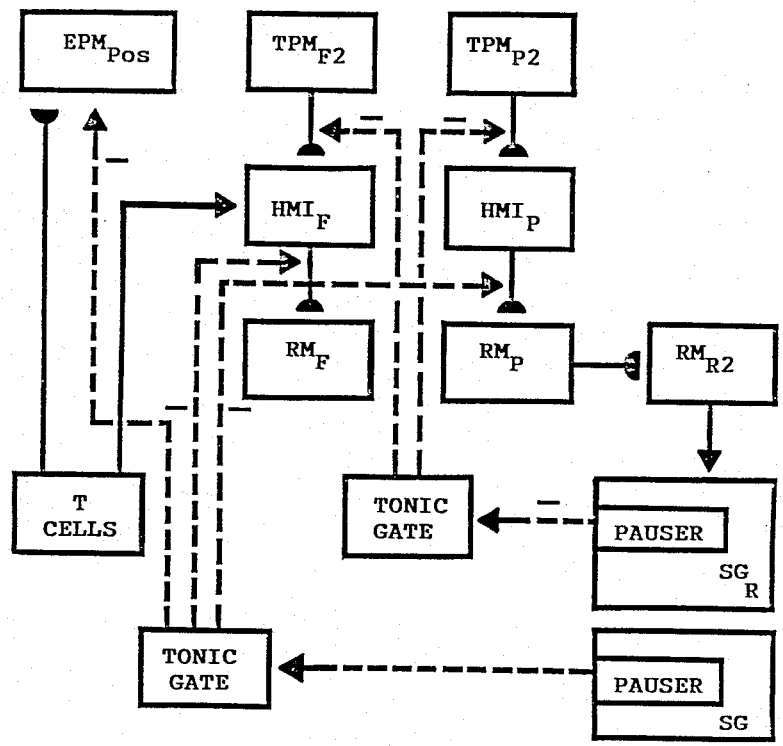
Figure 72:
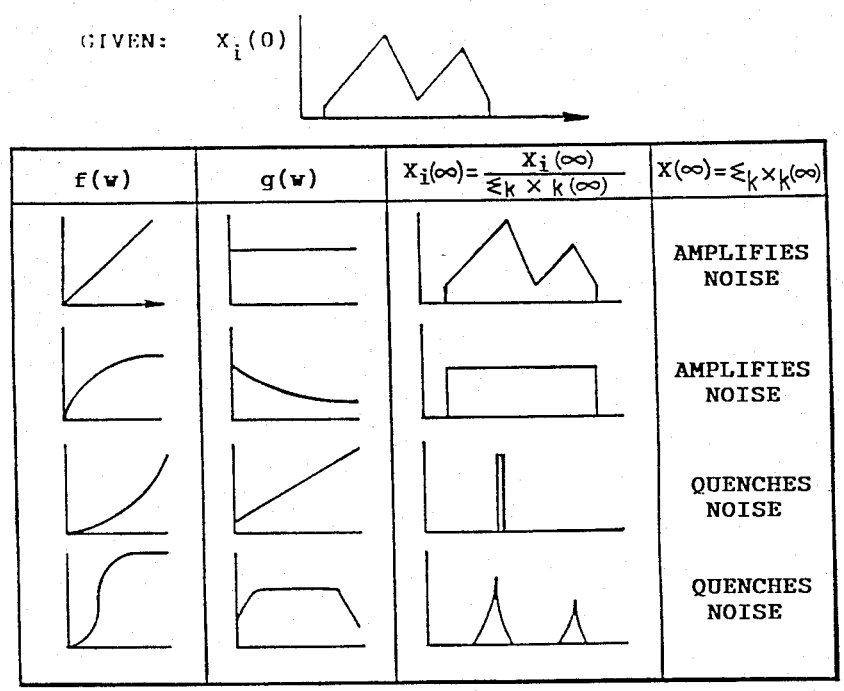

FIG. 71 is a view of a model depicting gating processes which regulate reset events during FIG. 72 shows the influence of signal function f (w) on input pattern transformation and short term memory storage.

FIG. 73 shows path activities during different target storage and matching phases of the predictive circuit in FIGS. 48 and 49.

DETAILED DESCRIPTION OF THE INVENTION

The present invention relates to the design principles and mechanisms of sensory motor systems, which form adaptive relationships with their environment. In particular, the present invention relates to networks which learn accurate sensory-motor transformation.

While the present invention may be adapted to a wide variety of applications, the system described specifically relates to ballistic or saccadic, movements of visual mediums such as cameras for robots. Where the technology closedly simulates the sensory motor system of the human eye, terminology and models simulating human eye movements are employed to help explain and describe the present system in order to enhance understanding. For example, the brain or cerebellum can be thought of as a computer with a microprocessor capable of making logical decisions. Other terms employing related functional features will be equally obvious.

Before the global network (described in Section J) can be described in detail, description of several subsystems must be presented. These subsystems include, for a subsystem for processing movements of a camera and a robot's hand while simultaneously processing error signals, a subsystem for processing visual errors for saccadic learning, and a subsystem for comparing target position or desired position of the camera's lense with the camera's present position.

A.

PARALLEL PROCESSING OF MOVEMENT AND ERROR SIGNALS

1. Sensory-Motor Coordinates: Hemisfield Gradients

In the present invention, a signal takes on behavioral meaning when it occurs in a network topography that is linked to behavioral consequences. With regard to visually-evoked camera movements, network topographies mediate between the distinct peripheral organizations of the camera's lense and the motor for moving the camera. Many of these topographical features are provided to create a computational substrate, whereby saccades can be generated and used to improve future saccadic accuracy.

Figure 1:
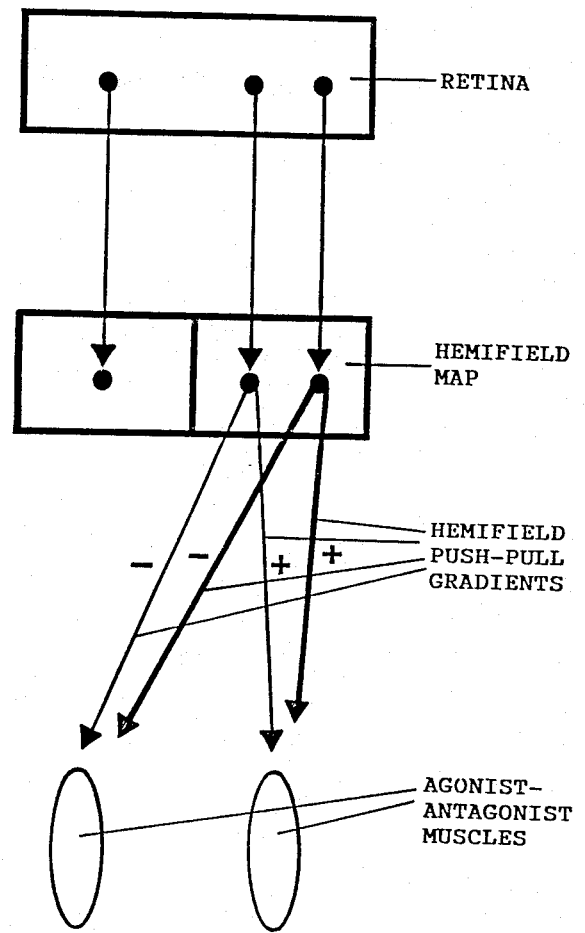
FIG. 1 is a scheme for mapping retinal position signals into agonist-antagonist muscle commands.

In the simplest example, lights hit the retina, where they are coded in retinal coordinates. Eventually, some of these lights can selectively activate muscles used to move the eye. Preferably, six extraoccular muscles are organized in three agonist-antagonist pairs. Thus, at the outset, a transformation from retinal coordinates to muscle coordinates is required. The transformation considers how a retinal signal could influence the pair of muscles controlling horizontal movements, the lateral and medial recti. A simple map that mediates between a two-dimensional retinal array and an agonist-antagonist muscle pair is depicted in FIG. 1. The "retina" in FIG. 1 maps topographically into a hemisfield map that is subdivided into right and left hemifield. A gradient of connections exists from each point of this hemifield map to the muscle pair, such that more eccentric retinal points cause more asymmetric muscle contractions. In particular, more eccentric points in the right hemifield excite the right muscle more and inhibit the left muscle more in a push-pull fashion.

Figure 2:
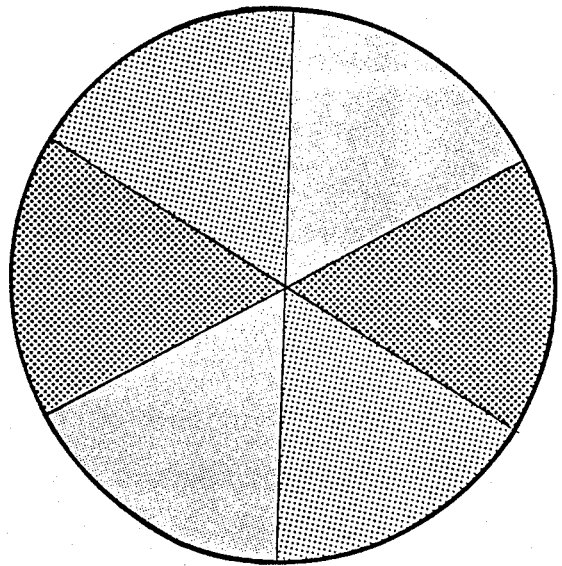
FIG. 2 is a view of a circular sector map having six wedges, each wedge of the circle represents a region that maps preferentially into one of the six extraocular muscles.

If each of the three pairs of muscles derived signals from a hemifield map, then each pair determines a different hemifield axis. FIG. 2 depicts the simplest realization of this idea: a six-sectored map, which we call a sensory-motor sector map. Such a sector map could be prewired using relatively simple developmental mechanisms.

Such a direct link from retina to muscles does not, of course, control saccadic motions in vivo.

2. Choice of Fixation Light: Network Competition

A visual scene contains many possible fixation points. One of these points is chosen for fixation from the many possible candidates. Within the computational framework defined in FIG. 1, such a choice mechanism needs to transform a broad array of lights on a retina into a relatively localized activation of the sector map. The sector map can then, in turn, preferentially contract some muscles more than others. Since broadly distributed lights on the retina activate many pathways to the sector map, a competitive interaction exists between the retina and the sector map that converts a broadly distributed input pattern into a more narrowly focused activity pattern. A network capable of making such a choice across spatially distributed alternatives will be discussed below.

3. Correcting Fixation Errors: Competition Proceeds Storage in Sensory Short Term Memory A focal activation of the sector map can elicit eye movements towards a chosen light, but the direction and length of these movements may be inaccurate.

a. Short Term Memory of the First Light

In order to correct the command due to a first light, the light chosen before movement, using information about the position of a second light, the light chosen after the movement, the system needs to store an internal marker of the position of the first light until the second light is registered. We call this storage process short term memory (STM). Since the command to be stored represents a sensory-activation, we call this example of STM sensory short-term memory (SSTM) to distinguish it from motor short-term memory (MSTM) processes that will also be needed.

b. Competition Stage Proceeds Sensory Short Term Memory Storage

Another easy way to say that the first light's position is chosen and stored in the SSTM is to say that no other light's position can be stored in the SSTM while the first light's position is stored there. In particular, the second light cannot be stored in the SSTM until the first light is no longer stored there. However, the second light must act as an error signal while the command corresponding the first light is still being stored. Otherwise, there would be no internal trace of which pathways the error signal should correct.

After the movement terminates, many lights will again activate the retina. In order to even define the second light, the competitive process neets to choose a light from among the many retinal lights. This selection process occurs while the command corresponding to the first light is still stored in the SSTM. Thus, the competitive process that chooses among the retinal lights occurs prior to the storage of a light in the SSTM (SEE FIG. 3).

4. Parallel Processing of Movement Error Signals

In the present invention, activation of the retinal position by light elicits signals in two functionally distinct pathways: a movement command pathway and an error signals pathway. The need for these two functionally distinct pathways can be understood by noting that each retinal position can be activated by either the first light or the second light of some saccade. When a retinal position is activated by a second light in a saccade, it can generate an error signal. This error signal is elicited at a stage subsequent to the competition that shows the second light. The error signal is elicited at a stage prior to the SSTM stage that stores the first light in the SSTM, since the SSTM stage blocks storage of other lights in the SSTM until after the second light error signal is registered.

A second light error signal alters the strength of the conditional pathway that is activated by the SSTM representation of the first light. The role of this learning process is to improve the ability of the first light to elicit correct saccades on future performance trials.

In summary, in order to correct previous errors before helping the generate the next movement, each retinal position gives rise to an error signal pathway, as well as a pathway that activates a positional map at the SSTM stage. The SSTM stage, in turn, activates a conditioned pathway, which can be altered by these error signals.

Figure 4:
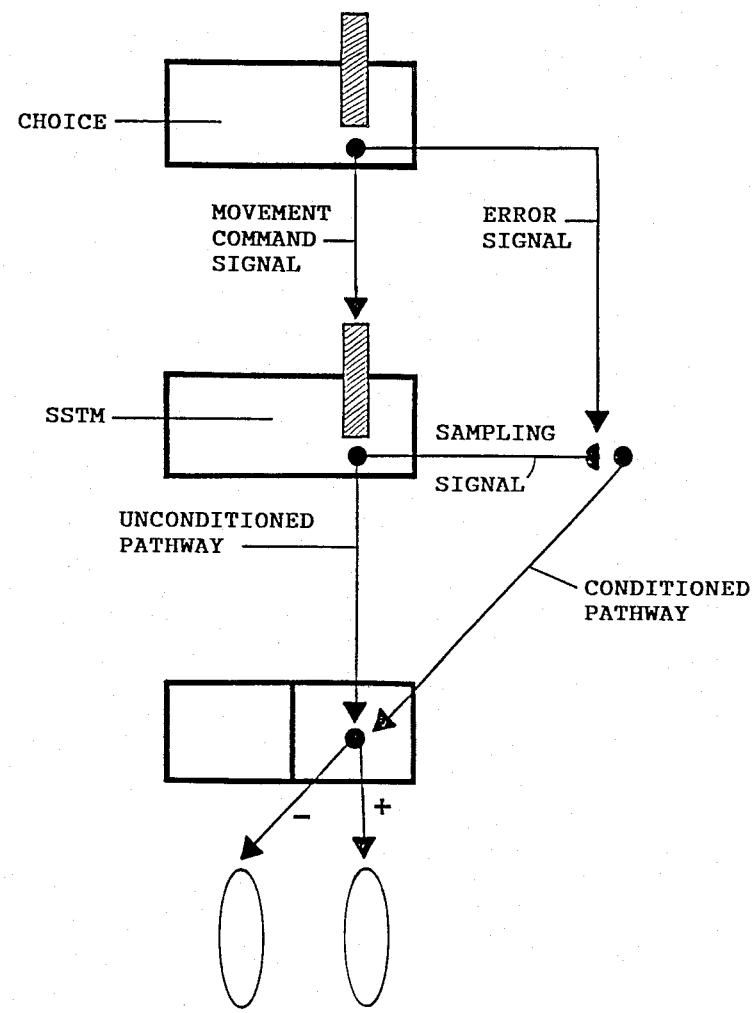
FIG. 4 is a view of a model depicting the representation of a chosen first light which gives rise to an unconditioned movement signal and a conditioned movement signal.

FIG. 4 depicts the processing stages that are needed to implement these functional requirements. As shown in FIG. 4, an unconditioned movement pathway, as well as a conditioned movement pathway is included. The unconditioned pathway enables saccades to be generated by lights, even before learning occurs. The error signals that are registered due to the saccades alter the strengths of the conditioned movement pathways. As a result, the total movement signal, which consists of an unconditioned and a conditioned component, generates more accurate movements that the unconditioned component alone.

5. The Existance of a Saccade Generator

In order for an SSTM stage to work well, there must also exists a saccade generator which converts the spatially coded signal within the light-activated retinal map into a temporally coded signal that determines how long and in what direction the eye will move. To understand why such a spatial-to-temporal conversion is necessary, recall that the SSTM stage activates a conditioned pathway until after the eye comes to rest so that this pathway remains active long enough to sample the second light error signal. The second light error signal cannot, however, be initiated until the eye stops moving. The network needs to convert the sustained output signal from the SSTM stage into a phasic movement signal whose duration is less than that of the SSTM output signal itself. Otherwise, the sustained SSTM output signal would keep the eye moving until some muscles maximally contract. The onset of the movement signal that is activated by the output from the SSTM stage, thus indicates a process that eventually inhibits the movement signal before the SSTM output shuts off. The mechanism that initiates, maintains, and terminates the movement signal is called the saccade generator (SG).

According to the above analysis, the saccade generator must be designed such that the error signal acts at a stage prior to the SG so that both the unconditioned and the conditioned movement pathways can input to the SG. The SG must also be designed so that learned changes in the strength of the conditionable pathway can improve saccadic foveation. In particular, changes in the amplitude of the signals in the conditioned pathways must cause changes in the SG output that improve the accuracy of the saccadic length and direction. A network synthesis of such an SG circuit will be discussed in Section F.

6. Competitive Choice and Storage in Short Term Memory

In the discussion that will follow, focus is given to properties of primary interest, such as competitive choice, STM storage, and attentional or motivational modulation. To understand these properties, the properties of networks of neurons which obey membrane equations and interact via on-center, off-center surround anatomies, or related cooperative-competitive anatomies must be reviewed.

a. Shunting Interactions

A membrane equation is an equation of the form $$C\frac{\partial V}{\partial t} = (V^+ - V)g^+ + (V^- - V)g^- + (V^p - V)g^p. \quad (2.1)$$

In equation (1), V(t) is the cell's variable voltage. Parameter C is a constant capacitance. The constants $V^+$, $V^-$, and $V_p$ are excitatory, inhibitory, and passive saturation points, respectively. The terms $g^+$, $g^-$, and $g^p$ are conductances that can vary through time as a function of input signals. Due to the multiplicative relationship between conductances and voltages in (1), a membrane equation is also said to describe a shunting interaction. In the next paragraphs, we show how on-center off-surround interactions among cells obeying such shunting interactions can be derived from functional considerations. Then we will indicate how desirable functional properties, such as competitive choice and STM storage, can be achieved by networks of this type whose parameters are appropriately chosen.

b. Ratio Processing and Normalization of Spatial Patterns by Shunting On-Center Off-Surround Networks Let $x_i(t)$ be the activity, or potential, of the ith cell (population) $v_i$ in a field F of cells $v_1, v_2, \ldots, v_n$. Suppose that each $v_i$ has B excitable sites of which $B - x_i$ are unexcited. Let an input pattern $(I_1, I_2, \ldots, I_n)$ perturb F in such a way that $I_i$ excites $v_i$ unexcited sites by mass action. Also let excitation $x_i$ spontaneously decay at a constant rate A. Then the net rate $\frac{d}{dt}x_1$ at which sites $v_i$ are activated is $$\frac{d}{dt}x_1 = -Ax_i + (B - x_i)I_i, \quad (2.2)$$

$i = 1, 2, \ldots, n$.

This law is inadequate because all of the activities $x_i$ can saturate at their maximal values B in response to an intensely activated input pattern. To see this, we define a spatial pattern to be an input pattern whose relative activities $\theta_i$, are constant thorugh time. Then each $I_i(t) = \theta_i I(t)$, where the ration $\theta_i$ is the constant "reflectance" of the input pattern at $v_i$ and I(t) is the total), and possibly variable, background intensity. The convention that $$\sum_{i=1}^{n} \theta_i = 1 \text{ implies that } I(t) = \sum_{i=1}^{n} I_i(t)$$

Choose a constant background intensity I(t) = I and let the activities equilibrate to their respective inputs. The equilibrium activities of (2.2) are found by setting $\frac{d}{dt}x_i = 0$. We find $$x_i = \frac{B\theta_i I}{A + \theta_i I}. \quad (2.3)$$

Now set the background intensity I at progressively higher levels without changing the reflectances $\theta_i$. Then each $x_i$ saturates at B no matter how differently the $\theta_i (>0)$ are chosen.

Figure 5A:
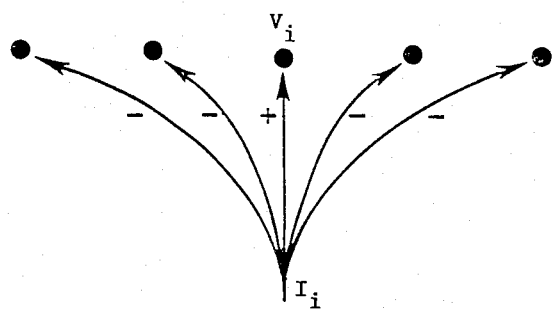
FIG. 5a is a diagram of an on-center off-surround networks showing: a feed forward network.
Figure 5B:
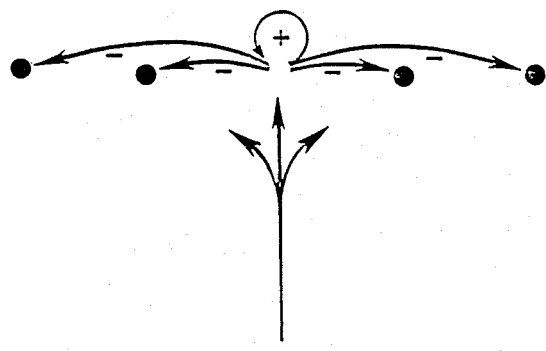
FIG. 5b is a view of a diagram of an alternate on-center off-surround network showing a feedback network.

This saturation problem can be solved by letting lateral inhibitory inputs shut off some sites as excitatory inputs turn on other sites in a feedforward competitive anatomy (FIG. 5a). In the simplest version of this idea, (2.2) is replaced by $$\frac{d}{dt} x_i = -Ax_i + (B - x_i) I_i - x_i \sum_{k \neq i} I_k, \qquad (2.4)$$

$i=1, 2, \ldots, n$. The new term $$-x_i \sum_{k \neq i} I_k$$

says that the lateral inhibitory inputs $$\sum_{k \neq i} I_k$$

shut off the active sites $x_i$ by mass action. In response to a sustained spatial pattern $I_i = \theta_i I$, the equilibrium activities of (2.4) are $$x_i = \theta_i \frac{BI}{A + I}. \qquad (2.5)$$

By (2.5), each $x_i$ is proportional to $\theta_i$ no matter how large the total input $I$ is chosen. The background activity $I$ is factored into the Weber-law modulation term $BI(A+I)^{-1}$ which approaches the constant $B$ as $I$ increases. Thus (2.5) shows that system (2.4) can accurately process the reflectances $\theta_i$ no matter how large the total input $I$ is chosen. This property is due to the multiplication, or shunting, or $x_i$ by lateral inhibitory signals in (2.4)

The total coefficient of $x_i$ in (2.4) is called the gain of $x_i$. Thus the saturation problem is solved by automatic gain control due to lateral inhibition. System (2.4) describes the simplest example of a feedforward shunting on-center off-surround network.

System (2.4) also possesses a normalization property. The total activity $$x = \sum_{i=1}^{n} x_i$$

satisfies the equation $$x = \frac{BI}{A + I} \qquad (2.6)$$

because $$\sum_{i=1}^{n} \theta_i = 1.$$

By (2.6) given a fixed total input $I$, the total activity $x$ is independent of the number of active cells. Shunting competitive networks hereby tend to conserve their total activity. In shunting on-center off-surround feedback networks, the normalization property provides a dynamical explanation of why short term memory is a limited capacity process.

c. Featural Noise Suppression: Adaptation Level and Pattern Matching

In (2.4), activity $x_i$ can fluctuate between O and B. In vivo, inhibition can often hyperpolarize $x_i$ below its passive equilibrium point O. To fully understand competitive dynamics requires that we classify other relevant competitive designs than the simplest example (2.4). Hyperpolarization is possible in the following generalization of (2.4):

$$\frac{d}{dt} \chi_i = -A\chi_i + (B - \chi_i) I_i - (\chi_i + C) \sum_{k \neq 1} I_k, \qquad (2.7)$$

where $-C \leq 0 \leq B$. If $C > 0$ in (2.7), then $\chi_i$ can be hyperpolarized by inhibitory inputs to any negative value between O and $-C$. In response to a sustained spatial pattern $I_i = \theta_i I$, the equilibrium activities of (2.7) are $$\chi_i = \frac{(B + C)I}{A + I} \left( \theta_i - \frac{C}{B + C} \right). \qquad (2.8)$$

By (2.8), $\chi_i > 0$ only if $\theta > C/B+C$. Since output signals are generated only by depolarized, or positive, values of $\chi_i$, the term $C(B+C)^{-1}$ is called the adaptation level of the network. Raising the adaptation level makes output signals harder to generate.

The special choice $B=(n-1)C$ illustrates how the adaptation level works in its simplest form. Then $C(B+C)^{-1} = 1/n$. In response to any uniform spatial pattern $I_i = 1/n$. Then (2.8) implies that all $x_i = 0$ no matter how large $I$ is chosen. This property is called featural noise suppression, or the suppression of zero spatial frequency patterns. Due to this property, the network suppresses input patterns that do not energetically favor any cellular feature detectors.

The featural noise suppression property implies a pattern matching property. For example, let two input patterns $J^* = (J_1, J_2, \ldots, J_n)$ and $K^* = (K_1, K_2, \ldots, K_n)$ add their inputs $I_i = J_i + K_i$ to generate a total input pattern $I^* = (I_1, I_2, \ldots, I_n)$ to the network. If the two patterns $J^*$ and $K^*$ are mismatched so that their peaks and troughs are spatially out-of-phase, then $I^*$ will tend to be approximately uniform and will be suppressed by the adaptation level. By contrast, if $J^*$ and $K^*$ have the same reflectances, say $J_i = \theta_i J$ and $K_i = \theta_i K$, then (2.7) implies that $$x_i = \frac{(B + C)(J + K)}{A + J + K} \left( \theta_i - \frac{C}{B + C} \right). \qquad (2.9)$$

By (2.9), the network energetically amplifies its response to matched patterns via Weber-law modulation. This type of energetic amplification due to matching is differente from the suppressive matching that occurs when a target position equals a present position.

d. Receptive Fields, Spatial Frequencies, and Edges

In more general feedforward shunting networks, the above properties hold in a modified form. Consider for example the class of feedforward networks $$\frac{d}{dt} x_i = -Ax_i + (B - x_i) \sum_{k=1}^{n} I_k C_{ki} - (x_i + D) \sum_{k=1}^{n} I_k E_{ki}, \qquad (2.10)$$

$i=1, 2, \ldots, n$. In (2.10), the coefficients $C_{ki}$ and $E_{ki}$ describe the fall-off with the distance between cells $v_k$ and $v_i$ of the excitatory and inhibitory influences, respectively, input $I_k$ on cell $v_i$. In response to a sustained spatial pattern $I_i = \theta_i I$, the equilibrium activites of (2.10) are $$x_i = \frac{F_i I}{A + G_i I} \quad (2.11)$$

where $$F_i = \sum_{k=1}^{n} \theta_k (BC_{ki} - DE_{ki}) \quad (2.12)$$

and $$G_i = \sum_{k=1}^{n} \theta_k (C_{ki} + E_{ki}) \quad (2.13)$$

The featural noise suppression property is implied by the inequalities $$B \sum_{k=1}^{n} C_{ki} \leq D \sum_{k=1}^{n} E_{ki} \quad (2.14)$$

since then, by (2.11) and (2.12), all $x_i \leq 0$ in response to a uniform pattern $\theta_i = 1/n$ no matter how large the total input I is chosen.

When the featural noise suppression property holds in a distance-dependent network, the network can, in addition to the other properties cited above, detect edges and other spatially nonuniform gradients in input patterns for the following reason. Inputs are suppressed by all cells across whose receptive fields the input pattern look appropximately uniform, no matter how intesne the input pattern is near these cells. In particular, a rectangular input pattern is suppressed both outside and inside the pattern by this mechanism. Only those cells can respond which occur near input regions where the input intensity changes across space at a rate that is no coarser than the receptive fields.

The responding cells compute input reflectances or relative contrast differences in their vicinity using the ratios that occur in equation (2.11). Equation (2.11) generalizes the reflectance processing properties of (2.5) and (2.8). The breadth of the edge reflects both the rate of change of the input pattern and of the structural scales of the network. Larger structural scales cause broader edges, other things being equal, and thus make it easier to match a pair of partially out-of-phase edges. Thus both relative contrasts and spatial scaling properties are encoded within the edges extracted by (2.11). Equation (2.11) generalizes the familiar difference-of-Gaussian receptive field model that is broadly used in analyses of spatial vision.

e. Short Term Memory, Feedback Competitive Networks, and Nonlinear Cross-Correlation Short term memory (STM) storage of input patterns is possible in networks possessing positive and negative feedback pathways. In order to prevent saturation due to positive feedback signalling, the positive feedback signals are balanced by competitive, or lateral inhibitory, feedback signals that automatically change the network's gain, just as in feedforward competitive networks. The feedback competitive analog of the feedforward competitive system (2.10) is $$\frac{d}{dt} x_i = -Ax_i + (B - x_i)\left[ I_i + \sum_{k=1}^{n} f_k(x_k) C_{ki} \right] \quad (2.15)$$

-continued $$-(x_i + D)\left[ J_i + \sum_{k=1}^{n} g_k(x_k) E_{ki} \right].$$

$i = 1, 2, \ldots, n$. I (2.15), $I_i$ is the excitatory input to $v_i$, $J_i$ is the inhibitory input to $v_i$, $f_k(x_k)C_{ki}$ is the positive feedback signal from $v_k$ to $v_i$, and $g_k(x_k)E_{ki}$ is the negative feedback signal from $v_k$ to $v_i$. Each input term $I_i$ or $J_i$ may itself be a weighted average of distributed inputs from a prior stage of processing. When $C_{ki}$ and $E_{ki}$ are functions of intercellular distances, then the excitatory and inhibitory interaction terms $$f_i(x^*) = \sum_{k=1}^{n} f_k(x_k)C_{ki} \text{ and } g_i(x^*) = \sum_{k=1}^{n}$$

$g_k(x_k)E_{ki}$ in (2.15), where $x^* = (x_1, x_2, \ldots x_n)$, define nonlinear cross-correlations $$x^* \to (f_1(x^*), f_2(x^*), \ldots f_n(x^*)) \quad (2.16)$$

and $$x^* \to (g_1(x^*), g_2(x^*) \ldots, g_n(x^*)) \quad (2.17)$$

of the STM activities $x^*$. Thus the concepts of feedback signalling and of nonlinear cross-correlation are the same in a distance-dependent network.

f. Signal Noise Suppression and Nonlinear Signals

The transformations (2.16) and (2.17) must define nonlinear cross-correlators due to a mathematical property of the networks (2.15). The positive feedback signals can amplify small activities into large activities (signals amplify "noise") unless the signal functions $f_k(x_k)$ and $g_k(x_k)$ are nonlinear functions of the STM activities $x_k$. Nonlinearity per se is not sufficient to prevent this from happening, since a nonlinear signal function such as $f_k(w) = \alpha \omega (\beta + \omega)^-$ can cause a pathological STM response in which all STM activities are amplified to equal asymptotes no matter how different, and small, their initial activities were. To avoid such pathologies, the positive feedback signals $f_k(x_k)$ need to be faster-than-linear functions of $x_k$, such as powers $f_k(x_k) = \alpha x_k^n$ with $n > 1$, at small values of the activities $x_k$. Sigmoid, or S-shaped, functions of activity are the simplest physically plausible signal functions that solve the signal noise suppression problem.

g. Dynamic Control of Network Sensitivity: Quenching Threshold and Attentional Gain Control When sigmoid feedback signals are used in a feedback competitive network such as (2.15), the network possesses a parameter that is called the quenching threshold (QT): STM activities that start out less than the QT tend to be suppressed, whereas the pattern of STM activities that initially exceeds the QT tends to be contrast enhanced through time. For example, see FIGS. 6a, 6b, 6c, and 6d which show the same input pattern differently transformed and stored in short temr memory due to different settings of the network QT. The QT is not just the manifest threshold of a signal function. The QT is a parameter that depends on the global structure of the network. Consider the following special case of (2.15):

$$\frac{d}{dt} x_i = -Ax_i + (B - x_i)f(x_i) - x_i \sum_{k \neq i} f(x_k). \quad (2.18)$$

$i=1, 2, \ldots, n$. In (2.18) all inputs are shut off and the competitive interaction $\Sigma_{k\neq 1}^n f(x_k)$
describes long range lateral inhibition, just like the term $\Sigma_{k\neq 1}^n I_k$
in the feedforward network (2.4). Suppose that the feedback signal function $f(w)$ satisfies $$f(w) = Cwg(w) \tag{2.19}$$

where $C \geq 0$ $g(w)$ is increasing if $0 \leq \omega \leq X^{(1)}$ and $g(w) = 1$ if $x^{(1)} \leq \omega \leq \beta$. Thus $f(w)$ is faster-than-linear for $0 \leq \omega \leq X^{(1)}$ linear for $x^{(1)} \leq w \leq B$, and attains a maximum value of BC at $w=B$ within the activity interval from O to B. The values of $f(w)$ at activities $w \geq B$ do not affect network dynamics because each $x_1 \leq B$ in (2.18). It was proved in Grossberg (1973, pp. 238-242) that the QT of this network is $$QT = \frac{x^{(1)}}{B - AC^{-1}}. \tag{2.20}$$

By (2.20), the QT is not the manifest threshold of $f(w)$, which occurs where $g(w)$ is increasing. The QT depends on the transition activity $x^{(1)}$ where $f(w)$ changes from faster-than-linear, upon the overall slope C of the signal function in the physiological range, upon the number B of excitable sites in each population, and upon the STM decay rate A. Equation (2.20) shows that an increase in C causes a decrease in the QT. Consequently, increasing a shunting signal C that nonspecifically gates all the network's feedback signals facilitates STM storage. Equation (2.20) also shows how using a linear signal function destabilizes network dynamics. If $f(w)$ is linear in (2.19), then $x^{(1)}=0$. By (2.20), the QT=0. Hence any positive network activity, no matter how small, will be amplified by a linear signal function.

Equation (2.20) illustrates that the network's sensitivity can be modulated by dynamic factors. If the nonspecific gain C is chosen very small, for example, then the QT may be so large as to desensitize the network to all inputs. By contrast, a large choice of C can render the network sensitive to its input by decreasing the QT. A nonspecific form of attentional gain control can thus modulate the network's sensitive to its input by decreasing the QT. A nonspecific form of attentional gain control can thus modulate the network's sensitivity to its inputs by controlling the size of the QT through time.

The QT property is not "built into" the network. It is a mathematical consequence of using shunting on-center off-surround feedback networks, and was considered surprising when it was first discovered by Grossberg (1973). Thus the network design which prevents saturation by automatically adjusting its gains in response to variable input loads (Section A.6B), and prevents amplification and STM storage of network noise by using a proper signal function (Section A.6F) is already prepared to respond adaptively to nonspecific attentional control signals.

h. Competitive Choice

A sigmoid signal function $F(w)$ is composed of a faster-than-linear part 10 at small activity values $w$, a slower-than-linear part 14 at large activity values $w$, and an approximately linear part 12 at intermediate activity values $w$ (FIG. 7). Each of these activity regions transforms input patterns in a different way before storing them as STM activity patterns. If network activities remain within the faster-than-linear range 10 of a sigmoid signal function, then the network is capable of making a competitive choice by contrast-enhancing the input pattern via the network's feedback pathways until only the population with the largest initial activity has positive activity.

A competitive choice can be accomplished in either of two ways: structurally or dynamiclly. In the structural solution, network parameters are chosen so that all STM activities remain within the faster-than-linear range 10 under all circumstances. In the dynamical solution 10, a nonspecific attentional gain control signal shifts either STM activities into the faster-than-linear range 10, or shifts interaction parameters such as inhibitory interaction strengths into the faster-than-linear range 10 until the choice is made.

A more complete understanding of how the signal function determines the stored STM pattern can be achieved by considering the following special case of (2.15):

$$\frac{d}{dt} x_i = -Ax_i + (B - x_i)[I_i + f(x_i)] - x_i \left[ J_i + \sum_{k \neq 1} f(x_k) \right], \tag{2.21}$$

$i=1, 2, \ldots, n$. Network (2.21) is just (2.18) with the inputs $I_i$ and $J_i$ left on. Network (2.21) strips away all extraneous factors to focus on the following issue. After an input pattern $(I_1, I_2, \ldots, I_n, J_1, J_2, \ldots, J_n)$ delivered before time $t=0$ establishes an initial pattern $(x_1(0), x_2(0), \ldots, x_n(0))$ in the network's activities, how does feedback signalling within the network transform the initial pattern before it is stored in STM? This problem was solved in Grossberg (1973).

Table 1 summarizes the main features of the solution. The function $g(w) = w^{-1} f(w)$ is graphed in Table 2.1 because the property that determines the pattern transformation is whether $g(w)$ is an increasing, constant, or decreasing function at prescribed activities $w$. For example, a linear $f(w) = aw$ determines a constant $g(w) = a$; a slower-than-linear $f(w) = aw(b+w)^{-1}$ determines a decreasing $g(w) = a(b+w)^{-1}$; a faster-than-linear $f(w) = aw^n$ x $n > 1$, determines an increasing $g(w) = aw^{n-1}$; and a sigmoid signal function $f(w) = aw^2(b+w^2)^{-1}$ determines a concave $g(w) = aw(b+w^2)^{-1}$. Both linear and slower-than-linear signal functions amplify noise, and are therefore unsatisfactory. Faster-than-linear signal functions, such as power laws with powers greater than one, or threshold rules, suppress noise so vigorously that they make a choice. FIG. 72 shows that sigmoid signal functions determine a QT by mixing together properties of the other types of signal functions.

i. Attentional Biasing and Competitive Masking

A suitably designed shunting on-center off-surround feedback network is also capable of biasing its stored STM in response to spatially focussed attentional or developmental factors (Grossberg, 1981; Grossberg and Levine. 1975). Such a spatially delimited attentional bias is not the same process as nonspecific attentional gain control, and it may coexist with attentional gain control (Grossberg. 1978a, 1982b).

To distinguish focal attentional biasing from nonspecific attentional gain control, we call the focal process competitive masking. To illustrate the main properties of masking, we use the simplest possible example. A more sophisticated example, in which maskign enables the network to respond in a context-sensitive way to a temporally evolving speech stream, is described in Cohen and Grossberg (1985) and Grossberg (1985c). Masking occurs in systems $$\frac{d}{dt} x_i = -Ax_i + (B_i - x_i)f(x_i) - x_i \sum_{k \neq 1} f(x_k) \quad (2.22)$$

in which populations $v_i$ can have different number $B_i$ of excitable sites, or equivalently in systems $$\frac{d}{dt} x_i = -Ax_i + (B - x_i)f(C_i x_i) - x_i \sum_{k \neq 1} f(C_k x_k) \quad (2.23)$$

whose population activities or signals are differentially amplified by shunting factors $C_i$. System (2.23) can be formally transformed into system (2.22) by a change of variables. Despite this formal equivalence, the physical interpretations fo these systems may differ. I (2.22), the different numbers of sites can be interpreted as a developmental bias in which certain input features are coded by more sites $B_i$ than others. In (2.23), the differential amplification of population signals can be interpreted as an attentional shunt that gates all the feedback interneurons, both excitatory and inhibitory, of each populations $v_i$ using its own shunting parameter $C_i$. Such a shunt may, for example, be controlled by a learned incentive motivational signal from a midbrain reinforcement center (Grossberg, 1982b).

If both developmental and attentional biases occur, as in $$\frac{d}{dt} x_i = -Ax_i + (B_i - x_i)f(C_i x_i) - x_i \sum_{k \neq 1} f(C_k x_k). \quad (2.24)$$

then masking is controlled by the relative sizes of the products $B_1C_1, B_2C_2, \ldots, B_nC_n$. For definiteness, label the cells so that $$B_1C_1 \geq B_2C_2 \geq \ldots \geq B_nC_n. \quad (2.25)$$

We now show that the nature of the masking depends upon the choice of signal function f(w).

To start, let the signal function be linear, say $f(w) = Ew$. then a masking phenomenon occurs such that $x_1(\infty) = 0$ if $B_iC_i < B_1C_1$, whereas $$\frac{x_i(\infty)}{x_j(\infty)} = \frac{x_i(0)}{x_j(0)} \quad (2.26)$$

for all i and j such that $B_1C_1 = B_iC_i = B_jC_j$. By (2.26), the activity pattern across the subfield of populations $v_i$ with maximal parameters $B_iC_i = B_1C_1$ is faithfully stored, but all other population activities are competitively masked. This type of masking is inadequate in a sensory processor, because the salience of a feature in an external display, as measured by a large initial $x_i(0)$ value, cannot overcome internal biases $B_iC_i < B_1C_1$ even if $x_i(0)$ is much larger than $x_1(0)$.

This problem is overcome if a sigmoid signal function f(w) is used. Then a tug-of-war occurs between cue salience $x_i(0)$, development biases $B_i$, and attentional shunts $C_i$ to determine which population activities will be stored in STM (Grossberg and Levine, 1975). Superimposed upon this masking bias is the usual contrast-enhancement that a sigmoid signal function can elicit. Thus the same nonlinear signal function that suppresses noise and contrast-enhances STM activities exceeding the QT automatically generates the type of masking bias that can successfully refocus attention in response to incentive motivational signals.

In summary, the ubiquity in the computer system or brain of the shunting on-center off-surround network design can be better appreciated from the mathematical fact that variations of this design imply constellations of formal properties which solve a large number of important functional problems.

B.

SACCADIC LEARNING USING VISUAL ERROR SIGNALS

1. Compensation for Initial Position in the movement signal

The following discussion described a saccadic learning network which uses visual error signals to compensate for initial position in the movement signal. For example, an eye can be in different positions with respect to the head before a saccade responds to light at a fixed position on the retina. Corresponding to each different initial position are the extraocular muscles in a different state of contraction. The same first light may thus excite the retina while the extraocular muscles are in different state of contraction. In order for a saccade to correctly respond to a first light at a fixed retinal position, it must move the eye a prescribed number of degrees, no matter what initial state of muscle contraction prevails before the saccade occurs. Consequently, the total movement signal needs to take into account not only the retinal locus of a light, but also the initial state of the muscles.

Figure 8A:
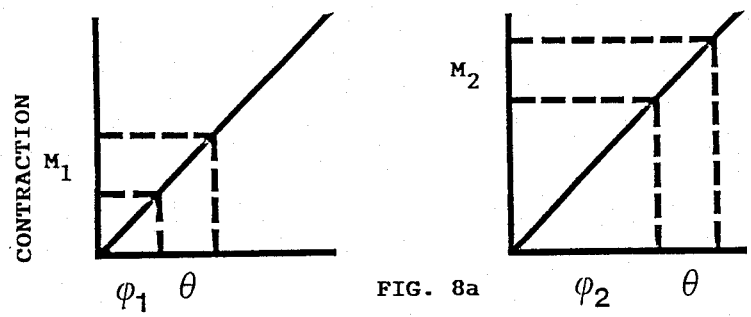
FIG. 8a shows a graph depicting the influence of a linear muscle plant on compensation for initial eye position.
Figure 8B:
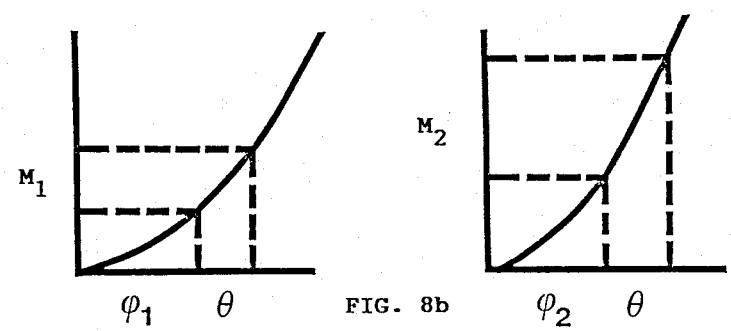
FIG. 8b shows a graph depicting the influence of a nonlinear muscle plant on compensation for initial eye position.
Figure 9:
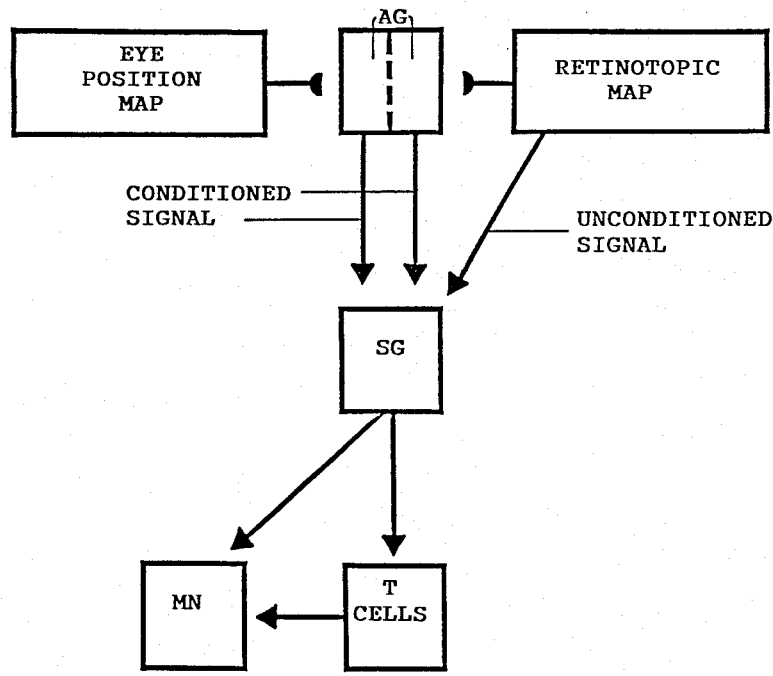
FIG. 9 is a view of a model depicting explicit information about eye position and about retinotopic position coverage at the saccade generator via unconditioned signals or via the adaptive gain stage, at which the conditioned pathways are altered by second-light error signals.

Only in the case that the amount of muscle contraction is a linear function of the movement signal can this signal be independent of the initial position of the eye. This fact is illustrated in FIG. 8a. If the muscle contraction is not a linear function of the movement signal, then the same movement signal can cause different amounts of contraction if the eye starts out at different initial positions, FIG. 8b. Thus, the movement signal can not depend only on retinal information if the muscle plant is non-linear, since a retinal command t moe the eye a given number of degrees would move the eye by different amounts, depending upon its initial position. Therefore, in a case where the muscle plant is non-liner, both retinal and initial positional information must contribute to the total saccadic command.

Where neither a retinally activated saccadic command nor a positionally activated saccadic command can possibly have a prior knowledge of the muscle plant's characteristics, retinotopic and positional signals must contribute to the conditionable components of the total movement signal that activates the muscles. The network in FIG. 4 therefore must be expanded to include a conditionable movement signal that is activated by a source of information about initial position (See FIG. 9).

2. Explicit vs. Implicit Knowledge of Initial Position

Figure 10:
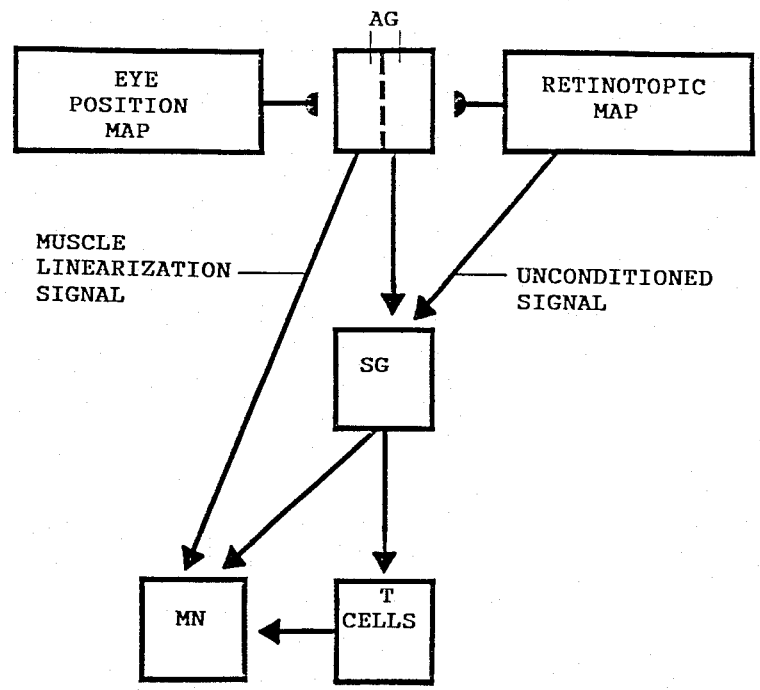
FIG. 10 is a view of a model depicting explicit information about eye position and about retinotopic position being registered at different network stages.

Both explicit and implicit information about initial eye position could, in principal, be used to activate conditionable movement pathways. Explicit information is computed within a network such that retinal maps and eye position maps control separate conditionable pathways that converge before the Saccade Generator (SG) stage shown in FIG. 9 or after the SG stage shown in FIG. 10.

Figure 11:
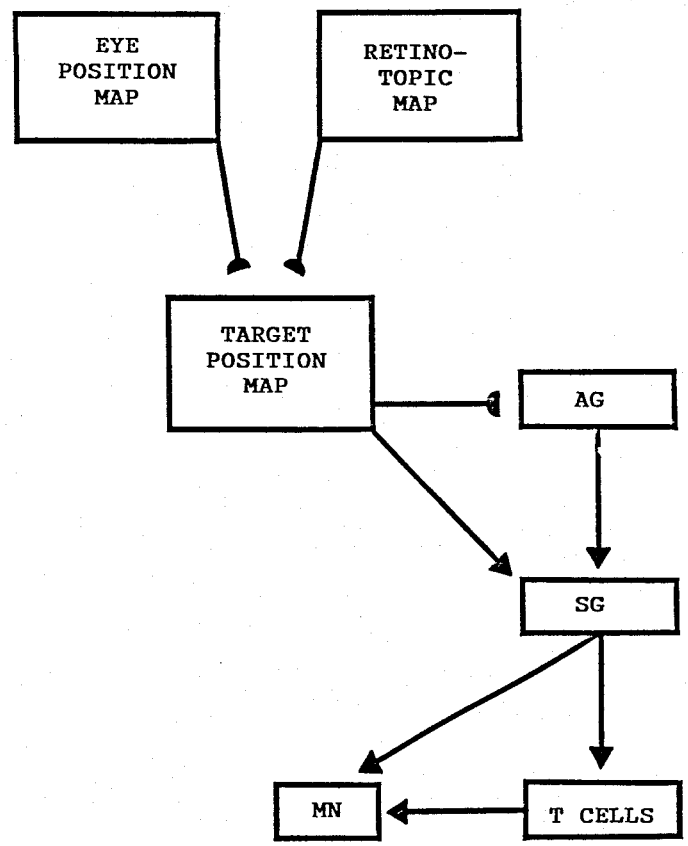
FIG. 11 is a view of a model depicting eye position implicitly encoded at a target position map.

Implicit information is illustrated by a network in which a single variant target position map controls the conditionable pathway that projects to the SG stage shown in FIG. 11. A target position map contains only implicit information about eye position because each eye position inputs to many map target positions, and every map target position depends jointly upon eye position and retinal position.

In order to arrive at a complete conceptual understanding of this learning problem, the different combinations of eye position sampling maps, retinotopic sampling maps, and target position sampling maps which cooperate to correct saccadic errors due to different types of non-linear muscle plants using either linear or non-linear signals are analyzed below.

3. Characterization of Correctable Errors

In addition to classifying sampling maps that are capable of compensating for muscle plant non-linearity, it is also necessary to characterize the error signals that are capable of correcting movement errors due to an imprecise choice of initial parameters.

Three types of movement errors to which the network will adapt are:

(A) movement errors due to inaccuracies of saccade length or direction; for example, undershoot and overshoot errors;

(B) movement errors due to modest lesions of the eye muscles;

(C) movement errors due to a different lens placed on the eyeball that modestly alters the length and direction of visual boundaries.

Errors of the type (A) can occur due to the normal course of development. Errors of (B) can occur due to accidents. Errors of (C) can be due either to alterations or manipulations of the lens of the eye.

4. Self-Movement vs. World-Movement

In order for any error correcting mechanism to correlate movement signals and visual signals during movement, it must have access to both types of signals. Saccades differ from arm movements in that rapidity of a saccade attenuates the registration of visual feedback during a saccadic movement. This is the familiar phenomena of saccadic suppression. Due to saccadic suppression, once a given light initiates a saccade, other lights do not strongly influence the saccadic trajectory. Only lights that occur before and after the saccade can be used by the saccadic error correction mechanism. Saccades thus differ from arm movements in their rapidity and in their approximately all or none reaction to light signals. Therefore, we have constructed our saccadic error correction mechanism to satisfy the rapidity and all-or-none nature of a saccade to prevent the saccadic error mechanism from distinguishing self-motion from world hyphen motion. If error correction were to be based entirely on visual feedback after a movement, the saccadic system would not be able to distinguish between two different reasons why a second light might not be foveated. One reason is that an incorrect saccade is made because the system's conditionable parameters are incorrectly chosen. The other reason is that a correct saccade is made in response to correctly chosen conditionable parameters, but the light is displaced to another position during the saccade.

Compensatory processes that can distinguish self-motion from world motion can occur in the pre-processing of visual signals before they reach the saccadic system or in post processing of saccadic motor signals before they generate the final motor command. For example, imagine that the preprocessing of the retinal light pattern attenuates whole field motions of the visual field as would be caused by self-motions in a stationary world. Such processing could also amplify the reactions to relatively localized relative motions within the visual field, as would be caused by an object moving in the world.

Compensation for self-initiated motions can also be accomplished by post-processing of the saccadic motor command. For example, suppose that head movements are caused by self-motions through the world, such as walking, running, or head turning. Such head movements could initiate a compensatory eye movement via the vestibulo-occular reflex (VOR) to maintain the subject's gaze on a prescribed non-foveal light as will be described further. Suppose, for example, that a VOR is initiated by a head movement that occurs while a saccade is being made. Then the VOR motor signal, which independently registers the head movement, can cooperate with the saccadic motor signal to generate a total movement that compensates for the self-initiated head movement. A cooperation interaction of the VOR and the saccadic system can compensate for self-initiated head movements, even if the saccadic system, by itself, cannot distinguish self-motions from world motions.

A third way to distinguish self-motion from world motion can exist in the saccadic system as a whole, without requiring the visual error correction mechanism make the distinction. Suppose, for example, that the eyes move with respect to a stationary light. Then the target position within an invariant target position map does not change. Consequently, the motor representation of this target position within a head-muscle interface (HMI) does not change. HMI, as will be discussed below mediates between target position computations and retinotopic computations. No new saccadic command is therefore generated within this system due to self-motion.

By contrast, suppose that a light moves with respect to the stationary eyes. Then a new target position is read into both the invariant target position map and the HMI. Unlike ballistic saccadic movements, the VOR eye movements are sufficiently slow to permit continuous registration of visual feedback, as in the case of arm movement.

5. A Universal Adaptive Gain Control Mechanism: Saccades, VOR, Posture, and Muscle Gain The VOR system described below can adapt to errors created by lenses which invert the visual image. The VOR can be described as follows: a head movement triggers vestibular signals that move the eye in a compensatory way to maintain fixation of a visual target. Successful operation of this system prevents a foveated target from moving with respect to the retina of a body as it moves with respect to its environment such as when the body moves toward the target. An inverting lens changes the expected relationship between the head movement and the visual feedback that is caused by a VOR induced eye movement; thus, the VOR also involves intermodality (head-eye) learning, due to continuous movement.

Adaption of eye-arm coordination and of the VOR are mentioned here to emphasize an important feature of the theories error correction mechanisms. Adaptation to inverting lenses during the VOR seems to be a very different process from the adaptation to curvature or distorting contact lenses during saccades. Despite this apparent difference, the same formal network machinery can be used to control adaptive responses in both paradigms. The same formal network machinery can also be used to control adaptations to post-saccadic drift and post-postural maintenance or gaze, as will be discussed later in section G, and control linearization of muscle responses to outflow signals, discussed in Section D. Thus, a single brain region is used as a universal adaptive gain control mechanism, which we have called the adaptive gain (AG) stage. We identify the AG stage with the cerebellum.

6. Design Requirements

The saccadic movement system consists of many cellular components. None of these components know the parameter governing the other components. Moreover, many of these parameters contribute to each saccadic motion. The only way that such a system can decide whether its parameters are correct or not is to test whether or not they lead to an accurate foveation of light targets. Consequently, the error correction mechanism uses the position of light on the retina after a saccade as a source of error signals. Thus, to correct a saccade, a mechanism needs to keep track of a first light location that initiates the saccade and a second light location that is registered after the saccade.

7. Different Coordinates for Unconditioned and Conditioned Movement Systems

The following discussion now refines the conclusion that the movement and the error signals are processing in parallel. It shows that two different coordinate systems, working in parallel are needed to unconditionally elicit saccades and to register the error signals that can correct the saccades.

a. Unconditioned Movements due to Prewired Connection Gradients

A source of unconditioned saccade commands is needed in order to avoid the infinite regress of the following type. Unless saccades can be elicited at a developmental stage that occurs prior to saccadic learning, no saccadic errors can be generated on which to base the learning process. Since this unconditioned source of movement commands is operative prior to saccadic learning, it must be capable of working without the benefit of finely-tuned learned parameters. It does not have to produce completely accurate saccades, because the latter learning process will improve saccadic accuracy. On the other hand, some regularity in the transformation from retinal position to unconditioned saccadic motion is needed. For example, if a light that excites a position to the right side of the fovea elicited a movement toward the left, then the task of correcting saccadic errors would be seriously impaired.

To account for these properties of unconditioned movements, we have assumed that asymmetrically distributed pathways, or spatial gradients, are generated during an early stage of development from the retina to the eye muscles, as shown in FIG. 1. Using the spatial gradients, a light to the right hemifield of the retina tends to move the eyes toward the right, and a light to the left hemifield of the retina, tends to move the eyes toward the left. A light to an oblique retinal position tends to move the eyes in an oblique direction, because the ratio of contractions in the co-contracting agonist muscles determines the net direction of the movement.

b. Conditioned Gain Control Due to Visual Error Signals

We will now show that the coordinates which are needed to learn error correcting gains within the conditionable pathways are different from the spatial gradients on which unconditioned saccades are based. Thus, the spatial gradients and the conditioned gains are computed by two parallel subsystems before these subsystems cooperate to read out a total saccadic signal. We call this conditionable subsystem the Adaptive Gain Stage as discussed above. Individual error lights to the AG stage must be able to correct whole muscle synergies to move the eyes closer to their targets on future performance trials. The design of the AG stage to solve this problem will now be described.

Coordinates in which the first light movement signals and second light error signals are registered at the AG stage are considered first. A conditionable movement signal that is activated by a first light is registered in retinotopic coordinates, whereas an error signal that is activated by a second light must influence the gains of agonist-antagonist muscle pairs; hence, is registered motor coordinates. The position of the first light is the target light before a saccade and the position of the second light is the target light after the saccade. Both first lights and second lights arise, however, from lights on the retina.

Figure 12A:
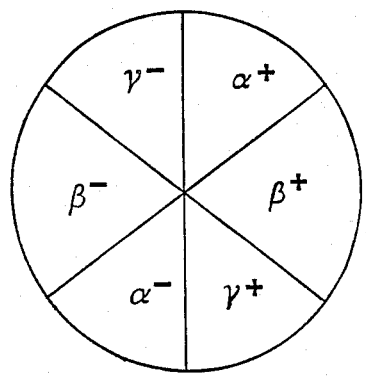
FIG. 12a shows a model depicting sectors corresponding to agonist and antagonist muscles of one eye.

FIG. 12a depicts a retinal topography that is positioned into six motor sectors denoted by $\alpha\pm$, $\beta\pm$, and $\gamma\pm$. Each sector corresponds to an agonist muscle (+) or a corresponding antagonist muscle (−). Each light excites the retina in a particular retinal position. As a first light, each light activates a conditionable movement pathway that retains its retinotopic coordinates. As a second light error signal, each light changes the gains of the agonist-antagonist muscle pair that corresponds to the sector in which its retinal position is contained.

c. Opponent Processing of Visual Error Signals

For example, suppose that the second light's retinal position falls within the sector corresponding to muscle $\alpha^+$. We assume that such an error signal increases the conditioned gain to the agonist muscle $\alpha^{30}$ and decreases the conditioned gain to the antagonist muscle $\alpha^{31}$ in response to the same first light on a later performance trial. In other words, each second light has antagonistic or opponent effects on the conditionable gains of its corresponding muscle pair.

8. Correcting Undershoot, Overshoot, and Skewed Saccadic Errors

Figure 12B:
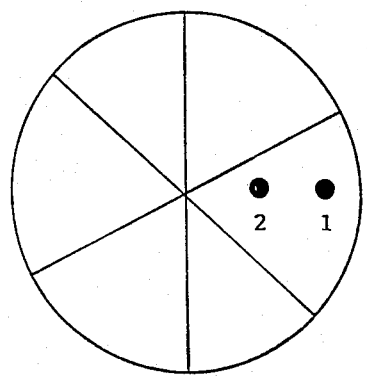
FIG. 12b is a model depicting a saccadic undershoot error.

The present system corrects four different types of saccadic errors. For example, FIG. 12b considers the case of an undershoot error in which a first light in sector $\beta^+$ generates a second light in the same sector. To correct such an undershoot error, the second light needs to strengthen the total signal to the saccade generator (SG) of muscle $\beta^+$ and/or weaken the total signal to the SG muscle of $\beta^-$. The following considerations suggest that both a strenghtening of the $\beta^+$ command and a weakening of the $\beta^-$ command to the SG simultaneously occur, and help to inactivate the antagonist SG during much of a saccade.

Figure 12C:
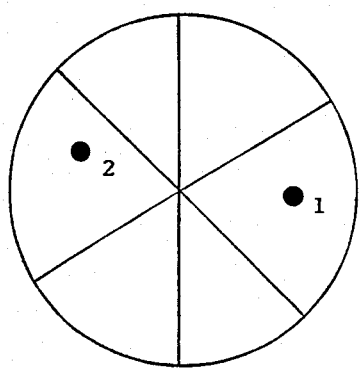
FIG. 12c is a model depicting a saccadic overshoot error.
Figure 13A:
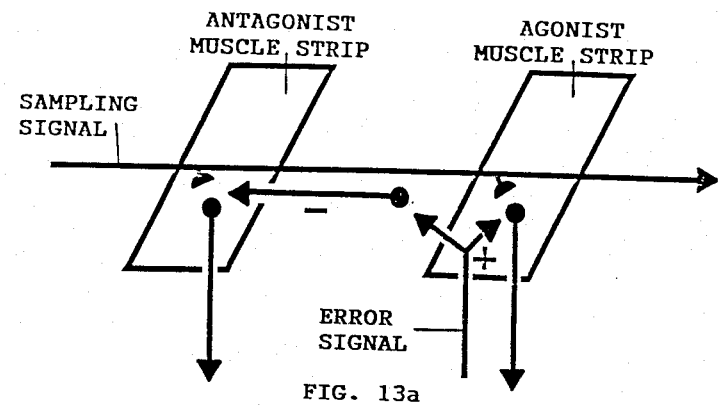
FIG. 13a shows a model for achieving opponent conditioning of agonist-antagonist muscles.
Figure 13B:
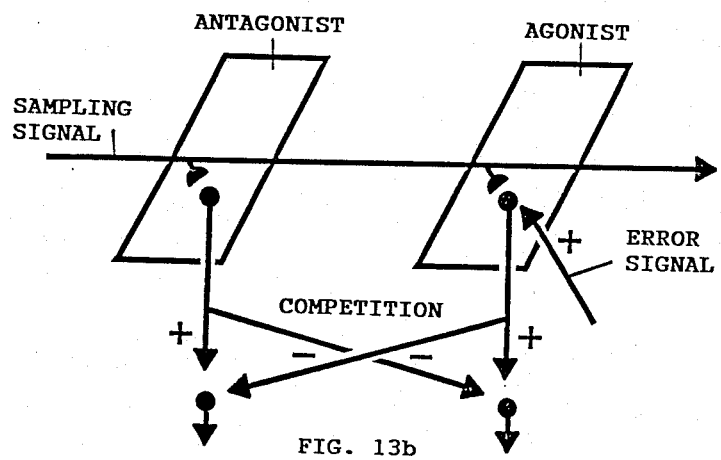
FIG. 13b shows an alternate model for achieving opponent conditioning of agonist-antagonist muscles.

FIG. 12c describes an overshoot error in which a first light in sector $\beta^+$ generates a second light in sector $\beta$. After this error is corrected, a first light in section $\beta^+$ still activates the SG muscle $\beta^+$, but more weakly than it did before error correction. How can an error signal to sector $\beta^-$ weaken the contraction of the muscle corresponding to sector $\beta^+ \rightarrow$ The previous case of correcting an undershoot error suggests that a second light in a given sector strengthens the signal to that sector's muscle. Since muscle $\beta^-$ is antagonistic to muscle $\beta^+$, both undershoot and overshoot errors can be corrected by the same mechanism if strengthening within a sector is due to excitatory conditioning of the conditionable pathway corresponding to that muscle. The weakening action within the antagonistic sector can be accomplished in either of two ways: by inhibitory conditioning of the conditionable pathway corresponding to the antagonist muscle. (FIG. 13a and FIG. 13b). In either case, a second light in sector $\beta^-$ via inhibitory signals from each sector to the output pathway of its antagonist muscle. Then, when an agonist muscle contraction causes an overshoot error, the error signal corresponding to the antagonist muscle can weaken the conditioned gain of the agonist muscle.

Figure 12D:
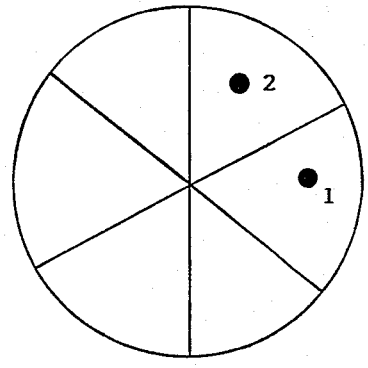
FIG. 12d is a model depicting a saccadic skewed undershoot error.

The same rule easily generalizes to other types of errors. FIG. 12d depicts a skewed undershoot error in which a first light in sector $\beta^+$ generates a second light in sector $\alpha^+$ due to motion of the eye downward and to the right. By the above rules, such a second light strengthens the total signal to mucle $\alpha^+$ and weakens the total signal to muscle $\alpha^-$, thereby tending to move the eye more upward on future performance trials to correct the movement error.

9. Equal Access to Error Signals: Separate Anatomies for Unconditioned Movements and Conditioned Gain Changes The above analysis suggests how undershoot, overshoot, skewed, and curvature distorting errors can be corrected no matter where the first light hits the retina. In order for this scheme to work, a first light to any retinal position must give rise to conditionable pathways that can strengthen or weaken the conditioned signals to the SGs of all the eye muscles. Thus the asymmetric retinal-to-motor gradients that are needed to generate unconditioned saccades define the wrong kind of anatomy for saccadic error correction. These asymmetrical retinal-to-motor gradients can work even if each retinal position sends no signals whatever to the SGs of some muscles. All that is required to initiate unconditioned saccade is a stronger pathway from each retinal position to the muscle corresponding to its sector. By contrast, correcting undershoot, overshoot, and skewed errors requires that every first light position be able to sample second lights in every sector. Expressed in another way, despite the asymmetries in the prewired retinal to motor spatial gradients, the mechanism whereby each first light position can adaptively sample all second light positions needs to be unbiased across second light positions. We call the property whereby each first light command can sample error signals due to all second light positions with equal ease the equal access constraint. We conclude that the unbiased anatomy that subserves saccadic error correction and the biased retinal-to-motor anatomy that unconditionally initiates saccades are two separate structures. We identify the error correction structure with the adaptive gain (AG) stage.

10. Anatomical Interpretation of the Adaptive Gain Stage: the Cerebellum

Figure 14:
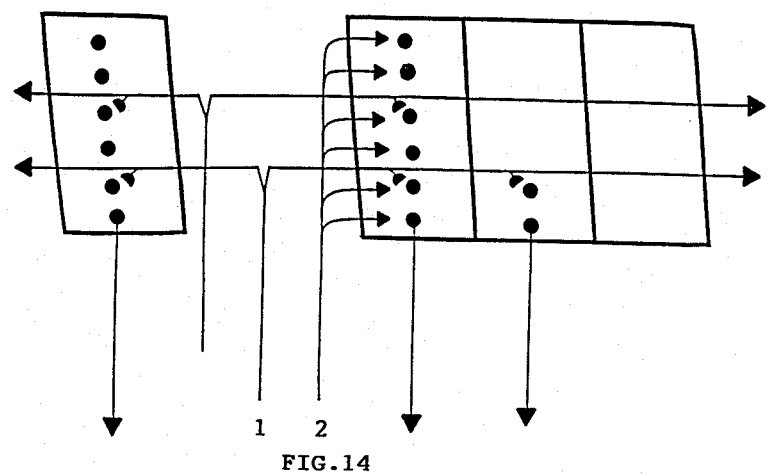
FIG. 14 shows a functional diagram of the adaptive gain stage.

This equal access constraint suggests that the representations of all second light positions are placed symmetrically with respect to the sampling signals from any first light position. FIG. 14 depicts the simplest realization of this concept. In FIG. 14, each first light pathway (labeled 1) gives rise to a branching conditionable pathway that is perpendicular to a series of parallel bands. Each band corresponds to one of the sectors $\alpha^\pm$, $\beta^\pm$, and $\gamma^\pm$. A second light in such a sector delivers an error signal to its entire band. Each first light can then sample any such band because its sampling pathway crosses and sends conditionable branches to all bands. The total output from such a band contributes to the conditioned gain of the corresponding muscle.

11. Superposition of Sampling Map and Error Signal Map: Logarithms and Bidirectional Parallel Fibers Some implications about the macroanatomy of the AG stage can be drawn by comparing FIGS. 12a, 12b, 12c, and 12d with FIG. 13. By FIGS. 12a, 12b, 12c and 12d, the set of all first light positions sweeps out the whole retina, as does the set of second light error signals. Thus, a map of sampling signal sources and a map of error signal sources are superimposed within the AG stage. The transformation of FIG. 12a into FIG. 14 is accomplished by mapping radial sectors into parallel strips. This property suggests that the error signal map is (approximately) logarithmic (Schwartz, 1980).

The existence of such a logarithmic map suggests, in turn, why parallel fibers are emitted by a granule cell in two opposite directions: If each retinal position activates a subset of mossy fiber terminals, then each subset must be able to activate parallel fibers capable of sampling the strips corresponding to all possible second light positions on the retina.

12. More Constraints on Saccadic Learning

Further constraints on the saccadic learning mechanism will now be derived and shown to be realizable by several related mechanisms. Part of the ensuing discussion applies only to the problem of saccadic error correction. For example, the saccadic learning problem under consideration is a case of temporally discrete sampling, where an old sampling and error signal can be activated by the same modality namely vision. By contrast, the VOR describes a continuous sampling problem, wherein the sampling signal is vestibular and the error signal is visual. The differences, therefore, exist in the types of sampling signals and sampled signals that are used for saccadic versus VOR adaptation. Although each learning circuit, whether mediating saccades or VOR's, may process its input in different ways, the same internal saccadic learning machinery is used in all cases. In accordance with the invention, the saccadic learning machinery will follow the following three properties: (a) the dual action of each light, (b) the incremental effect of error signals on performance, and (c) the attenuation of error signals by prior learning trials.

13. Dual Action, Incremental Learning, and Error Signal Attentuation

By the dual action of each light, we mean that each light is a source of error signal for correcting a previous saccade, as well as a source of a movement command for the next saccade. By the incremental effect of error signals on performance, we mean that the effect of error signals is to progressively improve the accuracy of the saccades. In particular, as learning progressively increases, the conditioned gain of the agonist muscle progressively decreases the conditioned gain of its antagonist muscle. This opponent learning process biases which of the saccade generators corresponding to the two muscles will be activated. By the attenuation of error signals due to prior learning trials, we mean that saccadic error correction tends to undermine its own source of error signals by causing more accurate saccades. This last property is the main justification for calling the second light a source of error signals. This property implies that the size of the error signal generated by a second light decreases as a second light approaches the fovea. These properties imply further constraints upon the microscopic design of the AG stage. The main constraints arise from the consideration of how sampling signals and error signals are allowed to overlap in the networks base and time in order to realize these three functional properties.

The dual action of each light constrains the possible onset times and duration of sampling signals and error signals. To see why this is so, suppose that the eyes make a sequence of inaccurate saccades in response to a single unmoving light in the outside world. These saccadic movements generate a series of lights on the retina. Denote the sampling signal due to the ith light in such a saccadic sequence by $S_i$ and its error signal by $E_i$, $i=1,2,\ldots$. Several possible cases may arise, and our goal is to indicate which cases are consistent with functional requirements. If inconsistent cases are found in vivo, then our model of saccadic learning needs correction.

Figure 15A:
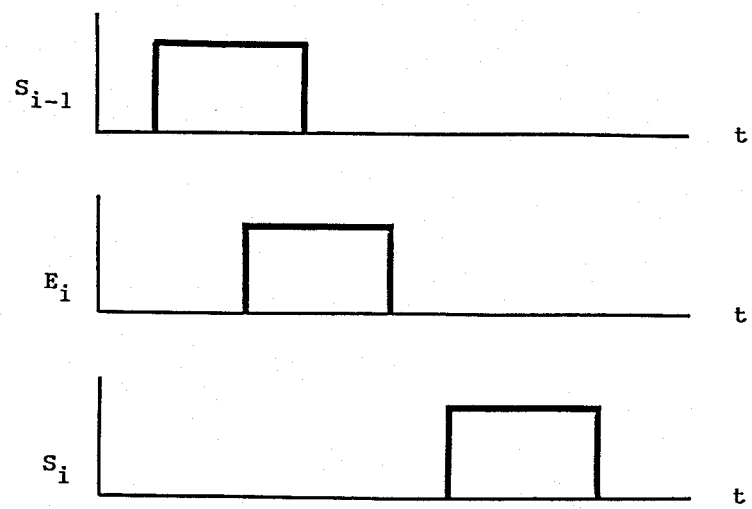
FIG. 15a shows a possible configuration of sampling signals and error signals.

Case 1: Suppose that the onset time of $E_i$ precedes that of $S_i$ and that $E_i$ terminates before $s_i$ begins (FIG. 15a). Since $S_{i-1}$ must sample $E_i$, the offset time of $S_{i-1}$ is later than the onset time of $E_i$. In this situation, $E_i$ can alter the effect of $S_{i-1}$ on future performance without altering the effect of $S_i$ on future performance, even though both $S_i$ and $E_i$ are elicited by the same light.

Figure 15B:
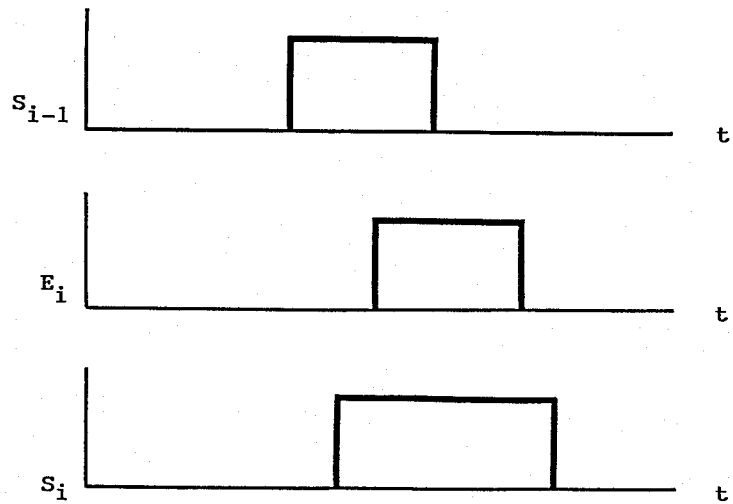
FIG. 15b shows an alternate configuration of sampling signals and error signals.
Figure 17A:
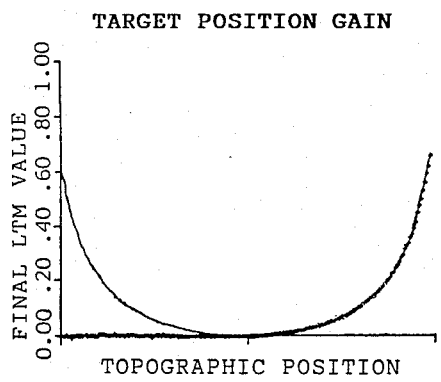
Figure 17B:
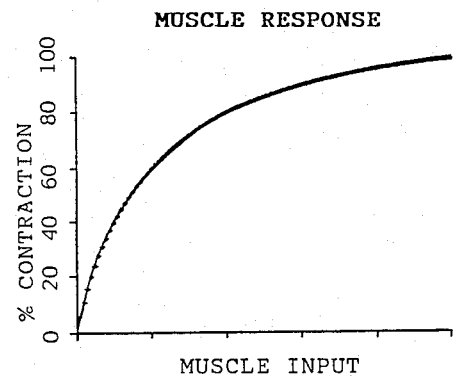
Figure 17C:
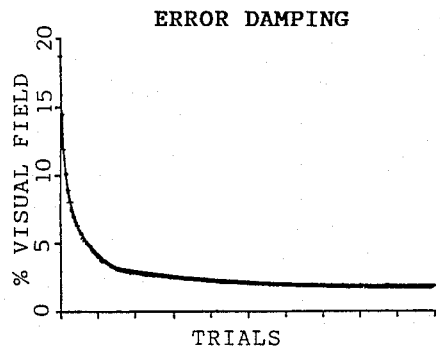
Figure 17D:
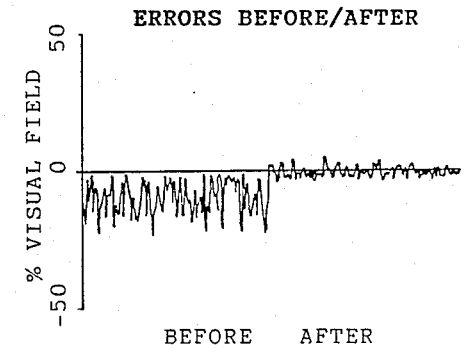

Case 2: Suppose that the onset time of $E_i$ is subsequent to the onset time of $S_i$ (FIG. 15b). Since $S_{i-1}$ must be able to sample $E_i$, $S_{i-1}$ is still active in sensory short term memory (SSTM) at the onset time of $S_i$. The timing configuration in FIG. 15b can create the following difficulty.

The effect of an error signal such as $E_i$ on the sampling signal $S_{i-1}$ of a prior light is to progressively improve the accuracy of the saccade that corresponds to $S_{i-1}$. Thus, after sufficiently many learning trials take place, $S_{i-1}$ will read-out conditioned signals leading to accurate foveations which generate zero error signals. In order for $E_i$'s to correct an $S_{i-1}$ in this way, the effect of successive $E_i$'s on the conditionable pathway sampled by $S_{i-1}$ must be incremental, so that each successive saccade foveates better in response to the same first light. When this incremental learning effect ultimately causes accurate foveations, no further error signals are registered until parameter changes elsewhere in the system cause fixation errors anew.

Given these learning properties, an $S_i$ that overlaps its own $E_i$ on every trial, as in FIG. 15b can create a serious learning anomaly. If a given nonfoveal light increments its $S_i$-activated sampling pathway with its own nonzero $E_i$ on every saccadic trial, then the error signal never terminates even if the saccade becomes more accurate. Unless precautions are taken, every saccade will eventually overshoot due to the persistent action of its own error signal.

This problem cannot be escaped just by claiming that $S_i$ is insensitive to $E_i$ because $S_i$'s onset time precedes that of $E_i$. Such a sensitivity-timing argument fails because $S_{i-1}$ must be sensitive to $E_i$ even though the onset time of $S_{i-1}$ precedes that of $S_i$. If $S_i$ were already insensitive to $E_i$ when $E_i$ occurred, then surely $S_{i-1}$ would also be insensitive, thereby preventing any saccadic learning whatsoever from occurring.

This self-sampling problem can be overcome if a preprocessing stage exists at which both the sampling map and the error map are topographically superimposed. Suppose at this stage that the source of sampling signals due to a given light topographically inhibits the source of error signals due to the same light before the error signals reach the AG stage. Then no $S_i$ could sample its own $E_i$, although any active $S_{i-1} \neq S_i$ could sample $E_i$.

Cases 1 and 2 show that two different timing rules can, in principle govern saccadic learning if these rules are joined to suitable topographic restriction on self-sampling of error signals.

14. Numerical Studies of Adaptive Foveation due to Saccadic Gain Changes: Learned Compensation for System Nonlinearities Formal learning capabilities of several types of AG stage models have been numerically analyzed. Computer simulations has been carried out wherein different combinations of eye position sampling maps, retinotopic sampling maps, and target position sampling maps are used with two varieties of agonist-antagonist competitive interactions to learn accurate foveations using different types of nonlinear muscle plants and error signals.

In all cases, saccades converge to the correct target position. Given a nonlinear muscle, a significant damping of errors occurs only if initial position is taken into account in the learning rule. This observation led to the following rule. This rule is called the Nonlinear Dimension Rule.

a. Purely Retinotopic Sampling

To see that compensating for a nonlinear muscle plant is a real problem, consider FIGS. 16a1, 16a2, 16a3 and 16b1, 16b2, 16b3. In FIGS. 16a1, 16a2, 16a3 and 16b1, 16b2, 16b3, only a retinotopic sampling map can be conditioned by error signals. FIG. 16a shows that, although saccades become more accurate on the average due to learning, the mean error rate never becomes smaller than approximately ±6.7% of the total visual field. The negative result holds even if the error function increases linearly with distance of the second light from the fovea, and if the relationship between muscle contraction and motion of the light on the retina is equal and opposite.

The cause of this learning difficulty is the nonlinear relationship between the total saccadic signal and the amount of muscle contraction. In the system of FIG. 16a, this nonlinearity is slower-than-linear one: The amount of contraction is proportional to the saccadic command at small values of the command, and gradually begins to decrease, or to saturate, at larger values of the command. In this example, a half-maximal muscle signal causes a 4/5-maximal muscle contraction. Thus the nonlinearity has a significant effect on system performance.

FIG. 16b shows that the nonlinear muscle function is the cause of this difficulty. When a linear muscle function is used, essentially perfect learning occurs. This occurs even though a demanding rule is imposed governing the amount of muscle contraction and the corresponding motion of the light on the retina: an increment of $\Delta L$ in muscle contraction is assumed to cause a $2\Delta L$ in the position of the light on the retina.

In order to learn well using a nonlinear muscle plant, the learning system needs somehow to compensate for the different contractions that are caused by fixed movement signals when the muscle starts out in different initial positions. A retinotopic sampling map contains no information whatsoever about initial position. The remaining simulations include information about initial position in several different forms. In the computer studies that are summarized below, we consider a mean error rate to be unacceptable unless it was less than about 4 percent of the visual field. This approximates the accuracy of human saccades (Weber and Daroff, 1972).

b. Invariant Target Position Map

One way to take the initial eye position into account without increasing the total number of long-term memory (LTM) traces in the sampling maps is to let a single LTM trace multiply a composite signal that is the sum of two signals. Let one signal code a retinotopic light position, the other signal code an initial eye position, and the two signals add to influence a single LTM trace only if their sum represents a fixed target position. A different LTM trace exists corresponding to each target position that is computed within the spatial resolution of the network. Such a sampling map is called an invariant target position map because a single LTM trace corresponds to each target position independent of how that position is synthesized from its component signals.

In this system, a single LTM trace must compensate for all the initial eye positions that can correspond to a fixed target position. Each of these initial eye positions corresponds to a different part of the nonlinear muscle function. Despite this fact, a significant reduction in the mean error rate occurs compared to the case of purely retinotopic sampling. FIGS. 17a, 17b, 17c, and 17d depicts a simulation in which the mean error rate eventually becomes 1.8% of the visual field. Thus, if a single sampling map implicitly embodies two degrees of freedom (one retinotopic position plus one initial eye position), then excellent learning occurs (See Section B.2).

c. Invariant Target Position Map Plus Retinotopic Map

Increasing the number of adaptive degrees of freedom causes a further improvement in error rate, even if no more LTM traces correspond to initial eye position information per se. These additional degrees of freedom enable part of the burden of adaptation to be absorbed by a different sampling map. In FIG. 18a, both an invariant target position map and a retinotopic map separately send sampling signals to the AG stage. Each of these maps undergoes independent learning within the AG stage. The two sampling maps then add their conditioned movement signals to unconditioned movement signals at the SG. The LTM traces of the independent retinotopic map and invariant target position map embody three degrees of freedom. The retinotopic map explicitly embodies one degree of freedom, and the invariant target position map implicitly embodies two degrees of freedom. In these simulations, a mean error rate of 1.5% of the visual field was attained using a nonlinear S-shaped muscle function. Thus, if three degrees of freedom are used and at least one degree of freedom incorporate initial eye position signals, then excellent learning takes place. This is true even if the learning function in nonlinear; for example, if error signals grow as a cubic function of error size.

d. Retinotopic Map Plus Eye Position Map

Better learning than with purely retinotopic sampling (FIGS. 16a1, 16a2, 16a3) occurs using two degrees of freedom in which the first map is a retinotopic map and the second map is a map of initial eye position. In these simulations, the network takes into account the target position of the eye (initial position plus retinal light position), but does not compute a map whose individual cells represent target position (FIGS. 18b1-18b4). In these simulations, a mean error rate of 3.5% of the visual field was attained using a nonlinear slower-than-linear muscle function. Note that, although both FIGS. 18a1-18a4 and 18b-18b4 use two sampling maps, their final error rates and spatial distributions of LTM traces are different due to their different sampling maps and the different non-linear muscle plants to which they are adapting. In other words, different sampling maps automatically learn different LTM patterns to compensate for the initial position errors tht are caused by different nonlinear muscle functions.

e. Nonvariant Target Position Map

Two degrees of freedom can also be realized by allowing every possible pair of retinotopic positions and initial eye positions, up to some finite spatial resolution, to have its own sampling pathway and LTM trace. FIGS. 19a, 19b and 19c shows that this model can achieve arbitrarily good mean error rates. Because each unique pair of positions has its own LTM trace, learning by this model is very stable. The model has the disadvantage that a given LTM trace will not be tuned until its unique pair of positions is activated on learning trials. By contrast, when an invariant target position map is used, learning occurs at a retinotopic or initial eye position whenever this position is a component of any target position. Thus, there exists a tradeoff between convergence rate, stability, and the number of independent sampling sources. The expected interval between successive learning increments at each LTM trace in a noninvariant target position map can be decreased by expanding the receptive fields of positions in the sampling map. Thus positions near to a fixed position can induce some learning at that position and the LTM traces then attain limiting values that are averages of the gains appropriate to nearby map positions. Given sufficiently symmetric and localized receptive fields, these average LTM values approximate the values that occur without any receptive field spread, but at a faster rate.

f. Retinotopic Map Plus Initial Eye Position Map Plus Invariant Target Position Map If three independent sampling maps send sampling signals to the AG stage, then learning is again very accurate and stable. FIGS. 30a-30f depicts an example in which a muscle contraction of $\Delta L$ causes a change of $-2 \Delta L$ in the retinal position of the light. Despite this distortion, the system quickly achieves error rates of 0.3% of the visual field.

15. Shared Processing Load and Recovery from Lesions

Inspection of FIGS. 16-20 shows that the spatial maps of LTM traces that arise due to learning in different models need not be the same. For example, the retinotopic LTM map or the invariant target position LTM map may differ due to the existence of other sampling maps in the network. These results illustrate that the adaptive behavior of each region of the network is influenced by the design of the network as a whole. Each region automatically assumes a different share of the processing load depending upon how many other regions exist to share this load. This type of insight helps to explain why behavioral losses right after certain lesions are eventually fully compensated whereas losses after other lesions are at best partially compensated by spared neural subsystems.

An example of how lesions can change learning, LTM maps can be developed from the simulation described in FIGS. 20a-20f. In this simulation, LTM traces or retinotopic, eye position, and invariant target position sampling maps share the learning load. If the target position map is destroyed, then the remaining reinotopic and eye position LTM traces can absorb the processing load, as in FIGS. 18b1-18b4. By contrast, if both the target position and the eye position map are destroyed, then the remaining retinotopic LTM traces cannot absorb the full processing load, although they can keep the mean errors centered around the fovea, as in FIGS. 16a1–16a3. Two sampling maps can be destroyed without preventing full adaptation, if these sampling maps are there, the retinotopic and the eye position maps. Then the single remaining target position map can absorb the full processing load, as in FIG. 17.

16. Models of Saccadic Error Correction

The simulations below describe learning by one pair of agonist-antagonist muscles. The same mechanism generalizes to any number of independent agonist-antagonist pairs.

For definiteness, let the agonist-antagonist muscle pair control horizontal eye movements, and let a one-dimensional strip of photo cells receive the retinal inputs that drive these muscles. Divide the strip into a right hemifield and a left hemifield. A row of 100 nonfoveal photo cells form each hemifield in the following simulations. The mechanisms work using any spatial resolution in one and two spatial dimensions.

The simulations are carried out using a discrete time variable as well as a discrete mesh of cells for two reasons: The saccade is a ballistic motion that is initiated by commands set up before it begins, and that is corrected by error signals that are registered after it ends. Use of a continuous time variable can only increase the stability of the computations. This discrete approximation will be refined in Section B.17. There we will consider effects of intertial properties which develop continuously during a saccade and will discuss how these tendencies towards dynamic overshoot may be controlled. The results in the present section provide a foundation for these later analyses.

Let the index $i$, $-100 \leq i \leq 100$, denote the spatial location of a light input on the retina, and the index $n$, $n \geq 1$, denote the learning trial. A randomly chosen light is assumed to activate the retina, unless the prior saccade was incorrect. In this latter case, the retinal position at which the nonfoveated light is registered after a saccade gets activated on the next trial. This procedure formalizes the idea that a second light position on trial n is the first light position on trial n+1, except when an accurate foveation occurs. To express this rule formally, let $i = i_n$ be the position of the retinal light on trial n, where $-100 \leq i_n \leq 100$. Position $i_n = 0$ corresponds to a light at the fovea. Let $E_n$ be the second light position that is caused by a saccade to a first light at position $i_n$. The function $E_n$ also represents the size of the error caused by the nth saccade, since $E_n = 0$ corresponds to a correct saccade. In order to restrict the computation to a discrete array of photo cells, we also define an error tolerance E, which was chosen equal to 0.1 in the simulations. In terms of these definitions let $$i_{n+1} = \begin{cases} \text{random } i, & -100 \leq i \leq 100 \text{ and } i \neq 0 \text{ if } |E_n| \leq E \\ E_n & \text{if } |E_n| > E \end{cases} \quad (3.1)$$

In order define a complete model, several rules need to be specified.

A. The Light-Motoneuron Transform: the rule whereby a light at position $i = i_n$ generates outputs from the motoneurons.

B. The Motoneuron-Muscle Transform: the rule whereby outputs from the motoneurons determine prescribed lengths of their target muscles before and after saccades.

C. The Muscle-Retina Transform: the rule whereby changes in muscle length cause changes in the position of the light on the retina.

D. The Retina-Learning Transform: the rule whereby the new second light position acts as an error signal that alters the sizes of LTM traces at the AG stage.

In order to state these rules clearly, we need to introduce some notation. Since the same Motoneuron-Muscle Transform is used in all models, we start by defining this transform. Let $O_{Rn}$ ($O_{Ln}$) equal the total motoneuron output to the right (left) muscle after the saccade on trial n, and let $M_{Rn}$ ($M_{Ln}$) equal the total muscle contraction fo the right (left) muscle after the saccade on trial n. In order to relate these two types of functions, we define a contraction function C(w) that converts motoneuron signals into muscle contractions. The computation is scaled so that $$M_{Rn} + M_{Ln} = C(1) \quad (3.2)$$

for all $n \geq 1$. The left and right muscles are assumed to contract and relax in a push-pull fashion.

MOTONEURON-MUSCLE TRANSFORM AND PUSH-PULL

Let $$M_{Rn} = \begin{cases} C(O_{Rn}) & \text{if } i_n > 0 \\ C(1) - C(O_{Ln}) & \text{if } i_n < 0, \end{cases} \quad (3.3)$$

$$M_{Ln} = \begin{cases} C(1) - C(O_{Rn}) & \text{if } i_n > 0 \\ C(O_{Ln}) & \text{if } i_n < 0, \end{cases} \quad (3.4)$$

for $n \geq 1$, and $$M_{R0} = M_{L0} = \tfrac{1}{2} C(1). \quad (3.5)$$

Equation (3.3) says that the right muscle contracts if the right hemifield received a light, and relaxes if the left hemifield receives a light. In case $i_n < 0$ of (3.3), $O_{Rn}$ can be defined by the relation $$O_{Rn} = C^{-1}[C(1) - C(O_{Ln})]. \quad (3.6)$$

Equation (3.4) makes the analogous statements about control of the left muscle. Equation (3.5) says that the eye starts out in a head-in-center position before learning trials begin. Contraction functions of the form $$C(w) = \frac{w^m}{\alpha^m + w^m} \quad (3.7)$$

were used in the simulations, where m=1, 2, or 4 and $\alpha$=0.1, 0.2, or 0.5. Parameter m determines the nature of the muscle plant nonlinearity. Choosing m=1 defines a slower-than-linear nonlinearity. Choosing m=2 or 4 defines an S-shaped, or sigmoidal, nonlinearity. Choice m=4 defined a more nonlinear muscle plant than does choice m=2. Parameter $\alpha$ also controls the nonlinearity of the muscle. A smaller $\alpha$ determines a steeper increase in muscle contraction as a function of w because $C(\alpha) = \frac{1}{2}$. Different choices of $\alpha$ thus correspond to different thresholds of muscle contraction and different sensitivities of the muscle plant to motoneuron signals. Equation (3.2) shows that the maximal total contraction is sealed to equal $C(1)$, which by (3.7) is less than 1.

We can now define the Muscle-Retinal Transform. This amounts to defining the second light position $E_n$ on trial n as a function of the amount of muscle contraction due to the nth saccade. To do so, it is necessary to keep two spatial scales clearly in view. Retinal lights can fall on any position i such that $-100 \leq i \leq 100$, whereas muscles can contract no more than an amount $C(1) < 1$. We assume that the change in retinal position of a fixed light on trial n is proportional to the amount by which the muscles contract or relax on that trial. The proportionality constant need not equal 1 for some of the models to learn accurate foveations. To define $E_n$, we use the notation $$[[\xi]] = \begin{cases} \text{largest integer} \leq \xi & \text{if } \xi > 0 \\ \text{smallest integer} \geq \xi & \text{if } \xi \leq 0. \end{cases} \quad (3.8)$$

MUSCLE–RETINA TRANSFORM

Let $$E_n = \begin{cases} \max\{-100 \cdot [[i_n + \beta(M_{R,n-1} - M_{Rn})]]\} & \text{if } i_n > 0 \\ \min\{100 \cdot [[i_n + \beta(M_{Ln} - M_{L,n-1})]]\} & \text{if } i_n < 0. \end{cases} \quad (3.9)$$

where $\beta = \dfrac{100\gamma}{C(1)}$. $\quad (3.10)$

To understand this definition, consider the case where $i_n > 0$. Then a light hits the right hemifield on trial n. This event causes a saccade towards the right. This saccade cannot move the eye farther than the right muscle can maximally contract. For simplicity, we assume that such a maximal contraction causes the light to fall on the leftmost cell of the array, namely $E_n = -100$. This property explains the use of the function $\max\{100; \}$ in this case. All saccadic motions cause the light to excite a definite new cell in the array. This property explains the use of the function $[[.]]$ which causes every motion to excite the cell nearest to the light's new position. Term $i_n + \beta(M_{Rn-1} - M_{Rn})$ says that the new position of the light is determined by the light's initial position $i_n$ plus the amount $\beta(M_{Rn-1} - M_{Rn})$ by which the light moves across the retina. The term $\beta(M_{Rn-1} - M_{Rn})$ says that the amount of retinal motion is proportional to the amount of muscle contraction $M_{Rn} - M_{Rn-1}$ caused by the light. Since the light moves to the left when the right muscle contracts, the change in retinal position is $\beta(M_{Rn-1} - M_{Rn})$ rather than $\beta(M_{Rn} - M_{Rn-1})$. Parameter $\beta$ in (3.10) scales amount of muscle contraction into amount of retinal motion as follows. By (3.2) term $C(1)$ is the maximal amount of muscle contraction. Dividing $M_{Rn-1} - M_{Rn}$ by $C(1)$ defines a function that stays between $-1$ and $1$. Multiplying this ratio by 100 defines a function that stays between $-100$ and $100$. The extra term $\gamma$ calibrates the gain of the Muscle-to-Retina Transform. In our simulations, gain values of $\gamma = 1$, 2, or 3 were studied. The equation for saccades to the left in (3.9) (case $i_n < 0$) has a similar interpretation.

We are now ready to define the Retina-Learning Transform. Different learning models use different combinations of sampling maps. Each sampling map sends conditionable signals to the AG stage and then on to the saccade generator (SG) or the motoneuron (MN) stages. To define rules for LTM change, let $z_{Rin}(z_{Lin})$ be the value of the LTM trace from the ith population of a sampling map to the AG strip corresponding to the right (left) muscle at the beginning of trial n. Learning by each LTM trace is assumed to alter the production rate of the chemical transmitter in its synapse (Eccles. 1953; Hebb. 1949; Grossberg, 1968a. 1969b, 1969c; Kandel and Schwartz, 1982). Each LTM trace, in turn, controls the net rate of release of its transmitter in response to its sampling signal. Two types of learning rules have been simulated. In both rules, a learning function $L(w)$ converts the position $E_n$ of the light after the nth saccade into the size $L(E_n)$ of a learning signal. We physically interpret $L(E_n)$ as an error signal that is carried by pathways from a retinal map to cerebellar climbing fibers that project to the motor strips of the right and left muscles (FIG. 14). Since no learning occurs when $E_n = 0$, we choose $L(0) = 0$. Since learning rate should increase, or at least not decrease, as $E_n$ increases, we assumed that $L(w)$ is an increasing function of $w \geq 0$. Since an increase in $z_{Ri,n+1}$ should occur if $E_n > 0$, whereas an increase in $z_{Li,n-1}$ should occur if $E_n < 0$, we assume that $L(w)$ is an odd function of $w$; viz., $$L(\omega) = -L(-\omega). \quad (3.11)$$

The two types of learning rules that we have studied can now be stated using the notation $|\xi|^+ = \max(\xi, 0)$.

HEMIFIELD GRADIENT LEARNING RULE

Let $$z_{Ri,n+1} = \delta z_{Rin} + [L(E_n)]^- \quad (3.12)$$

and $$z_{Li,n+1} = \delta z_{Lin} + [-L(E_n)]^+, \quad (3.13)$$

where $0 < \delta \leq 1$.

FRACTURED SOMATOTOPY LEARNING RULE

Let $$z_{Ri,n+1} = [\delta z_{Rin} + L(E_n)]^- \quad (3.14)$$

and $$z_{Li,n+1} = [\delta z_{Lin} - L(E_n)]^+, \quad (3.15)$$

where $0 < \delta \leq 1$.

A differential equation such as (3.12) is a discrete approximation to a related differential equation. Rewriting (3.12) as $$z_{Ri,n-1} - z_{Rin} = -(1-\delta)z_{Rin} + [L(E_n)]^+, \quad (3.16)$$

the corresponding differential equation is seen to be $$\frac{d}{dt} z_{Ri} = -(1-\delta)z_{Ri} + [L(E_n)]^+. \quad (3.17)$$

In (3.17), $z_{Ri}$ is a time average of the error signal $[L(E)]^+$. The averaging rate is $1-\delta$. If $\delta = 1$, then no forgetting occurs.

The Hemifield Gradient Learning Rule says that at most, one of the LTM traces $z_{Ri,n+1}$ and $z_{Li,n+1}$ can grow due to $E_n$ on trial n, since by (3.11), $[L(E_n)]^+ > 0$ only if $E_n > 0$ and $[-L(E_n)]^+ > 0$ only if $E_n < 0$. By contrast, the Fractured Somatotopy Learning Rule says that $z_{Ri,n+1}$ increases by the same amount that $z_{Li,n+1}$ decreases, and conversely, until one of the LTM traces becomes zero. Consequently, the sum $z_{Rin} + z_{Lin}$ is constant until one of the LTM traces vanishes.

In the simulations, the learning functions $L(w) = \epsilon w$, $L(w) = \epsilon w^3$, and $L(w) = \{\epsilon \text{ if } w > 0, \epsilon \text{ if } w < 0, \text{ and } 0 \text{ if } w = 0$ were used. These choices permitted a comparison of the effects of linear and nonlinear error signals on the learning process. In order to guarantee an incremental effect of error signals on learning and performance, the forgetting rate $1 - \delta$ was chosen small. The values used in the simulations were $\delta = 1, 0.999,$ and $0.998$. We also chose the learning rate to be larger than the forgetting rate, $1 - \delta$. The choices $\epsilon = 0.002, 0.005, 0.01, 0.1,$ and $1$ were studied. Too large a choice of $\epsilon$ destabilizes the system by amplifying the LTM traces too much on a single trial.

It remains to define the Light-Motoneuron Transform. This transform was chosen differently in different models because the sampling maps that were used vary across models. In every model, prewired light-activated pathways elicit unconditioned saccades even before learning occurs, and competition occurs between agonist-antagonist muscle commands (Section b.7). The agonist-antagonist competition can occur at any of several anatomical stages. If the Fractured Somatotopy Learning rule (3.14)-(3.15) holds, then competition between agonist-antagonist LTM traces already occurs within the AG stage. A subsequent stage of competition is nonetheless still necessary to guarantee the push-pull Motoneuron-Muscle Transform (3.3)-(3.4). If both the left and the right saccade generators receive positive signals from the AG stage, then their outputs must compete before the muscles receive the net signal, so that the motoneurons whose SG has the larger output will receive a positive signal, and the other motoneurons will receive a negative signal, thereby realizing push-pull. In such a network, two agonist-antagonist competition stages occur; intracerebellar competition and competition at a stage between SG and the MN stages. In an alternative scheme to achieve muscle push-pull, right and left hemifield outputs from the AG stage compete after the AG stage but before the SG stage. Then only one SG can generate an output signal. This output signal must then excite its own motoneurons and inhibit the antagonist motoneurons to achieve push-pull. In this network, there are three, rather than two, agonist-antagonist competition stages: intracerebellar, pre-SG, and post-SG competition.

If the Hemifield Gradient Learning Rule (3.12)-(3.13), is used, then agonist-antagonist competition must occur at some post-SG stage to realize LTM competition, as well as push-pull competition. The pre-SG and post-SG competitive anatomies described above achieve these properties with this learning rule. For definiteness, we write down only equations for the pre-SG competitive anatomy. Post-SG competition gives rise to similar learning properties, but the push-pull equations (3.3)-(3.4) must then be redefined.

The input to the motoneurons in all the simulations is a sum of an unconditioned retinotopic signal plus conditionable signals from one or more sampling maps. The unconditioned signal $U_{Rin}$ ($U_{Lin}$) from retinotopic cell i to the right (left) MN at the end of trial n is $$U_{Rin} = S_{in}^{(r)} G_{Ri} \quad (3.18)$$

and $$U_{Lin} = S_{in}^{(r)} G_{Li}. \quad (3.19)$$

Term $S_{in}^{(r)}$ is the signal emitted by the ith retinotopic cell, and $G_{Ri}$ ($G_{Li}$) is the path strength of the ith pathway to the right (left) MN. For simplicity, let $$S_{in}^{(r)} = \begin{cases} 1 & \text{if } i = i_n, \\ 0 & \text{otherwise.} \end{cases} \quad (3.20)$$

where $i_n$ is defined by (3.1). In a similar fashion, sampling signals will be chosen equal to 1 or 0 depending upon whether or not the corresponding sampling map population is activated on a given trial. The definitions of the spatial gradient functions $G_{Ri}$ and $G_{Li}$ embody the intuition that prewired connections tend to cause larger contractions in response to more eccentric retinal inputs (FIG. 1). The networks can learn to foveate in response to a wide variety of such spatial gradient functions $G_{Ri}$ and $G_{Li}$. For definiteness, we let the strength of these gradient connections increase as a linear function of retinal eccentricity; namely $$G_{Ri} = G[i]^+ \quad (3.21)$$

and $$G_{Li} = G[-i]^+. \quad (3.22)$$

In the simulations described in FIGS. 15-19, we chose $G = 0.1$. Other things being equal, smaller G values induce learning of larger LTM traces at the AG stage.

We can now define the combined effects of unconditioned and conditioned movement signals on the Light-Motoneuron Transform given different combinations of sampling maps.

a. Purely Retinotopic Sampling

In order to describe the motoneuron outputs $O_{Rn}$ and $O_{Ln}$ that correspond to a retinotopic sampling map, we use a superscript "(r)", as in the notations $S_{in}^{(r)}$ and $z_{Rin}^{(r)}$ for sampling signals and LTM traces, respectively. The total output signal from the right MN stage after the nth saccade terminates is defined to be $$O_{Rn} = \max\left\{1 \cdot \left[\sum_{i \in R} S_{in}^{(r)} (z_{Rin}^{(r)} - z_{Lin}^{(r)}) + \sum_{i \in R} P_{Rin} + O_{R,n-1}\right]^+\right\}. \quad (3.23)$$

The expression max $\{1;\}$ in (3.23) says that the right muscle contracts maximally when it receives a unit signal, as in (3.2). This expression, which forms part of all subsequent $O_{Rn}$ and $O_{Ln}$ equations, will henceforth be omitted for notational convenience.

The sums $\Sigma_{i \in R}$ in (3.23) are taken over all cells in the retinotopic sampling map. Since on trial n, the active sampling position is $i = i_n$, (3.20) implies that all terms in the sum vanish except term $i=i_n$. Thus, (3.23) simplifies to $$O_{Rn}=[S_{i_nn}{}^{(r)}(z_{Ri_nn}{}^{(r)}-z_{Li_nn}{}^{(r)})+S_{i_nn}{}^{(r)}G[i_n]^{-}+O_{R,n-1}]^{-}. \quad (3.24)$$

In (3.24) term $S_{i_nn}{}^{(r)}Z_{Ri_nn}{}^{(r)}$ says that the $(i_n)$th retinotopic population reads out a movement signal from the AG motor strip corresponding to the right muscle R. This signal is the product of the retinotopic sampling signal $S_{i_nn}{}^{(r)}$ times the LTM trace $Z_{Ri_nn}{}^{(r)}$ from retinotopic position $i_n$ to muscle strip R. Due to the multiplicative form of this relationship, we say that the LTM trace gates the sampling signal. Term $-S_{i_nn}{}^{(r)}Z_{Li_nn}{}^{(r)}$ says that a similarly LTM-gated read-out occurs from the AG strip corresponding to the left muscle strip L. Due to the minus sign in front of this expression, the left muscle signal competes with the right-muscle signal before the net signal can reach the right MN. Term $S_{i_nn}{}^{(r)}G[i_n]^{+}$ says that an unconditioned movement signal is also read-out by the $(i_n)$th retinotopic signal. The total, unconditioned plus conditioned, signal adds on to the previous MN activity $O_{R,n-1}$. If the updated total activity is positive, then the [...]$^{+}$ enables a signal to be emitted to the right muscle.

Equation (3.24) can be further simplified. Using (3.20) again we can write $$O_{Rn}=[z_{Li_nn}{}^{(r)}+G[i_n]^{+}+O_{R,n-1}]^{+}. \quad (3.25)$$

The subscripts in this formula are unwieldly. Henceforth we write subscript i instead of $i_n$ to simplify the notation. Then (3.25) becomes $$O_{Rn}=[z_{Rin}{}^{(r)}-z_{Lin}{}^{(r)}+G[i_n]^{+}+O_{R,n-1}]^{+}. \quad (3.26)$$

A similar analysis shows that $$O_{Ln}=[z_{Lin}{}^{(r)}-z_{Rin}{}^{(r)}+G[-i_n]^{+}+O_{L,n-1}]^{+}. \quad (3.27)$$

b. Invariant Target Position Map

Using the same simplified notation as in (3.27), we can recursively define the motoneuron output corresponding to the right muscle by $$O_{Rn}=[z_{Rkn}{}^{(t)}-z_{Lkn}{}^{(t)}+G[i_n]^{-}+O_{R,n-1}]^{+}. \quad (3.28)$$

where $Z_{Rkn}{}^{(t)}$ and $Z_{Lkn}{}^{(t)}$ are the target position map LTM traces. In (3.28), the target position on the kth trial is denoted by $k=k_n$. It is necessary to define $k_n$ in terms of the retinotopic position $i_n$ and the initial eye position $j_n$ at the beginning of trial n. We find that $$k_n = \begin{cases} i_n + i_j & \text{if } -100 \leq i_n + j_n \leq 100 \\ \text{undefined} & \text{if } |i_n + j_n| > 100 \end{cases} \quad (3.29)$$

and $$j_n = \begin{cases} \beta M_{R,n-1} & \text{if } i_n > 0 \text{ and } \beta M_{R,n-1} \leq 100 \\ \beta M_{L,n-1} & \text{if } i_n < 0 \text{ and } \beta M_{L,n-1} \geq -100 \\ \text{undefined otherwise.} \end{cases} \quad (3.30)$$

Function $j_n$ in (3.30) defines the initial eye position at the beginning of trial n, in terms of the amount of muscle interaction in (3.3) and (3.4) due to the previous saccade. Then function $k_n$ in (3.29) determines the target position arising from retinotopic position $i_n$ and initial eye position $j_n$. In cases when $k_n$ is undefined, the next retinotopic position $i_{n+1}$ is chosen randomly. In a similar fashion, the motoneuron output corresponding to the left muscle is defined by $$O_{Ln}=[z_{Lkn}{}^{(t)}-z_{Rkn}{}^{(t)}+G[-i_n]^{+}+O_{L,n-1}]^{+}. \quad (3.31)$$

Two other combinations of sampling maps can be defined by using these definitions.

c. Invariant Target Position Map Plus Retinotopic Map

Let $$O_{Rn}=[(z_{Rkn}{}^{(t)}-z_{Lkn}{}^{(t)})+(z_{Rin}{}^{(r)}-z_{Lin}{}^{(r)})+G[i_n]^{+}+O_{R,n-1}]^{+} \quad (3.32)$$

and $$O_{Ln}=[(z_{Lkn}{}^{(t)}-z_{Rkn}{}^{(t)})+(z_{Lin}{}^{(r)}-z_{Rin}{}^{(r)})+G[-i_n]^{+}+O_{L,n-1}]^{+}. \quad (3.33)$$

d. Retinotopic Map Plus Eye Position Map

Let $$O_{Rn}=[(z_{Rin}{}^{(r)}-z_{Lin}{}^{(r)})+(z_{Rjn}{}^{(p)}-z_{Ljn}{}^{(p)})+G[i_n]^{-}+O_{R,n-1}]^{-} \quad (3.34)$$

and $$O_{Ln}=[(z_{Lin}{}^{(r)}-z_{Rin}{}^{(r)})+(z_{Ljn}{}^{(p)}-z_{Rjn}{}^{(p)})+G[-i_n]^{-}+O_{L,n-1}]^{-} \quad (3.35)$$

In (3.34) and (3.35) $Z_{Rjn}{}^{(p)}$ and $Z_{Ljn}{}^{(p)}$ are the eye position map LTM traces. The subscript $j=j_n$ is defined by (3.30).

e. Nonvariant Target Position Map

A similar definition of MN output signal can be given for the case wherein each pair (i,j) of retinotopic positions and initial eye positions activates its own sampling map population. Essentially perfect learning can rapidly occur in this case even if no LTM agonist-antagonist competition occurs. This is due to the fact that each (i,j) pair controls an LTM trace $z_{ij}$ that is unique to its position. For example, the learning simulation described in FIG. 19 used the MN signals $$O_{Rn}=[z_{ijn}+G[i_n]^{+}+O_{R,n-1}]^{+} \quad (3.36)$$

and $$O_{Ln}=[z_{ijn}+G[-i_n]^{+}+O_{L,n-1}]^{+} \quad (3.37)$$

where $$z_{ij,n+1}=[z_{ijn}+L(E_n)]^{+}. \quad (3.38)$$

In these simulations. $1 \leq i, m \leq 40$, thereby generating 1600 sampling populations.

f. Retinotopic Map Plus Initial eye Position Map plus Invariant Target Position Map Let $$O_{Rn} = [(z^{(r)}_{Rin} - z^{(r)}_{Lin}) + (z^{(p)}_{Rjn} - z^{(p)}_{Ljn}) + (z^{(t)}_{Rkn} - z^{(t)}_{Lkn}) + G[i_n]^{+} + O_{R,n-1}]^{+} \quad (3.39)$$

$$O_{Ln} = [(z^{(r)}_{Lin} - z^{(r)}_{Rin}) + (z^{(p)}_{Ljn} - z^{(p)}_{Rjn}) + (z^{(t)}_{Lkn} - z^{(t)}_{Rkn}) + G[-i_n]^{+} + O_{L,n-1}]^{+} \quad (3.40)$$

The formal lesions described in Section B.15 can be carried out on equations (3.39) and 3.40) by deleting the LTM traces with superscripts (t), then (t) and (p) and then (r) and (p).

17. Dynamic Coasting

In the preceding sections, we have analyzed examples in which the final position of the eye is a function $C(O_{Rn})$ or $C(O_{Ln})$ of the total movement signals $O_{Rn}$ and $O_{Ln}$ to an agonist-antagonist pair of eye muscles. In vivo, the eye may continue moving for awhile after the saccade generator shuts off.

Dynamic coasting is due to the fact that the eyeball builds up inertia during saccade. This inertia enables the eyeball to keep moving after the saccadic command terminates. Dynamic coasting does not imply that the saccade must overshoot its target. Indeed, second light error signals are registered only after a saccade terminates, and are indifferent to whether or not part of the saccade was due to eyeball inertia.

18. Adaptive Control of Dynamic Coasting

Given that some dynamic coasting is to be expected, it remains to explain how accurate foveations can nonetheless be learned. In the following analysis, we consider several approximate rules to express the effects of dynamic coasting, and describe computer simulations which demonstrate how well the resultant network learns to foveate.

First, we need a rule to replace equations (3.3) and (3.4). To replace (3.3), we considered the following rule.

Dynamic Coasting Rule

$$M_{Rn} = \begin{cases} C(O_{Rn}) + D(C(O_{Rn}) - M_{R,n-1}) & \text{if } i_n > 0 \\ C(1) - C(O_{Ln}) & \text{if } i_n < 0. \end{cases} \quad (3.41)$$

A similar rule is defined for $M_{Ln}$. Equation (3.41) differs from (3.3) by the term $$D(C(O_{Rn}) - M_{R,n-1}), \quad (3.42)$$

where $D(\xi)$ may be a linear or nonlinear function of the difference $\xi = C(O_{Rn}) - M_{R,n-1}$. This term expresses the amount of coasting that occurs over and beyond the movement due directly to the saccadic command $C(O_{Rn})$. Term (3.42) makes rigorous the hypothesis that the amount of coasting increases as a function of how much the new saccadic command $C(O_{Rn})$ exceeds the previous eye position, as expressed by $M_{R,n-1}$. In other words, more coasting can occur if the eye movement is bigger, other things being equal.

It is also necessary to consider more sophisticated rules for $O_{Rn}$ and $O_{Ln}$. Consider, for example, the old rule (3.34) for combining a retinotopic sampling map with an eye postion position sampling map; namely, the

Static Command Rule

$$O_{Rn} = [S_n + O_{R,n-1}]^+, \quad (3.43)$$

where $$S_n = (z_{Rin}^{(r)} - z_{Lin}^{(r)}) + (z_{Rjn}^{(p)} - z_{Ljn}^{(p)}) + G[i_n]^+. \quad (3.44)$$

This rule does not provide an adequate summary of the total output signal in situations where part of this signal may be due to a conditioned gain that is sensitive to the amount of dynamic coasting. In order to partially overcome this deficiency, we compared computer simulations usig (3.43) with computer simulations using the

Dynamic Command Rule

$$O_{Rn} = [S_n + C^{-1}(M_{R,n-1})]^+. \quad (3.45)$$

Rule (3.45) acknowledges that the initial position $C^{-1}(M_{R,n-1})$ of the eye before the nth saccade begins may be due to the combined effects of the saccade command $C(O_{R,n-1})$ and of the dynamic coast $D(C(O_{R,n-1}) - M_{R,n-1})$ in (3.41). Rules (3.43) and (3.45) are identical in cases where no dynamic coasting occurs, since then $M_{R,n-1} = C(O_{R,n-1})$. The present discussion thus generalizes the case where dynamic coasting can occur.

In the computer simulation summarized by FIGS. 21a-21e, we chose a linear dynamic coast function $$D(\xi) = \frac{\xi}{C(1)} \quad (3.46)$$

and the static command rule (3.43). Despite the linearity of $D(\xi)$, the system's ability to learn accurate foveations deteriorated relative to the situation depicted in FIG. 18. By contrast, in FIGS. 22a-22e the same linear dynamic coast function (3.46) was paired with the dynamic command rule (3.45). Learning significantly improved.

In FIGS. 22a-22e a nonlinear dynamic coast function $$D(\xi) = C\left(\frac{\xi}{C(1)}\right) \quad (3.47)$$

was used where, as in all these simulations.

$$C(w) = \frac{w}{.2 + w}. \quad (3.48)$$

When this slower-than-linear signal functions was paired with the static command rule (3.43), and even more serious breakdown of saccidic learning occurred. In FIGS. 24a-24e, by contrast, (3.47) was paired with the dynamic command rule (3.45), and learning was again greatly improved.

FIGS. 25a-25e and 26a-26e show that a change of the nonlinearity which defines the dynamic coast function can alter the details of learning, but not the qualitative conclusion drawn from FIGS. 23 and 24. In both FIGS. 25a-25e and 26a-26e we chose $$D(w) = \frac{\left(\frac{w}{C(1)}\right)^2}{.2^2 + \left(\frac{w}{C(1)}\right)^2} \quad (3.49)$$

instead of (3.47). Function D(W) in (3.49) is a sigmoidal signal function which is guadratically nonlinear at the small w values where (3.47) is approximately linear. When paired with a static command rule in FIGS. 25a-25e poor learning again occured. When paried with

C.

COMPARING TARGET POSITION WITH PRESENT POSITION: NEURAL VECTORS

1. Reconciling Visually Reactive and Intentional Computations

The following discussion will focus on the design of the Head-Muscle Interface, or HMI. As already mentioned, the HMI mediates between target position computations and retinotopic computations. It does so by comparing target positions with present positions to compute vector differences in motor coordinates. The computation of vector differences can be accomplished by self-calibrating neural mechanisms. A network capable of carrying out such a computation is called a Vector Command Network, or VCN. A visually-reactive network is, by contrast, called a Retinotopic Command Network, or RCN. The following four problems are solved by a VCN.

a. Head-to-Muscle Coordinate Transform

To compare a target position computed in head coordinates with an eye position computed in agonist-antagonist motor coordinates, the target position is transformed into motor coordinates. The transforming mechanism that is used works even if the target position map, or TPM, possesses a complex internal structure. The head coordinates of different target positions can even be randomly distributed across the TPM without causing any calibration difficulties.

The TPM needs to contain loci corresponding to a large number of different egocentric positions, whereas only three pairs of agonist-antagonist muscles move the eye. In order to map head coordinates into muscle coordinates, each target position in the TPM sends sampling signals to motor representations of all the agonist-antagonist muscle positions at the head-muscle interface (HMI). A massive convergence of pathways must therefore occur from the TPM onto each muscle representation in the HMI.

One way to provide space for so many converging pathways is to represent each muscle within a large region of cells, to let each target postion in the TPM project to a small subset of these cells, and to distribute the eye position signal in parallel across the entire region using many axon collaterals. In this type of anatomical realization, a potentially confusing mixture of cellular response profiles would present itself to a physiologist's electrodes. Signals due to both lights and eye positions would change rapidly from cell to cell due to target position inputs computed in head corrdinates. These signals would intermix with signals due to eye positions that change slowly from cell to cell. The next paragraph explains why these influences would appear and disappear through time in a complex way, depending upon where and whether lights flash on and off and are differentially attended through time.

b. Present Eye Position Signals: Corollary Discharges

Outflow signals that move and help to hold the eye muscles in position are assumed to be the source of eye position signals. Since these outflow signals are computed in agonist-antagonist coordinates, they can be directly related to the HMI.

c. Simultaneous Calibration of the Head-to-Muscle Transform and of the Vector Difference between Target Position and Eye Position The HMI transforms target positions from head coordinates into motor coordinates in order to compute vector differences of target postions and present positions in motor coordinates. How the HMI accomplishes both tasks using the same network equations will be shown.

First consider the mechanism which learns the transformation of target position from head coordinates into motor coordinates. Suppose that a cell population within the TPM encodes the target position by being activated before the saccade begins. Let the activity of this population be stored in STM until after the saccade is over. One might legitimately ask how any saccade whatsoever can be generated before the transformation within the HMI is learned. If the visually reactive Retinotopic Command Network (RCN) already described in Section B did not exist, this concern would be a valid one. As it is, a developmental stage before the HMI is calibrated is considered when saccades can be unconditionally generated and corrected by visual error signals within the visually reactive RCN.

The active population within the TPM sends sampling signals over its conditionable pathways to the HMI. The HMI also receives corollary discharge signals that encode eye position as time goes on. These corollary discharge signals provide the eye position data that the conditionable pathways will learn. Not all eye positions are, however, the correct ones to learn. For example, before the saccade occurs, the corollary discharge signals encode initial eye postion. The correct eye position to learn is not the initial eye position. Rather, it is intended eye position.

This simple observation leads to a major conclusion about HMI design. The conditionable pathways from the TPM target positon to the HMI can learn only after a saccade is over. This property raises an important question. If the TPM target position is stored in STM throughout the saccade, then it can emit sampling signals along its conditionable pathways throughout the saccade. How can these sampling signals be prevented from encoding all the eye positions that are attained before and during the saccade? How can these sampling signals be caused to encode only the eye position that is attained after the saccade? It is concluded that a gating signal exists which is capable of modulating the learning that occurs within the LTM traces of active conditionable pathways. Learning is prevented except when this gating signal is on. The gating signal turns on only after a saccade is over.

If these formal constraints can be achieved, then a target position stored within the TPM can learn the eye position that is attained by the subsequent saccade. How does the HMI know whether this final eye position is the "expected", or intended, eye position, namely the eye position which corresponds to the target position that is encoded within the TPM? The answer is, quite simply, that the HMI does not possess this information. The HMI transformation succeeds in learning the expected eye position only because the visually reactive RCN can learn to generate correct saccades. Thus, as a result of the visual error correction that takes place within the visually reactive retinotopic system, the HMI can learn accurate transformations of target positions into motor coordinates.

From the above discussion, one can begin to understand how a vector difference can be computed by the HMI. Learning an eye position within the HMI occurs only after a saccade is over. Before a saccade begins, an active target position that is tored at the TPM can read-out the motor coordinates which it learned on previous occasions. These are the motor coordinates of the target position, not of the eye's present position before the saccade begins.

Thus before the saccade begins, information about the target position and present position are simultaneously available within the HMI. There is no danger that the conditionable pathways will forget their learned target position by relearning the present eye position, because learning occurs only after a saccade is over, not before it begins. This fact guarantees the stability of memory before a saccade begins. How this occurs can be better seen by considering the form of the learning process that occurs after a saccade is over.

A corollary discharge reads eye position into the HMI in the form of a pattern of excitatory inputs. At times when learning can occur, the conditionable pathways from the TPM continue to learn until their signals can match the corollary dischage signals. Then learning stops. Thus the conditionable pathways from the TPM to the HMI are inhibitory pathways (FIG. 27). These inhibitory pathways carry the "adaptive inhibitory reference copy" of the HMI. When the excitatory corollary discharges equal the inhibitory conditionable TPM—HMI signals, learning stops.

Before a saccade occurs, the active target position within the TPM reads its motor coordinates into the HMI as a pattern of inhibitory signals. The corollary discharge reads its present position into the HMI as a pattern of excitatory signals. The sum of these inhibitory and excitatory signal patterns represents a vector difference of target position and present position in motor coordinates.

D.

VISUALLY-MEDIATED GATING OF VECTOR OUTPUTS

Since the eyes always assume some position, corollary discharges are tonically received by the HMI. Since these eye position signals are excitatory, the HMI is always active, even if no target position is read into the HMI from the TPM. Indeed, when the TPM is inactive, no inhibitory signals whatsoever are sent to the HMI.

To prevent the HMI from persistently generating output motor commands, and thereby eliciting series of saccades, in the absence of either visually reactive or intentional saccadic commands it is assumed that the output from the HMI is multiplicatively gated to zero except when some TPM population is actively reading-out a target position to the HMI. Thus, whereas the HMI is always activated by corollary discharges, it can only generate output signals at times when a vector difference between a target position and a present position is being computed at the HMI.

The TPM can only read-out target positions at times when visual or other input sources can activate target position populations within the TPM. Thus visual signals play two distinct role in the VCN: a specific role and a nonspecific role. Their specific role is to provide information concerning which target positions to activate within the TPM. Their nonspecific role is to enable outputs from the HMI to be released.

Visual signals and positional signals get mixed together to compute target positions within the TPM only to be recoded as positional signals in motor coordinates within the HMI. Thus positional signals are encoded in two different ways within the HMI by the inhibitory TPM inputs. Superimposed on these inhibitory positional signals are excitatory positional signals due to corollary discharges. Modulating this mixture of excitatory and inhibitory positional signals are two types of nonspecific gating signals. Visual inputs influence one of these gating signals, but not the other. Thus visual signals influence the network in two different ways. All of these interactions occur rapidly in time, albeit at different phases of the saccadic cycle. Superimposed upon these rapid signalling events are signals which can change slowly due to learning. Although the learning takes place in motor coordinates, it is modulated by a gating signal that is computed in head coordinates.

Another summary of HMI dynamics can be given which hints at its functional role as part of a larger processing scheme. Two different types of gating signals are needed to regulate HMI dynamics. One type of gating signal is turned on before a saccade begins, and is used to regulate saccadic performance. The other type of gating signal is turned on after a saccade ends, and is used to regulate saccadic learning. When their properties are described in this way, these properties suggest the conclusion that these two types of gating signals are controlled by complementary movement and postural subsystems that help to regulate the saccadic rhythm.

2. Modulators of Head-to-Muscle Coordinate Learning

The hypothesis that a gating signal regulates learning within the HMI leads to several experimental predictions. Such a gating signal is also called a Now Print signal in the neural modelling literature (Grossbar, 1982a). The cells which control this Now Print signal may either be transiently activated after saccade ends (rebound cells) or may be turned on except during saccades (pause cells). In order for pause cells to work well as sources of Now Print signals, the saccade must begin shortly after the HMI is activated by the TPM. Otherwise the TPM target postion would be able to sample the initial eye position, as well as the terminal eye position, for a significant amount of time. A critical parameter in ruling out a pause cell as a possible generator of a Now Print signal is the relative amount of time after the saccade ends as compared to before the saccade begins that the TPM command and the pause cell are simultaneously active. This ratio must be large in order for a pause cell to be an effective Now Print signal source.

A stronger test of whether a particular refixation neuron or pause cell is controlling a Now Print signal neuron or pause cell is controlling a Now Print signal to the HMI can also be made. Suppose that such a cell could be excited on a series of saccadic trials by an electrode before each saccade occurs from a fixed target position. Then the head-to-muscle transform should gradually encode the initial eye position. Consequently, over successive learning trials, saccades in response to the fixed target position should become progressively smaller.

3. Mathematical Design of the Head-to-Muscle Interface

The HMI circuit is a modified version of a motor expectancy learning circuit that was proposed by Grossberg (1972a FIG. 6). Denote by $I_j$ the excitatory corollary discharge signal that represents the eye position corresponding to the jth muscle. Denote by $-S_i$ the ith inhibitory sampling signal that is released by the ith target position within the TPM. Let $z_{ij}$ denote the LTM trace that exists at the synapse of the inhibitory pathway from the ith TPM target position to the jth HMI muscle representation. As in the design of the AG stage in section B, each LTM trace is assumed to control the rate of transmitter production in its synapse. Each LTM trace $z_{ij}$ is assumed to possess the following properties:

1. Trace $z_{ij}$ computes a time-average of the product of the ith sampling signal $S_i$ with the jth potential $x_j$ of the HMI whenever $x_j$ is suprathreshold ($x_j>0$). Otherwise, no learning occurs.
2. Trace $z_{ij}$ multiplicatively gates the signal $S_i$ before it can influence $x_j$. The net inhibitory signal that influences $x_j$ due to $S_i$ is thus $-S_i z_{ij}$.
3. Potential $x_j$ reacts additively to the sum of all conditionable inhibitory signals $-S_i z_{ij}$ from the TPM and the jth excitatory corollary discharge $I_j$ at times when it is sensitized by a gating signal from the TPM.
4. The learning rate is gated to zero by a presynaptic gating, or Now Print, signal P that is switched on after a saccade terminates.

The properties (1)–(4) are instantiated by the following differential equations for the time rates of change $$\frac{d}{dt} x_j \text{ and } \frac{d}{dt} z_{ij}$$

of each potential $x_j$ and LTM trace $z_{ij}$, respectively:

$$\frac{d}{dt} x_j = -Ax_j + G\left(\sum_{i=1}^{n} S_i\right)\left(-\sum_{i=1}^{n} S_i z_{ij} + I_j\right) \quad (4.1)$$

and $$\frac{d}{dt} z_{ij} = P\{-Bz_{ij} + S_i [x_j]^+\}, \quad (4.2)$$

where $$[x_j]^+ = \begin{cases} x_j & \text{if } x_j > 0 \\ 0 & \text{if } x_j < 0 \end{cases} \quad (4.3)$$

and the gating function $$G\left(\sum_{i=1}^{n} S_i\right)$$

is an increasing function of $$\sum_{i}^{n} = S_i$$

that vanishes when all $S_i=0$. The suprathreshold activity pattern $$V=([x_1]^+,[x_2]^+,[x_3]^+,[x_4]^+,[x_5]^+,[x_6]^+) \quad (4.4)$$

represents the instantaneous vector difference between target position and eye position in muscle coordinates for a single eye. We now summarize how equations (4.1)–(4.4) carry out the operations that were outlined in Section C.2.

Suppose that, due to additional processing within the TPM, at most one target position sampling signal $S_i>0$ at any time. Without loss of generality, we can suppose that the gating function $$G\left(\sum_{i=1}^{n} S_i\right) = \begin{cases} 1 & \text{if } \sum_{i=1}^{n} S_i > 0 \\ 0 & \text{if } \sum_{i=1}^{n} S_i = 0. \end{cases} \quad (4.5)$$

At times when no TPM target position is active, equation (4.1) reduces to the equation $$\frac{d}{dt} x_j = -Ax_j, \quad (4.6)$$

which implies that the potential $x_j$ rapidly decays to its passive equilibrium value, zero. In particular, no sustained output signals can be generated from the HMI at these times.

By contrast, consider times when some target position, say the ith one, is active within the TPM. At times when $S_i>0$, equation (4.1) reduces to the equation.

$$\frac{d}{dt} x_j = -Ax_j - S_i z_{ij} + I_j. \quad (4.7)$$

The LTM trace is assumed to change slowly relative to the fluctuation rate of the STM trace $x_j$. Hence we can assume that $x_j$ is always in a approximate equilibrium relative to the slow time scale of $z_{ij}$. At equilibrium, $d/dt\, x_j=0$.

Then (4.7) implies that $x_j$ approximately satisfies the equation $$x_j = \frac{1}{A} (I_j - S_i z_{ij}). \quad (4.8)$$

The forgetting rate B of $z_{ij}$ in (4.2) is also assumed to be slow relative to the learning rate $S_i[x_j]^+$. Consequently, the rate of change of $z_{ij}$ approximately satisfies the equation $$\frac{d}{dt} z_{ij} = PS_i[x_j]^+. \quad (4.9)$$

Equations (4.8) and (4.9) together imply that $$\frac{d}{dt} z_{ij} = \frac{PS_i}{A} [I_j - S_i z_{ij}]^+. \quad (4.10)$$

By equation (4.10), the LTM trace changes only at times when the gating signal P, the sampling signal $S_i$ and the position difference term $[I_j - S_i z_{ij}]^+$ are all positive. Moreover $z_{ij}$ can increase due only to these factors. All descreases of $z_{ij}$ are due to the very slow forgetting term $-BPz_{ij}$ in (4.2) which can be completely ignored on the time scale of a learning trial.

Suppose that, at the onset of learning, $z_{ij}$ is small, possibly even zero. Also suppose that, when $S_i$ is activated across learning trials, $S_i$ maintains a temporally stable value due to the competitive feedback interactions that store signals in STM within the TPM. Finally suppose that the gating signal P becomes positive only after a saccade is over. At such times, $I_j$ encodes the corollary discharge (present eye position) corresponding to the jth extraocular muscle, $j=1, 2, \ldots 6$. Due to learning within the visually reactive RCN, at times when $S_i > 0$ the present eye position $(I_1, I_2, \ldots, I_6)$ gradually converges to the eye position $(I_{i1}, I_{i2}, \ldots, I_{i6})$ corresponding to the target position that activated $S_i$.

By (4.10), $z_{ij}$ changes only when $S_i < 0$ and $P < 0$. When $S_i < 0$ and $P < 0$, (4.10) implies that $S_i z_{ij}$ approaches $I_j$ as learning proceeds. Since each $I_j$ converges to $I_{ij}$ on learning trials when $S_i < 0$, $S_i z_{ij}$ converges to $I_{ij}$ on these trials. The slow forgetting rate B prevents $S_i z_{ij}$ from getting stuck at $I_j$ values that may occur before $I_j$ converges to $I_{ij}$.

This argument shows that the gated signal $S_i z_{ij}$ approaches $I_{ij}$ for all $j=1, 2, \ldots, 6$. Thus activating the target position corresponding to $S_i$ reads-out the signal pattern $(S_i z_{i1}, S_i z_{i2}, \ldots, S_i z_{i6})$ into the HMI. Due to learning, this signal pattern approaches the target position $(I_{i1}, I_{i2}, \ldots, I_{i6})$. In all, the head coordinates of $S_i$ have learned to read their target position, expressed in agonist-antagonist muscle coordinates, into the HMI.

After learning occurs, suppose that $S_i > 0$ at a time when the eye is at the present eye position $(I_1, I_1, \ldots, I_6)$. By (4.8), $$x_j = \frac{1}{A}(I_j - I_{ij}) \qquad (4.11)$$

at these times. Equation (4.11) computes the vector difference of the present eye position and the target position, expressed in muscle coordinates. The HMI output signals are $$V = ([x_1]^+, [x_2]^+, \ldots, [x_6]^+). \qquad (4.12)$$

In pattern V, if an agonist muscle representation has a positive value, its antagonist muscle representation has a negative value, and conversely. Thus at most three of the six entries in V are positive at any time. These entries completely determine which vector difference is being computed.

4. Muscle Linearization and Retinotopic Recoding

The HMI design shows how target positions can be recoded into motor coordinates so that vector differences which automatically compensate for present position can be computed. The HMI design also shows how the visually reactive system prevents an infinite regress from occurring: although learning within the HMI can only associate final eye position in motor coordinates with a TPM target position, this eye position approaches the target eye position due to learning within the visually reactive system.

Two major problems still need to be solved in order for the HMI to work well: linearization of the muscle response to outflow signals, and transformation of the HMI output patterns V in (4.12) from muscle coordinates into retinotopic coordinates.

a. Linearization of Muscle Response

The need to linearize the muscle response to outflow signals can be seen by considering equation (4.11). Each potential $x_j$ computes the difference of present eye position $I_j$ and target position $I_{ij}$ in muscle coordinates. Both $I_j$ and $I_{ij}$ are derived from outflow signals to the muscle plant. Unless the muscle plant contracts as a linear function of these outflow signals, neither $I_j$ nor $I_{ij}$ provides a reliable index of where the eye is actually pointing at any time. Thus a circuit is needed which can linearize the muscle plant's response to outflow signals, despite the fact that the muscle plant is nonlinear.

This argument can be made more vividly by noting that the output V of the HMI is based upon a vector difference of target position and present position. Infinitely many choices of theses positions can generate the same vector difference. The function of each fixed vector difference is to encode a determinate distance and direction that the eye must move to foveate a light. If the many individual target positions and present positions that lead to a fixed vector difference do not accurately reflect where the eye actually is or intends to go, then the vector difference itself cannot encode how the eye must move to foveate a light. A single vector difference could then be generated by combinations of target positions and present positions that do not represent the same distance and direction of motion between the actual present eye position and the actual position of a light on the retina.

These considerations strongly suggest that the muscle response is linearized by a separate learning circuit. Above, many possible ways whereby the saccadic control system could, in principle, compensate for muscle plant nonlinearity were considered. The design of the HMI suggests a particular scheme. Given that a separate circuit linearizes the muscle response, the simulation described in FIG. 16b indicates that a retinotopic sampling map may be sufficient to control the LTM traces which are tuned by second light error signals at the AG stage.

This conclusion does not imply that adaptive compensation for initial eye position is no longer needed. Indeed, such compensation occurs within the circuit that linearizes the muscle response as well be discussed in Section D below. However, this circuit delivers its conditioned signals to a processing stage that occurs after, rather than before, the saccade generator (SG). Only a retinotopic sampling map is needed, for purposes of correcting individual saccades, to deliver conditionable signals before the SG stage. Despite this fact, there are other reasons why converging conditionable pathways from more than one sampling map are needed at a stage prior to the SG stage, as will be discussed in Section H below.

b. Retinotopic Recording

The HMI transforms the multimodal target position map of the TPM into a much simpler unimodal motor map. However, muscle coordinates are the wrong coordinates from which to generate saccadic commands. Such commands need to be generated in retinotopic coordinates, so that they can benefit from second light visual error signals. Visual signals in retinotopic coordinates are recorded as target positions in head coordinates, then recoded as target positions in muscle coordinates, so that they can be recoded as vector differences in muscle coordinates, only to be recoded into retinotopic coordinates once again. The circle from vision to motor coordinates and back to vision is hereby closed.

Thus, although a target position in muscle coordinates is dimensionally incompatible with retinotopic coordinates, a vector difference in muscle coordinates is dimensionally compatible with a retinotopic coordinates. This is true because of the way in which a vector difference is computed. In order to compute a target position, initial eye position is added onto the retinal position of the light. In order to compute a vector difference, initial eye position is subtracted from target position. The addition-then-substraction of initial eye position from retinal position shows that the vector difference is retinotopically consistent. Of course, this description ignores all the coordinate transformations and time delays that make these transformations functionally meaningful. Just adding and subtracting initial eye position seems meaningless, even absurd, outside of this functional context. However, this description shows that the vector differences that are computed in muscle coordinates within the HMI can, in principle, be mapped back into retinotopic coordinates. A detailed description of how this is accomplished is set out below in Section J.

We can now explain why we have often used the term "retinotopic" coordinates instead of "retinal" coordinates. We used the term "retinal" coordinates only to describe the frame in which lights on the retina are registered. The more general term "retinotopic" coordinates is used to describe any coordinate system, including vector differences, that can be mapped in a one-to-one way on retinal coordinates.

In summary, the TPM cannot activate a target position solely in response to eye position signals. A combination of visual signals and eye position signals is needed. The HMI, in turn, can generate output signals only at times when the TPM is actively reading a target position into the HMI. Thus, these signals cannot elicit outputs from the HMI.

By contrast, an attended light input can activate a target position within the TPM. When the saccade caused by this light is over, the updated present position input to the HMI. The target position and present position then cancel each other by vector subtraction. Thus although the HMI is capable of generating an output in this case, no saccade staircase or succession of saccades of equal amplitude is generated because the output equals zero.

D.
ADAPTIVE LINEARIZATION OF THE MUSCLE PLANT

1. Muscle Linearization Network

In order to linearize muscle responses to outflow signals, a Muscle Linearization Network (MLN) exists wherein an inflow signal helps to linearize the size of a muscle contraction in response to outflow signals. This hypothesis does not imply that the muscle plant becomes more linear, but only that the muscle response to outflow signals beecomes more linear, so that outflow signals can be used as a good estimator of present eye position in the HMI.

The MLN shares several basic design properties with the retinotopic command network (RCN) already discussed in Section B. This comparison, as well as later ones will clarify our contention that distinct sensory-motor systems share common design features, including common brain regions. For example, in both the MLN and the RCN, the source of movement signals branches into two parallel pathways. One pathway generates an unconditioned movement signal. The other pathway generates a conditioned movement signal. This latter pathway passes through the AG stage. The size or gain of the conditioned signal is determined by error signals to the AG stage. The unconditioned and conditioned movement signals then converge at a stage subsequent to the source of the unconditioned movement signal.

In the MLN, the unconditioned movement signal is clearly an outflow signal. The error signal is determined by a matching process that compares outflow signals with inflow signals, such that perfect matches generate no error signals and large mismatches generate large error signals. These error signals are delivered to the AG stage, where they alter the gain of the corresponding condition pathway. This conditioned pathway also arises from the source of outflow signals. The unconditioned and conditioned movement signals then converge at a stage subsequent to the source of outflow movement signals.

A number of informative technical problems must be solved in order for the MLN to work well. Solutions to these problems in stages will be suggested. First, we will specify the MLN macrocircuit in greater detail. A possible macrocircuit is depicted in FIG. 28. The fact that modifications of the macrocircuit can achieve similar functional properties, and that modifications may exist across species, should be kept in mind throughout the subsequent discussion.

FIG. 28 builds upon the conclusion that medium lead burst (MLB) cells, which are the target cells of the saccade generator (SG), activate both tonic (T) cells and burst-tonic motoneurons (MN). The T cells, in turn, also excite the MN cells. The MN cells innervate the eye muscles which move and hold the eyes in place. The firing rate of T cells changes smoothly with eye position, whereas the firing rate of MN cells exhibits a burst during a saccade that returns to a position-dependent steady discharge level between saccades. These cell types are modelled and described in greater detail in section F.

Assuming that the T cells are the source of the unconditioned outflow pathway to the MN cells implies that the T cells also give rise to three other types of pathways. Given the other design constraints upon the MLN circuit, one pathway has already been mentioned: the pathway that provides corollary discharges to the HMI. The other two pathways are used to control the conditioned movement signals that linearize the muscle response. One pathway sends excitatory signals to a network called the outflow-inflow interface (OII). The OII carries out the matching of outflow signals with inflow signals that generate error signals to the adaptive gain (AG) stage, or cerebellum. A non-zero error signal is generated only if a mismatch between outflow and inflow occurs. The fourth type of pathway from the T cells also reaches the cerebellum. This is the conditioned movement pathway that samples the error signals from the OII to the AG stage. This conditioned pathway thereupon projects to a stage subsequent to the T cells but prior to the muscles. This target of conditioned movement signals is identified as the MN cells.

In summary, the total saccade-related signals from the T cells to the MN cells is assumed to derive from a direct unconditioned pathway and an indirect conditioned pathway through the cerebellum. The size of the conditioned signal is modified until a match between direct tonic cell outflow and muscle inflow is achieved. The conditioned pathway supplements the direct pathway signal until the muscle response to the direct pathway signal is linear. This property enables the output from the total tonic cell population to provide accurate corollary discharges to the HMI despite the existence of nonlinearities of muscle response in the absence of cerebellar compensation. It should be noted, however, that this sort of adaptive OII calibration does not guarantee accurate foveation. It merely guarantees a linear muscle response to whatever signals happen to activate the T cells.

2. Matching within the Outflow-Inflow Interface

The matching mechanism that is preferred for the OII helps to simultaneously solve several functional problems:

1. It can compensate for differences in the absolute size scales of outflow signals and inflow signals by computing the relative sizes of the signals corresponding to agonist-antagonist muscle pairs. Thus the computational unit within the OII is a spatial pattern, or normalized motor synergy, rather than the amplitude of a single outflow or inflow signal.
2. It can match the inflow synergy against the outflow synergy. A perfect match occurs if the inflow synergy is a linear function of the outflow synergy. Poor matches occur if the inflow synergy exhibits nonlinear distortions. The error signal emitted from the OII increases as the match deteriorates.
3. Despite this last property, if the OII receives no inflow signals, then the muscle plant is not further linearized.

Formal circuits that imply these properties will be first summarized before considering physical mechanisms that can generate their formal relationships. Several different, but closely related formal circuits can achieve the desired properties.

FIG. 29 summarizes the main formal properties of an OII design whose inflow signals increase with muscle contraction. FIG. 30 summarizes an OII model whose inflow signals increase with muscle length. Suppose that, within a prescribed time interval, the tonic cell outflow signal to an agonist muscle equals $\alpha$ and to the corresponding antagonist muscle equals $\beta$. Suppose that the muscle contractions casued by these outflow signals are $C(\alpha)$ and $C(\beta)$, respectively, and that the inflow signals are proportional to the amount of contraction; viz., $kC(\alpha)$ and $kC(\beta)$, where k is a positive constant.

The absolute sizes of these outflow signals and inflow signals might vary on very different size scales. Therefore, it is assumed that these size scales are normalized before their resultant spatial patterns are compared. Such a normalization scheme defines a "big" agonist outflow signal as one that is large relative to its antagonist contraction. Thus it is assumed that the outflow signal pattern $(\alpha,\beta)$ is transformed into the spatial pattern $$\left( \frac{\alpha}{\alpha + \beta}, \frac{\beta}{\alpha + \beta} \right) \quad (5.1)$$

and that the inflow signal pattern $$(kC(\alpha), kC(\beta)) \quad (5.2)$$

is transformed into the spatial pattern $$\left( \frac{C(\alpha)}{C(\alpha) + C(\beta)}, \frac{C(\beta)}{C(\alpha) + C(\beta)} \right) \quad (5.3)$$

except if $k=0$. If $k=0$, equation (5.3) is replaced by (0.0), then the two spatial patterns are matched as follows.

The inflow spatial pattern (5.1) generates topographic excitatory signals and the outflow spatial pattern generates topographic inhibitory signals to the comparator region. Error signals are generated only if one of the net potentials corresponding to the agonist inputs or antagonist inputs is positive. In other words, let $$E^+ = \left[ \frac{C(\beta)}{C(\alpha) + C(\beta)} - \frac{\beta}{\alpha + \beta} \right]^- \quad (5.4)$$

and $$E^- = \left[ \frac{C(\alpha)}{C(\alpha) + C(\beta)} - \frac{\alpha}{\alpha + \beta} \right]^+ \quad (5.5)$$

where $[\xi]^+ = \max(\xi, 0)$ and $E^+$ ($E^-$) is the agonist (antagonist) error signal. Suppose that the agonist error signal $E^+$ acts to increase the conditioned gain of the agonist muscle and to decrease the conditioned gain of the antagonist muscle within the AG stage. The antagonist error signal $E^-$ has the opposite effect on these muscles at the AG stage. Thus the error signals generated by the OII and the error signals generated by second light error signals obey similar laws within the AG stage thus far described.

To understand how these formal rules work, note that if the agonist muscle contracts less than its outflow signal command, then its conditioned gain is increased due to the OII-generated error signals in (5.4). Subsequent overflow signals therefore generate larger contractions and smaller error signals, until finally no error signals occur. To test whether no error signals occur when the muscle response is linearized, consider equations (5.4) and (5.5). Both error signals $E^+$ and $E^-$ equal zero if $$\frac{C(\alpha)}{C(\alpha) + C(\beta)} = \frac{\alpha}{\alpha + \beta}. \quad (5.6)$$

Equation (5.6) implies $$\frac{C(\alpha)}{C(\beta)} = \frac{\alpha}{\beta}. \quad (5.7)$$

Thus, error signals are not generated if the relative contraction and dilation of an agonist-antagonist muscle pair equals the relative size of the agonist-antagonist outflow signal. This is the basic linearity property that is sought. In particular, suppose that the agonist and antagonist outflow signals to the tonic cells mutually inhibit each other in a push-pull fashion, such that $$\alpha + \beta = \gamma \quad (5.8)$$

where is constant. Also suppose that the amount of contraction of the agonist is balanced by the amount of dilation of the antagonist, such that $$C(\alpha) + C(\beta) = \delta. \quad (5.9)$$

Then (5.7) implies $$C(\alpha) = \rho\alpha. \quad (5.10)$$

where the proportionality constant $\rho = \gamma\delta$

Suppose, by contrast, that the agonist muscle contracts nonlinearly in response to the outflow signals; for example, suppose that the agonist muscle contracts too little. Then by (5.4) and (5.5)

$$E^+ > 0 = E^- \tag{5.11}$$

so that the agonist conditioned gain will be increased and the antagonist conditioned gain will be decreased due to conditioning. The inequalities (5.11) are due to the fact that the match of agonist signals in (5.5) gives rise to the antagonist error signal, and the match of antagonist signals in (5.4) gives rise to the agonist error signal. This model predicts that the agonist-antagonist symmetry axis is reversed somewhere between the OII which is a target for the outflow and inflow signals from the tonic cells and muscles respectively, and the cerebellum, which receives OII-activated error signals via climbing fibers. The model of FIG. 30 in which length-based inflow signals are used, also predicts reversal of symmetry axis. This reversal occurs, however, within the OII in the matching of outflow and inflow signals.

3. An Explanation of the Steinbach and Smith Data

Equations (5.1)–(5.5) provide an explanation of why an absence of inflow signals prevents adaptation to strabismus surgery. If all inflow signals are prevented, then, since the inflow constant $k=0$ in equation (5.2) equations (5.4) and (5.5) reduce to $$E^- = \left[ -\frac{\beta}{\alpha + \beta} \right]^+ = 0 \tag{5.12}$$

and $$E^- = \left[ -\frac{\alpha}{\alpha + \beta} \right]^- = 0. \tag{5.13}$$

so that no error signals at the AG stage are generated. Another way to state this conclusion is in terms of inflow signals to the cerebellum. In equations (5.4) and (5.5), inflow signals provide the excitatory drive for generating error signals to the cerebellum. This model predicts that cutting all inflow pathways will eliminate a major source of inflow which reaches the cerebellum via climbing fibers. Cutting all fo these inflow pathways should also prevent the eye movement system from liearizing muscle responses after nonlinearities are induced by other manipulations. Cutting the inflow pathways need not disrupt the linearity of muscle response in the absence of other manipulations, because the inflow signals give rise to error signals, not to the conditioned movement signals that maintain a linear muscle response.

4. A Role for Golbi Tenton Organs in Muscle Linearization

The models in FIGS. 29 and 30 indicate two different ways in which Golgi tendon organs might contribute to muscle linearization. Both of these models are based upon observations that Golgi tendon organs respond to increases in muscle tension. Tendon organix exhibit a high threshold when activated by passive stretch, but are exquisitely sensitive to active muscle contraction (Granit, 1962; Houck and Henneman, 1967; Kandel and Schwartz, 1981). During active contraction of an agonist eye muscle, the Golgi tendon organix of the agonist muscle can emit an output signal that increases with the amount of muscle contraction. Since the antagonist muscle is passively stretched during an active agonist contraction, its Golgi tendon organix may respond much less, or not at all. If the antagonist tendon organ does respond, however, its signal would be expected to increase, rather than decrease, due to the progressive contraction of the agonist muscle. Data concerning the properties of Golgi tendon organs during saccadic eye movements seem not to be available, so our discussion of this matter will consider several mechanistic possibilities that are compatible with functional requirements.

One possibility is that, as an agonist muscle contracts, the increase of MN input to the agonist muscle coexists with a progressive decrease in MN input to the antagonist muscle. Such a decrease could cause a progressive reduction of tension in the antagonist muscle. The increase in $C(\alpha)$ and the decrease in $C(\beta)$ that was assumed in equation (5.3) could hereby be achieved. Van Gisbergen, Robinson, and Gielen (1981), by contrast, have shown that the MN input to the antagonist muscles of monkeys are totally shut off during saccades. Thus, a different source of progressively decreasing antagonist inputs $C(\beta)$ is needed to establish the ratio scale in equation (5.3).

One possibility is that the Golgi tendon organs of the agonist muscle provide the input for both $C(\alpha)$ and $C(\beta)$ using a push-pull mechanism. FIG. 31 is based upon the existence of agonist and antagonist tonic cell populations which receive push-pull inflow inputs from the contracting muscle. These tonic cells, in turn, input to the mechanism that computes the ratio scale. Thus, suppose that during an agonist contraction, the agonist inflow signal is $kC(\alpha)$ and the antagonist inflow signal is approximately 0. Let the baseline activity of both the agonist and the antagonist tonic cell populations equal M. Then their activities after inflow input are $$(M + kC(\alpha), M - kC(\alpha)). \tag{5.15}$$

Since M is larger than the maximal inflow signal, both terms in (5.15) are nonnegative. Next, the activities (5.15) generate a spatial pattern $$\left( \frac{1}{2}\left(1 + \frac{kC(\alpha)}{M}\right), \frac{1}{2}\left(1 - \frac{kC(\alpha)}{M}\right) \right). \tag{5.16}$$

Each activity in (5.16) is computed by dividing the corresponding activity in (5.15) by the sum of both activities in (5.15). Equation (5.16) is now used instead of (5.3) to compute the error signals $D^+$ and $E^-$ in (5.4) and (5.5). Thus $$E^+ = \left[ \frac{1}{2}\left(1 - \frac{kC(\alpha)}{M}\right) - \frac{\beta}{\alpha + \beta} \right]^+ \tag{5.17}$$

and $$E^- = \left[ \frac{1}{2}\left(1 + \frac{kC(\alpha)}{M}\right) - \frac{\alpha}{\alpha + \beta} \right]^+. \tag{5.18}$$

To test whether no error signal is emitted when the muscle response is linearized, we set $E^+$ and $E^-$ equal to zero, as in Section 5.6. No error signal is emitted if $$C(\alpha) = \frac{M}{k}\left(\frac{\alpha - \beta}{\alpha + \beta}\right). \tag{5.19}$$

If, moreover, agonist and antagonist outflow signals to the tonic cells are mutually inhibitory, as in (5.8), then $$C(\alpha) = q\alpha - r \quad (5.20)$$

where $q = 2M(ky)^{-1}$ and $r = M(k)^{-1}$. Thus, this model also generates error signals until the amount of muscle contraction is a linear function fo the outflow signals. All of our other conclusions about muscle linearization and about the Steinbach and Smith (1981) data also hold, with the exception of one refinement. If all inflow signals are cut in FIG. 31, then the tonic cells continue to register basal activities (M, M), and the normalized pattern ($\frac{1}{2}$, $\frac{1}{2}$) continues to input to (E$^-$, E$^+$). Thus error signals $$E^- = \left[ \frac{1}{2} - \frac{\beta}{\alpha + \beta} \right]^+$$

and $$E^- = \left[ \frac{1}{2} - \frac{\alpha}{\alpha + \beta} \right]^+$$

can reach the AG stage. These error signals will not influence muscle linearization, however, if there are approximately as many eye movements in an agonist direction as there are in the corresponding antagonist direction, because both error signals are measured relative to the value $\frac{1}{2}$.

Figure 3:
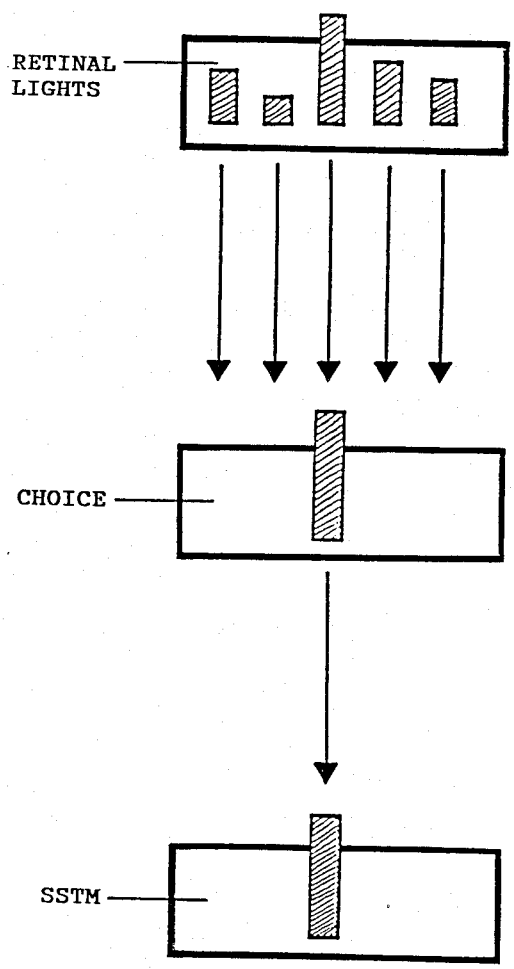
FIG. 3 is a view of a diagram showing a choice among retinal light stored in sensory short term memory.

For completeness, we note that an alternative model, based upon length-dependent inflow signals (FIG. 3.0). The length-dependent inflow signals would be derived from the muscle spindles rather than from the Golgi tendon organs. A single strabismus operation could alter the match between inflow length information and outflow commands. It remains to say how destruction of all inflow signals from the Golgi tendon organs could prevent adaptation. In a spindle-based model, these data seem to require the assumption that inflow from the Golgi tendon organs is also used. Such inflow would not, however be used to compute the state of muscle contraction. It would act to nonspecifically gate the error signals to the cerebellum. Only during active muscle contractions would these error gates be activated, thereby enabling muscle linearization to occur.

5. Dynamic Linearization: Adaptive Sampling During Saccades

All of the above models of the OII share an important and surprising functional property. They all predict that the cerebellar learning which linearizes eye muscle responses takes place during saccades and at a very fast sampling rate. In models which use Golgi tendon organ inflow, as in equation (5.15), this conclusion follows from the fact that, during posture, agonist and antagonist tensions must be equal in order to hold the eye in a fixed position. Hence, after a saccade is over, the outputs from both agonist and antagonist Golgi tendon organs should be equal too. Their ratio cannot, therefore, be used to compute deviations from muscle linearity. In a spindle-based model, as in FIG. 30 the Golgi tendon organ output that gates cerebellar error signals would be expected to be much larger during a saccade, when the agonist muscle is actively contracting, than after. Hence error signals would be much more effective during a saccade in this model too.

The idea that adaptive sampling takes place during a saccade makes sense from an intuitive vantage point. The forces on the eye muscles during a saccade are very different from the forces that act between saccades. Hence conditioned gains that were learned during posture might be the wrong gains to ensure muscle linearity during movement. Furthermore, if one waits until a movement is over to learn these gains, then the accumulated nonlinearity due to an entire saccade would have to be compensated for at the terminal saccadic position. By contrast, if the learning circuit is fast enough to deliver sampling and error signals several times during a saccade, say within 15 or 50 msec., then conditioned gains could be learned for components of each saccadic movement in which not too much nonlinearity has accumulated. The saccade would hereby be broken down into movement "frames", each of whose nonlinear distortions could separately be dealt with as a function of eye position within that frame.

6. An Agonist-Antagonist Ratio Scale

A simple mechanism whereby an input pattern ($I_1$, $I_2$) can be transformed into a spatial pattern $$\left( \frac{I_1}{I_1 + I_2}, \frac{I_2}{I_1 + I_2} \right). \quad (5.21)$$

The transformation (5.1), (5.3), and (5.16) within the OII are all special cases of this problem. The desired transformation can be accomplished by a feedforward on-center off-surround network whose cells obey the membrane equations above. In the special case of an agonist-antagonist interaction, an on-center off-surround anatomy is a push-pull anatomy.

Let $x_1(t)$ be the potential of the agonist population and $x_2(t)$ be the potential of the antagonist population. A simple version of the networks used in Section A is sufficient. Suppose that $$\frac{d}{dt} x_1 = -Ax_1 + (B - x_1) I_1 - x_1 I_2 \quad (5.22)$$

and $$\frac{d}{dt} x_2 = -Ax_2 + (B - x_2) I_2 - x_2 I_1. \quad (5.23)$$

Define the total input $I = I_1 + I_2$. Then (5.22) and (5.23) can be rewritten as $$\frac{d}{dt} x_1 = -Ax_1 + BI_1 - x_1 I \quad (5.24)$$

and $$\frac{d}{dt} x_2 = -Ax_2 + BI_2 - x_2 I. \quad (5.25)$$

If the potentials $x_1$ and $x_2$ equilibrate quickly to changes in the inputs $I_1$ and $I_2$ then $$\frac{d}{dt} x_1 \simeq 0 \text{ and } \frac{d}{dt} x_2 \simeq 0$$

at all times. Thus $$x_1 \simeq \frac{BI_1}{A + I} \quad (5.26)$$

and $$x_2 \cong \frac{BI_2}{A+I}. \tag{5.27}$$

If the total input I exceeds constant A by a sufficient amount, then $$x_1 \cong \frac{BI_1}{I_1+I_2} \tag{5.28}$$

and $$x_2 \cong \frac{BI_2}{I_1+I_2}. \tag{5.29}$$

The desired transformation can thus be defined by $$(I_1, I_2) \rightarrow (x_1, x_2). \tag{5.30}$$

7. Sampling from a Spatial Map of Outflow Position

It was assumed that the tonic (T) cells in FIG. 28 are the source of outflow signals to the MN cells as well as the source of sampling signals to the AG stage. The T cells cannot, however, project directly to the AG stage, for the same reason that the HMI cannot project directly to the AG stage. Sufficiently different spatial patterns of activity must give rise to different sampling pathways with their own LTM traces. Only in this way can different outflow patterns learn different conditioned gains to compensate for different eye muscle positions.

The T cell and HMI examples hereby focus our attention upon a functional problem that is of general importance: How can activity patterns across a fixed set of cells be parsed by a spatial map, such that sufficiently different patterns activate different cell populations within the spatial map? The following section addresses this issue.

Within the MLN, sufficiently distinct tonic cell outflow patterns activate different cellular locations within such a spatial map. We therefore call the map an eye position map (EPM). Each spatial locus in the EPM sends a separate sampling pathway to the cerebellum. Each such pathway adaptively encodes all gain changes that are caused by OII-induced error signals while the sampling pathway is active. These gain changes, in turn, differentially alter the cerebellar feedback signals to the MN cells. As already discussed in Section B above, a single sampling pathway can simultaneously encode gain changes that differentially influence all the eye muscles and thereby control all the eye muscles in a synergetic or coarticulated fashion.

E.
SPATIAL MAPS OF MOTOR PATTERNS

1. Transforming Pattern Intensities into Map Positions

The following discussion analyzes how different activity patterns over a fixed set of cells can be transformed into different spatial foci of activity at the next processing stage. A network which encodes information by activating cells in different locations is called a spatial map. The problem is to transform different activity patterns over a fixed set of cells into a spatial map. In the case of the HMI, the activity patterns represent difference vectors. Hence the spatial map is consistent with retinotopic coordinates already discussed in section C.4. Such a spatial map is called a retinotopic map, or RM. As noted in section D.7, the spatial map that recodes tonic cell outflow patterns is called an eye position map or EPM. Such an EPM is consistent with head coordinates, rather than retinotopic coordinates.

Although an RM and an EPM encode different types of information, they can arise from the same mechanisms. The formal problem to be solved is the same, no matter what interpretation is given to the activity patterns that must be spatially parsed.

Several types of mechanisms are consistent with these functional requirements. The available neural data do not ambiguously force the choice of one mechanism above all others. Therefore, several possible spatial mapping models are analyzed.

Henceforth, the special cases of mapping a HMI vector into an RM, or of a T cell outflow pattern into an EPM will be discussed. The same considerations hold for transforming any set of muscle-coded activity patterns into a spatial map.

2. Antagonistic Positional Gradients, Contrast Enhancement, and Coincidence Detectors The first model executes a transformation that requires no learning. It exploits the organization of muscles into agonist-antagonist pairs. A similar construction exists for sensory fields that possess natural left-to-right and/or bottom-to-top symmetry axes.

The model's inputs are grouped into agonist and antagonist pairs. Both inputs need to be positive, except in the extreme cases where one input is maximally active and the other is shut off. In the MLN, both agonist and antagonist tonic cells can directly give rise to positive inputs. By contrast, only one output from each agonist-antagonist pair of the HMI can be positive. Hence, such outputs need to activate tonically active cells in a push-pull fashion, as in equation (5.15), before these tonic cells can generate inputs to the model.

Denote the input pair by $(I_1, I_2)$. The model first maps each input pattern into a one-dimensional spatial map in such a way that different map positions correspond to different input ratios $I_1/I_2$. To see how this happens, denote the population with input activity $I_i$ by $v_i$, $i=1,2$. Let each population $v_i$ send pathways to a field $F_1$ of cells. Since there are many cells in $F_1$, the field of cells can be approximated by a continuous one-dimensional medium. Let S be the spatial variable of this medium, and let $P_{iS}$ denote the strength of the pathway from $v_i$ to positions S in $F_1$. Suppose for definiteness that $$P_{1S} = Pe^{-\mu(v-S)^2} \tag{6.1}$$

and $$P_{2S} = Pe^{-\mu(\omega-S)^2}. \tag{6.2}$$

In other words, each cell population $v_i$ sends a broad spatial gradient of connections to $F_1$ (FIG. 32). Each spatial gradient connects to $F_1$ according to a simple random growth law. By equation (32), the best connection of $v_1$ is to position $S=v$. Population $v_1$ contacts other positions S within $F_1$ with a strength that decreases as a Gaussian function of their distance $|v-S|$ from position v. By equation (6.2), the best connection of $v_2$ is to position $S=\omega$. Population $v_2$ contacts other positions S within $F_1$ with a strength that decreases as a Gaussian function of their distance $|\omega-S|$ from position $\omega$. Suppose that $v<w$. The connections from $v_1$ to $F_1$ are assumed to be inhibitory. The connections from $v_2$ to $F_2$ are assumed to be excitatory. The total input at position S due to the activity pattern $(I_1,I_2)$ is $$J(S;I_1,I_2) = -I_1P_{1S} + I_2P_{2S} \quad (6.3)$$

$S(I_1/I_2)$ is the position S which receives the maximal input in response to input pattern $(I_1,I_2)$. As the input pattern $(I_1,I_2)$ changes, the position $S(I_1/I_2)$ changes too and depends only on the ratio $I_1/I_2$. Thus the antagonistic interaction of a pair of Gaussian positional gradients can convert spatial patterns into spatial maps. Before proving this fact, we summarize the subsequent two stages of the model.

The input pattern to the field $F_1$ is contrast-enhanced and normalized by on-center off-surround interactions within $F_1$ discussed above. Thus each activity pattern $(I_1,I_2)$ activates a sharply tuned population of cells within $F_1$ at and near position $S(I_1/I_2)$. This contrast-enhancement operation converts $F_1$ into a one-dimensional spatial map of the agonist-antagonist input patterns $(I_1,I_2)$.

We now consider how to generate a spatial map of more than one agonist-antagonist activity pattern. In cases where just two agonist-antagonist patterns are needed, this can be done by letting each location in $F_1$ activate parallel strips of cells at the next stage $F_2$ (FIG. 33). Assume that the other agonist-antagonist pair also activates parallel strips of cells in $F_2$, but that the strips of the different agonist-antagonist pairs are not parallel. The ideal case is one in which the two types of strips are mutually perpendicular. Finally, suppose that the cells within $F_2$ are coincidence detectors that respond only if they are simultaneously activated by a pair of strips. Such coincidence detectors are easily designed due to the fact that the inputs from $F_1$ to $F_2$ are normalized.

Such a field $F_2$ computes a two-dimensional spatial map of the two pairs of agonist-antagonist input patterns. This procedure can be iterated to generate an n-dimensional spatial map, but it becomes physiologically implausible for values of n much larger than 3.

It remains to determine the position $S(I_1/I_2)$ at which the input pattern $J(S;I_1,I_2)$ of equation (6.3) is maximal. To locate this position, we determine the solutions of the equation.

$$\frac{\partial}{\partial S} J(S;I_1,I_2) = 0. \quad (6.4)$$

Equation (6.4) implies that $$\frac{(S-\omega)}{(S-\nu)} e^{[(S-\nu)^2 - (S-\omega)^2]} = \frac{I_1}{I_2}. \quad (6.5)$$

Both $I_1/I_2$ and the exponential term are nonnegative. Hence (6.5) has a solution only if the ratio $(S-\omega)(S-\nu)^{-1}$ is also nonnegative. This is true only if $S \leq \nu$ or $S \geq \omega$. Since $\nu < \omega$ and the connections from $v_1$ to the cells around position $S = \nu$ are inhibitory, it is clear that some nonnegative inputs $J(S;I_1,I_2)$ are found in the region $S \geq \omega$, which we consider henceforth.

Introducing the new variable $y = S - \nu$, we rewrite (6.5) in the form $$\frac{(y-\lambda)}{y} e^{\mu|y^2 - (\lambda-y)^2|} = \frac{I_1}{I_2}. \quad (6.6)$$

where $\lambda = \omega - \nu$. Equation (6.6), in turn, implies that $$f(y) = \frac{e^{\mu\lambda^2} I_1}{I_2} \quad (6.7)$$

where $$f(y) = \frac{(y-\lambda)}{y} e^{2\mu\lambda y}. \quad (6.8)$$

Since $y - \nu = S \geq \omega$, it follows that $y \geq \lambda$. As y increases from $\lambda$ to $\infty$, f(y) increases from 0 to $\infty$. Thus given any nonnegative choice of the ratio $I_1/I_2$, there exists a value $y(I_1/I_2)$ of y between $\lambda$ and $\infty$ that satisfies (6.7). Moreover, as the ratio $I_1/I_2$ increases, the value of $y(I_1/I_2)$ also increases. In terms of the positional variable $S = y + \nu$, this means that the position $S(I_1/I_2)$ at which $J(S;I_1,I_2)$ is maximal increases from $\omega$ to $\infty$ as the ratio $I_1/I_2$ increases from 0 to $\infty$.

Of course, it makes no sense to talk about an infinite field of cells. Thus it is necessary to consider how the maximal range of input ratios $I_1/I_2$ can be coded by a finite interval of cells. Inspection of (6.7) and (6.8) shows that a choice of parameters such that $\lambda$ is small and $\mu\lambda$ is sufficiently large facilitates this goal. Then the function $(y-\lambda)y^{-1}$ in (6.8) rapidly jumps from 0 towards its maximum value 1 as y increases above $\lambda$. Function $e^{2\mu\lambda y}$ in (6.8) grows quickly as a function of y, thereby being able to match a larger range of ratios $I_1/I_2$ in (6.7). Finally, the coefficient $\mu\lambda^2$ in (6.7) can be relatively small even though $\mu\lambda$ is relatively large because $\lambda$ is small. Thus the main constraint is that the amount of shift $\lambda = \omega - \nu$ of the antagonistic positional gradients should be small relative to other parameters of the problem. Increasing the spatial decay rate $\mu$ of these spatial gradients enables a wider range of input ratios $I_1/I_2$ to be encoded within a fixed interval.

3. Position-Threshold-Slope Shift Maps

The previous model illustrated the importance of using antagonistic quantities to convert activities into positions. The next model describes a different version of this general idea. In this model, the antagonism is not derived from the interaction of an agonist-antagonist pair. The antagonism arises from a single motor activity. Using such a model, the HMI does not have to preprocess its outputs by putting them through a tonic push-pull process. To fix ideas, we consider how such a model would convert the vector differences $V = ([x_1]^+, [x_2]^+, \ldots, [x_6]^+)$ of the HMI into activated positions within the RM.

Using this model, each suprathreshold activity $[x_j]^+$ at the HMI generates a signal $[x_j]^+ P_j(r,\theta)$ to a position $(r,\theta)$ at the first stage $F_1$ of processing, which is depicted for convenience as a surface in polar coordinates $(r,\theta)$. The path strengths $P_j(r,\theta)$ define postional gradients from each HMI population $v_j$ to $F_i$. The total input from the HMI to position $(r,\theta)$ of $F_1$ is the sum $$S(r \cdot \theta) = \sum_{j=1}^{6} [x_j]^- P_j(r \cdot \theta) \quad (6.9)$$

of these signals (FIG. 34). Then an output signal $$T(r,\theta) = [S(r,\theta) - \Gamma(r,\theta)]^+ \quad (6.10)$$

is emitted to the second stage $F_2$ of processing, which is the RM. Recall that the notation $[\xi]^+$ stands for max $(\xi,0)$.

By (6.9), the input $S(r,\theta)$ to $F_1$ is the sum of output signals $[x_j]^+$ weighted by the path strengths $P_j(r,\theta)$. In other words, the HMI vector $V=([x_1]^+,[x_2]^+, \ldots ,[x_6]^+)$ is filtered by the path strength vector $P(r,\theta)=(P_1(r,\theta), P_2(r,\theta), \ldots ,P_6(r,\theta))$ at position $(r,\theta)$. For simplicity, we have assumed that $F_1$ equilibrates rapidly to this input, and that the equilibrium activity at each position $(r,\theta)$ equals its input $S(r,\theta)$. Then $S(r,\theta)$ gives rise to the output signal $T(r,\theta)$ in (6.10). The map $S(r,\theta) \text{ - - - } T(r,\theta)$ from $F_1$ to the RM is topographic, whereas the map $V \rightarrow S(r,\theta)$ from the HMI to $F_1$ is built up from the convergent filtering action of six positional gradients.

Equation (6.10) says that a signal is emitted to the RM only if $S(R,\theta) > \Gamma(i,\theta)$. Thus $\Gamma(r,\theta)$ is the signal threshold of the $(r,\theta)$ pathway. The signal $T(r,\theta)$ grows linearly as a function of suprathreshold values of $S(r,\theta)$, as in the classical Hartline-Ratliff equation (Ratliff, 1965) and other models of neural pattern discrimination (Grossberg, 1970, 1976a).

Both the positional gradients $P_j(r,\theta)$ and the signal thresholds $\Gamma(r,\theta)$, depend upon the position $(r,\theta)$ within $F_1$. A larger choice of $P_j(r,\theta)$ says that an input $[x_j]^+ P_j(r,\theta)$ to $r,\theta$ grows with a steeper slope as a function of $[x_j]^+$. A larger choice of $\Gamma(r,\theta)$ says that a larger total input $S(r,\theta)$ to $(r,\theta)$ is needed to fire a signal to the RM. Both $P_j(r,\theta)$ and $\Gamma(r,\theta)$ are assumed to increase with r. Thus cells at $F_1$ with larger radial positions r are more sensitive to their inputs and have higher output thresholds than cells with smaller radial positions r. This covariation of cell position, signal threshold, and signal slope causes a shift to occur in the spatial locus of maximal total activity at the RM as an HMI signal $[x_j]^+$ increases. Low intensity inputs cause maximal total activity to occur at the low threshold end of the RM, whereas high intensity inputs cause maximal activity to occur at the high threshold end of the RM. Due to the role of correlations in cell position, threshold, and slope in generating this shift in activity locus, we call this mechanism a Position-Threshold-Slope (PTS) Shift.

The input pattern to the RM that is caused by a PTS shift is contrast-enhanced and normalized before it is stored in STM as an RM activity peak. This is accomplished by endowing the RM with a suitably designed recurrent on-center off-surround shunting network. A simple rule that approximates the dynamics of such a network is $$x(r,\theta) = \left[ \frac{T(r,\theta)}{\max_{(R,\phi)} T(R,\phi)} \right]^n. \quad (6.11)$$

where $n > 1$. By (6.11), all nonmaximal $T(r,\theta)$ generate a small $x(r,0)$ if n is chosen sufficiently large, whereas the maximal $T(r,0)$ generates an $x(r,\theta)=1$ no matter how large n is chosen.

A 3-dimensional (one dimension for every agonist-antagonist pair) PTS shift can be designed so that every realizable HMI pattern V generates a different activity peak within the RM. Moreover, continuous variations in one or more activities within V cause continuous changes in the RM position. This PTS shift mechanism works well formally and uses known types of parametric correlations within neuronal populations. The most demanding constraint concerns the spatial juxataposition of the six populations that respond to the six signals $[x_j]^+$ in V, $j=1, 2, \ldots, 6$. Each population corresponds to a different muscle of one eye. In order for the PTS shift mechanism to work well, all six populations must be topographically placed in such a way that any three contiguous eye muscles are represented by three contiguous populations. The simplest way to accomplish this is to arrange populations as a sector map (FIG. 2).

FIGS. 35a, 35b and 36a, 36b summarize a computer simulation of how the RM changes position as a function of V.

In any realizable monocular pattern V within the HMI at most three connsecutive components can be positive at any time. This is true because if three contiguous muscles contract to saccade the eye, then their three antagonist muscles must relax. By "consecutive" components, we mean "consecutive modulo 6", that positive components $(x_5, x_6, x_1)$ and $(x_6, x_1, x_2)$ are considered consecutive. If the set of all realizable patterns V is considered then they can be grouped in terms of patterns which correspond to saccades in the same direction. When so grouped, a convenient representation of the positive pattern components becomes apparent.

For example, consider the direction and length of the saccade encoded by a prescribed pattern V. Suppose that pattern V* encodes a saccade in the same direction, but of greater length. Then the same muscles that contract in response to V also contract in response to V* but each contracting muscle must contract more in response to V*. In other words, each of the positive components in V* is larger than its corresponding component in V. This argument constrains the possible combinations of positive entries that can realize patterns V.

We can represent patterns V whose saccades have increasing length but the same direction as triples of points on a succession of nonintersecting, expanding, closed curves. The distance of a point from the origin represents the size of a positive $x_i$ in V. The direction of the point with respect to the horizontal axis represents the direction in which its corresponding muscle contracts. This observation can be expressed more formally as follows. Each HMI output is represented in the form $$[x_i]^+ = Af(|D - D_i|), \quad (6.12)$$

$i=1,2,\ldots,6$. In (6.12), the parameters $D_i$ and the function $f(\omega)$ are fixed. They embody the constraints on saccadic length and direction that we have just summarized. The variables A and D change as a function of V. Variable A encodes amplitude information and variable D encodes directional information. Thus the representation (6.12) expresses the six-dimensional vector $\dot{V}$ as a two-dimensional vector (A,D) in polar coordinates. This is possible due to the manner in which the parameters $D_i$ and the function $f(\omega)$ absorb the extra degrees of freedom.

Parameter $D_i$ represents the width direction of contraction, $i=1,2,\ldots,6$. Each pattern V defines a value A that increases with the length of the saccade. Function f(w) modulates the amplitude of A in a manner that depends upon which direction is under consideration. In particular, function f(w) has the following properties:

(i) $f(\omega) > 0$ if $-\pi/2 < \omega < \pi/2$;
(ii) $f(\omega) = 0$ if $-\pi \leq \omega \leq -\pi/2$ or if $\pi/2 \leq \omega \leq \pi$;
(iii) $f(\omega)$ increases if $-\pi/2 < \omega < 0$;
(iv) $f(\omega)$ decreases if $0 < \omega < \pi/2$;
(v) $f(\omega)$ is $2\pi$-periodic.

Using function f(w), each pattern V defines a value D that represents the direction of the saccade. For example, if $D=D_3$, then the saccade moves in a direction close to that represented by the third muscle. This follows from properties (iii) and (iv), since then $x_3 = Af(0)$, whereas $x_2 = Af(|D_3 - D_2|) < Af(0)$ and $x_4 = Af(|D_3 - D_4|) < Af(0)$. Moreover at most three contiguous $x_i$'s are positive. This is because it is assumed that $|D_3 - D_5| > \pi/2$, $|D_3 - D_6| > \pi/2$, $|D_3 D_1| > \pi/2$ and so on. Thus by property (ii), if $D = D_3$ then $x_1 = x_5 = x_6 = 0$. A similar analysis holds for any choice of D such that $n - \pi \leq D \leq \lambda$.

The PTS shift hypothesis implies that both the path strength $P_i(r0)$ and the threshold $\Gamma(r, \theta)$ are increasing functions of r. The gradient nature of the HMI→RM map suggests, in addition, that $P_i(r, \theta)$ decreases as $\theta$ deviates from the direction represented by $D_i$. In our simulations, the thresholds $\Gamma(r, \theta)$ were chosen independent of $\theta$ for simplicity, but an increase of $\Gamma(r, \theta)$ as $\theta$ deviates from $D_i$ is also physically plausible.

Several choices of the functions $f(w)$, $P_i(r, \theta)$, and $\Gamma(r, \theta)$ and the parameters $D_i$ were analyzed in order to understand the PTS shift map. The results indicated that a certain amount of regularity in these functions as i, r, and $\theta$ vary generates a more uniformly distributed mapping function; that is, a mapping function whose chosen position within the RM does not change very slowly as a function of certain changes in V and very quickly as a function of other changes in V. Map uniformity is not, however, an end in itself, since all that is needed is an (approximately) one-to-one map.

The essentially linear map described in FIGS. 35 and 36 was generated using the following functions. First the $[x_i]^+$ in (6.12) were expressed in terms of the functions $$D_i \frac{(i-1)\pi}{3},$$

$i = 1, 2, \ldots, 6$, and $f(w) = [\cos \omega]^+$. Then the PTS shift was defined using the positional gradients $$P_i(r, \theta) = r[\cos(\theta - D_i)]^+, \quad (6.13)$$

in (6.9) and the signal thresholds $$\Gamma(r, \theta) = \gamma r^2 \quad (6.14)$$

in (6.10), where $\gamma = 0.8$.

4. Self-Organizing Spatial Maps

The design of a 3-dimensional PTS shift map requires careful preprocessing of the HMI output vector, say via a sector map. An alternative solution to the spatial mapping problem does not need to impose this topographic constraint. In this solution, each input $[x_j]^+$ is again used to generate a PTS shift, but only within its own population. Distinct populations do not have to be embedded within a sector map. The output signals from these independent PTS shifts are the inputs to an adaptive coding model. Thus, in this solution, a carefully but plausibly, prewired network topography is replaced by a less carefully prewired network that can develop its own topography. Consequently, this self-organizing model can handle input vectors of any dimension.

The adaptive filter executes the same types of computations that were used to calibrate the TPM→HMI transform. Once again, the component signals $[x_j]^+$ in a vector input pattern such as V are the starting point of the computation. The signals $[x_j]^+$ cannot themselves be used as the inputs to the adaptive filter from the HMI to the RM because V encodes information about saccade direction and length. Why this is so is explained in later paragraphs. Instead, the intensities $[x_j]^+$ are first converted into spatial maps using one-dimensional PTS shifts. Then the total activity of all the active PTS shifts is normalized, or conserved, by long-range shunting lateral inhibition. Finally the normalized positional activities $S_j$ corresponding to each $[x_j]^+$ are used as the inputs to the adaptive filter. The adaptive filter interacts with the RM to establish a spatial map of patterns V within the HMI (FIG. 37). We now describe this self-organizing spatial map in greater detail.

In a one-dimension PTS shift, each intensity $[x_j]^+$ gives rise to an input that is uniformly distributed (in a statistical sense) across a population of cells. The signal thresholds and suprathreshold sensitivities (slopes) of the cells within each population are nonuniformly distributed within the population. Cells with lower thresholds tend to be found at one end of the population, cells with higher thresholds are found at the other end of the population, and cells with intermediate thresholds are found in between the two ends. Cells with higher thresholds are more sensitive to suprathreshold inputs. In other words, if the threshold of the cell's signal function is higher, then the slope of the signal function is steeper in the suprathreshold range. Thus the equation $$T_j(r) = [[x_j]^+ - \Gamma_j(r)]^+ P_j(r) \quad (6.15)$$

defines the output from the jth muscle coordinate of the HMI to the radial position r of the jth PTS shift population. Since $\Gamma_j(r) \geq 0$ (6.15) can be simplified to read $$T_j(r) = [x_j - \Gamma_j(r)]^+ P_j(r) \quad (6.16)$$

which shows that the jth output can be computed directly from the HMI potential $x_j$. In (6.16), both the threshold $\Gamma_j(r)$ and the path strength $P_j(r)$ are assumed to increase with r. The largest signal $T_j(r)$, across all values of r defines the PTS position activated by $x_j$.

Denote by $F_1$ the stage that received the output signals (6.16) from all HMI potentials $x_j$. Thus, $F_1$ contains all the separate PTS shifts. We assume that $F_1$ normalizes its response to this total input and stores it in STM. Denote the normalized STM activites of $F_1$ by $S_i$. Keep in mind that $i \neq j$ because a whole population of cells corresponds to each HMI potential $x_j$. These normalized activities $S_i$ are the inputs to the adaptive coding model.

Each output signal $S_i$ from $F_1$ generates an input signal $S_i C_{ik} z_{ik}$ to each population $v_k$ of the spatial map. Parameter $C_{ik}$ is the strength of the path that carries $S_i$ to $v_k$, and $z_{ik}$ is the LTM trace of this path. For simplicity, suppose that all $C_{ik} = 1$. This choice implies that the spatial gradients from the HMI to the RM are non-specifically distributed to all RM populations. Then the signal due to $S_i$ at $v_k$ is $S_i z_{ik}$. All of these signals are added to generate the total input $$T_k = \Sigma S_i z_{ik} \quad (6.17)$$

that is received by $v_k$.

Suppose that the RM responds to these inputs by satisfying the following properties:

1. It enhances the potentials $x_k$ in the RM that correspond to the largest inputs $T_k$ and suppresses the activities of all other potentials.
2. It conserves, or normalizes, the total activity of the enhanced potentials.

3. It stores the normalized and enhanced activities $x_k$ in STM until the RM is attentionally reset by auxiliary signals.

Letting $x_k$ be the activity of $v_k$ these rules can be approximated by the computation $$x_k = \begin{cases} 1 & \text{if } T_k > \max\{\epsilon, T_m : m \neq k\} \\ 0 & \text{otherwise,} \end{cases} \quad (6.18)$$

which is a variant of (6.11).

5. Activity-Dependent Map Formation

Then the enhanced activities $x_k$, and only these activities, change the weights of the LTM traces $z_{ik}$. This adaptive coding postulate assumes that code learning is dependent upon post-synaptic activation. Due to (6.18), this postulate implies that learning occurs at the LtM trace $z_{ik}$ only if $x_k = 1$; that is, only if $v_k$ is activated. The role of the learning rule is to guarantee that the pattern $z_k \equiv (z_{1k}, z_{2k}, z_{3k}, \ldots)$ of LTM traces abutting $x_k$ becomes parallel, or proportional, to a time average of all the signal patterns $S \equiv (S_1, S_2, S_3, \ldots)$ that are active at $F_1$ when $v_k$ is active, in the RM. If $v_k$ is active only when a single pattern $S$ is active, then $z_k$ becomes proportional to only this signal pattern. The simplest possibility is thus that $z_{ik}$ approaches $S_1$ as learning proceeds. If a larger set of signal patterns is active when $v_k$ is active, then the tuning curve of $v_k$ will become coarser, other things being equal.

The simplest learning law that embodies these properties is $$\frac{d}{dt} z_{tk} = (-Bz_{tk} + S_1)[I_k]^+. \quad (6.19)$$

Equation (6.19) is conceptually the same learning law as equation (4.2) within the HMI. Term $S_i$ in (6.19) plays the role of $S_i$ in (4.2), and term $[x_k]^+$ in (6.19) plays the role of both P and $[x_j]^+$ in (4.2).

When a series of vector patterns V sends signals from the HMI to the RM through time, the interaction of fast contrast enhancement and normalization in the RM with slow LTM adaptation parses the patterns V in such a way that different patterns across the HMI activate topographically distinct regions of the RM. Many refinements of this mechanism can be implemented. For example, the prewired gradients $C_{ik}$ in (6.18) can be chosen so that strong agonist activations in the HMI tend to activate a given region of the RM, whereas strong antagonist activations in the HMI tend to activate a complementary region of the RM. For present purposes, the most important property of this model is that it is temporally stable. That is, because a small number of populations in $F_1$ is mapped into a large number of populations in the RM, once a topographic parsing by the RM of patterns across the HMI is established, this spatial map will endure through time unless the system suffers some type of internal damage.

Rules (6.17)–(6.19) will be discussed in greater detail to explain how the work together to control spatial map formation within an RM or EPM and to explain why the output from the HMI or tonic cells must be fed into PTS shifts before the normalized PTS shift response generates inputs to the adaptive coding model.

Since, by (6.18), $x_k = 0$ or 1, (6.19) can be rewritten as $$\frac{d}{dt} z_{ik} = (-Bz_{ik} + S_i) x_k. \quad (6.20)$$

For notational simplicity, also let $B = 1$. By (6.20), $x_k = 0$ implies that $(d/dt)z_{ik} = 0$. Consequently, no learning occurs in $z_{ik}$ unless $v_k$ is activated. If $x_k = 1$ then (6.20) implies $$\frac{d}{dt} z_{ik} = -z_{ik} + S_i. \quad (6.21)$$

By (6.21), $z_{ik}$ approaches $S_i$ whenever $i_k$ is active. In other words, the LTM pattern $z_k$ approaches the signal pattern S as learning proceeds. This property holds for any S that is active when $v_k$ is active. Thus, integrating equation (6.21) shows that $z_k(t)$ is a time average of all the signal patterns S that were active when $v_k$ was was active before time t.

The definition in (6.17) of the total input $T_k$ to $v_k$ shows why training each $z_k$ to become parallel to a different signal pattern $S^{(k)} = (S_1^{(k)}, S_2^{(k)}, S_3^{(k)}, \ldots)$ enables each $S^{(k)}$ to selectively activate its $v_k$. Under these circumstances, in response to any signal pattern S, $T_k = \Sigma i S_i S_i^{(k)}$ and $T_m = \rho i S_i S_i^{(m)}$ for all $m \neq k$. If we choose $S = S^{(k)}$, then $T_k = \Sigma i [S_i^{(k)}]^2$ whereas $T_m = \Sigma i S_i^{(k)} S_i^{(m)}$ for all $m \neq K$. Other things being equal, $T_k > T_m$, $m \neq k$, because $S^{(k)}$ is parallel to itself in $T_k$ but $S^{(k)}$ is not parallel to any of the other signal patterns $S^{(m)}$ in $T_m$, $m \neq k$. Whenever $T_k > T_m$, $m \neq k$, it follows by (6.18) that $x_k = 1$ and all $x_m = 0$, $m \neq k$. In other words, $S^{(k)}$ is coded by $v_k$.

In order to guarantee that $T_k > T_m$ whenever $z_k = S^{(k)}$ and $z_k \neq S^{(m)}$, $m \neq k$, one problem still needs to be overcome. The total signal $\rho i S_i$ needs to be constant (conserved, normalized) across all signal patterns S. Otherwise, the encoding mechanism can fail as follows. Let $z_k = S^{(k)}$ and $z_m = S^{(m)}$, $m \neq k$, but suppose that each signal $S_i^{(m)}$ in $S^{(m)}$ is larger than the corresponding signal $S_i^{(k)}$ in $S^{(k)}$. Then $\Sigma i S_i^{(m)} > \Sigma i S_i^{(k)}$ so the total signal is not normalized. In this situation, $T_m$ can be larger than $T_k$ even if $S = S^{(k)}$ because, although $z_k$ is parallel to S, each LTM trace in $z_m$ is larger than the corresponding LTM trace in $z_k$. The total activity across $F_1$ was normalized to deal with this problem.

6. Coding of Movement Length and Direction

Coding of movement and direction is solved by letting each $[x_j]^+$ input to a 1-dimensional PTS shift. This transformation maps HMI intensities into PTS positions in an approximately one-to-one fashion. Normalizing the positive intensities of the activated PTS positions does not alter the one-to-one property of the map. No loss if saccadic length or direction information occurs of normalization acts on output signals from PTS shifts. Then the normalized PTS shift pattern S can be fed as input signals to the adaptive coding model to generate a spatial parsing of HMI patterns across the RM.

7. Normalization of Total PTS Shift Map

It remains to say how the total output from all the PTS shifts can be normalized. The physiologically simplest schemes feed the PTS intensities as inputs into an on-center off-surround network whose cells obey membrane equations (shunting interactions) and whose off-surrounds are broadly distributed across the network. A network with particularly nice properties undergoes both feedforward and feedback on-center off-surround interactions. The inputs and the feedback signals activate the same population of interneurons, which distribute both types of signals to the rest of the network. The feedback signals are chosen to be linear functions of population activity. The choice of linear feedback signals may cause confusion unless further commentary is provided.

As noted earlier, linear feedback signals can create an amplification instability in networks whose function is to phasically store activity patterns in STM. In networks that react to tonically active input sources, such as the HMI or tonic cells, the amplification instability becomes the functionally useful property of temporarily maintaining a stable baseline of activity or tone. A simple network that instantiates this concept is $$\frac{d}{dt} S_t = -CS_t + (D - S_t)(I_i + S_t) - S_t \sum_{r \neq t} (I_r + S_r). \quad (6.22)$$

where the $I_i$ are the inputs to $F_1$ due to the PTS shifts and the $S_i$ are the normalized activations caused by these inputs within $F_1$. For simplicity, suppose that the total input $\Sigma_i I_i$ to (6.22) is small compared to the total number of sites D in each population, and let $D > C$. Then, in response to any PTS shift pattern $(I_1, I_2, I_3, \ldots)$, the total activity $\Sigma_{i=1} S_1$ of (6.22) approximates the constant value D-C and $S_i$ becomes proportional to $I_i$. When a new PTS shift pattern is input to the network, the total activity remains normalized as the normalized activities of $S_i$ adjust themselves to become proportional to the new inputs $I_i$.

F. SACCADE GENERATOR AND SACCADE RESET

1. Saccade Generator

In Section 2.5, we described learning requirements that suggest the need for a saccade generator (SG). An SG must be capable of shutting off its own output signal, thereby terminating a saccadic movement, while its input signal remains on. This section will discuss how general properties of the SG impose new design constraints on networks that input to the SG. A detailed SG design will also be developed, however, in order to clearly state the properties of these input sources and how they may interact with SG cells.

2. Converting an Intensity Code into a Duration Code

In order for the SG output to shut off before its input shuts off, some measure of output size must accumulate and act as an inhibitory signal that counteracts the input. The net SG output must, moreover, change as a systematic function of SG input, not only to generate saccades in response to unconditioned inputs, but also to alter a saccade as the conditioned input corresponding to a fixed unconditioned input changes due to learning. In our discussions of both unconditioned inputs (Section A) and conditioned inputs (Section B), larger SG inputs are required to generate larger saccadic movements.

At first glance, it would appear that two qualitatively different types of circuits could, in principle, accomplish this goal. In one circuit, a feedforward inhibitory interneuron $v_1$ accumulates the activity that counteracts the input at $v_2$ (FIG. 38a). In the other circuit, a feedback inhibitory interneuron $v_2$ accumulates the activity that counteracts the input at $v_1$ (FIG. 38b). These two designs lead to significantly different predictions about the input circuits that activate the SG. A feedforward inhibitory interneuron cannot, however, effectively carry out the required task. This is because the range of output sizes that a feedforward inhibitory interneuron can accomodate is insufficient for SG purposes. Either smaller inputs could not be shut off at all, which is unacceptable, or the total range of output sizes could be much too restricted. The simplest version of a feedback inhibitory interneuron is considered in FIG. 38b.

In such a circuit, some measure of output size accumulates and feeds back as an inhibitory signal that counteracts the input. Since the functional role of the SG output is to move the eye to its target position, the simplest accumulating measure of output size is the outflow signal itself.

This suggests an agonist interaction like that depicted in FIG. 39. In FIG. 39, an input to burst (B) cells generates signals to the tonic (T) cells. The T cells integrate this input through time. This integrated T cell activity generates outflow signals to the motoneurons (MN), thereby causing them to move. In addition, the T cells generate an inhibitory feedback signal to the B cells and an excitatory feedforward signal to the MN cells. As this inhibitory signal builds up due to the integrative action of the T cells, it progressively weakens the excitatory effect of the input on the B cells. When the inhibitory T cell feedback completely cancels the input, the B cells shut off (hence their name), thereby terminating SG input to the T cells and allowing the saccade to end.

To see how this kind of network can work, consider the simple model $$\frac{d}{dt} x = -Ax + I - By \quad (7.1)$$

and $$\frac{d}{dt} y = f(x) \quad (7.2)$$

where x(t) is the activity of the model B cells, y(t) is the activity of the model T cells, and I is the input size. Suppose that f(x) is a nonnegative increasing function such that f(0)=0. Also suppose that f(x) has a finite maximum, say 1, and that most inputs I which perturb x(t) are large enough to drive f(x) close to its maximum. Then when I turns on, x(t) is activated and starts to grow. Function f(x) rapidly grows to 1. By (7.2), y(t) integrates the value 1 through time, hence grows (approximately) linearly with t. Thus $y(t) \cong t$. The net input I=By by the B cells in (7.1) therefore satisfies $$I - BY \cong I - Bt \quad (7.3)$$

Thus, the net input becomes zero at (approximately) time $$t_I = \frac{I}{B} \quad (7.4)$$

Thereafter the decay rate $-A$ of x(t) and the negativity of $I - By$ drive x(t) to zero.

The critical property of this circuit is that y(t) integrates the (approximate) input 1 for a time interval of (approximately) I/B in duration before x(t) shuts off its input to y(t). Thus, the tonic outflow signal increases at an (approximately) constant rate for a duration that increases (approximately) linearly with the input intensity I. These linear properties break down at the small input sizes I such that f(x) does not equal 1 and at the transitional times when x(t) is increasing from equilibrium and decreasing back to equilibrium. Despite these caveats, it is clear that such a system can generate movement signals that expand and contract in a regular way as the input increases and decreases over an unlimited range. In other words, such a system can convert an intensity code (I) into a code for temporal duration ($t_I$). Using such a code, the duration of a saccade should covary with the duration of burst cell activity.

3. Summation of Retinotopic and Initial Eye Position Signals to the Saccade Generator Several important conclusions about the inputs to the SG can now be drawn. By chapter 5, T cell outputs generate the outflow signals that determine the position of the eyes in the head. Thus, after an accurate saccade terminates, the T cell feedback to the SG encodes the target position of the eyes. Since this T cell feedback signal cancels the total input to the SG, the total input to the SG also encodes the target position of the eyes.

In chapters 3 and 4, it was concluded by contrast that the movement commands to the SG are computed in retinotopic coordinates. Retinotopic commands from the visually reactive movement system are derived from a retinotopic map (RM) that is activated by retinal lights (Section B). Retinotopic commands from the intentional and predictive movement systems are derived from an RM that is activated by difference vectors (Section E). The following important design problems must now be addressed. How can retinotopic commands be converted into target position commands before activating the SG?

The following conclusion now seems inevitable: at the ST, RM adds its movement signal to a signal from an eye position map (EPM). In order for the sum of RM and EPM signals to encode the target position of the eye, the EPM signal must encode the initial position of the eye before the saccade begins.

4. The Eye Position Update Network

The primary functional role of the EPM map is to form part of a network that updates initial eye position signals to the SG after each saccade terminates. This network is called the Eye Position Update Network (EPUN). The existence of an EPUN is implied by the fact that T cell feedback shuts of the SG: After a correct saccade terminates, the T cell feedback cancels the total SG input. In order to prepare for the next saccade, the RM command that encoded the previous saccade command must be shut off, so that a new RM command can replace it. By the time that the new RM command is instated, a new EPM command must also be activated, so that the total RM+EPM command can encode the new target position. The new EPM command encodes, as always, the initial eye position. However this new initial eye position is the target position of the previous saccade.

This summary suggests that the following sequence of events occurs between two successive saccades:

$$RM_1 + EPM_1 \rightarrow EPM_1 \rightarrow EPM_2 \rightarrow RM_2 + EPM_2 \quad (7.5)$$

In (7.5), $RM_1 + EPM_1$ stands for the total SG input that caused the first saccade. After the saccade is over, the $RM_1$ input shuts off. This event does not cause a new saccade to occur because the T cell feedback having cancelled the total input $RM_1 + EPM_1$ input alone. Then the eye position input is updated by the new initial position input $EPM_2$. The input $EPM_2$ approximately matches the T cell feedback, hence does not cause a new saccade. Finally, a new $RM_2$ input is activated. If the T cell feedback cancels the $EPM_2$ signal, then the $RM_2$ input generates a burst within the SG whose size depend upon the $RM_2$ command alone.

Some variation on the timing of the reset events in (7.5) is also consistent with functional requirements. For example, both $RM_1$ and $EPM_1$ may be simultaneously reset. It is not, however, permissible for $EPM_1$ to be reset before $RM_1$ is reset. Then the new total command $RM_1 + EPM_2$, which approximately equals $2RM_1 + EPM_1$, could elicit a spurious saccade in response to the increment $RM_1$ 5. Two Types of Initial Position Compensation: Eye Position Update and Muscle Linearization This discussion suggests that both the RM and the EPM activate conditionable pathways through the adaptive gain (AG) stage that contribute to the total SG input. It is already known that the RM must activate such a conditionable pathway (Section B). The conclusion that the EPM also controls a conditionable pathway follows from the possibility that the size scale of the EPM signals is initially either much too large or much too small to balance the T cell feedback that is registered before and after saccades. Unless this calibration problem is solved, the conditionable RM pathway would have to compensate both for initial position errors of the unbalanced EPM and T cell inputs and for saccadic foveation errors. By contrast, if both the RM and the EPM control conditionable pathways, then they can cooperate to correct initial position errors and saccadic foveation errors.

One of the major lessons of Section B was to show how multiple sampling maps can cooperate to generate the total adaptive gain needed to correct saccadic foveation errors. Since both the RM and the EPM can activate conditionable pathways, they could, in principle, share the adaptive load to correct saccadic foveation errors, as in equations (3.34) and (3.35). Under normal circumstances, the MLN obviates much of the need for such cooperation by directly linearizing the response of the muscle plant, thereby enabling the RM to absorb most of the adaptive load needed to correct saccadic errors, as in equations (3.25) and (3.26).

The analysis in Section D suggests experimental tests of whether the EPM controls a conditionable pathway. Suppose, for example, that certain pathways from cerebellar direct response cells to MN cells carry the conditioned signals that linearize muscle responses (Section D). If these pathways of the MLN were cut, then dysmetria should be caused due to the subsequent nonlinear muscle responses. As a result, the corollary discharges to the HMI would inaccurately encode the actual positions of the eyes. Any movement commands based upon HMI vectors would consequently lead to saccadic errors for two reasons: The vectors themselves would be incorrectly calibrated, and the total input to the SG would not compensate for muscle nonlinearity. By contrast, visually reactive saccades due to retinal lights would lead to saccadic errors for only one reason: They would not be erroneous due to incorrectly calibrated vectors. They would be erroneous only due to the nonlinearity of the muscle plant.

If such visually reactive saccades could be evoked sufficiently often, the adaptive cooperation of RM and EPM signals at the SG should substantially correct the dysmetria. By contrast, adaptation to vector-based RM commands might show less correction, because the corollary discharges from which the vectors are computed would continue to be miscalibrated. Ablating the frontal eye fields can cause only visually reactive saccades to occur, whereas ablating the superior colliculus can cause only intentional and predictive saccades to occur. Such lesions, in concert with lesions of the pathway from cerebellar direct response cells to MN cells, may therefore be useful to test whether the EPM input to the SG is conditionable.

Another test of EPUN properties can be made by using paradigms in which saccade staircases are generated.

6. Saccade Staircases

The EPUN design explains the existence of saccade staircases as follows: The electrode input initially adds an RM input to the total SG input. A saccade is hereby generated. This RM input does not turn off, because the electrode does not turn off. On the other hand, after the saccade is over, the EPM input is updated, as in (7.5). The EPM input hereby increases by an amount corresponding to the length of the saccade. This new EPM input cancels the new level of T cell feedback. Hence the extra RM input due to the sustained electrode input can cause a second saccade. This argument can clearly be iterated to conclude that a saccade staircase will occur.

An intriguing feature of this explanation emerges when we ask why all the saccades in the saccade staircase are of approximately equal size. In Section 4.9 we noted that one factor is the absence of initial eye position compensation from the HMI. We have just noted that the staircase per se is due to the presence of initial eye position compensation from the EPUN. Further argument is needed to explain the equal sizes of the saccades. Equal increments in total input to the SG do not imply equal saccade sizes if the muscle plant is nonlinear. However, the muscle plant is functionally linear due to the action of the MLN. A series of equal saccades is the result.

This explanation shows that appropriate properties of three adaptive circuits (VCN, EPUN, and MLN) are needed to reconcile the properties of saccadic staircases with the greater body of saccadic data. Suitable manipulations in any of these circuits should therefore yield predictable changes in the properties of saccadic staircases. for example, cutting the cerebellar direct response pathways that are assumed to linearize muscle response in the MLN is predicted to elicit saccades of unequal sizes in a saccade staircase. Preventing the reset of the neurons that are assumed to update the EPM in the EPUN is predicted to cause just one saccade to be generated. This latter property can be used to discover what brain region houses this EPM.

Our explanation of saccadic staircases implies that during normal adult saccades, the RM input is shut off after the saccade is over. Any mechanism that prevents this reset event can elicit saccadic staircases.

7. Circuit Design of the Eye Position Update Network

The EPUN is built up by using many of the same design principles as the RCN (Section B), VCN (Section C, and the MLN (Section 1). This fact illustrates that, once a network module has been synthesized by the evolutionary process, it may be specialized in many ways by hooking it up to different input and output pathways. The EPUN network is designed as follows:

As in the MLN, T cell activity is mapped into an EPM which sends sampling signals to the AG stage (FIG. 40). Instead of using the OII generated error signals of the MLN at the AG stage, the EPUN uses the second light error signals of the RCN and VCN. As in the RCN and VCN, the conditionable pathways from the AG stage project to the SG.

Both retinal lights and HMI vectors are encoded within an RM before a saccade begins and are stored in STM there until after the saccade is over. In this way second light error signals can correct foveation errors due to the RM command (Section A). The hypothesis that RM+EPM signals cooperate at the SG leads to the suggestion that the EPM is activated using similar temporal rules: The T cell input to the EPM is encoded and stored in STM before the saccade begins, and is not reset until after the saccade is over. The EPM thus represents initial eye position right after the saccade ends, and the total RM+EPM input represents target position. Thus, any second light error signal that the saccade might generate can correct the cooperating conditionable pathways of this composite target position command.

The discrete sampling of T cell signals by the EPM is controlled by some type of gating action, because the T cells are tonically active and are thus always on. Several functional variations on this gating concept are readily imagined, and await future data to select among them. For example, a pause cell, or cell that is on except during a saccade (Section F) could provide an excitatory gating action either at the synaptic knobs of T cell pathways to the EPM (FIG. 40) or at the axon hillocks of these pathways. In the former case, the gating action could also modulate the plasticity of the adaptive filter which maps T cell outputs into EPM positions (Section E). Alternatively, a burst cell, or cell that is on only during a saccade, could provide an inhibitory gating action at synaptic knobs or axon hillocks. Discussion of neural data which may provide interpretations of EPUN cells is reserved until Section J, where we will also make several predictions about movement and postural subsystems.

8. A Saccade Generator Circuit

In this section, we describe a more complex SG model than the simple feedback inhibitory circuit of FIG. 39. This circuit utilizes cell types such as pause cells, two types of burst cells, tonic cells, and motoneurons that will paly a role in our later discussions. The circuit illustates how agonist and antagonist movement signals can work together in a push-pull fashion. In particular, antagonist bursts can occur near the end of a saccade and isometric coactivation of medium lead burst can occur when a saccade moves in a direction perpendicular to the preferred axis of the bursters. The circuit also has the property that its accuracy can vary with the network's level of arousal, notably that saccadic undershoots can occur in a fatigued or insufficiently aroused state. In our SG circuit, the last three properties are all explained by the same mechanism.

FIG. 41 depicts how such a model SG circuit controls a left-right pair of mutually antagonistic muscles. To describe this circuit's properties, we consider how cells that contract the right muscle interact with each other and with the other cells of the network. A total SG+EPM input is received by the long-lead burster (LLB) population $v_2$. Population $v_2$ sends excitatory signals to the medium-lead burster (MLB) population $v_6$. Population $v_6$ also receives powerful inhibitory signals from the pauser (P) population $v_3$. The LLB cells cannot supraliminally activate the MLB cells until the P cells shut off. The inputs to the LLB cells can build up gradually through time and over spatially dispersed populations that can receive inputs from several sources of RM and EPM inputs. When the total LLB input reaches a critical size, the LLB population can directly inhibit the P cells $v_3$ and thereby indirectly disinhibit the MLB cells $v_6$. The gradual and spatially dispersed build-up of input to the LLB cells is hereby translated into a rapid and focussed onset of activity at the MLB cells.

The MLB cells activate their tonic (T) cells $v_8$ and their motoneuron (MN) cells $v_{10}$, also called burst-tonic cells. The T cells $v_8$ integrate their inputs, and relay this integrated activity to the MN cells $v_{10}$. Thus, the MN cells receive integrated MLB input from the T cells, as well as direct MLB inputs. The MN cells, in turn, contract the right muscle. The direct MLB inputs enable their MN cells to generate a large initial signal to the eye muscles. This initial burst can overcome muscle inertia and any changes in total muscle input that may occur during the transition from posture to movement (Section G). The T cell input, on the other hand, helps the eye to attain its final position and to maintain this position after the saccade is over. The T cells also generate the inhibitory feedback signals to the LLB cells which terminate the saccade, as in FIG. 39.

Due to inhibitory feedback from the T cells, recording from the LLB cells will not easily disclose the existence of inputs from an eye position map (EPM), as in equation (7.5). This is because the T cell feedback tends to cancel the EPM input to the LLB cells. Inhibition of the T cell input should unmask the EPM input contribution to the LLB cells in such a circuit.

Activation of the right muscle circuitry also affects the left muscle circuitry. In order to understand how this happens in the circuit of FIG. 41, we must first explain how the arousal (A) cells $v_4$ work. These A cells control the generalized "excitability" of the entire circuit. In particular, population $v_4$ determines the tonic activation level of the P cells $v_3$. The A cells also generate inputs to the MLB cell populations $v_5$ and $v_6$. The balance between A cell excitation and P cell inhibiton keeps the MLB cells off between saccades. When the P cells $v_3$ are turned off by inputs from the LLB cells $v_2$, the unmasked input from the A cells $v_4$ combines with LLB input at $v_6$ to provide a strong onset of MLB activation. The primary function of the A cell population is thus to bring the size of MLB activation by unconditioned LLB inputs into a reasonable range at an early developmental stage, such that later conditioned changes in LLB inputs can correct any remaining errors of saccade length and direction.

When an input to the LLB cells $v_2$ initiates a saccade, the $v_2$ cells also inhibit the MLB cells $v_5$ of the left muscle. This inhibitory signal to $v_5$ cancels the excitatory signal from the A cells $v_4$ after the P cells $v_3$ are shut off. Thus, the LLB cells $v_2$ simultaneously inhibit the P cells $v_3$ and the antagonistic MLB cells $v_5$ using broadly distributed off-surround pathways.

This has important experimental implications. The antagonist MLB cells $v_5$ are shut off at the beginning of a saccade by the agonist LLB cells $v_2$. However, as the saccade progresses, the inhibitory feedback from the agonist T cells $v_8$ gradually shuts off the LLB cells $v_2$. As a result, LLB inhibition of the MLB cells $v_5$ gets progressively smaller, until the $v_5$ cells receive a net excitatory input from the A cells $v_4$. In other words, the MLB cells $v_5$ experience an antagonistic burst towards the end of a saccade, as also occurs in vivo. In an alternative model, the A cells could be removed without destroying most of the circuits properties.

9. Computer Simulations of a Saccade Generator Model

Below are summarized the differential equations that were used in this simulation. In order to simplify the model and to minimize the number of free parameters, we chose parameters equal to 1 and linear signal functions whenever possible.

Long Lead Bursters $$\frac{d}{dt} x_1 = -x_1 + I_1 - x_7 + x_7(0) \qquad (7.6)$$

$$\frac{d}{dt} x_2 = -x_2 + I_2 - x_8 + x_8(0) \qquad (7.7)$$

Pausers $$\frac{d}{dt} x_3 = -x_3 + x_4 = f(x_1) - f(x_2) \qquad (7.8)$$

Arousal Cells $x_4 = $ constant

Medium Lead Bursters $$\frac{d}{dt} x_3 = -x_5 + x_1 + x_4 - g(x_2) - g(x_3) \qquad (7.9)$$

$$\frac{d}{dt} x_6 = -x_6 + x_2 + x_4 - g(x_1) - g(x_3) \qquad (7.10)$$

Tonic Cells $$\frac{d}{dt} x_7 = C(x_5 - x_6) \qquad (7.11)$$

$$\frac{d}{dt} x_8 = C(x_6 - x_5) \qquad (7.12)$$

Motoneurons $$\frac{d}{dt} x_9 = -x_9 + x_5 - x_6 + x_7 \qquad (7.13)$$

$$\frac{d}{dt} x_{10} = -x_{10} + x_6 - x_5 + x_8 \qquad (7.14)$$

Initial data were chosen as follows:

$$x_1(0) = x_2(0) = x_5(0) = x_6(0) = 0 \qquad (7.15)$$

$$x_3(0) = x_4(0) = x_7(0) = x_8(0) = x_9(0) = x_{10}(0) = \tfrac{1}{2} \qquad (7.16)$$

Parameters, signal functions, and inputs were chosen as follows:

$$C = .01. \qquad (7.17)$$

$$f(\omega) = \frac{\omega}{.001 + \omega}. \qquad (7.18)$$

$$g(\omega) = \frac{\omega}{.02 + \omega}. \qquad (7.19)$$

$$I_1 = 0$$

In equation (7.6), term $x_7(0)$ is used to encode the EPM input corresponding to the target position attained by the previous saccade, which is hypothesized to equal the T cell inhibitory feedback from $v_7$ at the end of this saccade. Term $x_8(0)$ in equation (7.7) has a similar interpretation.

10. Comparison of Computer Simulations with Neural Data

Properties of model SG cells are similar to data on the response characteristics of various cell types in the deep layers of the superior colliculus, peripontine reticular formation, and oculomotor nuclei. FIG. 42 schematizes the neural response leading to a saccade. It highlights the main properties of the various cell types found in unit recordings by Luschei and Fuchs (1972) and Raybourn and Keller (1977).

Agonist medium lead bursters (MLB) tend to burst to near saturating levels during saccades. The burst duration is proportional to the saccade length in the MLB's direction of action. Antagonist MLB cells burst slightly before the saccade ends. Both MLB's have been found to burst equally to saccades orthogonal to the MLB's direction of action. In the model, this occurs when a saccadic command shuts of the pausers $v_3$. These pausers are assumed to be omnipausers which are shut off by every saccadic command. If the saccade is perpendicular to an antagonist pair of LLB populations, then no other inputs perturb the corresponding circuit. Consequently both agonist and antagonist MLB populations are equally activated during the saccade.

The duration of pauser inactivity due to a saccadic command is proportional to saccade length. The tonic cell activity is proportional to present eye position. The motoneuron, or burst-tonic cell activity is also proportional to eye position between saccades. In addition, motoneurons burst during saccades with a burst duration similar to that of MLBs.

All of these properties of the experimental data appear in our model. Moreover, our simulations use the same neuron model for all cell types. The varied response characteristics seen in our simulations depend entirely on the connections, input and output signal functions, and parameter choices between the model cells. These cellular characteristics are thus emergent properties due to choices of network interactions and reaction rates. This type of model provides an alternative to control models whose transfer functions may not correspond to neural mechanisms.

G. POSTURAL STABILITY AND LENGTH-TENSION REGULATION

1. Separate Postural and Movement Systems

Two distinct types of adaptive circuits have thus far been invoked to ballistically move the eyes to target positions. The muscle linearization network (MLN) compensates for the nonlinearity of the oculomotor plant whereas the retinotopic command network (RCN) and vector command network (VCN) use visual error signals to alter the direction and length of saccades. Neither of these mechanisms suffices to maintain the position of the eye during gaze. This is because both types of movement circuits are used to calibrate the proper direction and length of a saccade, but not the tensions needed to maintain the gaze after the saccade is over. As already noted, unequal lengths of agonist and antagonist muscles must coexist with equal tensions in these muscles to maintain gaze after the saccade is over.

FIG. 41 provides a more precise understanding of this design issue. In FIG. 41, the medium lead burster (MLB) population $v_6$ that excites the motoneuron (MN) cells $v_{10}$ of agonist muscle also completely inhibits the MN cells $v_9$ of the antagonist muscle. In particular, the inhibition of the antagonist MN by the agonist MLB prevents the antagonist tonic (T) cells from reading-out their signals to the antagonist muscle during the saccade. This push-pull arrangement prevents the antagonist muscle from unnecessarily slowing down during a rapid agonist contraction. In particular, the force exerted by the antagonist muscle on the eyeball is much reduced during a saccade.

By contrast, as soon as the saccade is over, the MLB inhibition is removed from the antagonist MN cells, and the full impact of T cell output is felt at the antagonist muscle. The balance of tensions between agonist and antagonist muscles consequently changes. In order to prevent the eye from drifting away from its target position after the saccade is over, an additional circuit is needed to compensate for any imbalances that may exist in agonist-antagonist tensions. This circuit must be able to do its work without altering the muscle lengths that were attained by a saccade. Thus, movements and postures must be regulated by different control systems in order to preserve the lengths achieved by movement yet compensate for the tension changes that occur during posture.

The postural system, no less than the movement system, must be capable of learning. The intrinsic tension characteristics of the eye muscles may change through time. The degree of tension imbalance at each combination of agonist-antagonist muscle lengths may also differ, and could not be effectively counterbalanced by a prewired mechanism.

2. Tension Equalization Network

FIG. 43 describes a network capable of learning to generate equal agonist-antagonist tensions without undermining the length characteristics of the movement system. This circuit is called a Tension Equalization Network (TEN). The goal of the TEN is to prevent post-saccadic drifts from occurring. It does so by using motions of visual cues with respect to the retina as error signals after a saccade is over. Visual motions with respect to the retina can also occur when the eyes are moving due to active movement commands. In order not to confuse these two types of motion, gating mechanisms are needed which enable learning to occur only when the eye is not in active movement mode. Another type of gating must also occur within the TEN. Read-out of postural signals from the conditioned pathways of the TEN must also not be allowed except in the postural mode. If equalizing tensions were imposed upon agonist and antagonist muscles in the movement mode, then movement would be impaired.

3. Design of the Tension Equalization Network

The TEN shares many of the design features that are used by the MLN and the EPUN. It also shares design features with networks capable of vestibulo-ocular reflex (VOR) adaptation. As in the MLN and the EPUN, the TEN spatially encodes T cell activity patterns at an eye position map (EPM). The EPM, in turn, sends conditionable pathways to the adaptive gain (AG) stage.

The error signals which these pathways sample at the AG stage are neither the error signals from the outflow-inflow interface (OII) of the MLN, nor the second light error signals of the EPUN. The TEN needs to use error signals that can measure the amount of post-saccadic drift. In the present embodiment, visual error signals are used by the TEN. These error signals must be capable of correcting post-saccadic drifts even in the absence of moving visual targets. Hence, directionally tuned error signals are activated by motions of the whole visual field. The accessory optic system is capable of generating error signals of this type. Directionally-tuned whole-field visual error signals can, for example, be generated by a network whose cells fire only if they receive convergent inputs from a sufficiently large number of cells tuned to a similar direction. In the present embodiment, a whole-field visual motion in a direction opposite to a prescribed muscle's direction of contraction causes the strength of the conditioned pathway to the AG strip of that muscle to increase and the strength of the conditioned pathway to the AG strip of the antagonist muscle to decrease (FIG. 44).

As in the MLN, the AG stage sends pathways directly to the MN cells. The pathway $$\text{T cell} \rightarrow \text{EPM} \rightarrow \text{AG} \rightarrow \text{MN} \tag{8.1}$$

can influence muscle tensions without altering the tonic cell outputs that determine muscle length. In order for the TEN to work well, the conditioned, and learning must be possible only in the postural mode. Both of these requirements can be achieved by a single gating signal that nonspecifically inhibits the TEN somewhere between the T cells and the AG stage in FIG. 43. The cells which give rise to such an inhibitory gating action must be active only during a saccade. Burst cells could therefore be the sources of this inhibitory gating signal.

The TEN accomplishes its function in the following way. During a saccade, its conditioned pathways to the MN cells are inactivated by gating signals. After the burst cells shut off, these conditioned pathways are disinhibited, as the T cells register the outflow signal pattern corresponding to where the eyes should be. If the eyes then begin to drift in their orbits, these outflow signals do not change. Hence they provide a stable source of sampling signals to the AG stage. Each distinguishable T cell outflow pattern can control a different conditionable pathway (FIG. 44) to the AG stage. Each such pathway can learn to control conditioned gains of all relevant muscles at the AG stage. These gains change as a result of learning in a way that tends to prevent future drifts when the eye ends up in the same or similar, outflow position. In short, the TEN is indifferent to how the eye got to where it is at the end of a saccade. Wherever that might be the TEN uses it outflow-activated sampling pathways to hold it there.

It is important to realize that the TEN is designed to accomplish this goal without interfering with the functioning of other adaptive circuits. For example, the RM and EPM sampling maps of the EPUN have already determined an outflow pattern across the T cells before the TEN is allowed to turn on after a saccade terminates. The MLN has also achieved an approximately linear muscle plant response via the MN cells before the TEN is allowed to turn on. By the time the TEN turns on the T cell pattern that activates its EPM has already been determined, and the positions of the eyes in the head have also been determined. It remains only for the TEN to resist passive eye movements after the active movement signals shut off, and to do so via the MN cells so as not to disturb the other computations that got the eyes to wherever they might be. Thus, at times when the TEN is turned on, the signals from the MN cells to the eye muscles explicitly encode the tension requirements that hold the eyes in place, but implicitly encode both length and tension information that prevent the eyes from moving from wherever they were intended to be.

4. Relationship to the Vesibular-Ocular Reflex

FIG. 45 summarizes a VOR model which maximizes the functional homology with the TEN circuit. As in the TEN, a whole-field visual error signal in the VOR circuit acts to change conditioned gains in order to prevent slippage of visual cues across the retina. Within the TEN, the EPM that samples these error signals is activated by T cells. Within the VOR circuit, the EPM that samples these error signals is activated by the vestibular canals. In both the TEN and VOR circuits different head positions can control different synergies of conditioned gains capable of preventing motions of the eyes relative to the visual world. Also in both circuits, a whole-field visual drift towards the right strengthens the eye motion to the left. In the TEN, the strengthened eye motion to the left prevents post-saccadic drift to the right during posture. In the VOR circuit, the strengthened eye motion to the left prevents relative motion of the visual field to the right during a head movement.

The functional homology between the TEN and the VOR circuits calls attention to the possibility that sampling signals within the VOR circuit may be gated at some stage between the vestibular canals and the cerebellum. In the TEN, this gate is opened only in the postural mode. Such a posture-dependent gating action would also be useful in the VOR circuit. This can be seen by noting that a saccade may accompany a head movement. The head movement can activate the VOR sampling pathways as the saccade may generate visual whole-field motions. Saccades thus generate whole-field error signals at times when the VOR circuit is already correctly calibrated. A posture-dependent gating action can prevent saccade-generated whole-field motions from erroneously altering the VOR gains. In species where the VOR circuit can compensate for head movements during saccades, this gating action may occur at the synaptic knobs of the sampling signal pathway within the AG stage. At such a locus, the posture-dependent gate can prevent learning from occurring except in the postural state, but could nonetheless allow read-out of the conditioned gains to occur even during saccades.

H.

SACCADIC RHYTHM AND PREDICTIVE MOVEMENT SEQUENCES

1. Rhythmic Choices among Mutiple Movement Sources

Section G provided a simple example of a functional rhythm in a sensory-motor system. During such a rhythm, movement and postural subsystems turn on and off intermittently through time, thereby supplementing and complementing each others computational competences. The demand upon the postural subsystem are always the same: Hold the eyes in place no matter how they got there. The choice of movement subsystems is more varied. A visually reactive saccade may occur or a saccade that is triggered by an intermodality signal, such as a sound, may occur, or a saccade may be volitionally produced, or a preplanned sequence of predictive movements may occur, as in a dance. As one ascends the evolutionary ladder from visually reactive to predictive movements, sensory cues play an increasingly limited role.

In this section we consider a network that is capable of encoding a predictive sequence of movements in long-term memory, and of reading-out this movement sequence at will. This model will put us in a better position to integrate the networks which process visually reactive, intermodality, intentional, and predictive movements into a single global processing scheme in Section J.

2. Distinguishing Correct Predictive Saccades from Incorrect Individual Saccades The basic nature of a predictive competence may be better appreciated through the following example. Consider the two light-and-movement sequences:

---
I. Incorrect Light-Activated Saccade
light 1 - incorrect movement 1-light 2-movement 2
II. Correct Light-Activated Predictive Saccade
light 1-light 2-correct movement 1-correct movement 2
---

In both case (I) and case (II), two successive nonfoveated lights strike the retina. In case (I), both lights are due to a single source that remains on continuously, whereas in case II each light is due to a different source that is flashed on only briefly. In case (I), we want the second nonfoveated light to be the source of an error signal which corrects the saccade caused by the first light. We also want this second light to be able to trigger a second saccade. These properties can be realized by a retinotopic command network or RCN (Section B). In case (II) by contrast we do not want the second nonfoveated light to be a source of an error signal, because the first predictive saccade is correct. However, we still want the second nonfoveated light to trigger a second predictive saccade.

Cases (I) and (II) differ in terms of how lights and movements are interspersed during visually reactive and predictive saccades, respectively. An analysis of these differences leads to the conclusion that each light activates two parallel pathways that are capable of triggering saccadic motions. The first pathway is the more direct one that leads through the network analog of the superior colliculus. The second pathway is more indirect, and leads through the network analog of the frontal eye fields. The second pathway subserves the predictive capability of the saccadic model.

This bifurcation of pathways is not the bifurcation between sampling pathways and error signal pathways that was introduced in Section A. Both the pathways in the present bifurcation are sampling pathways. We therefore need to explain how both of these sampling pathways work together to achieve the desired properties of both cases (I) and (II).

3. The Temporal Control of Predictive Saccades

As discussed above, predictive saccades are encoded as target positions in a target position map (TPM) computed in head coordinates. Several target positions can simultaneously be stored in short term memory (STM) by such an TPM. The positions so stored are already influenced by attentional factors.

The minimal network design capable of controlling the STM storage and sequential read-out of predictive saccades uses two successive TPMs denoted by $TPM_1$ and $TPM_2$. The spatial map $TPM_1$ initially stores all the relevant target positions in STM. The map $TPM_2$ selects and stores only the target position which controls the current saccade, and interacts directly with the HMI to generate output vectors. We call this entire control structure a Predictive Command Network (PCN).

The main functional insight that is embodied by PCN design is that matches and mismatches between target positions and present positions at the HMI regulate the sequential performance and learning of predictive saccades. In particular, a match at the HMI can cause the next target position command to be read into the HMI, thereby causing a mismatch between the new target position and the present position. This mismatch generates the next saccade. In other words, as the network attains its present target, it resets itself to attain its next intended target. Once the PCN circuit is nonspecifically activated by a volitional signal, this match-mediated reset scheme can automatically run off its intended saccades until the entire predictive sequence has been performed.

In order to gradually develop this insight into a precise circuit design, a functional description of network operations will first be given. Then a specific network realization, along with possible cell-type identifications, will be suggested. Several closely related network realizations can be envisaged, and more than one version may be used across different species.

4. Storage of Temporal Order Information

A. Storage of Temporal Order, Target Match, and Memory Reset

Stage $TPM_1$ stores in STM the temporal order information of attended target positions. The temporal order information is encoded by a spatial pattern of activation across the target positions, with more intensely activated positions tending to be performed first. Grossberg (1978a, 1978c, 1985c) has derived STM codes whereby temporal order information can be laid down in a way that permits its stable long term memory (LTM) encoding as a unitized motor plan. A suitably designed shunting competitive network can do the job (Section A 6). A temporal order code that is based upon relative STM activity can take into account both the order of item occurrences and the motificational salience of individual items. Motivationally more salient events can be looked at at earlier times, other things being equal. Grossberg (1982b. 1982c. 1984) has described mechanisms whereby motivational salience can modulate the attention that is given to a subset of sensory cues. A discussion of these mechanisms also lies outside the scope of this chapter. For present purposes, it suffices to note that earlier occurring items will often, but not always, be stored in STM with larger activities.

B. Read-Out and STM Storage of a Target Choice

When a nonspecific output gate opens between $TPM_1$ and $TPM_2$, the most active target position stored within $TPM_1$ is read into $TPM_2$. This target position is chosen by a competitive interaction among the active output pathways from $TPM_1$ to $TPM_2$. Several things now happen (FIG. 46a).

C. HMI Mismatch, Output Gate Closure, and Target Self-Inhibition

Consider the state of the HMI prior to the moment of target choice at $TPM_2$. A match may exist there due to correct execution of a prior saccade, or the HMI may be inactive. If target read-out from $TPM_2$ then occurs, it nonspecifically activates the HMI (Section C) as it instates a new target position there in agonist-antagonist muscle coordinates. This new target mismatches the eye position corollary discharge. Thus, a primary effect of target read-out is to cause a mismatch within the HMI (FIG. 46b).

A second effect of target read-out is to prevent the read-out of other active target locations from $TPM_1$ until the next saccade is over. The chosen target position in $TPM_2$ is stored in STM until this saccade is over. During this time, it blocks further read-out there from $TPM_1$ and maintains the target position within the HMI.

A third effect of target read-out from $TPM_1$ is to prepare $TPM_1$ to read-out its next saccadic command after the present saccade is over. A topographically-specific inhibitory signal from the chosen target position to its source in $TPM_1$ accomplishes this reset event (FIG. 46a). Although its STM source in the temporal order code of $TPM_1$ is inhibited, the chosen target position can remain active in STM within $TPM_2$ due to the internal positive feedback loops within this network.

D. Read-Out, Reset, and STM Storage of Retinotopic Commands

The mismatch at the HMI generates a vector difference which generates an output pattern to an RM (Section C). When this happens, the eye is still at rest. This output pattern is stored in STM as a spatial location within the RM after inhibiting any command that may have previously been active within the RM.

The RM command, in turn, activates three output pathways: an unconditioned excitatory pathway to the saccade generator (SG), a prewired inhibitory pathway to the superior colliculus (SC), and a conditioned pathway to the adaptive gain (AG) stage. These signals together can generate a saccade.

While the saccadic motion is taking place, output from the HMI to the RM is prevented by offset of an output gate. The stored movement command in the RM is thus undisturbed during the saccade.

E. LTM Printing

After the saccade terminates, a gate opens that enables the LTM traces in the $TPM_2 \rightarrow HMI$ pathway to print the final eye position in muscle coordinates (Section C).

F. Match-Induced Reset of the TPM

After a correct saccade takes place, a match between target position and present eye position is generated within the HMI (FIG. 47a). Whenever a match occurs at the HMI, the stored target position in the $TPM_2$ is inhibited. Its target position signals to the HIM are thereby also inhibited (FIG. 47b), a mismatch is caused at the HMI (FIG. 47c), and the inhibitory signal from the $TPM_2$ to the $TPM_1$ output pathways is eliminated. In all, a match at the HMI induces a mismatch at the HMI by inhibiting the $TPM_2 \rightarrow HMI$ target position command.

After the $TPM_2$ target position is inhibited, the target positions that are active in STM are the $TPM_1$ stage can complete to choose the next target light and store it in $TPM_2$. Then the cycle can automatically repeat itself until no temporal order information is stored any longer in STM within the $TPM_1$.

5. Design of a Predictive Command Network

FIGS. 48 and 49 together describe a formally competent microcircuit that is built up from neurally plausible components. Some cellular stages of these figures possess properties of known neuron types. The circuit thus predicts the functional roles of such cells and their interactions with other cells. FIG. 49 provides details of HMI gating processes that could not be drawn into FIG. 48.

The networks of $TPM_1$ and $TPM_2$ possess similar cellular architectures, even though they carry out different functional tasks. In particular, both $TPM_1$ and $TPM_2$ contain shunting on-center off-surround feedback networks (Section A.6). For example, pathways 1 and 4 in $TPM_1$ and $TPM_2$, respectively, are both part of positive feedback loops in an on-center (FIG. 48). Pathway 5 in $TPM_2$ illustrates a negative feedback loop in an off-surround. Despite these similarities, network $TPM_1$ is designed to simultaneously store a spatial pattern of temporal order information in STM. Network $TPM_2$, by contrast, is designed to store only one target light at a time in STM.

The subsequent discussion will show that the cells in the $TPM_1$ have properties similar to those of light-sensitive cells in the parietal cortex, whereas the cells in $TPM_2$ have properties similar to those of the light-insensitive saccade neurons in the parietal cortex. The visuomovement cells and movement cells in the frontal eye fields also have similar properties (Section J). The formal properties in question were independently derived as part of how motor commands are read-out from STM in a prescribed temporal order.

To start our discussion of the PCN microcircuit, consider a time at which a pattern of temporal order information is being stored in STM and the eye is at rest. In other words, the network has attended some lights and stored them in STM, but has not yet translated them into overt movements. At such a time, network $TPM_1$ is active, but network $TPM_2$ is inactive and no target position commands are being read by $TPM_2$ into the HMI. Consequently, all output gates from the HMI are closed and there exists a mismatch between corollary discharge and target position inputs to the HMI.

The activity within the $TPM_1$ cannot activate the $TPM_2$ because of the nonspecific inhibitory gating action which pathway 2 exerts on outputs from the $TPM_1$ (FIG. 48). Such a gating action may in vivo take place at an interneuronic stage between $TPM_1$ and $TPM_2$, but we have avoided all such extra complexities to draw a simpler circuit. The cells which activate the inhibitory pathway 2 are tonically active. (Tonic cells are depicted as open circles, phasic cells as closed circles.)

Pathway 10 can also gate shut the output pathways from $TPM_1$ to $TPM_2$. Pathway 10 is, however, inactive at this time. It is inhibited by pathway 9. Pathway 9 is active because pathway 8 from the HMI is inactive. Pathway 8 from the HMI is inactive because the inhibitory pathway 11 in FIG. 49 is active. Pathway 11 is active because the $TPM_2$ is inactive, and thus cannot activate the inhibitory pathway 12. In all, the multisynaptic pathway $12 \rightarrow 11 \rightarrow 8 \rightarrow 9 \rightarrow 10$ is shut off whenever the $TPM_2$ is inactive. Thus the $TPM_2$ does not block its own activation by the $TPM_1$ at times when it is inactive. The only impediment to activation of $TPM_2$ by $TPM_1$ at such a time is the inhibitory pathway 2.

Suppose that volition acts to inhibit the nonspecific pathway 2. Volition does not need to have specific consequences of any kind in order for the PCN to respond by rapidly reading out its sequence of stored commands. We now explain how this can happen.

When pathway 2 shuts off, excitatory signals from the active $TPM_1$ populations can reach the $TPM_2$ along topographically organized pathways such as pathway 3. The largest signal causes the most rapid and vigorous activation of its receptive population. The on-center (pathway 4) off-surround (pathway 5) feedback interactions within the $TPM_2$ contrast enhance this input pattern until only the positive feedback loop corresponding to the largest input is active. The activity within this loop is also stored in STM by the positive feedback interaction.

This active TPM$_2$ population gives rise to three types of output signals. First, a topographic inhibitory feedback signal (pathway 6) from the TPM$_2$ to the TPM$_1$ inhibits its source of feedforward TPM$_1$→TPM$_2$ signals (pathway 3). The stored activity in TPM$_2$ hereby resets the temporal order information across TMP$_1$ by deleting the target position that was just stored in TPM$_2$. This reset even prepares TPM$_1$ to read-out the next-most-active population during the next saccadic cycle.

Second, activation of the TPM$_2$ causes the nonspecific inhibitory gating pathway 10 to turn on, thereby inhibiting further outputs from TPM$_1$. Thus, as one target position is being stored in TPM$_2$, it prevents other target positions from being read-into TPM$_2$. This gating action is accomplished by the multisynaptic pathway 12→11→8→9→10. The multiple links in this pathway are needed because this pathway also controls another important property. The multisynaptic pathway 12→11 also prevents tonic read-out of eye position signals from the HMI when no target positions are registered there (Section C.6d). Pathway 12→11 does this by gating shut all HMI outputs—including gating signals of TPM$_1$ outputs and inputs to the RM—whenever the TPM$_2$ is inactive. Pathway 8 links the HMI output gate 12→11 to the TPM$_1$ output gate 9→10. Pathway 12→11→8→9→10 is thus an assemblage of two functionally distinct but synergetic subsystems.

Due to the importance of pathway 12→11→8→9→10, we now consider in greater detail how it inhibits TMP$_1$ outputs. When TPM$_2$ gets activated, the inhibitory pathway 12 shuts off the inhibitory gating signal in pathway 11, thereby disinhibiting pathway 8. When the disinhibitory pathway 8 fires, it shuts off pathway 9, which disinhibits pathway 10, thereby shutting off outputs from the TPM$_1$. Pathway 8 can fire if it receives an excitatory signal from the HMI. Such a signal arises from the HMI if there is a mismatch between target position and eye position there. This property leads to a consideration of the third type of output signal that is controlled by the TPM$_2$.

The active population in the TPM$_2$ reads a target position, computed in muscle coordinates, into the HMI. This target position was learned using the mechanisms described in Sections C and D. Should this target position be different from eye position, then a mismatch will be registered in the HMI and the output pathways from the TPM$_1$ to the TPM$_2$ will be gated shut. By contrast, should this target position equal the eye position that is read into the HMI, then a match will be registered in the HMI, and the target position will cancel the eye position. Even if the inhibitory gating pathway 11 is off, no output can activate pathway 8 when a match occurs within the HMI. At such times, pathway 9 will inhibit pathway 10, thereby enabling the next target position to be read-into the TPM$_2$ from the TPM$_1$.

Thus, output along pathway 8 is contingent upon two events: activation of the TPM$_2$ and mismatch within the HMI. This contingency enables new inputs from the PTM$_1$ to reset an active TPM$_2$ should its target position have already been realized by prior eye movements. Were it not for this property, the sequential reset mechanism could sometimes get "stuck" before it could read-out its entire command sequence.

If the target position does not equal the eye position within the HMI, then no more signals can pass from the TPM$_1$ to the TPM$_2$, and a target position will be stored within the TPM$_2$, until a match can be generated within the HMI. Such a match cannot be generated by a change in target position, since the same target position will continue to be read into the HMI by the TPM$_2$ until a match occurs. A match can be created only if the eye moves until the eye position pattern matches the stored target position pattern.

6. Saccade Generation by Predictive Commands

In order for the eye to move in this way, the vector difference computed within the HMI must be able to generate a saccade, in the manner described by Section C. Such a saccade can be elicited due to the second role played by the multisynaptic pathway 12→11. We have already summarized the first role of this pathway: When the TPM$_2$ is inactive, the tonically active gating pathway 11 inhibits the target cells at which the HMI vector is registered in a pathway 13. At such times, the HMI vector encodes only eye position and would generate ceaseless saccade staircases were it not for pathway 11 (Section F). By contrast, when the TPM$_2$ is activated, pathway 12 inhibits pathway 11. The target cells can then register the HMI vector, which now compares target position with eye position. If a mismatch occurs, pathway 8 maintains this difference vector within the HMI by preventing STM reset of the TPM$_2$.

The second role of pathway 12→11 is to enable pathway 14 to carry muscle-coded vector signals to a retinotopic map (RM), where they are recoded as an active map position and stored in STM (Section E). Output signals from this RM to the saccade generator (SG) update the eye position update network (EPUN) and generate a new saccade (Section F). If this saccade is correct, it causes eye position to match target position in the HMI. If the saccade is incorrect, another mismatch is caused by a vector difference in the HMI, and another corrective saccade is generated. this description thus shows how temporally discrete target position information and temporally continuous eye position information are continuously matched at the HMI.

When eye position finally comes close to matching target position within the HMI, pathway 8 becomes inactive, despite the fact that the gating pathway 11 is still inhibited. Consequently pathway 10 is inhibited via the multisynaptic pathway 8→9→10, and output signals from the TPM$_1$ can once again reach the TPM$_2$. Otherwise expressed, a match at the HMI triggers a "rehearsal wave" that enables read-out of a new target position to occur from the TPM$_1$. The most active target position within the TPM$_1$ can then begin to compete with the stored target position within the TPM$_2$. The new target position wins this competition because the stored target position has only its positive feedback pathway within TPM$_2$ with which to maintain its activity, whereas the new target position has both the input from TPM$_1$ plus its positive feedback pathway with which to become instated. As the new target position inhibits the old one within the TPM$_2$, it can generate a new target position input to the HMI. This new target position causes a mismatch within the HMI, which in turn causes activation of pathway 10. pathway 10 inhibits the TPM$_1$ output pathways and stabilizes the STM storage of the new target position within the TPM$_1$ The next saccade in the predictive sequence can then be generated by the HMI. This cycle continues until all of the stored target positions within the TPM$_1$ have been sequentially inhibited. After all of the saccades have been performed the TPM$_1$ is inactive, the TPM$_2$ is left storing the last target position command in STM, and the HMI is inactive because its target position and eye position match.

Several variations on this microcircuit design can be contemplated which compute the same basic functional properties but differ in terms of testable details. One of these variations is suggested by consideration FIG. 73. FIG. 73 summarizes how different branches of the multisynaptic pathways $12 \rightarrow 11 \rightarrow 8 \rightarrow 9 \rightarrow 10$ and $12 \rightarrow 11 \rightarrow 8 \rightarrow 14$ are activated during different phases of the saccadic cycle. This summary suggests that these pathways are designed rather parsimoniously. Inspection of FIG. 73 also shows that the pathways 8 and 10 are always on and off in-phase with each other. Consequently, pathway 8 could directly inhibit the $TPM_1$ output pathways, instead of acting via the multisynaptic pathway $8 \rightarrow 9 \rightarrow 10$ without altering any functional properties. We have included the tonic pathways 9 and 10 to call attention to a possible homology that may exist in vivo between pathway 10 and pathway 2. In FIG. 48, both volitional signals and HMI signals play upon a general gating system whose function is to inhibit $TPM_1$ outputs. Pathways 2 and 10 simply mark the target cells where volitional and HMI-activated signals happen to feed into this general gating system. Thus, FIG. 48 would be "more parsimonious" than a future in which pathway 8 directly inhibits $TPM_1$ outputs if such general gating system were to exist. On the other hand, if pathway 2 inhibits not only $TPM_1 \rightarrow TPM_2$ outputs but also the $TPM_2$ cells, then pathways 2 and 10 could not possibly be part of the same functional system, because STM storage of activity within the $TPM_2$ must be able to occur while pathway 10 is active. Enabling pathway 2 to inhibit $TPM_2$ cells achieves a small advantage, since shutting off the volitional signal after a saccade sequence terminates would then inhibit the stored final target position within $TPM_2$, and thereby completely reset the $TPM_2$ in preparation for the next predictive saccadic sequence. Given such an arrangement, the rationale for the multisynaptic pathway $8 \rightarrow 9 \rightarrow 10$ would collapse, and a direct inhibitory pathway 8 onto the $TPM_1$ output pathways might be expected to exist.

7. Two Types of Output Gates: Target-Driven Gates and Saccade-Driven Gates

To complete our description of PCN design we need to consider in finer mechanistic detail several functional issues that were raised in Chapter 4. What happens if a predictive saccadic command generates a saccadic error due to inaccurate translation of a vector command into movement, as in the Shebilske paradigm? How can a vector command be stored within the RM throughout a saccade? What prevents this stored vector command from being reset by eye positions attained during a saccade? How is learning within the HMI prevented from occurring except after a saccade terminates? We suggest that all of these functions are controlled by a single gating system. This gating system is, however, different from the target-driven gating system (pathway $12 \rightarrow 11$) that is modulated by storage of target positions within the $TPM_2$. The other gating system is called a saccade-driven gating system because its activity is modulated by the saccade generator (SG).

FIG. 49 describes one possible version of the saccade-driven gating system. This version uses a pause cell input source. Such a pause cell is tonically on except during a saccade. Before and after a saccade occurs, when the pause cell population is active, it can open two gating pathways. A Now Print gate (pathway 15) enables pathway 7 from the $TPM_2$ to learn the eye position that was attained by the last saccade. A read-out gate (pathway 16) enables the HMI to read-out a vector command along pathway 14 to the RM, where it can be stored in STM. As soon as a saccade begins, both gates shut. Learning within the HMI therefore cannot occur during a saccade, and new vectors from the HMI cannot be read-out during a saccade. Consequently the RM command can be stored until after a saccade is over. It can thereby sample second light error signals using its conditionable pathways within the adaptive gain (AG) stage, or cerebellum (Section B). After a saccade terminates, the pause cell turns on and both gates open again. It takes some time, however, for the target position within $TPM_2$ to be reset, for a new vector to be computed by the HMI, for this new vector to activate the RM via pathway 14, and for the new RM input to competitively inhibit the stored RM position. During this time interval, the old RM position can sample second light error signals at the AG stage.

Reset of the RM position is accomplished in the same way that an updated target position from the $TPM_1$ resets the $TPM_2$. This type of competitive reset of the RM follows from the ability of the RM to contrast enhance and store retinotopic inputs using a shunting on-center off-surround feedback network (Section E).

The conjoint action of target-driven gating and saccade-driven gating help to refine our explanation of data that incorrect saccades in response to a briefly flashed light could correct themselves in the dark. In FIG. 49 the target-driven gate remains closed after such an incorrect saccade, because a mismatch of eye position with target position occurs within the HMI. After the incorrect saccade terminated, however, the saccade-driven gate opens, and enables the new HMI vector to instate an updated movement command in the RM. A corrective saccade ensues.

Several alternative saccade-driven gating schemes all possess the functional properties that we need, and may therefore exist in vivo. For example, pause cells could inhibit tonic cells that inhibit learning and vector read-out, thereby causing a disinhibitor gating reaction, rather than a direct excitatory gating reaction, in pathways 7 and 14. A saccadic burst cell population could directly inhibit learning in pathway 7 and read-out to the RM in pathway 14 (Section F). To test whether one has discovered such gate-controlling cells in vivo, lesion experiments of several types can be carried out. For example, suppose that pathway 11 in the target-driven gating system were cut. Then outputs from the HMI could occur even in the absence of target position inputs. Saccade staircases would therefore ensue. Suppose that pathway 16 in the saccade-driven gating system were cut. Then HMI outputs could continually reset the RM during a saccade. Consequently, by the time a correct saccade was over, the RM would have received an input corresponding to the smallest vectors that it can encode. This, in itself, is not a bad property. However, if the RM were then required to relearn its conditioned AG gains, it could not do so, because it would have "forgotten" the vector which caused the saccade by the time the saccade was over.

8. Parietal Light-Sensitive and Saccade Neurons

The on-center cells within the $TPM_1$ and $TPM_2$ have properties that are analogous to those of light-sensitive neurons and saccade neurons in the parietal cortex, respectively. The $TPM_1$ cells are light-sensitive because lights are an important information source in building up a TPM in head coordinates. If these cells in the TPM$_1$ store activity in STM without triggering a saccade, then their activity can persist for a long time. However, as soon as they initiate a saccade by activating the TPM$_2$ (pathway 6 in FIG. 48). Thus these TPM$_1$ cells have the curious property that they shut off just when the saccade begins that their stored light might have been expected to control.

Supraliminal activation of TPM$_2$ cells, by contrast, causes these cells to generate a saccade and to persistently fire due to their STM storage until the saccade is over. These TPM$_2$ cells are not sensitive to light because they are activated by TPM$_1$ cells and only when the control processes which regulate pathways 2 and 10 in FIG. 48 allow. In Section J, we will summarize the similar properties of visuomovement cell and movement cells in the frontal eye fields.

Experimental tests can be made of whether parietal light-sensitive and saccade neurons or frontal visuomovement and movement neurons are examples of TPM$_1$ and TPM$_2$ cells, respectively. Electrical stimulation of a saccade neuron should inhibit its light-sensitive source via pathway 6 in FIG. 48. Cutting or otherwise inactivating this inhibitory feedback pathway should enable the light-sensitive neuron to remain on during the ensuing saccade. The light-sensitive cell should also repond to certain eye positions, in particular the eye positions which together with appropriate retinal positions give rise to the target position of a TPM$_1$ cell. The saccade neuron should remain on when an incorrect saccade occurs in the dark until after a corrective saccade of Shebilske type is made.

In addition to cells with properties of light-sensitive neurons and saccade neurons, the PCN also contains other cells with interesting characteristics. We have already noted that the target-driven and saccade-driven gating systems can be controlled by pause cells or by burst cells. In fact, several types of pause cells are included in FIG. 49. The pause cell which controls pathway 11 will shut off just before and during a correct PCN-generated saccade and then will not turn back on until the next TPM$_2$ command is instated. However, after an incorrect PCN-generated saccade occurs, such a pause cell will remain off until a corrective saccade of Shebilske type can be made. By contrast, the pause cells which control pathways 15 and 16 will turn off during any saccade, whether or not it is generated by the PCN and whether or not it is correct. The cells which control the "rehearsal wave" pathway 9 are also pause cells. These cells turn off only when the TPM$_2$ is active and a mismatch is registered within the HMI. Thus they turn off only for saccades that are generated by the PCN, and remain off during corrective saccades (Section D.5) In addition to these differences, the onset and offset times of these different types of pause cell types are not synchronous.

9. Switching between Movement and Postural Eye Position Maps: Frontal Eye Field Control Our analysis of the PCN has focused upon how a pattern of stored target positions can give rise to a sequence of predictive saccades. We have shown how such a stored activity pattern at the TPM$_1$ can sequentially activate an RM and can correct Shebilske-type errors due to mistranslation of a saccadic command between the RM and the eye muscles. This analysis calls attention to the following issues.

Before a predictive saccade takes place, the RM of the PCN and an EPM that registeres initial eye position must both send their movement commands to the SG. The RM and the EPM are part of the eye position update network (EPUN) that was described in Section F. After a predictive saccade is over, it takes some time for the next TPM$_1$ command to be instated within the TPM$_2$, and then give rise to the next RM output. In order to prevent postsaccadic drifts from occurring between these saccades, the EPM of the tension equalization network (TEN) must switch on to read-out its conditioned postural gains.

This discussion emphasizes that two different types of EPMs are turned on and off at different phases of the saccadic cycle in order to guarantee the accuracy of movements and the stability of postures. The EPM which cooperates with the RM to generate the SG input is called the movement EPM, or EPM$_M$. The EPM which controls postural gains is called the postural EPM, or EPM$_{Pos}$.

FIGS. 50$a$, 50$b$ and 50$c$ schematizes the timing of RM, EPM$_M$, and EPM$_{Pos}$ onsets and offsets respectively during a series of saccades. The durations of the EPM$_M$ signals are not certain. They may be as long as the sillouettes drawn in FIGS. 50$a$, 50$b$ and 50$c$ or they may be more synchronous with RM durations, as illustrated by the cross-hatched area. We will develop some implications of the latter hypothesis.

Suppose that the RM and the EPM$_M$ are synchronously switched on and off, while the EPM$_{Pos}$ is being switched off and on. The simplest way to accomplsh these properties is to suppose that the gating system which turns the RM on and off also turns the EPM$_M$ on and off while it turns the EPM$_{Pos}$ off and on. This gating system is a saccade-driven gating system.

The computation and storage of temporal order information by the TPM$_1$ takes place in the frontal eye fields (FEF). All of the subsequent PCN stages—TPM$_2$, HMI, and RM—could also, in principle take place in the FEF, or in regions to which the FEF projects.

10. Direct Computation of Predictive Difference Vectors from Stored Retinotopic Positions?

We now consider some functional problems that would need to be solved if a neural system were to directly transform stored retinotopic positions $R_1, R_2 \ldots, R_m$ into difference vectors.

A. Getting Started

The first problem is to get started. Consider the first light $R_1$ in a stored predictive sequence of retinotopically coded positions. How is $R_1$ encoded into a difference vector? With what stored quantity $R_0$ does $R_1$ get compared in order to compute the correct difference vector $R_1 - R_0$? To emphasize the nature of this difficulty, suppose that the last saccade was made in response to a sound, not to a light. How does the system know how to subtract $R_1$ from the "retinotopic" position $R_0$ of the sound?

Figure 51A:
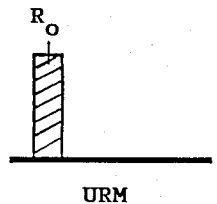
Figure 51A:
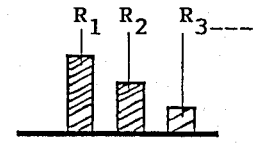

In light of these considerations, a brain capable of solving this problem would encode all sources of movement commands, including auditory sources, within a universal retinotopic map, or URM (FIG. 51$a$1). Such a URM would store only the retinotopic position of the last movement command to be executed. When $R_1$ was read-out to be converted into a difference vector, so too would the previously stored command in $R_0$ in the URM (FIG. 51$b$). Both retinotopic commands would be read-into a region where the difference vector $R_1 - R_0$ could be computed.

Figure 51B:
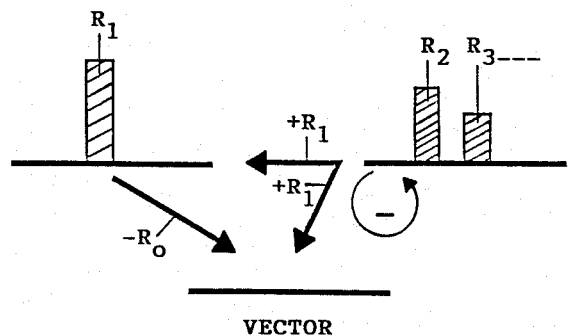

As $R_1$ was read-out of its RM (FIG. 51$b$2) it would self-inhibit its RM representation to prevent perseverative performance of its movement command. It would also inhibit $R_0$ at the URM in order to instate itself into STM storage there. Once stored in the URM, $R_1$ could later be read-out along with $R_2$ to compute the difference vector $R_2-R_1$ (FIG. 51b).

In summary, the existence of a URM and of coordinated STM reset and storage operations between the URM and all other RMs is implicit since retinotopic commands are directly recorded into difference vectors.

B. Vector Sign Reversal

Consider a pair $R_1$ and $R_2$ of retinotopic positions corresponding to horizontal eye motions. For simplicity, suppose that these positions are encoded within a 1-dimensional RM whose positions are labeled by real numbers. Consider the case in which both $R_1$ and $R_2$ lie to the right of the fovea. Suppose moreover that $R_2$ lies to the left of $R_1$. If we label the fovea with the number 0, then $R_1 > R_{22} > 0$ and $R_2 < -R_1 < 0$. The problem can now be stated: How can retinotopic positions with one sign (in this case positive) generate a difference vector with the correct length and opposite sign (in this case negative)? Motor coordinates are ideal for computing difference vectors because the balance of excitation and inhibition across their agonist-antagonist populations can easily encode a reversal of sign, as in $R_2-R_1<0$.

Retinotopic coordinates are, however, dimensionally inconsistent with motor coordinates. By contrast, target position coordinates are dimensionally consistent with motor coordinates. That is why recoding of retinotopic coordinates into target position coordinates was necessary before the target position coordinates could be recoded into motor coordinates at the HMI.

I.

FORMATION OF AN INVARIANT TARGET POSITION MAP

1. Invariant Self-Regulating Multimodal Maps

The most important property for a target position map (TPM) to possess is that of map invariance; namely, the many-to-one activation of a single spatial locus that corresponds to a prescribed target position, no matter which of the many possible combinations of retinal position and eye position give rise to that target position. In an invariant TPM, after movements of the eye occur with respect to a fixed light source, no change occurs in the spatial locus which the light activates. More generally, if an invariant TPM stores a pattern of n lights, no change occurs in the spatial positions of map activation as the eyes inspect the successive lights. Although the spatial positions of map activation do not change, other more subtle indices may change. For example, habituation may reduce the activation of a traget position if it is stored in the map for a long time. Such an habituated target position could gradually lose its ability to attract an observer's attention.

In a noninvariant TPM, by contrast, a different map position is activated by a fixed light each time the observer moves his eyes. A single light can thereby activate a series of target positions. These target loci cannot habituate as a function of the total time that the light has been stored. Using multiple noninvariant encodings of a single target position in a predictive command network (PCN) could cause serious problems, since the very act of saccading to a target position could activate a new spatial locus corresponding to that target position, as well as new loci corresponding to all the remaining target positions, simply because the eyes moved. These multiple activations and reactivations could cause a breakdown in the temporal order code that was moving the eyes (Section H).

Two designs of an invariant TPM will be discussed. One TPM design depends more heavily on prewired mechanisms. The other design is built up through learning. This latter design has remarkable formal properties. Indeed, it possesses the properties which include map invariance, self-regulation, error tolerance, and multimodal self-consistency. Of special interest is the way in which macroscopic functional properties emerge from the interaction of microscopic cellular processes. Notable among the microscopic processes from which an invariant TPM can be synthesized are chemical transmitter systems that possess autoreceptors. Certain catecholaminergic transmitter systems are well known to possess autoreceptors. However, this is the first time that they have been used to explain such a high-order functional capability as invariant multimodal map formation. We will show how to combine a known transmitter learning equation and transmitter autoreceptor equation into a new self-regulating transmitter learning equation. When this transmitter learning equation is obeyed at all the learning synapses of a properly designed neural circuit, it enables the circuit as a whole to learn an invariant TPM. In particular, the autoreceptive part of the new learning equation enables the circuit as a whole to compensate for variable nubmers of sampling sources without causing any contradictions in the rules which emerge through learning.

2. Prewired Positional Gradients: The Mean Value Property

Several schemes for generating prewired TPMs are known. They are all based on variants of the following simple idea. Consider for the moment one-dimensional maps; for example, maps of target position in a horizontal direction. Imagine that a one-dimensional retinotopic map (RM) and a one-dimensional eye position map (EPM) map topographically onto a one-dimensional TPM, as in FIG. 52. Denote the activated position of the RM by R and the activated position of the EPM by E. Our task is to design an TPM which is maximally excited at a single spatial locus in response to any physical choice of R and E such that $R+E=$constant. Denote the one-dimensional spatial variable fo the TPM by p. We will describe several schemes which imply that the maximally excited spatial locus of the TPM is $$p=\tfrac{1}{2}(R+E); \qquad (10.1)$$

that is the mean value of R and E.

The formal constraints governing schemes of this type are easily described. Their neural instantiation is another matter. For example, suppose that activation of position R in the RM causes a spatially distributed input to the TPM of size.

$$I_R(p)=Ae^{-\mu(R-p)^2} \qquad (10.2)$$

and that activation of positoin E in the EPM causes a spatially distributed input to the TPM of size.

$$I_E(p)=Be^{-\mu(E-p)^2}. \qquad (10.3)$$

In other words, the RM and the EPM cause Gaussianly distributed inputs to the TPM whose maxima occur at positions p=R and p=E, respectively. Such gradients could develop, for example, due to growth of connections from the RM and EPM to the TPM guided by TPM morphogens which undergo significant lateral diffusion within the TPM.

Suppose that the activity pattern caused within the TPM by active R and E loci is given by $$x_1(p) = I_R(p)I_E(p). \tag{10.4}$$

Alternatively, suppose that the TPM activity pattern is defined by $$x_2(p) = I_R(p) + I_E(p). \tag{10.5}$$

In other words, the input patterns generate TPM activation either through a multiplicative (shunting, gating) process, as in (10.4), or through an additive process, as in (10.5). The shunting process is more robust, but both processes work within an achievable parameter range.

In the shunting case, equations (10.2)–(10.4) imply that $$x_1(p) = ABe^{-\mu[(R-p)^2 + (E-p)^2]}. \tag{10.6}$$

The position $p = P_1$ at which $x_1(p)$ is maximum is found by minimizing quantity $$(R-p)^2 + (E-p)^2. \tag{10.7}$$

This minimum occurs at $$P_1 = \tfrac{1}{2}(R+E). \tag{10.8}$$

A similar conclusion holds for the additive gradient $x_2(p)$. An important addition constraint holds in the additive case, however, since a maximum occurs at $$P_2 = \tfrac{1}{2}(R+E) \tag{10.9}$$

only if the positions R and E are not too far apart relative to the decay rate $\mu$ of the Gaussian positional gradients. In particular $y = |R-E|$ must not be larger than the unique positive root of the equation $$2e^{-\frac{\mu}{4}y^2} - e^{-\mu y^2} = 1. \tag{10.10}$$

Thus broad positional gradients are needed to admit a wide range of R and E values. No such quantitative constraints on $\mu$ exist in the shunting case. However, even in the shunting case $\mu$ must be chosen sufficiently small to guarantee physically realizable gradients which cover the entire TPM.

Gaussian gradients are not the only ones that imply the mean value property in (10.8) and (10.9). Exponential gradients $I_R(p) = Ae^{-\mu|R-p|}$ and $I_E(p) = Be^{-\mu|E-p|}$ could, for example, also be used, as could other gradients that decrease with the distance from the inducing input sources R and E.

Invariant target positions can also be derived from two dimensional RMs and EPMs. Then formulas like (10.2) and (10.3) for R(p) and E(p), respectively, generalize to $$I_R(p,q) = (A_1 e^{-\mu(R_1-p)^2}, A_2 e^{-\nu(R_2-q)^2}) \tag{10.11}$$

and $$I_E(p,q) = (B_1 e^{-\mu(E_1-p)^2}, B_2 e^{-\nu(E_2-q)^2}) \tag{10.12}$$

and a formula such as (10.4) for $x_1(p)$ generalizes to $$x_1(p,q) = (A_1 B_1 e^{-\mu[(R_1-p)^2 - (E_1-p)^2]}, A_2 B_2 e^{-\nu[(E_2-q)^2]}).$$

The spatial locus of maximal activity of the activity pattern $x_1(p,q)$ occurs at the position $(P_1, Q_1)$ such that $$P_1 = \tfrac{1}{2}(R_1 + E_1) \tag{10.14}$$

and $$Q_1 = \tfrac{1}{2}(R_2 + E_2). \tag{10.15}$$

In both the one-dimensional and two-dimensional maps, the strongest input constraint is the requirement that eye positions match up, at least approximately, with the corresponding retinal positions. This requirement can be met, for example, by mapping tonic cell output patterns into an EPM using a one-dimensional or three-dimensional position-threshold-slope (PTS) shift map. (Section E.3).

If retinal position and eye position are combined one dimension at a time, then an extra processing stage is needed to combine the one-dimensional maps. This final stage only needs to achieve response selectivity, because invariance is already guaranteed by the one-dimensional maps. Several types of coincidence detectors can achieve the desired selectivity, as can an adaptive filter (Section E).

In all versions of a prewired TPM, the final stage must contrast enhance the final activity pattern in order to convert its diffusely distributed activity into a sharply defined target position. In general, many of the mechanisms that go into the design of prewired TPMs are specilizations of the general spatial mapping mechanisms that were described in Section E.

3. Self-Organizing Target Position Maps: Multimodal Sampling of a Unimodal Eye Position Map In our treatment of invariant TPM self-organization, an RM and an EPM act as sources of conditionable pathways which converge upon another EPM. Denote the sampling EPM by $EPM_1$ and the sampled EPM by $EPM_2$. We will show how cooperative self-organization of the signalling from the RM and the $EPM_1$ convert $EPM_2$ into an invariant TPM. The internal structures of the sampling maps RM and $EPM_1$ do not need to be topographically organized, but $EPM_2$ does have an internal topography. Moreover, the design works given any number of sampling maps, not just two. Any number of modalities can join to learn a globally self-consistent rule at the sampled map using the mechanisms that we will described. We focus on the case of two sampling maps RM and $EPM_1$ because that is our main application.

In accordance with the present invention, the RM and the $EPM_1$ store a retinal position and an initial eye position in short term memory (STM) before a saccade beings. The STM storage persists until after the saccades is over. The accuracy of the saccades progressively improves through time due to learning via second eight error signals (Section B). In other words, the saccades in question are the visually reactive saccades of the retinotopic command network (RCN). The invariant TPM that we will describe is built up on the shoulders of RCN learning.

We will consider a time frame when these RCN-generated saccades are already quite accurate. After such an accurate saccade terminates, a Now Print gate opens, just like in the HMI (Section H), and allows the RM and the $EPM_1$ to sample the activity locus within the $EPM_2$. This $EPM_2$ activity locus encodes the target position because the saccade was accurate. It codes target position invariantly because it is a unimodal code that is directly derived from final eye position, rather than from a multimodal combination of retinal position and initial eye position.

This kind of many-to-one learning will go on until activating positions within the RM and the $EPM_1$ can begin to reliably activate $EPM_2$ positions before a saccade occurs. Once the RM and the $EPM_1$ can reliably activate the $EPM_2$, then the $EPM_2$ will automatically become an invariant TPM.

Then the invariant TPM positions can begin to learn TPM muscle coordinates at the HMI, the HMI vectors can begin to be encoded by an RM, and so on, as in Section C and H. Processing stages that learn temporally stable maps can successively support the formation of further temporally stable maps. Thus, intentional movement controls emerge in a developmental progression.

4. Double Duty by Sampling Maps and their Neural Interpretation

The retinotopic map RM that samples $EPM_2$ has the same properties as the RM which is the basis of retinotopic sampling of the adaptive gain (AG) stage in the RCN (Section B). These two maps are really the same map, and thus thwe RM also controls the direct unconditioned pathway and the indirect conditioned pathway that generate visually reactive saccades. The eye position map $EPM_1$ that samples the $EPM_2$ has the same properties as the EPM that updates eye position signals to the SG within the eye position update network, or EPUN (Section F). These two maps are also a single map. We therefore interpret $EPM_1$ as the movement EPM, or $EPM_M$ that was discussed in Section H.

The sampled map $EPM_2$ becomes an invariant TPM by virtue of the learning rules whereby RM and $EPM_1$ interact with it. The map, $EPM_2$ need not have any internally invariant properties. Any reasonably continuous change of activation locus in $EPM_2$ with final eye position will do. Any of the spatial mapping mechanisms of Section E satisfy this modest formal requirement. Thus invariant TPM emerges from a noninvariant EPM.

5. Associative Learning at Autoreceptive Synaptic Knobs

The learning rule which we will apply joins together two properties of chemical transmitter models (Grossbert, 1981, 1984) into a new self-regulating transmitter learning equation. One property concerns an associative learning rule of the form $$\frac{d}{dt} z_{ij} = \epsilon S_i [-A z_{ij} + B x_j]. \quad (10.16)$$

In (10.16), $z_{ij}$ is interpreted as the production rate of a chemical transmitter in the synapthic knob(s) of pathway (s) $e_{ij}$ from cell (population) $v_i$ to cell (population) $v_j$. This is essentially the same learning rule that we used in (6.19) to learn a spatial map. In (10.16), $S_i$ is a presynaptic sampling signal that travels along pathway $e_{ij}$. If $S_i = 0$, then $(d/dt) z_{ij} = 0$. Hence a presynaphtic signal, rather than the postsynaptic signal of (6.19), turns on the plasticity of this transmitter system. The small parameter $\epsilon$ just says that the learning rate can be chosen to be slow even if $S_i$ can become large.

As in our discussion of associative learning, we also assume that transmitter is released at a rate proportional to $S_i z_{ij}$. This property leads us to consider the second property of chemical transmitter models that we will use. The equation $$\frac{d}{dt} z_{ij} = C(D - z_{ij}) - S_i z_{ij} - E \sum_{k=1}^{n} S_k z_{kj} \quad (10.17)$$

says that, in the absence of any transmitter release (all $S_k + 0$), $z_{ij}$ accumulates to a target level D. This target level is determined by two factors: a constant production rate (term CD) combined with feedback inhibition (term $-C z_{ij}$) of transmitter $z_{ij}$ onto an intermediate stage of transmitter production. When the sampling signal $S_i$ is turned on, transmitter is released at a rate $S_i z_{ij}$, hence the term $-S_i z_{ij}$. The additional term $$-E \sum_{k=1}^{n} S_k z_{kj}$$

says that a fraction of the total transmitter released at cell $v_j$ is reabsorbed by autoreceptors into the synaptic knobs of pathway $e_{ij}$. Once in these knobs, the reabsorbed transmitter inhibits transmitter production via feedback inhibition.

A major effect of autoreceptive inhibition is to normalize the total amount of transmitter impinging upon a postsynaptic cell. To see why this is so, suppose for definiteness that all presynaptic signals $S_i = 1$. Let the total amount of transmitter produced in pathways abutting $v_j$ to be denoted by $$z_j = \sum_{k=1}^{n} z_{kj}$$

Then (10.17) implies that $$\frac{d}{dt} z_j = nCD - C z_j - (1 + nE) z_j. \quad (10.18)$$

At equilibrium $(d/dt) z_j = 0$, so that $$z_j = \frac{nCD}{1 + C + nE}. \quad (10.19)$$

By (10.19), $z_j \leq (CD/E)$ no matter how many pathways impinge upon $v_j$. Thus the total amount of transmitter does not grow with the total number of pathways. This is the normalization, or conservation, property that we seek.

In our present application, this type of normalization helps to achieve self-regulation of the TPM. To see how sparing can occur in system (10.17), suppose that some pathways $p_{ij}$ to $v_j$ are cut. Then feedback inhibition of transmitter production within the remaining pathways is reduced, thereby amplifying their transmitter production levels in a compensatory fashion.

The transmitter learning rule that we will use combines the transmitter laws (10.16) and (10.17) into the single law $$\frac{d}{dt} z_{ij} = eS_i \left[ -Fz_{ij} + Gx_j - H \sum_{k=1}^{n} S_k z_{kj} \right]. \quad (10.20)$$

In (10.20), the constant asymptote D of (10.17) is replaced, due to learning, by a variable asymptote proportional to $x_j$ as in (10.16). This apparently simple change has profound consequences for the course of learning when equation (10.20) holds at all the cells $v_j$ at which learning occurs. Term $-AS_i z_{ij}$ in (10.16) and term $-S_i z_{ij}$ in (10.17) are absorbed into term $-FS_i z_{ij}$ in (10.20). Term $S_i$ in (10.20) also gates the autoreceptive influx $$-H \sum_{k=1}^{n} S_k z_{kj}$$

Although this property is of conceptual interest, it did not substantially influence our simulations due to the slow forgetting rate $-eF$.

Given the learning rule (10.20), all of the desired TPM properties arise through self-organization just so long as combinations of RM and $EPM_1$ positions are allowed to sample the correct target eye positions with $EPM_2$. Thus, individual cells in the $EPM_2$ can receive simultaneous sampling signals from the RM and the $EPM_1$. By equation (10.20), an RM-activated LTM trace and an $EPM_1$-activated LTM trace can influence one another through autoreceptive interactions at the same sampled cell in $EPM_2$. We will now describe how this interaction influences the self-organization process both mathematically and through computer simulation results.

6. Multimodal Learning of Invariant Self-Regulating Spatial Maps

FIG. 53 describes a model in which two fields RM and $EPM_1$ sample spatial patterns of activity across a field $EPM_2$. Field RM contains p cells $v_i^{(1)}$, $i=1, 2, \ldots, p$, and field $EPM_1$ contains q cells $v_j^{(2)}$, $j=1, 2, \ldots, q$. To simplify our graphic displays, we have chosen $EPM_2$ to contain only two cells $V_1$ and $V_2$ although the results go through for any number of cells, as Section I.6 will illustrate. Denote the sampling signals from $v_i^{(1)}$ by $S_i^{(1)}$ and the sampling signal from $v_j^{(2)}$ by $S_j^{(2)}$. The LTM traces from $v_i^{(1)}$ to $V_k$ are denoted by $z_{ik}^{(1)}$, and from $v_j^{(2)}$ to $V_k$ are denoted by $z_{jk}^{(2)}$, $i=1, 2, \ldots, p; j=1, 2, \ldots, q; k=1, 2$. The activities of $V_1$ and $V_2$ are denoted by $x_1$ and $x_2$ respectively. The inputs which activate $V_1$ and $V_2$ are denoted by $I_1$ and $I_2$ respectively. The input pattern $(I_1, I_2)$ represents the target position that is sampled by an appropriate pair $v_i^{(1)}$ and $v_j^{(2)}$ of RM and $EPM_1$ cells respectively. We will show how conjoint sampling by pairs of RM and $EPM_1$ cells leads to learning of this input pattern. Learning is not harmed by increasing the number of cells in RM and $EPM_1$ despite the fact that such an increase in cells also increases the number of cells in $EPM_1$ with which each cell in RM is paired, and conversely. Thus no contradictions in rule learning are generated by adding more cells. This example raises the possibility that RM and $EPM_1$ in vivo may directly learn a pattern of corollary discharges at the HMI rather than an invariant TPM.

The equations governing the model are as follows:

EPM$_2$ ACTIVITIES
Let $$\frac{d}{dt} x_1 = -x_1 + I_1 + z_1, \quad (10.21)$$

where $z_1$ equals the total sampling input from RM and $EPM_1$ to $V_1$ namely $$z_1 = \sum_{i=1}^{p} S_i^{(1)} z_{i1}^{(1)} + \sum_{j=1}^{q} S_j^{(2)} z_{j1}^{(2)}. \quad (10.22)$$

Similarly, let $$\frac{d}{dt} x_2 = -x_2 + I_2 + z_2, \quad (10.23)$$

where $$z_2 = \sum_{i=1}^{p} S_i^{(1)} z_{i2}^{(1)} + \sum_{j=1}^{q} S_j^{(2)} z_{j2}^{(2)}. \quad (10.24)$$

LONG TERM MEMORY TRACES
Let $$\frac{d}{dt} z_{ik}^{(1)} = eS_i^{(1)} [-Fz_{ik}^{(1)} + Gx_k - Hz_k] \quad (10.25)$$

and $$\frac{d}{dt} z_{jk}^{(2)} = eS_j^{(2)} [-Fz_{jk}^{(2)} + Gx_k - Hz_k] \quad (10.26)$$

where $i=1, 2, \ldots, p$; $j=1, 2, \ldots, 1$; and $k=1, 2$.

It remains to specify the rule whereby RM and $EPM_1$ signals can sample a consistent target position pattern across $EPM_2$. On every trial, one population $v_i^{(1)}$ in RM and one population $v_j^{(2)}$ in $EPM_1$ is randomly activated. We let $i=i_n$ be the randomly chosen index in $(1, 2, \ldots, p)$ of an RM cell and $j=j_n$ be the randomly chosen index in $(1, 2, \ldots, q)$ of an $EPM_{1y}$ cell on trial n. In other other words,

SAMPLING $$S_i^{(1)} = \begin{cases} 1 & \text{if } i = i_n \\ 0 & \text{if } i \neq i_n \end{cases} \quad (10.27)$$

and $$S_j^{(2)} = \begin{cases} 1 & \text{if } j = j_n \\ 0 & \text{if } j \neq j_n, \end{cases} \quad (10.28)$$

where $n=1, 2, \ldots, N$ and N is the number of learning trials. The inputs to $V_1$ and $V_2$ on trial n are denoted by $(I_{1n}, I_{2n})$. In order to represent target positions, the inputs are chosen to be a function of $i_n+j_n$. For definiteness we consider the following function.

INPUTS
$$I_{1n}+I_{2n}=K \quad (10.29)$$

and $$I_{2n}=L(i_n+j_n), \quad (10.30)$$

where K and L are positive constants. In other words, both $I_{1n}$ and $I_{2n}$ are linear functions of the total sampling index $i_n+j_n$ and $I_{2n}$ increases as $I_{1n}$ decreases.

Figure 54A:
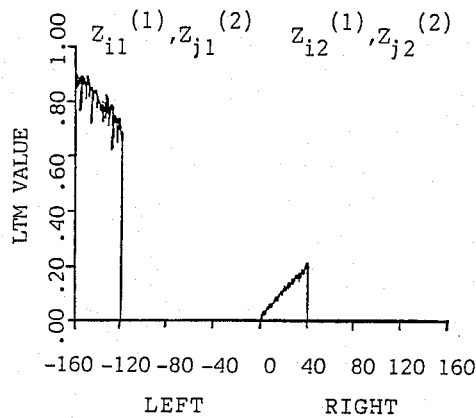
Figure 54B:
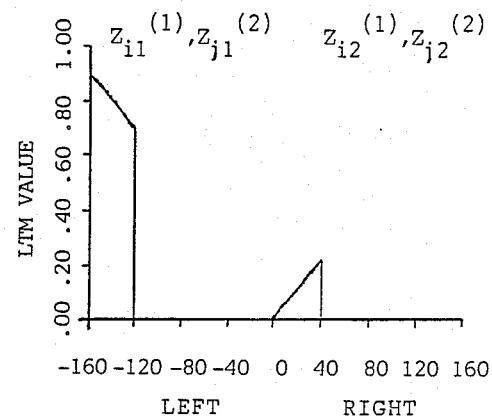
Figure 54C:
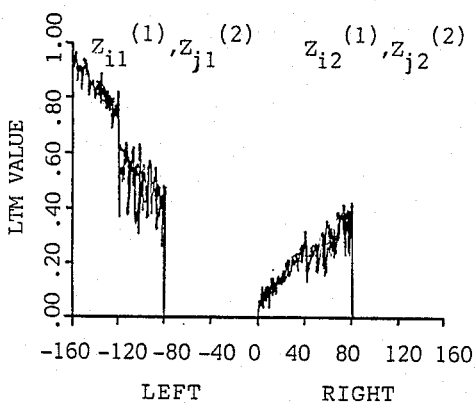
Figure 54D:
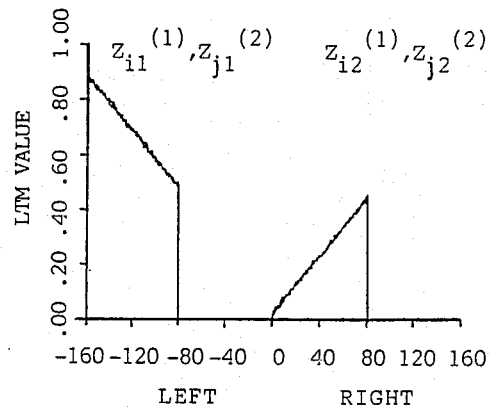

FIGS. 54a–54f describes how the LTM traces from RM and $EPM_1$ to $EPM_2$ build up as a function of how many cells in RM and EPM$_1$ are allowed to sample EPM$_2$. Each figure represents a superposition of RM and EPM$_1$ LTM values. In FIG. 54b only 40 cells in RM and EPM$_1$ sample EPM$_2$. In FIG. 54d, the number of sampling cells in each field is increased to 80, and in FIG. 54f to 160. Notice that increasing the number of cells, and hence the number of sampling combinations, in going from FIG. 54b to 54d to 54f has no significant effect on the LTM values of the previous maps. In other words, the learning process is self-regulatory.

Figure 54E:
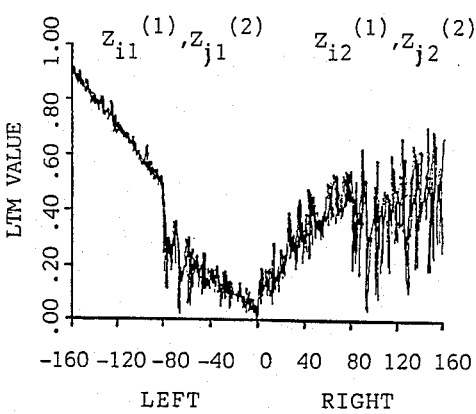
Figure 54F:
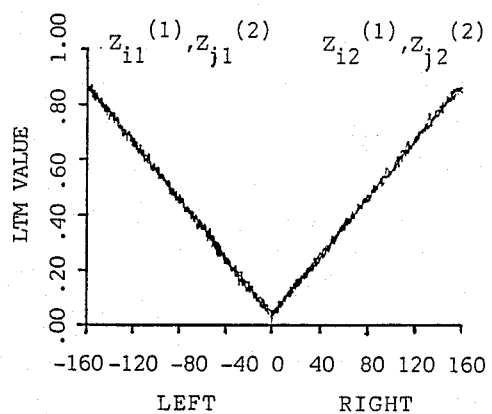

FIGS. 54b, d, and f illustrate the final, or asymptotic, LTM values that are obtained after many learning trials. FIGS. 54a, c, and e illustrate intermediate stages of learning. FIG. 53a describes an intermediate LTM pattern prior to the final LTM pattern in FIG. 54b. Using the pattern of final LTM values in FIG. 54b as initial LTM values, an expanded field of sampling inputs then began to learn. FIG. 54c shows a learning stage intermediate between FIG. 54b and 54d. Then the field of sampling inputs was expanded again. FIG. 54e shows a learning stage intermediate between FIGS. 54d and 54f. One can clearly see how new parts of the LTM maps build up in FIGS. 54a, c, and f.

We now quantify how well the map learning process in FIG. 54 satisfies the properties of map invariance and self-regulation. Let m equal the number of sampling cells in each of the maps RM and EPM$_1$. In the following simulations, we chose m=40, 80, and 160. In order to assess map invariance, we first define the mean values of all the LTM traces which about each sampled cell in EPM$_2$. We compare these mean values with the sampled input patterns and with each LTM combination that corresponds to the same target position.

Thus, we let $$M_{k1}^{(m)} = \frac{1}{c(k)} \sum_{i-j=k} (z_{il}^{(1)} + z_{jl}^{(2)}) \qquad (10.31)$$

and $$M_{k2}^{(m)} = \frac{1}{c(k)} \sum_{i+j=k} (z_{i2}^{(1)} + z_{j2}^{(2)}). \qquad (10.32)$$

where c(k) is the number of combinations of i and j such that $i+j=k$. In particular, $$c(k) = \begin{cases} k-1 & \text{if } k = 2,3,\ldots,m \\ 2m-k+1 & \text{if } k = m+1, m+2 \ldots, 2m. \end{cases} \qquad (10.33)$$

Each summand in (10.31) equals the total LTM trace $z_{i1}^{(1)} + z_{j1}^{(2)}$ from $v_i^{(1)}$ in RM and $v_j^{(2)}$ in EPM$_1$ such that $i+j=k$. If RM and EPM$_1$ can cooperate to learn the EPM$_2$ patterns, then after sufficiently many learning trials, each summand $z_{i1}^{(1)} + z_{j1}^{(2)}$ in (10.31) should approximate $I_1 = K - L(i+j)$, by (10.29) and (10.30), and each summand $x_{i2}^{(1)} = k$. Consequently, the following standard deviations should be small.

INVARIANT MAP
Let $$U_k^{(m)} = \left[ \sum_{i-j=k} [(z_{i1}^{(1)} + z_{j1}^{(2)} - M_{k1}^{(m)})^2 + (z_{i2}^{(1)} + z_{j2}^{(2)} - M_{k2}^{(m)})^2] \right]^{\frac{1}{2}} \qquad (10.34)$$

and $$V_k^{(m)} = \left[ \left( \frac{M_{k1}^{(m)}}{M_k^{(m)}} - \frac{K-Lk}{K} \right)^2 + \left( \frac{M_{k2}^{(m)}}{M_k^{(m)}} - L\frac{k}{K} \right)^2 \right]^{\frac{1}{2}} \qquad (10.35)$$

where $$M_k^{(m)} = M_{k1}^{(m)} + M_{k2}^{(m)}. \qquad (10.36)$$

FIGS. 55a-55c and 56a-56c show that both standard deviations are small for each choice of m=40, 80, 160 and all k within the chosen range. The standard deviations $U_k^{(m)}$ in (10.34) show that each combination of retinal position and eye position comes close to the mean value corresponding to the target position. This measure shows that the map exhibits invariance, but it does not show that this invariant map actually learns the input pattern. The standard deviations $V_k^{(m)}$ in (10.35) show that the mean values corresponding to different target positions to learn the input patterns which they sample, up to a scaling factor.

To establish map self-regulation, we must show that the LTM maps are insensitive to the size m of the sampling sets in RM and EPM$_1$. Our computer simulations using the followng standard deviations establish this property.

SELF REGULATING MAP
The numbers $$W_k^{(M,m)} = [(M_{k1}^{(M)} - M_{k1}^{(m)})^2 + (M_{k2}^{(M)} - M_{k2}^{(m)})^2]^{\frac{1}{2}} \qquad (10.37)$$

should be small for every pair of sampling set sizes m and M such that M m and $k=2, 3, \ldots, 2m$. In FIGS. 56a-56c we plot $W_k^{(M,m)}$ where m=40 and M=80 or 160. The small values of $W_k^{(M,m)}$ demonstrate map self-regulation.

FIG. 57 illustrates that the map learning process is just as effective if the initial LTM values are randomly chosen numbers between 0 and 1, rather than the zero initial LTM values of FIG. 53a. Again similar LTM maps emerge. These figures thus show the stability with which the LTM traces form invariant self-regulating asymptotic LTM patterns.

The numerical parameters used to generate FIGS. 53-57 are listed below for completeness. The learning rate parameter e in (10.25) and (10.26) was chosen so small that the potentials $x_1$ and $x_2$ in (10.21) and (10.23) were always in an approximate equilibrium with respect to the inputs and LTM traces. Hence we set $(d/dt)x_1 = (d/dt)x_2 = 0$ and substituted the equations $$x_1 = I_1 + z_1 \qquad (10.38)$$

and $$x_2 = I_2 + z_2 \qquad (10.39)$$

into the LTM equations (10.25) and (10.26). In these LTM equations we chose $$F = 0.2, \qquad (10.40)$$

$$G = 1, \qquad (10.41)$$

$$H = 2, \qquad (10.42)$$

We also chose $$p = q = 160 \tag{10.43}$$

as the total number of sampling cells in RM and in $EPM_1$. In the input functions (10.29) and (10.30), we let $$L = \frac{2}{p+q} = \frac{1}{160} \tag{10.44}$$

and $$M = 2(1 + L) = \frac{161}{80} \tag{10.45}$$

Consequently input $I_1$ in (10.29) varied from 1/160 to 2 and input $I_2$ in (10.30) varied from 2 to 1/160 across learning trials. The total number of learning trials used in FIGS. 54a–54f was $5(10)^5$, divided among the $(160)^2$ possible combinations of randomly chosen sampling pairs. For initial conditions, we chose $x_1(0) = x_2(0) = 0$. We also chose all initial LTM traces equal to zero (FIGS. 54a–54f) or equal to randomly chosen numbers between 0 and 1 (FIG. 58)

7. Multimodal Learning of an Invariant Self-Regulating Target Position Map

In order to study formation of a topographic TPM, we replaced the two population $EPM_2$ of the preceding example with a multicellular $EPM_2$ network. In order to achieve manageable computation times, we let RM, $EPM_1$ and $EPM_2$ each have 40 cells, or cell populations. The activity of the kth cell in $EPM_2$ was defined by $$\frac{d}{dt} x_k = -x_k + I_k + z_k. \tag{10.46}$$

$k = 1, 2, \ldots, r$, where $$z_k = \sum_{i=1}^{p} S_i^{(1)} z_{ik}^{(1)} + \sum_{j=1}^{q} S_j^{(2)} z_{jk}^{(2)}. \tag{10.47}$$

The LTM equations for $z_{ik}^{(1)}$ and $z_{jk}^{(2)}$ are the same as in (10.25) and (10.26) with the addition that $i = 1, 2, \ldots, p$, $j = 1, 2, \ldots, \Gamma$, and $k = 1, 2, \ldots, r$. In our simulations, $p = q = r = 40$. The main difference between this example and the previous one is that here the $EPM_2$ represented target eye positions by spatially focused peaks. To represent this spatial map, we defined $i_n$ and $j_n$ as before, let $$k_n = \left[ \left| \frac{(i_n + j_n)r}{p+q} \right| \right] \tag{10.48}$$

and chose the input to cell $v_k$ in $EPM_2$ on trial n to equal $$I_{kn} = e^{\frac{-(k-k_n)^2}{\lambda}}, \tag{10.49}$$

where $[|w|]$ denotes the largest integer less than or equal to w. Equation (10.49) says that the maximal activation of $EPM_2$ on trial n occurs at position $k = k_n$. Other activations of $EPM_2$ on trial n are Gaussianly distributed around position $k = k_n$. Position $k_n$ represents the target position attained by the nth saccade. In (10.48), we scaled $k_n$ using the factor $r(p+q)^{-1}$ to keep it between 1 and the number of cells r within the $EPM_2$ FIG. 10.8 plots the LTM surfaces generated by this learning model. As before, invariant map learning was excellent. We quantified how well in invariant map was learned as follows. After the $5(10)^5$ learning trials were over, we fixed the LTM values. We then randomly chose 10,000 combinations of cells in the RM, the $EPM_1$ and the $EPM_2$. As before, we let $i = i_n$ be the index of the RM population and $j = j_n$ be the index of the $EPM_1$ population on the nth choice. In addition, we let $k = m_n$ be the index of the $EPM_2$ population on the nth choice. In terms of these choices, we compared the relative sizes of LTM traces and inputs on the nth random choice using the function $$Y_n = \left| \frac{z_{i_n m n}^{(1)} + z_{i_n m n}^{(2)}}{Z^{(n)}} - \frac{I_{mnn}}{I^{(n)}} \right|, \tag{10.50}$$

where $$Z^{(n)} = \sum_{k=1}^{40} (z_{ink}^{(1)} + z_{jnk}^{(2)}), \tag{10.51}$$

$$I^{(n)} = \sum_{k=1}^{40} I_{mnk}. \tag{10.52}$$

$$I_{mnk} = e^{\frac{-(mn-kn)^2}{\lambda}}. \tag{10.53}$$

and $k_n$ is defined in terms of $i_n$ and $j_n$ by (10.48). Then we computed the average size of the values $Y_n$ in terms of the function $$Y = \frac{1}{10,000} \sum_{n=1}^{10,000} Y_n. \tag{10.54}$$

In our simulations, $Y = 0.0515$. Since the LTM traces and inputs varied between 0 and 1, this error represents excellent learning of the invariant map.

8. Associative Pattern Learning

Some mathematical insight can be gleaned into how multimodal map learning occurs by noticing that system (10.21)–(10.26) has the properties of a completely non-recurrent associative learning network. The stable pattern learning properties of these networks also hold in the present case. These properties enable one to understand how the correct relative LTM pattern values are learned by each sampling cell. The correct self-regulating absolute LTM values are learned due to the action of the autoreceptors.

In order to clarify these associative learning properties, we define two types of variable.

TOTAL ACTIVITY VARIABLES
Let $$I = I_1 + I_2, \tag{10.55}$$

$$x = x_1 + x_2, \tag{10.56}$$

$$z_{ij1} = z_{i1}^{(1)} + z_{j1}^{(2)}, \tag{10.57}$$

$$z_{ij2} = z_{i2}^{(1)} + z_{j2}^{(2)}, \tag{10.58}$$

and $$z_{ij} = z_{ij1} + z_{ij2}. \tag{10.59}$$

RELATIVE ACTIVITY VARIABLES
Let $$\theta_1 = \frac{I_1}{I}, \tag{10.60}$$

$$\theta_2 = \frac{I_2}{I}, \tag{10.61}$$

$$X_1 = \frac{x_1}{x}, \tag{10.62}$$

$$X_2 = \frac{x_2}{x}, \tag{10.63}$$

$$Z_{ij1} = \frac{z_{ij1}}{z_{ij}}. \tag{10.64}$$

and $$Z_{ij2} = \frac{z_{ij2}}{z_{ij}}. \tag{10.65}$$

our goal is to indicate how relative pattern learning occurs. On a trial when $v_i^{(1)}$ is active in RM and $v_j^{(2)}$ is active in EPM$_1$, the relative LTM traces $Z_{ij1}$ and $Z_{ij2}$ in (10.64) and (10.65) measure how well RM and EPM$_1$ have cooperated to learn the relative inputs $\theta_1$ and $\theta_2$ in (10.60) and (10.61). We will show that the relative LTM pattern ($Z_{ij1}, Z_{ij2}$) is attracted to the relative input pattern ($\theta$hd 1, $\theta_2$) via the relative STM pattern of ($X_1, X_2$) of (10.62) and (10.63).

On a learning trial when $v_i^{(1)}$ and $v_j^{(2)}$ are active, $z_1$ in (10.22) and $z_2$ in (10.24) reduce to $$z_1 = z_{ij1} \tag{10.66}$$

and $$z_2 = z_{ij2} \tag{10.67}$$

where $z_{ij1}$ and $z_{ij2}$ are defined in (10.57) and (10.58), respectively. Consequently, (10.21) and (10.23) reduce to $$\frac{d}{dt} x_1 = -x_1 + I_1 + z_{ij1} \tag{10.68}$$

and $$\frac{d}{dt} x_2 = -x_2 + I_2 + z_{ij2} \tag{10.69}$$

Adding (10.68) and (10.69) implies that $$\frac{d}{dt} x = -x + I + z_{ij} \tag{10.70}$$

For similar reasons on such a learning trial, addition of (10.25) and (10.26) implies that $$\frac{d}{dt} z_{ij1} = \epsilon[-(F + 2H)z_{ij1} + 2Gx_1] \tag{10.71}$$

and $$\frac{d}{dt} z_{ij2} = \epsilon[-(F + 2H)z_{ij2} + 2Gx_2] \tag{10.72}$$

from which it follows by a further addition of (10.71) and (10.72) that $$\frac{d}{dt} z_{ij} = \epsilon[-(F + 2H)z_{ij} + 2Gx] \tag{10.73}$$

We use these equations to derive equations for the relative STM and LTM traces. The basic tool is the elementary formula for the derivative of a ratio: which we apply to the ratios $$X_1 = \frac{x_1}{x}, \quad X_2 = \frac{x_2}{x}, \quad Z_{ij1} = \frac{z_{ij1}}{z_{ij}}, \text{ and } z_{ij2} = \frac{z_{ij2}}{z_{ij}}. \tag{10.74}$$

We find the familiar pattern learning equations $$\frac{d}{dt} X_k = P_{ijk}(Z_{ijk} - X_k) + Q_k(\theta_k - X_k) \tag{10.75}$$

and $$\frac{d}{dt} Z_{ijk} = R_{ijk}(X_k - Z_{ijk}), \tag{10.76}$$

k=1, 2, where the coefficients are the nonnegative functions $$P_{ijk} = \frac{z_{ij}}{x_k}, \tag{10.77}$$

$$Q_k = \frac{I}{x_k}, \tag{10.78}$$

and $$R_{ijk} = \frac{2\epsilon G x}{z_{ijk}}. \tag{10.79}$$

Term $Q_k(\theta_k - X_k)$ in (10.75) describes read-in of the input pattern $\theta_k$ into STM $X_k$. This term causes $X_k$ to approach $_k$. Term $P_{ijk}(Z_{ijk} - X_k)$ describes read-out of LTM into STM. It causes $X_k$ to approach $Z_{ijk}$. Thus the relative STM trace $X_k$ is turn between the tendency to represent new, as yet unlearned, patterns $\theta_k$ and to read-out old remembered patterns $Z_{ijk}$. Term $R_{ijk}(X_k - Z_{ijk})$ in (10.76), on the other hand, described read-in of STM into LTM. This term causes $Z_{ijk}$ to approach $X_k$. In all, the STM and LTM patterns mutually attract each other, while the STM pattern is attracted to the input pattern:

$$Z_{ijk} \leftarrow X_k \rightarrow \theta_k. \tag{10.80}$$

The net effect of these attractive tendencies is that the LTM pattern is atracted towards the input pattern:

$$Z_{ijk} \rightarrow \theta_k. \tag{10.81}$$

This is true given any fixed but random choice of i and j through time. The simulations demonstrate that, in response to a randomly chosen sequence of (i,j) pairs through time, these learning tendencies fit together to synthesize a globally consistent, invariant, self-regulating TPM.

The role of autoreceptors in enabling the network to self-regulate is indicated by an examination of the LTM traces of equation (10.25) at equilibrium. At equilibrium, $(d/dt)x_1 = 0$. Then (10.21) becomes $$x_1 = I_1 + z_1 \tag{10.82}$$

Consider $z_{i1}^{(1)}$ in (10.25) by letting $k=1$. If we substitute for $x_1$ in this equation, we get $$\frac{d}{dt} z_{i1}^{(1)} = \epsilon S_i^{(1)} [-F z_{i1}^{(1)} + G(I_1 + z_1) - H z_1]. \quad (10.83)$$

At equilibrium, $(d/dt)z_{i1}^{(1)} = 0$, which by (10.83) implies that $$F z_{i1}^{(1)} + (H - G)z_1 = G I_1 \quad (10.84)$$

We assume that the LTM decay rate F is very small. Then (10.84) implies that $$z_1 \simeq \frac{G}{H - G} I_1 \quad (10.85)$$

Thus the relative size of H to G determines the scaling factor that converts inputs into LTM values. This scaling factor does not influence the goodness-of-fit measured by $V_k^{(m)}$ in (10.35).

On the nth learning trial, $z_1 = Z_{jn1}^{(1)} + z_{jn2}^{(2)}$ due to equations (10.27) and (20.28). Thus, for all large choices of n, when the network is close to equilibrium, (10.85) implies $$z_{in1}^{(1)} + z_{jn2}^{(2)} \simeq \frac{G}{H - G} I_1. \quad (10.86)$$

Given that the network can approach an approximate equilibrium as n becomes sufficiently large, equation (10.86) has the following implications. First, it implies that $H > G$. Computer simulations show that system variables can diverge if H-G becomes too small. Second, equation (10.86) shows that the equilibrium value of each LTM trace $z_{i1}^{(1)}$ depends upon the equilibrium values of all LTM traces $z_{j2}^{(2)}$ with which it is paried. In particular, each $z_{i1}^{(1)}$ adjusts its equilibrium value to compensate for the addition or deletion of LTM values $z_{j2}^{(2)}$, as in FIG. 53. Thus equation (10.86) describes a sharing of adaptive load quite different from that described in Section B. The present type of load sharing is the property of self-regulation that we seek.

J.

VISUALLY REACTIVE, MULTIMODAL, INTENTIONAL, AND PREDICTIVE MOVEMENTS: A SYNTHESIS

1. Avoiding Infinite Regress: Planned Movements Share Reactive Movement Parameter In this section, we tie together the design principles and mechanisms which we have introduced in the preceding sections. This synthesis quantifies a developmental sequence in which obligatory saccadic reactions to flashing or moving lights on the retina are supplemented by attentionally mediated movements towards motivationally interesting or intermodal sensory cues. These movements are supplemented once again by predictive saccades which form part of planned sequences of complex movement synergies that can totally ignore the sensory substrate on which they are built.

The analysis of such a complex system would be hopeless in the absence of sufficient design constraints. The previous sections illustrate our contention that development and learning is essential to discover sufficiently many constraints. This section continues the discussion for disclosing a small number of closely related global network designs that are capable of simultaneously satisfying all of the constraints.

The primacy of learning constraints is perhaps most urgently felt when one squarely faces the problem of infinite regress. A discussion of how the problem of infinite regress may be solved shows how to hierarchically organize motor learning circuits so that each circuit can benefit from and build upon the learning of a more primitive learning circuit. This hierarchical organization of learning problems can be profitably compared to the hierarchical organization whereby simple motor synergies in the spinal cord can be temporally organized by descending cortical commands.

The need to solve the problem of infinite regress is evident in our method of calibrating a target position command in muscle coordinates at the head-muscle interface, or HMI (Section C). We have stated that an active target position map (TPM) population will sample whatever eye position corollary discharges are read-into the HMI after the eye comes to rest. These eye position signals may or may not correspond to the target position that is active within the TPM. The TPM will eventually sample the correct eye position only if an independent learning mechanism enables the eye to accurately foveate retinal lights.

We have also stated that this independent learning mechanism forms part of the RCN, or retinotopic command network (Section B), whereas the HMI forms part of the VCN, or vector command network (Section C). This section is to complete our discussion of the itneractions that occur between these two typs of networks.

2. Learning and Competition from a Vector-Based Map to a Light-Based Map

The motion-sensitive system uses second light error signals to improve its foveating capability (Section B). The HMI uses the learned accuracy of the motion-sensitive saccades in order to compute accurate difference vectors in muscle coordinates, which can then be transformed into a retinotopic map, or RM (Section E). It remains to show how much an RM can generate accurate saccadic movements. Two main possibilities exist, and we suggest that both may be used in vivo. In one possibility, the RM learns to read-out commands to the saccade generator (SG) using the output pathways of the motion-sensitive RCN system. It is preferred that this pathway is used by attentionally modulated commands from the parietal cortex. In the other possibility, the RM controls its own output pathways through which it learns its own correct movement parameters. Preferably, this pathway is used by predictive commands from the frontal eye fields (FEF). Each possibility implies a distinct constellation of functional and structural properties which can be empirically tested.

First we describe how an RM in the VCN can learn to activate the RCN output pathways, and to thereby generate accurate saccades using the adaptive gains which had previously been learned within the RCN. This discussion resolves the following paradox: How does the VCN both learn from and inhibit the RCN? In order for the RM to become associated with the correct RCN output pathways, these pathways must be excited during the learning phase. In order for VCN commands to supplant RCN compounds, the RN must be able to inhibit RCN output pathways during later performance trials. How can excitation during learning give rise to inhibition during performance?

The sampled RCN output pathways also form an RM. Thus the learning of an RM→RM associative transform must be discussed to avoid notational confusion, we denote the RM within the VCN by $RM_V$ and the RM within the RCN by $RM_R$.

Before learning occurs, each $RM_V$ population gives rise to conditionable pathways which are distributed nonspecifically across the $RM_R$, because it is not known a priori which $RM_R$ population will be associated with which $RM_V$ population. The LTM traces in these pathways are initially small. While the RCN is still learning how to make accurate saccades, the LTM traces within the $RM_V \rightarrow RM_R$ conditionable pathways remain broadly distributed and small, because each $RM_V$ population can become associated with many different $RM_R$ populations. Several reasons for this exist. Until accurate saccades persistently occur, the TPM cannot form with precision (Section I) because each fixed combination of retinal position and initial eye position can sample a different final position whenever a foveation error occurs. Each TPM population can, in turn, sample many corollary discharge patterns at the HMI due to foveation errors. Thus, across learning trials, each fixed combination of TPM and corollary discharge inputs to the HMI can activate many different vectors these and by extension, many different $RM_V$ populations. Thus each $RM_V$ population can sample many different $RM_R$ populations until learning within the RCN stabilizes. Consequently the $RM_V \rightarrow RM_R$ associative transform will remain broadly distributed and weak until the RCN becomes capable of reliably generating correct foveations.

Competitive interactions are preferred to occur amoung the $RM_R$ populations in order to chose a winning population for storage in short term memory (STM). Such a population's activity must be stored in STM until after the saccade terminates, so that it can sample any second light error signals that may then be registered (Section A). During the learning trials when foveation errors still regularly occur within the RCN, the $RM_V \rightarrow RM_R$ signals, being weak, lose the competition for STM storage to the first light-activated movement signals. The $RM_V$ consequently does not interfere with the initial stages of learning within the RCN.

By contrast, after the RCN becomes capable of generating correct foveations, the LTM traces of each $RM_V$ population begin to sample the same $RM_R$ population on all future learning trials, while the LTM traces of other, less favored, pathways become weak. The $RM_V \rightarrow RM_R$ associative map thereby becomes more topographic as some of its LTM traces become large due to the cumulative effects of consistent learning on successive saccadic trials. After the LTM traces become sufficiently large, a conditioned signal from $RM_V$ to $RM_R$ can successfully complete with a first light-activated movement signal within the RCN. When this happens, attentionally amplified VCN commands can take precedence over motion-sensitive RNC commands.

In order for this scheme to work the $RM_R$ must occur at a stage that is prior to the RCN's error signal pathway to the adaptive gain (AG) stage, or cerebellum (Section B). Then the $RM_V \rightarrow RM_R \rightarrow AG \rightarrow SG$ pathway can use the cerebellar gain that was previously learned in response to second light error signals of RNC vintage (FIG. 59).

This example shows in several ways how a suitably designed network hierarchy can avoid infinite regress by exploiting previously learned movement parameters. The RCN helps the VCN to learn its TPM, to calibrate its HMI, and to sample accurately calibrated movement commands using its AG stage adaptive gains.

3. Associative Pattern Learning and Competitive Choice: Non-Hebbian Learning Rule This section mathematically demonstrates the properties which were explained within the previous section. Suppose that a network $F^{(1)}$ sends broadly distributed conditionable pathways to a disjoint network $F^{(2)}$. We have in mind, of course, the special case in which $F^{(1)} = RM_V$ and $F^{(2)} = RM_R$, but our discussion is more general. Denote the cells of $F^{(1)}$ by $v_j^{(1)}$ and the cells of $F^{(2)}$ by $v_i^{(2)}$. The cells $F^{(1)} = v_j^{(1)}$ are generically called sampling cells and the cells $F^{(2)} = (v_i^{(1)})$ are generally called sampled cells.

For simplicity, let each cell population $v_j^{(1)}$ emit the sampling signal $S_j$ within the axons $e_{ji}$ from $v_j^{(1)}$ to all cells $v_i^{(2)}$ in $F^{(2)}$. Let a long term memory (LTM) trace $z_{ji}$ be computed at the synaptic knobs of each pathway $e_{ji}$. Suppose that $z_{ji}$ computes a time-average of the signal $S_j$ times the postsynaptic potential $x_i^{(2)}$ of $v_i^{(2)}$. It has been proved under general mathematical conditions, that the pattern of LTM traces $(z_{j1}, z_{j2}, \ldots, z_{jn})$ learns a weighted average of the STM patterns $(x_1^{(2)}, x_2^{(2)}, \ldots, x_n^{(n)})$ that occur across $F^{(2)}$ while $S_j$ is active. This is the same theorem about associative pattern learning that we used to clarify the learning of an invariant TPM in Section I. In the present example, a different version of the same learning laws shows how a topographic associative map can be learned.

To see how this can happen, suppose for definiteness that $F^{(2)}$ chooses at most one activity $x_i^{(2)}$ for storage in STM at any given time, as in Section A.6. Suppose that the population $v_{ij}^{(2)}$ with $= i_j$ in $F^{(2)}$ is stored in STM at times when population $v_j^{(1)}$ is active in $F^{(1)}$. Since $S_j$ is active during time intervals when the particular STM trace $x_{ij}^{(2)}$ is chosen for STM storage, the relative LTM trace $$z_{jij} \left( \sum_{k=1}^{n} z_{jk} \right)^{-1}$$

monotonically approaches 1 as learning proceeds. In other words, only the LTM trace $z_{jij}$ becomes large as all the other traces $z_{j1}, z_{j2} \ldots z_{jn}$ become small. This is a non-Hebbian form of learning, because both conditioned increases and conditioned decreases in LTM traces $z_{ij}$ can occur due to pairing $S_j$ and $X_i^{(2)}$. A simple learning equation with this property is $$\frac{d}{dt} z_{ji} = \epsilon S_j (-z_{ji} + x_i^{(2)}). \tag{11.1}$$

Performance of the learned pattern of LTM traces occurs as follows. Suppose that the signal that reached each population $v_i^{(2)}$ from $v_j^{(1)}$ equals $S_j z_{ji}$. In other words, $S_j$ is multiplicatively gated by the LTM trace $z_{ji}$ before the grated signal $S_j z_{ji}$ perturbs $v_i^{(2)}$. Since only $z_{ji}$ among all the LTM traces $z_{j1}, z_{j2}, \ldots, z_{jn}$ is large, the only large gated signal is $S_j z_{jij}$. Consequently, only $v_{ij}^{(2)}$ is significantly activated by $v_j^{(1)}$.

To illustrate how all the inputs to $F^{(2)}$ influence its dynamics through time, let us approximate the choice-making behavior of $F^{(2)}$ by an algebraic rule. This is permissible in the present case because the LTM traces, which are the variable of primary interest, fluctuate through time much more slowly than the STM traces $x_i^{(2)}$ or their inputs $I_i$. Thus, let $$J_i = I_i + \sum_{j=1}^{m} S_j z_{ji} \qquad (11.2)$$

equal the total input to $v_i^{(2)}$ at any time where $I_i$ is a light-induced motion-sensitive input and $$\sum_{j=1}^{m} S_j z_{ji}$$

is the total conditioned input from $F^{(1)}$. Also let $$x_i^{(2)} = \begin{cases} 1 \text{ if } J_i > \max\{\delta, J_k : k \neq i\} \\ 0 \text{ otherwise} \end{cases} \qquad (11.3)$$

be the rule whereby $F^{(2)}$ activities are chosen and stored in STM. In (11.3) parameter $\gamma > 0$ estimates the quenching threshold (QT) of $F^{(2)}$ (Section A.6). By (11.3), $v_i^{(2)}$ is chosen and stored with the normalized activity 1 if its input exceeds the QT and is the largest total input received by $F^{(2)}$. Equation (11.3) approximates a network with broad lateral inhibitory interactions and signal functions selected to make a global choice (Section A.6).

Before learning occur, all the LTM traces are small and uniformly distributed across $F^{(2)}$. Consequently the maximal $J_i$ is determined by the maximal $I_i$. The choice behavior of $F^{(2)}$ is then controlled by the motion-sensitive inputs $I_i$ as in Section B. Suppose that at most one signal $S_j$ is large at any time (because only one $RM_V$ population is activated by the HMI at any time). Also suppose, as above, that activity in $v_{ij}^{(2)}$ is paired with activity in $v_j^{(1)}$, so that only $z_{jij}$ becomes large due to associative learning. In particular, equation (11.1) implies that $z_{jij}$ approaches 1 as a result of learning and all $z_{ji}$ approach zero. $i \neq i_j$. These conclusions follow from the conjoint action of several properties. For one, $S_j = 0$ implies that $(d/dt) z_{ji} = 0$; no learning occurs unless the sampling signal $S_j$ is active. If $S_j > 0$ when $x_{ij} = 1$, then (11.1) implies that $z_{ij}$ approaches 1. If $S_j 0$ when $x_i = 0$, $i \neq i_j$ then (11.1) implies that all $z_{ji}$ approach zero, $i \neq i_j$.

Suppose, moreover, that each $S_j$ becomes larger than the maximal posible input size $I_j$ whenever $S_j$ is positive. The size of $S_j$ may, in particular, be amplified by attentional gain control or by incentive motivation signals (Section A.6). After learning occurs, consider a performance trial during which the sampling signal $S_j$ is on while a motion-sensitive input $I_i$ is on in a different $F^{(2)}$ channel ($i \neq i_j$). Because $z_{jij} \cong 1$ and all $z_{ji} \cong 0$, $i \neq i_j$, it follows by (11.2) that $$J_{ij} \cong S_j z_{jij} \cong S_j \qquad (11.4)$$

and that $$J_i \cong I_i, i \neq i_j \text{ tm } (11.5)$$

Consequently, $$J_{ij} > J_i, i \neq i_j \qquad (11.6)$$

By (11.3) it follows that $$x_{ij} - 1 \qquad (11.7)$$

whereas all $$x_i = 0, i \neq i_j \qquad (11.8)$$

In other words, after learning occurs, the VCN-activated populatioin $v_{ij}^{(2)}$ wins the STM competition over the RCN-activated population $v_j^{(2)}$ despite the fact that $v_i^{(2)}$ wins the STM competition over $v_{ij}^{(2)}$ before learning occurs.

By winning the STM competition, population $v_{ij}$ also stabilizes the memory within its LTM trace $z_{jij}$. This property also follows from the learning equation (11.1). When $S_j = 0$, it follows that $(d/dt) z_{ji} = 0$, so that no learning or forgetting occurs unless the sampling signal $S_j$ is active. Suppose that when $S_j = 0$, $z_{jij}$, starts out equal to 1 due to prior learning. If $z_{jij}$ can cause $x_{ij}^{(2)}$ to quickly win the STM competition, then also $x_{ij}^{(2)} = 1$ at these times. By (11.1) even if $S_j > 0$.

$$\frac{d}{dt} z_{jij} = S_j(-1 + 1) = 0. \qquad (11.9)$$

Consequently, once LTM trace $z_{jij}$ learns the value 1, it reinforces its memory of this value during subsequent performance. Note, however, that the LTM trace has not lost its plasticity. It is in a dynamical equilibrium with the STM activation that it causes.

In summary, after learning of the associative transform $F^{(1)} \to F^{(2)}$ occurs, $F^{(1)}$ can control STM decisions within $F^{(2)}$, even though $F^{(1)}$ had no influence over these STM decisions before learning occurred. Moreover, $F^{(1)}$ can maintain its control in a stable fashion due to the feedbck exchange between STM and LTM that occurs in equations (11.1) and (11.3).

This model describes a critical period that ends when its LTM traces achieve a dynamical equilibrium with its STM traces. In the absence of further learning-contingent structural changes within the network, such a model predicts that new learning can occur if the correlations between sampling populations $v_j^{(1)}$ and sampled populations $v_i^{(2)}$ are systematically changed using artificially large inputs $I_i$, despite the absence of any apparent plasticity before such a change takes place.

4. Light Intensity, Motion, Attentional and Multimodal Interactions within the Parietal Cortex The previous two sections have shown how the VCN can feed into the RCN. We begin by noting that the RCN can also feed into the VCN, as in FIG. 59. Indeed, when the target position map (TPM) of the VCN is trying to gain control over $RM_R$, it does so by correlating the same retinotopic position within the $RM_V$ and the $RM_R$. In other words, from an early stage of development, the TPM, no less than the $RM_R$, is also sensitive to light-induced intensity and motion changes on the retina. The RM that feeds into the TPM, which is denoted by $RM_T$ in FIG. 59, registers these light-sensitive activations and passes them on to the TPM. The high correlation between activations of the same retinotopic positions within the $RM_T$ and the $RM_R$ leads to the growth of large LTM traces within the $RM_V \to RM_R$ associative transform.

The TPM never loses its sensitivity to light-induced changes on the retina. As development progresses, however, other modulatory influences can also begin to play upon the $RM_T$ and the TPM. These include multimodal interactions, notably auditory inputs and attentionally modulated signals. In Section J.2, for for example, we discussed how a TPM-activated population $v_{ij}$ can win the STM competition within the $RM_R$ over a population $v_i$, $i \neq i_j$, that is directly activated by a light sensitive input $I_i$. This can only occur if multimodal or attentional inputs can bias the TPM to activate a target position that does not correspond to the retinotopic position $v_i$. Such mismatches must not be allowed to frequently occur until after the $RM_V \to RM_R$ map is learned, because they would undermine the transform learning process. Fortunately, such mismatches cannot occur until after the $RM_V \to RM_R$ transform is learned because this transform must be learned before intentional movements can generate a mismatch at the $RM_R$ via the $RM_V \to RM_R$ transform. Infinite regress is thus once again averted.

In this section, we describe some of the multimodal and attentional mechanisms that can influence which TPM population will be chosen to activate the TPM→HMI→$RM_V$→$RM_R$ pathway. Concerning the important problem of multimodal interactions, we will make only some brief comments.

A light-activated invariant TPM is computed in head coordinates. So too is a TPM based on auditory signals. Once both types of TPMs have been formed, strong correlations between sounds and lights can be the basis for learning an associative transform from sound-activated target positions to light-activated target positions, and possibly an inverse transform from vision to audition. This transform can be learned using the same associative laws that enabled the $RM_V \to RM_R$ transform to be learned.

After this transform is learned, the target position of a sound can compete for STM activation with the discordant target position of a light at all TPMs where both types of signals are registered (FIG. 60). The target position of a sound can also amplify the activation of the target position of a light into which it is associatively mapped. In the present invention, competitive and cooperative interactions manifests itself via the circuit.

$$\text{(auditory TPM)} \to \text{(visual TPM)} \to \text{HMI} \to RM_V \to RM_R \quad (11.10)$$

in FIGS. 59 and 60.

As in the associative transform described in Section J.3, an intermodal associative transform tends to stabilize its prior learning via a dynamically maintained critical period. Although this discussion does not address the complex issue of how binaural signals are used to localize an object in space, any more than it describes how binocular disparity cues are used for visual localization, the following conclusion is robust: Whatever be the fine structure of these TPMs, if they are both computed in head coordinates, then multimodal associative transformations can form with a precision that covaries with the degree to which their sampling and sampled map positions are correlated.

5. Nonspecific and Specific Attentional Mechanisms

Preferrably, two types of attentional mechanisms occur in neocortical regions that control saccadic movements.

The most elementary attentional mechanism is a nonspecific alteration of the gain, or sensitivity, across a neural network. This operation leads to either amplification or attenuation of all responses within the network. Such a nonspecific modulation of sensitivity is controlled by a parameter called the quenching threshold (QT) of the network (Section A.6). Any of several network parameters can, in principle, cause state-dependent changes of the QT. A large QT imposes a high criterion for cell activation. A very large QT can totally desensitize the network to all inputs. A low QT enables even small inputs to activate their cells. A typical mechanism for controlling the QT is a nonspecific signal that shunts the interneuronic pathways within the network.

If, for example, the QT of the auditory TPM became large and/or the QT of the visual $RM_T$ became small during attention to visual cues, then auditory inputs would have great difficulty competing to activate the HMI. By contrast, if the QT of the visually-activated $RM_T$ became large and the QT of the auditory TPM became small during attention to auditory cues, then auditory inputs could more easily activate the HMI.

A more specific type of attentional modulation is also needed to effectively control instrumental conditioning. If a target position received a large incentive motivational signal, then it can more effectively compete with factors like retinal light intensity or retinal movement for STM storage within a cortical TPM. If a target position received a multimodal combination of auditory and visual signals, then it can more effectively compete with a source of only visual signals.

In addition, nonspecific gain change may alter the salience of different modalities through time. At any given moment, a complex interplay of retinal light intensity signals, retinal motion signals, specific intermodal signals, specific motivational signals, and nonspecific modality-selective attentional signals will help to determine which activated target positions within the TPM will win the competition to activate the HMI. In addition to these input factors, the learned factors which group familiar sensory patterns into object representations will also influence the intensity with which these representations activate their corresponding target positions. As in life, the more interesting and complex are the objects being viewed, the more complex will be the activity patterns across the TPM that enable us to visually explore them.

6. Multiple Retinotopic Maps

We can now begin to gather together constraints derived in earlir sections to refine the macrocircuit diagram of FIG. 59. We will do this in stages using figures that omit processes which are not immediately being discussed. Where important circuit variations are consistent with functional requirements, we will note them in order to stimulate experiments capable of deciding between them.

FIG. 61 depicts a refinement of FIG. 59. FIG. 61 contains two macrostages that were not included in FIG. 59: a pair of retinotopic maps, $RM_{R1}$ and $RM_{R2}$, instead of a single retinotopic map RM; and a pair of target position maps, $TPM_1$ and $TPM_2$, instead of a single target position map TPM. The retinotopic map $RM_{R2}$ plays the role of $RM_R$ and the target position map $TPM_1$ plays the role of TPM. First, we describe the role of the new retinotopic map $RM_{R1}$.

FIG. 4 summarizes the functional role of the $RM_{R1}$. In FIG. 4, two successive network stages are used to process light-activated signals from the retina. The first stage, the $RM_{R1}$, chooses the retinotopic position that receives the most favorable combination of retinal intensity and motion factors at any time. As in FIG. 4, the $RM_{R1}$ gives rise to second light error signals (ES) which act at the adaptive gain (AG) stage, or cerebellum. In both FIGS. 4 and 60, the $RM_{R1}$ activates the next retinotopic map, the $RM_{R2}$, at which the light that is chosen by the $RM_{R1}$ is stored in STM. The $RM_{R2}$ gives rise to the conditioned pathways along which sampling signals (SS) learn adaptive gains within the AG stage in response to second light error signals. The chosen light must thus be stored in STM until after the saccade is over, so that its conditioned pathways can sample the second light error signals.

As in FIG. 59, the $RM_V$ in FIG. 61 samples the $RM_{R2}$, so that it can learn to transmit an attentionally modulated choice of retinotopic position to the $RM_{R2}$. Due to $RM_V \rightarrow RM_{R2}$ signals, the choice which is stored within the $RM_{R2}$ might differ from the choice which was made by the $RM_{R1}$. The $RM_{R2}$ chooses the largest signal which it receives before storing it in STM, as in equations (60). Attentional and intentional factors may hereby override visually reactive factors within the $RM_{R2}$ as in Section J.3. However, sufficiently vigorous reaction to a moving stimulus may override an insufficiently amplified attentional focus. Despite the fact, visual factor remain the exclusive source of second light error signals from the $RM_{R1}$ to the AG stage.

FIG. 62 describes a variation on FIG. 61 that is consistent with functional requirements. In FIG. 62 a multisynaptic pathway $RM_{R1} \rightarrow RM_T \rightarrow RM_{R2}$ replaces the direct $RM_{R1} \rightarrow RM_{R2}$ pathway of FIG. 61. This multisynaptic pathway plays the following functional role. In both FIGS. 61 and 62 the $RM_T$ is a retinotopic map at which attentional modulation of visual signals can occur. In FIG. 62, the $RM_{R1} \rightarrow RM_T$ pathway can selectively enhance the retinotopic position that was chosen within the $RM_{R1}$. As a result, the favored $RM_{R1}$ population is also "attentionally" amplified within the $RM_T$. The $TPM_1$ thus receives from the $RM_T$ a spatial pattern of activated retinotopic positions such that the favored $RM_{R1}$ position can effectively compete with positions that are amplified by other attentional factors.

In FIG. 62, the $RM_{R2}$ receives the entire spatial pattern of positions from the $RM_T$, not just the position chosen by the $RM_{R1}$ as in FIG. 61. Thus, if a retinotopic position other than one chosen by the $RM_{R1}$ is favored by the $RM_T$, then, in the absence of intermodal influences, both the $RM_V$ and the $RM_{R2}$ will tend to choose the same retinotopic position even before the $RM_V$ the $RM_{R2}$ transform is learned. By contrast, in FIG. 61 the $RM_{R2}$ and the $RM_v$ can more easily choose different positions whenever attentional factors within the $RM_T$ favor a position other than the one chosen by the $RM_{R1}$.

In summary, the interactions in FIG. 62 strengthen the tendency for both the $RM_V$ and the $RM_{R2}$ to choose the same positions whenever only light-activated cues enter the movement decision, whether or not the attentionally favored positions are the retinally favored ones. This property of FIG. 62 tends to further stabilize learning of the $RM_V \rightarrow RM_{R2}$ associative transform.

7. Interactions between Superior Colliculus, Visual Cortex, and Parietal Cortex

We interpret the stages $RM_{R1}$, $RM_{R2}$ and $RM_T$ in FIGS. 61 and 62 in terms of interactions between superior colliculus (SC), visual cortex, and parietal cortex. These retinotopic maps interact with other network stages that possess unambiguous anatomical interpretations. Such linkages constrain the anatomical interpretation of the retinotopic maps themselves. For example, the $TPM_1$ is assumed to occur in the parietal cortex.

Both the $RM_{R1}$ and the $RM_{R2}$ project to the AG stage, which is assumed to occur in the cerebellum. The $RM_{R1}$ gives rise to visually activated error signals, which are assumed to reach the cerebellum via climbing fibers. The $RM_{R2}$ gives rise to visually activated sampling signals, which are assumed to reach the cerebellum via mossy fibers. The $RM_{R1}$ activates the $RM_{R2}$, whether monosynaptically or multisynaptically, but not conversely. The $RM_{R2}$, but not the $RM_{R1}$ stores a choice in STM from a time before a saccade begins until a time after a sacccade ends. The $RM_{R2}$, but not the $RM_{R1}$ or $RM_T$, projects to the saccade generator (SG). The $RM_{R2}$ also receives inputs that are sensitive to corollary discharges. The $RM_T$ but not the $RM_{R1}$ processes retinotopic position signals that are attentionally modulated. Last but not least, each of the regions $RM_{R1}$, $RM_{R2}$, and $RM_T$ is a retinotopic map; hence, it possesses enough internal topography to differentially process many distinct map positions.

8. Multiple Target Position Maps within Parietal Cortex and Frontal Eye Fields

The single TPM in FIG. 59 is expanded into two successive TPMs, namely $TPM_1$ and $TPM_2$, in FIG. 62. These successive TPMs play a role that is similar in important respects to the successive TPMs that were used to regulate sequences of predictive saccades in FIG. 54. MAP $TPM_1$ in both FIGS. 53 and 62 is an invariant TPM which can simultaneously encode several active target positions. In FIG. 62 the activity level at each target position is the resultant of a combination of light-activated, multimodal, incentive motivational, and attentional gain control signals. In FIG. 54, such factors interact with predictive mechanisms to read-out sequences of learned movement synergies. In both FIGS. 54 and 62 the map $TPM_2$ chooses the target position from $TPM_1$ which achieves the largest activity based upon all of these influences. The chosen target position is stored in STM until after the saccade is over, so that it can then sample the corollary discharge at its HMI. In FIG. 62 we interpret the $TPM_1$ on-center cells to be formal analogs of the light-sensitive attentionally modulated cells of the posterior parietal cortex, and the on-center cells in $TPM_2$ to be formal analogs of the saccade cells.

The TPMS of FIG. 62 are different from the TPMs that control predictive saccades (FIG. 54) in a crucial way; The parietal TPMs are incapable of storing temporal order information in STM. As we saw in Section I, the ability to effectively store temporal order information in STM requires specialized auxilliary mechanisms that enable a match-mediated nonspecific rehearsal wave to sequentially read-out and reset the STM activity pattern within the $TPM_1$. We assume that this type of reset mechanism is found in the frontal eye fields (FEF) and is a version of a frontal cortex architecture that is specialized to organize "the temporal ordering of recent events". In addition to the machinery that is needed to regulate storage and sequential read-out of STM in a predictive system, we suggest that the predictive STM patterns may be encoded in long term memory (LTM) as motor plans, or chunks. These motor plans may be read-into STM from LTM in the absence of sensory cues. Both the regulatory STM machinery and the LTM chunking and read-out machinery are assumed to be part of the predictive design.

9. Learning Multiply-Activated Target Position Maps

The previous sections have suggested that one TPM system is needed at which intermodal, motivational, and light-related factors can competively struggle to define an attentional focus capable of directing an eye movement. A second TPM system needed at which predictive sequences of eye movements can be performed and be learned, perhaps as part of more general motor plans. Consideration of how these two types of TPM systems interact leads to further constraints on system design. In order to unambiguously discuss these two TPM systems, we denote the parietal TPM stages by $TPM_{P1}$ and $TPM_{P2}$ and the frontal TPM stages by $TPM_{F1}$ and $TPM_{F2}$.

In Section I, we considered several ways in which an invarient TPM can arise. In the subsequent discussion, we will fix ideas by assuming that the $TPM_{P1}$ forms through a process of self-organization, as in Section I.6. Whatever mechanism gives rise to the $TPM_{F1}$. If a topographic map exists from the $TPM_{P1}$ to the $TPM_{F1}$, then the cells in the $TPM_{F1}$ inherit the invariant target positions that a encoded by the corresponding cells in $TPM_{P1}$ (FIG. 63). Moreover, all of the attentional factors that weight the importance of target positions in $TPM_{P1}$ can also weight the target positions in $TPM_{F1}$. Thus the specialized intermodal and motivational mechanisms that feed directly into $TPM_{P1}$ can automatically influence the $TPM_{F1}$ without necessitating the replication of these mechanisms at the $TPM_{F1}$. Although we consider this an attractive possibility, the $TPM_{F1}$ could also implicitly form from combinations of $RM_T$ and EPM signals, as in Section I. Such a TPM would not, however, benefit from parietal forms of attentional modulation. In the present invention it is preferred that the FEF possesses its own $TPM_{F1}$.

From the $TPM_{P1}$, the target position with the largest weight, or activity, can generate a movement command via the $TPM_{P2}$. From the $TPM_{F1}$, the whole pattern of active target positions can be sequentially read-out in order of decreasing activity, and can be gradually encoded on successive performance trials into long term memory as part of a unitized motor plan for future predictive performances. Once it is recognized that these two types of TPM systems, exist, several design issues come into focus concerning how it is decided which of these TPM systems will learn or perform eye movements at any given time.

Further consideration needs to be given to how the $TPM_{P1}$ is formed. In Section I, we considered a self-organization model in which a single retinal position (RM) and a single initial eye position ($EPM_1$) can sample a single target eye position ($EPM_2$) on every learning trial. Eventually, pairs of signals from the RM and the $EPM_1$ to the $EPM_2$ learn to generate individual target position activations at the $EPM_2$, thereby converting it into a TPM.

On any given saccadic trial, a single initial eye position ($EPM_1$) can combine with several retinotopic positions (RM) to sample a single target eye position ($EPM_2$). Only one combination of retinotopic position with initial eye position is the correct one, and this combination will consistently sample its correct target eye position on all learning trials, thereby generating a cumulative effect on the corresponding LTM traces. On the average, the other retinotopic positions will be randomly chosen with respect to the correct retinotopic position across sampling trials. Their LTM traces will tend to encode as many erroneous LTM increments as decrements, thereby tending to cancel their net LTM change, due to erroneous correlations across learning trials. If only the property of random error distribution prevents map relearning errors from accumulating, then an electrode input that persistently activates the same false target eye position at $TPM_2$ after each saccade should cause a massive learned distortion in the adult $PTM_{P1}$ In a second embodiment $TPM_{P1}$ map learning occurs only during a developmentally plastic critical period. This critical period terminates before such diverse attentional influences as multimodal and motivational factors can begin to override retinal light intensity and motion factors. During such a critical period, the $RM_{R1}$ in FIG. 62 can strongly bias the $RM_T$ to differentially amplify its preferred light position. The input from the $RM_T$ to differentially amplify its preferred light position. When the input from the $RM_T$ to the $TPM_{P1}$ is formed in this way, the critical period ends, and future multiple activation of the $RM_T$ cannot cause map errors to be learned. In this model, approximate choices occur within the $RM_T$ at an early developmental stage, and electrode activations of an adult $TPM_{P1}$ should not recode its target positions.

10. Multiple Pareital and Frontal Eye Field Vector Systems

Given that two TPM systems exist, it is necessary to consider whether they compute neural vectors using their own head-muscle interfaces (HMI) or whether they share a single HMI. The results in Section C showed how a TPM can convert its target positions into vectors at HMI via a learning process. These results imply that only a single target position at a time can sample a HMI. If two or more target positions simultaneously sampled a HMI, then each target position would learn only a fractional part of the target eye position, by equations (4.1) and (4.2). It is preferred that each TPM system has its own HMI (FIG. 64b)

This system is preferred over a system where each TPM system activates the same HMI but at different times (FIG. 64b) because it provides the predictive movement system with a greater independence from interference by irrelevant sensory cues. We also favor this alternative for specific reasons. For example, if only one HMI existed, then the $TPM_P$ and $TPM_F$ systems would need to be able to competitively inhibit each other's output signals before these signals reached the shared HMI, since only one TPM can be allowed to sample the HMI at any time. This would necessitate the ability of two large and topographically organized neural regions to nonspecifically shut each other off. Whereas this is not formally impossible, it is much easier for the two systems to compete nonspecifically at a smaller neural region, such as the SC or the SG. It is not inconceivable that, as a predictive movement capability evolved through phylogeny, a single HMI-based system evolved into a multiple HMI-based system. By considering the more different multiple HMI case herein, many of theproperties which arise using a simpler single HMI case may also be implicitly analyzed.

11. Learning Neural Vectors and Adaptive Gains in a Predictive Movement System

It is therefore preferred that two HMI systems exist, corresponding to the two TPM systems $TPM_P$ and $TPM_F$. We denote these HMIs by $HMI_P$ and $HMI_F$ respectively, as in FIG. 64a. We now consider what new learning issues are raised by the existence of a separate $HMI_F$ system. The main issues concern how target positions are converted into muscle coordinates by the learned $TPM_{F2} \rightarrow HMI_F$ transform, and how vector commands from the $HMI_F$ gain control of adaptive gains at the AG stage that can generate accurate foveations.

The problem in its most severe form arises if the $TPM_F$ system unlike the $TPM_P$ system of FIG. 62 does not sample the $RM_{R2}$. Then the $TPM_F$ system cannot use the adaptive gains which the $RM_{R2}$ controls via the AG stage. It is possible for the $TPM_F$ system to sample the $RM_{R2}$, but it would have to do so in a way that does not also inhibit sampling by the $TPM_P$ system. In particular, the $TPM_F$ system would have to sample the $RM_{R2}$, so that $TPM_F$ signals would not competitively preempt sampling of the $RM_{R2}$ by the $TPM_P$ system. Such a convergence of visually reactive, $TPM_P$, and the $TPM_F$ commands at the $RM_{R2}$ could, however, cause a high probability of erroneous command choice during sequences of predictive saccades. Erroneous command choices during predictive saccades can be minimized if the predictive movement system can nonspecifically inhibit all visually reacitve and $TPM_P$ signals. This cannot happen if the $TPM_F$ system can sample the $RM_{R2}$ because the sampled pathways must be activated by visually reactive signals. In order for the predictive movement system to nonspecifically inhibit other sources of movement commands, it must feed into the SG at a stage subsequent to the $RM_{R2}$, so that it can nonspecifically inhibit $RM_{R2} \rightarrow SG$ movement signals without inhibiting its own movement signals.

It is, therefore, preferred that the $TPM_F$ system controls its own unconditioned $HMI_F \rightarrow RM_F \rightarrow SG$ and conditioned $HMI_F \rightarrow RM_F \rightarrow AG \rightarrow SG$ movement pathways to the SG, as in FIG. 65. This system faces and meets the full force of the infinite regress problem. If the adaptive gains controlled by the $RM_{R2}$ are not used to achieve accurate predictive saccades, then how does the predictive command network (PCN) learn its adaptive gains? No learning difficulties arise if the vectors used by the PCN via the $HMI_F$ are accurately calibrated. Any adequate solution of how sequences of predictive saccades are controlled must include a solution of this problem. If $HMI_F$ vectors are accurately calibrated, then predictive commands from the PCN can cause unconditioned movements via the pathway $HMI_F \rightarrow RM_F \rightarrow SG$ in FIG. 65. Second light error signals, registered via the Retina$\rightarrow RM_{R1} \rightarrow AG$ pathway, can then alter the adaptive gains within the $RM_F \rightarrow AG \rightarrow SG$ pathway, using the mechanisms of Section B. Thus the retinotopic command network (RCN) helps to calibrate the PCN using its second light error signal subsystem. We now indicate how the RCN also helps to calibrate the vectors computed within the $HMI_F$ of the PCN. Thus the RCN acts in two ways to overcome the infinite regress problem that might otherwise be faced by the PCN.

The main requirements are (1) the $TPM_{F2} \rightarrow HMI_F$ transform is correctly learned before the $HMI_F$ can begin to generate predictive commands, and (2) the $TPM_F \rightarrow HMI_F$ transform is not unlearned due to performance errors caused by $HMI_F$-generated saccades before the $HMI_F \rightarrow RM_F \rightarrow AG \rightarrow SG$ pathway can learn the correct adaptive gains. Both requirements are achieved by making an assumption concerning the type of saccade-driven gate (Section H.7) that turns on learning within the $HMI_F$.

The best performance is achieved if the SG is broken up into two subsystems. One subsystem $SG_R$ receives unconditioned and conditioned movement signals from the $RM_{R2}$, and thus also from the $HMI_P$ (FIG. 66). The other subsystem $SG_F$ receives unconditioned and conditioned movement signals from the $HMI_F$ via the $RM_F$. Both subsystems preferably possess their own complement of burster cells and pauser cells that send convergent signals to tonic cells and motoneurons (Section F.8) Preferably, the learning gate within the $HMI_F$ is turned on either by onset of pauser activity or by offset of burster activity within the $SG_R$. It is also preferred that the same class of $SG_R$ cells turns on the learning gate within the $HMI_P$ (FIG. 66). Thus the learned transformation of target position into motor coordinates is regulated by $RM_{R2}$-controlled gating signals in both HMIs. Since the $RM_{R2}$ can learn to generate correct saccades using second light error signals (Section B), it can generate correct target eye positions for learning the HMIs.

In order for the $TPM_{F2}$ to sample the $RM_R$-generated target positions at the $HMI_F$, the $TPM_{F1}$ must be capable of activating the $TPM_{F2}$ before $RM_R$-generated saccades occur. Thus the TPMs of the FEF must be sensitive to lights at a developmental stage prior to the emergence of predictive saccades. This properly implies that factors other than volition can enable the $TPM_{F1}$ to activate the $TPM_{F2}$ (Section H.4). In particular, specific output signals from the $TPM_{P1}$ to the $TPM_{F1}$ give rise to inhibitory interneurons capable of shutting off the tonic gating cells which inhibit $TPM_{F1}$ output signals (FIG. 67). A volitional signal can also shut off these cells, as in Section H.4. Furthermore, such a volitional signal opens an output gate which enables the $HMI_F$ to activate the $SG_F$ (FIG. 66)

12. Frontal Eye Field Control of Voluntary Saccadic Eye Movements and Posture: Cell Types In the preferred embodiment three types of post-saccadic cell may be found in the FEF, or in closely associated neural regions. One type may be part of the eye position map (EPM) within the tension equalization network (TE) of Section G. These EPM cells are activated by tonic cells of the SG after a saccade terminates. They are driven by an efference copy from the brainstem saccade generator, and respond only after saccades of fixed dimensions are over. Their functional role is to read out the learned postural gains that prevent postsaccadic drift.

A second type of post-saccadic cell may exist in the FEF if the $HMI_F$ is housed within the FEF. Such cells would relay gating signals from the $SG_R$ to the $HMI_F$ (FIG. 66). These cells would be active after both spontaneous and visually elicited saccades. They could, however, respond after saccades of variable size, since their function is to enable the $TPM_{F2}$ to learn whatever target eye position was attained by the previous saccade. It may be that the $SG_R$ directly gates the $HMI_F$ without the intervention of $HMI_F$ interneurons. Then the activity of axons, rather than cell bodies, would be predicted to possess these functional properties.

The $TPM_{F2}$ cells which we have identified with FEF movement cells may also occasionally respond like a type of post-saccadic cell. Suppose that the $TPM_{F1}$ has been storing several target positions in STM while spontaneous or visually elicited saccades are taking place. The $TPM_{F2}$ and the $HMI_F$ can process such target positions because the $TPM_{F2}$ must be able to learn its target eye positions at the $HMI_F$ in response to visually activated movement commands (Section J.11). Thus after a saccade takes place, a rehearsal wave may occur enabling the $TPM_{F1}$ to read a new target position into the $TPM_{F2}$. Such a $TPM_{F2}$ cell would occur after the saccade was over. Hence the cell would appear to be a "post-saccadic cell." This cell might not cause the next saccade unless the volitional gate is opened (FIG. 67). Hence its role in controlling a future voluntary saccade could be mistaken for a reaction to a past visually reactive saccade. Such a cell would not encode an efference copy from the SG. Rather, it would encode the target position of a possible voluntary saccade. To distinguish this type of "post-saccadic cell" from an EPM cell which controls the read-out of postural gain, one could use the Bruce and Goldberg (1984) paradigm to discover whether the cell can also function as a movement cell in an experiment that requires voluntary saccades.

13. Coupled Vector and Adaptive Gain Learning

Variations of the circuit design described in FIGS. 66 and 67 are possible. If the gating rules summarized in FIG. 67 are imposed, then the PCN can achieve a significant competence even if the SG is not broken into two subsystems. The gating rules in FIG. 66 enable the $TPM_{F2}$ to calibrate accurate vectors at the $HMI_F$ before the $HMI_F$ can begin to generate predictive saccades. Thus, when $HMI_F$-generated saccades emerge, the vectors computed within the $HMI_f$ are already accurately calibrated, whereas the adaptive gains of the conditioned pathway $HMI_F \rightarrow RM_F \rightarrow AG \rightarrow SG$ are not yet accurately calibrated. Consequently saccadic errors will occur. In FIG. 66 we prevented these errors from causing the relearning of inaccurate vectors by using the $SG_R$ to shut off vector learning in the $HMI_F$ when predictive saccadres are being made.

New vector learning may be permitted to occur in the predictive mode. The learning of incorrect target positions within the $HMI_F$ which is caused by foveation errors will tend to be compensated by learning within the AG stage if the $HMI_F$ starts out with accurately calibrated vectors. For example, suppose that an undershoot error occurs. Then the vector which caused the saccade will learn a larger adaptive gain (Section B), but the $TPM_{F2}$ will learn to generate a smaller vector in response to the same retinal position on a later saccadic trial (Section C). On successive undershoot trials, progressively smaller vectors and progressively larger gains will be learned hand-in-hand. Finally, a time is reached at which either the saccades cannot get shorter, or the larger adaptive gains by themselves will start to cause longer, and therefore more correct, saccades. At such a time, the adaptive gains are larger than they were at the outset, and are hence better able to prevent undershoot errors, but the vectors read-out by the TPM are too small. As large vectors being to be learned, the adaptive gains will grow even larger to prevent further undershoot errors. Thereafter, relearning of correct vectors and of large enough adaptive gains to prevent undershoot errors go hand-in-hand until accurate saccades are generated.

14. Gating of Learning, Movement, and Posture

The network to which our analysis of sensory-motor learning has led us is now a large and complex one. Underlying this complexity are a few general circuit designs—such as head-muscle interfaces, eye position maps, target position maps, and adaptive gain stages—which are utilized in multiple network locations. The placement of these circuits into different network positions endows them with different functional capabilities. The reader need only recall the many uses of eye position maps, including their possible role in generating an invariant TPM (Section I), to appreciate this fact. Thus a significant part of the intelligence embodied within these large circuits lies in the developmental rules which control the correct placement of a few standardized circuit designs.

Another part of the intelligence of such a system lies in the gating rules which synchronize the switching on an off of the correct subsystems through time. Such gating rules have arisen repeatedly during the preceding sections. They must be simple enough to generate correct switching decisions based upon locally computable signals. They give rise to global intelligence due to the manner in which they are connected to network subsystems. In particular, they are organized to achieve synchronous switching between movement and postural subsystems, and to modulate learning within each of these subsystems (Section H). The present section summarizes and further develops the gating rules that are needed to prevent contradictory movement or postural signals from being generated during the saccadic cycle.

FIGS. 68–71 describe the main types of gates that are needed in our theory. In all of the figures, gating pathways are denoted by dashed lines. The gates that regulate sequential read-out of target positions within the PCN will not be discussed, because they were already dealt with in Section H. FIGS. 68–70 show that just a few types of gating actions suffice to regulate the entire network.

a. Read-in, Reset, and Storage of Movement Commands

FIG. 68 indicates how movement commands activate the network, how they reset previous commands, and how they are stored in STM long enough after a saccade terminates to sample adaptive gains at the SG stage (Section A).

Suppose that the network starts out at rest. The pauser population in the SG is then on. This is an omnipauser population that is on between all saccades and is turned off by all saccades. Because these pausers are on, they inhibit the inhibitory tonic gate. The $RM_T$ is therefore free to respond to lights that inpinge upon the retina. (In the subsequent discussion, we will suppose for definiteness that inhibitory tonic gates modulate network stages. Excitatory phasic gates could, in principle, do the same job, as FIG. 71 will illustrate.)

Activation of the $RM_T$ has three major effects. First, the $RM_T$ can instate a new retinotopic position into the $RM_{R2}$. By so doing, it inhibits any retinotopic position that was previously stored by the $RM_{R2}$, as well as the output signals from the $RM_{R2}$ to the SG and to the AG stage.

Second, the $RM_T$ enables a new initial eye position to be read into the $EPM_T$, by inhibiting the tonic gate that kept the T cells from doing so before. This eye position is stored in STM within the $EPM_T$. Due to this sequence of events, the $RM_{R2}$ is inhibited before the $EPM_T$. Due to this sequence of events, the $RM_{R2}$ is inhibited before the $EPM_T$ can be reset. Consequently, the new eye position at the $EPM_T$ cannot initiate a saccade staircase by inputting a new eye position signal to the SG before the previous retinotopic signal is shut off (Section F.6).

Third, both the new $RM_T$ position and the new $EPM_T$ position can now input to the $TPM_{P1}$, which leads to choice and STM storage of a target position at the $TPM_{P2}$.

These events prepare the network to initiate a new saccade by instating new retinotopic ($RM_{22}$), initial eye position ($EPM_T$), and target position ($TPM_{P2}$) commands. These reset events also occur with a sufficient delay after a previous saccade has ended to allow the $RM_{R2}$, $EPM_T$, and other systems which sample the AG stage to benefit from any second light error signals that the $RM_{R1}$ might generate there. All of these events are regulated by two tonic gates, both of which are controlled, directly or indirectly, by populations in the SG.

FIG. 68 also notes that a different type of gate is needed in order to learn an invariant $TPM_{P1}$. Such a gate is opened only after a saccade occurs, in response to the actiavtion of the saccade rebound cells. This gate enables the $RM_T$ retinotopic position and the $EPM_T$ initial eye position to sample the target eye position that is attained by the saccade (Section I.5). Saccade rebound cells can arise as the off-cells of a gated dipole opponent process whoe on-cell input source is an SG burster cell population (FIG. 69). In fact, the on-cells of such a gated dipole can replace the disinhibitory pauser gate in FIG. 68 by an inhibitory burster gate (FIG. 69).

b. READ-OUT AND COMPETITION OF MOVEMENT COMMANDS

FIG. 70 describes gating actions that regulate the flow of movement commands to the saccade generator (SG). The critical gate in this figure is an inhibitory tonic gate which acts at a stage somewhere between (or within) the $RM_{R2}$ and the SG.

The $RM_{R2}$ can inhibit the gate, and thereby enable its stored retinotopic position to activate the SG, other things being equal. Two properties govern our choice of the $RM_{R2}$ as a possible source of gate inhibition. First, the $RM_{R2}$ stores a choice in STM, and hence is active throughout a saccade. Thus, the gate stays off throughout an $RM_{R2}$-activated saccade and thereby enables the SG to fully react to the $RM_{R2}$ movement command. Second, the $RM_{R2}$ is part of the retinotopic command network (RCN). The $RM_{R2}$ can therefore be activated by attended lights before the developmental stage occurs during which the invariant $TPM_{P1}$ forms. The RCN can thus generate and correct the visually reactive saccades on which invariant TPM formation, vector calibration within the HMI, and other later learning processes are based.

$TPM_{P2}$ also inhibits the tonic gate. This enables attentionally modulated multimodal inputs, in addition to visually reactive visual inputs, to generate saccades via the $TPM_{P2} \rightarrow HMI_P \rightarrow RM_P \rightarrow RM_{R2} \rightarrow SG$ pathway.

Finally, the $RM_F$ can powerfully excite the tonic gate. This excitation can counteract inhibition from the $RM_{R2}$ and the $TPM_{P2}$. Thus, when the volitional gate in the FEF opens (Section H) and a vector from $HMI_F$ activates the $RM_F$, this voluntary command can inhibit other movement commands as it activates its own pathway to the $SG_F$.

FIG. 70 also describes another possible way in which the FEF movement system can compete with the SC movement system. Suppose that $RM_F$ commands excite the bursters of $SG_F$ and the pausers of $SG_R$, and possibly that $RM_{R2}$ commands excite the bursters of $SG_R$ and the pausers of $SG_F$. If the pausers of $SG_R$ could be kept on by $RM_F$ excitation even in the presence of inhibition from $SG_R$ long lead bursters, then the FEF could dominate SC commands even within the peripontine reticular formation (Section F.8).

c. GATING OF POSTURE AND LEARNING

In FIG. 71, the postural eye position map ($EPM_{Pos}$) is allowed to store eye positions only between saccades. While a saccade is being performed, the tonic gate inhibits the $EPM_{Pos}$. Thus, the $EPM_{Pos}$ reads out the adaptive gains which prevent postsaccadic drift only during the postural state (Section G).

In FIG. 71 the same tonic gate acts upon the $EPM_{Pos}$ and upon vector outputs from the $HMI_P$ and the $HMI_F$. Outputs leave each HMI for STM storage within its retinotopic map RM only during the postural state (Section C). Thus, before a saccade beins, each HMI can compute a vector difference of target position and initial eye position and store it retinotopically in its RM. As soon as a saccade begins, the HMI→RM pathways are gated shut. Consequently, the stored retinotopic positions are not changed due to the saccadic motion. After the saccade terminates, the output gates open again and enable new vectors to be retinotopically stored.

FIG. 71 also includes a tonic gate that prevents learning from occurring within the HMI except during the postural state (Section C). In networks wherein a saccade generator subsystem like $SG_R$ does not exist, all the gating actions in the figure could, in principle, be governed by a single SG-controlled gating system.

15. When Saccade Choice May Fail: Saccadic Averaging and Partial Vector Compensation In order to emphasize the dynamic nature of the interactions which we have described, we end this section by considering some circumstances during which saccadic choice may partially fail.

In Section J.3, we suggested that choice of one retinotopic position occurs due to the broad lateral inhibitory signals and signal functions at the stage that is caricatured by equation (11.3). Such a network may not, however, make a choice if two electrodes simultaneously activate a pair of its cells with equal intensity, or with intensities that are greater than the strength of its lateral inhibitory signals. Under these circumstances, both cells may retain partial activity and may thus generate a saccade that is a compromise, or weighted average, of the individual saccadic commands.

In Section H and FIGS. 61, 62, 66, and 67, we suggested that only one target position at a time can normally be stored within a $TPM_2$; then only one vector at a time can be computed at the corresponding HMI. By contrast, the process of STM reset and STM storage at a $TPM_2$ takes some time. It may be possible for one light to be partially stored within the $TPM_2$ when another, more salient, light occurs. Such a second light may be able to instate itself in the $TPM_2$ before the previous light can be fully stored. In this case, a partial vector compensation may occur that is rapidly followed by a second, more complete, vector compensation.

Finally, only one saccade is usually generated by the retinotopic command network (RCN), or the predictive command network (PCN), but not both. On the other hand, simultaneously active electrodes placed in both subsystems may either bypass their inhibitory gates (FIG. 70) or may override the inhibitory signals due to these gates. Then a saccade may occur that is a weighted average of both saccadic comands.

K.

ROBOTS TO SELF-TRAIN AND SELF-CALIBRATE THEIR OWN OPERATING PARAMETERS

In the previous sections, several circuits were presented to solve functional problems of self-calibration required by a sensory-motor system. While it was easier to describe the principles and properties of these solutions in terms of anatomical and physiological relationships to aid the reader in understanding, the same principles and properties may apply to electrical and mechanical structures such as a robot. Thus, the models described above can be adapted to a robot to develop a self-calibrating robot.

Therefore, in accordance with the present invention, each adaptive sensory motor system, computes a representation or a map of target positions. Such target positions may also be called intended positions or terminal motor positions. Each adaptive sensory motor system also computes a representation of a present position. To determine the amount of movement that will be necessary, the target position is matched against the present position detected by a sensory device such as a photo-detection device. During a movement, a fixed target position may be stored while changing present positions are matched against it. The target positions are phasic commands which can be switched on or off through time. For example, at times, when a sensory motor system is at rest, or in a posture mode, no target position whatsoever need be active in the system. By contrast, present position commands are tonic commands which are always on, since motors moving a photo-detection device are always in one position or another.

In order to compare target positions with present positions, data from a visual system and a motor system must be computed in the same coordinate system. In the present invention, the present position of the photo-detection device is computed with respect to a body-centered or egocentric coordinates. By body-centered coordinates, we mean the following: the photo-detection device rotates with respect to the body supporting the photo-detection device. The directions in which the photo-detection device is determined by the amounts of contraction of the motors fixed to the photo-detection device which allow it to rotate. Signals stimulated either from a computer to the motors (outflow) or from the motors to the computer (inflow) could, in principle be used to determine these directions. In either case, the photo-detection device's position is computed relative to its position in the body supporting it. For simplicity, these coordinates will be referred to as head coordinates to correspond with the head coordinates referred to in previous sections. Similar nomenclature already used in previous sections will also be used. Consequently, the target positions of the visual system is also computed in the head coordinates. In other words, when a light activates a photo-detection cell, we say that it is registered in retinal coordinates. The position of the light in retinal coordinates is then transformed into target position computed in head coordinates in order to compute sensory motor matches. Thus, we speak of transforming a retinal map into a target position map.

A target position map is computed before a movement of the photo-detection device relative to its supporting body occurs. Thus, many visual and motor positions correspond to a signal target position. In other words, this transformation from retinal coordinate to head coordinate is many-to-one.

In order for a system to adapt to its environment, an error tolerant map must be generated from such variable components. Thus, some sort of self-organization, notably a self-correcting learning capability, is needed. Otherwise, all visual and motor coordinates would require that a perfectly prewired system exist. This problem is solved by designing self-organizing and invarient multi-modal maps.

As suggested above invariance means that many combinations of visual and motor inputs can correspond to a single target position output. In other words, a single visual input is paired with many motor inputs to sweep out all the target position outputs to which that visual input contributes. Alternatively, a single motor input is paired with many visual inputs to sweep out all the target position outputs to which that motor input contributes.

Preferably, the map should be able to form in response to a wide range of set sizes from which the inputs are drawn. Varying the set size spanned by the map inputs cause the set size spanned by the map outputs to also vary. Unless self-organization of maps is an unstable process, the invariant "form" of the map should be independent of its "size". This is the problem of self-regularization. The self-regulation property includes, not only the size of the individual input fields, but also the number of input fields that cooperate to define each invariant position.

Such a transformation from visual to motor coordinates involves both a change of map coordinates and a change of map dimensions. The visually activated target position map possesses at least as many topographically distinct populations as their are discernable lights detected on the photo-detection means. By contrast, the motors used to move the photo-detection device in the present invention preferably are organized into against-antagonist pairs. It is further preferred that each photo-detection device is moved by three pairs of motors. Such a system closely parallels the extra-occular muscles of the eye. The present position of the photo-detection device can thus be characterized by six quantities. The transformation from visually activated coordinates to motor coordinates therefore replaces a large number of distinct map locations by rays, patterns, or six numbers. Such a transformation replaces complex and abstract combinations of multimodal information by simple and concrete arrays of unimodal motor information.

According to the present invention, the same network that learns this coordinate change also computes the match between target positions and present positions. This important network as already described is called the head-muscle interface or "HMI".

The degree of mismatch between the target position and the present position generates a motor code that can be used to accurately move the photo-detection means. In the present invention, the degree of mismatch in the HMI represents a vector difference that compares the target position of the photo-detection device with its present position. This difference between target position and present position encodes how far and in what direction the photo-detection device is to move. When the target position equals its present position, the vector difference equals zero, and no photo-detection movement command is generated. By contrast, large mismatches between the target position and present position represent commands to generate large positional movements of the photo-detection device.

Preferably, the HMI vectors automatically compensate for different distances and directions, depending upon the photo-detection device's present position when the target position is registered. It is further preferred that these vectors carry out this task in addition to gating associative learning of target position maps between modalities.

Two different types of data are manipulated by the HMI: Target position maps and encode motor expectations or intended movements which represent where the system wants to go. The data are encoded and stored by the system long enough to execute the intended movement. By contrast, present position signals monitor the present state of the photo-detection device. Although these signals remain on tonically, they change continuously as the photo-detection device moves.

Using these two types of information, a signal target position command can be readily transformed into many different movement trajectories due to the automatic compensation for present position that is encoded by the HMI vectors. This combination of mechanics accomplishes a tremendous reduction in the number of commands which need to be stored. The network does not have to store many different movement trajectories with arbitrary initial and terminal positions, as inverse kinematic positions approaches to movement controls would conclude. It does not have to map many different trajectories in one modality into many different trajectories in another modality. Instead, it computes maps of target position. Such maps do not encode whole trajectories. They encode only terminal positions of these trajectories. Terminal positions are mapped into terminal positions across modalities. Within each modality, terminal positions are mapped into motor coordinates via a learned transformation. By automatically compensating for present position, this transformation generates code that can accurately control all possible movement trajectories.

Signals that branch off from the direct computer-to-motor pathway in order to register present position are traditionally called corollary discharges. Corollary discharges, rather than inflow signals (which are signals which carry a command from the motor to the computer), are used to compensate for self-induced movements.

One of the roles of an outflow signal is to move the photo-detection device by adjusting the motors. However, the losses that govern the motor plant are not known are a piori to the outflow source. In particular, it is not known, a piori how much the motor will adjust the photo-detection device in response to an outflow signal of a prescribed size. Moreover, even if the system somehow knew this information at one time, it may turn out to be the wrong information at a later time due to environmental changes. Thus, the system needs to compute a reliable measure of an outflow command, as well as a reliable measure of the motor's response to that command.

In the present invention corollary discharges provide a reliable measure of outflow commands. In particular, corollary discharges are computed using signal sizes that the outflow path is capable of generating. The motor responses to these signals may, however, initially be too large, much too small, or even non-linear, due to the characteristics of the motor plant. In order to convert outflow signals into a full range of linear-motor adjustments somehow, the computer system needs to eventually adjust the responses of the motor plant to these outflow signals. Such adjustments have the effect of causing the motor to respond as if it were a different plant, notably, a linear plant with a carefully chosen gain. Thus, according to the present invention, the outflow signals form a reliable basis on which to compute present position at the HMI. Inflow signals whose plant characteristics are susceptible to continual change, do not.

The use of corollary discharges to compute present position at the HMI does not imply that the inflow signals are not used. In fact, some type of information about motor plant characteristics is needed to calibrate motor adjustments that vertically respond to outflow signals. Embodied in the present invention, the outflow-inflow interface "OII" circuit exists for comparisons between outflow and inflow signals.

By recalling that the outflow signals are computed in motor coordinates, namely agonist-antagonist coordinates, the relative sizes of agonist and antagonist outflow signals, not any absolute quantity, determine the desired size scale of the outflow signals. Expressed in another way, the spatial pattern or normalized motor synergy of agonist and antagonist outflow signals determines the functional size scale. The size scale is defined as the outflow signal to the motor.

If outflow signals sizes are computed in motor coordinates, information which expresses the motor plants responses to these signals must also be computed in motor coordinates. Thus, spatial patterns of outflow signals are matched against spatial patterns of inflow signals at the OII. Good matches imply that the motors are responding linearly, and with reasonable gain to outflow signals. Bad matches must be able to adjust plant gain as well as plant non-linearities. In other words, mismatches within the OII generate error signals that can change the size of the total outflow signal to the motor plant. Thus the conditional part of the total outflow signal adds or subtracts the correct amount of signal to make the motor react as if it is a linear motor plant with a reasonable gain. The motor plant does not, itself, change. Rather, automatic gain control signals compensate for its imperfections through learning. If the motor plant changes due to aging or accidents, mismatches are caused within the OII and trigger new learning. The gain control signals automatically alter the total outflow command until the motors again react linearly. Thus, the linearization of the muscle plant is a learning process that takes place on a slower time scale than registration of a corollary discharge.

Throughout all of these learning changes, the corollary discharges to the OII remain intact. The system can compensate for plant changes without disrupting the code, whereby present position is internally calibrated. Thus, whereas the outflow is used to rapidly change present position signals, inflow is used to derive slow calibrations of the motor response characteristics to these signals.

Linearizing the motor plants' response to outflow signals does not insure that the photo-detection device can move to accurately foveate a target light. Plant linearization just insures that if outflow commands of correct size can be learned, then the motor can faithfully execute these commands.

Thus, light detected on a photo cell of the photo-detection device on the retina is transformed by several processing stages before it can generate an outflow command to move the photo-detection device. Whether or not the photo-detection device successfully moves to foveate the light cannot be decided until the net effect of all these stages actually moves the photo-detection device. A reliable test of whether the light is foveated is given by the position of the light on the detection device after the movement is over. Visual error signals are thus a reliable basis for modifying the size of outflow signals until the photo-detection device can successfully foveate targets lights.

As mentioned before, by encoding the difference between a target position and the photo-detection device's present position, a neural vector can be used to move the device the correct distance and direction in order to foveate a retinal light. The neural vectors within the HMI are encoded in motor coordinates. Each neural vector is an activity pattern across a fixed set of motor coded cell populations. Changing neural vectors does not change with which populations are activated. It only alters the pattern of this activity.

In the present invention it is preferred that the HMI vectors are transformed from motor coordinates, to retinotopic coordinates. Each motor vector would then excite a different location within a retinotopic map. Different retinotopically coded positions could then control different outflow pathways, and their gains could therefore be separately altered by different visual error signals.

When a non-foveated light detected on the photo-detection device acts as a visual error signal, it is meant that this visual signal somehow changes the outflow command into one that can generate a more accurate movement on the next performance trial. Such an outflow command controls a coordinated reaction or synergy of all the eye motors.

As already mentioned, a vector command is first transformed from motor coordinates into retinotopic coordinates. Then, the vector command and its visual error signals are reconverted into motor coordinates in such a way that the visual error signal can correct the gains of all the relevant motor outflow signals.

In the present invention, visual error signals are also used to correct post-saccadic drifts. These visual signals are not, however, error signals that compute how far a target light lies from the fovea. They compute the net motion of the photo-detection device with respect to the visual world during the postural mode. The postural mode is the mode in which the photo-detection device has already found the correct target position.

In order for visual error signals to calibrate the adaptive gains whereby the photo-detection device can accurately foveate detected lights, the movement control system in the present invention must be sensitive to visual signals both before and after a visually reactive movement occurs. Thus, a different pattern of visual sensitivity exists when planned or intentionally generated movement occur.

In reconciling these two patterns of visual sensitivity the present invention required additional learning circuits. For instance, the initiation of a planned movement required the suppression of sensitivity to the visual cues that generate reactive movements. In order to make accurate planned movements, however, the adaptive gains that were learned in response to visual error signals were used.

The distinction between planned movements and reactive movements raises a more general issue of attentional control. The decision to make a planned movement, instead of a visually reactive movement involves a sensitivity shift that may be interpreted as a shift of attention. Even with the visually reactive system, many light sources can compete to be chosen as targets for photo-detection movement.

In the present invention, attentional decisions take place within a head-coordinate frame. One reason for this is based upon the observation that sensory cues other than visual cues, notably auditory cues, can compete to be sources of saccadic movements. A second reason is based upon an analysis of the coordinate system within which planned movements are computed.

In the case of a visually evoked photo-detection movement, visual feedback can be used to correct movement parameters, because a target light detected by the photo-detection means can act as an error signal after the movement occurs. This is true even if the body or head remains stationary throughout the movement. A saccade to a sound source can also occur while the head remains stationary throughout the saccade. In this situation, however, no obvious source of auditory error signal exists, because the location of the auditory sound source does not change with respect to the body as a result of the photo-detection movement.

This lack of auditory error signal does not cause a problem if the auditory system can make use of movement command pathways that have been adaptively tuned by visual error signals. Such an intermodality sharing of common pathways not only overcomes a problem of principality, but also significantly reduces the amount of adaptive machinery that is needed to improve the accuracy of the intermodality movements.

Intermodality sharing of activated photo-detection cells movement command pathways can be achieved if there exists a processing stage at which signals generated by auditory cues feed into visually calibrated movement command pathways. Then auditory cues can use the visually learned movement parameters by activating these visually calibrated commands. In order for auditory cues to effectively share visually tuned parameters, the overlapping intermodality maps must be dimensionally compatible. That is, if the maps representing coordinate systems with different and variant properties, then no consistent intermodality command structure can be learned. Thus, in order to align intermodality coordinate systems, auditory and visual cues must be suitably processed before they are mapped onto retinally activated pathways.

Every auditory cue is registered with respect to head coordinates. Therefore, since auditory cues are directly registered in head coordinates, a learned map of auditory signals onto a visually derived head coordinate map would achieve the most parsimonious solution of this problem.

In order to insure dimensional consistency, planned movements and reactive movements due to all irrelevant sensory modalities need to compete with each other with the same coordinate frame.

The need for a head coordinate map is also suggested by considering a series of planned saccades, called predictive movements, or regeneration of predictive movements within a more general motor program, such as a dance.

A sequence of accurate movements that occurs in response to the prior occurrence of a spatial or temporal pattern of lights illustrates predictive movements that are responsive to controllable lights. For example, if a regular pattern of lights is briefly flashed in front of a robot, the movement of the robot's photo-detection can rapidly tract the position of the lights even after the lights are shut off.

To clarify the main issues addressed by the present invention, suppose for a moment that each light in a pattern is encoded in a retinotopic map before the photo-detection device moves. After the photo-detection device moves in response to the first light, a correct photo-detection device movement to the second light can be made only if the photo-detection device movement system can compensate for the photo-detection device's prior movement. This type of compensation is not just a matter of computing a new target position, by taking into account the photo-detection device's new initial position before the second movement occurs, because the detection position of the second light is in the wrong source to initiate a motion to the desired target position.

A predictive motion can be accurately made if the stored position of the second light, with respect to the body supporting the photo-detection device is compared with the present position of the photo-detection device, with respect to the body, after the first saccade is over. The vector difference of these positions determines the correct direction and length of motion that the photo-detection device must make to fixate the position of the second light. Then the process repeats itself. The position of the third light, with respect to the body, is compared with the position of the photo-detection device with respect to the body after the second movement is over and so on until the stored movement commands are actualized.

In order for this system to work, all of the stored lights that will control a predictive movement sequence must be stored in a head coordinate map. After the photo-detection device moves any number of times, the present photo-detection position can be subtracted from the target position, in head coordinates, that is coded by the next stored command. This difference vector represents the motion that will acquire the desired target location.

In addition to being able to simultaneously store all the predictive commands in a head coordinate map, the network that regulates predictive movements stores the commands in a way that reflects their temporal order, and eliminates these command sources as their corresponding movements are executed to make way for the next command in the series.

While the invention has been particularly shown and described with references to a preferred embodiment thereof, it will be understood by those skilled in the art that various changes in form and details may be made therein without departing from the spirit and scope of the invention as defined by the appended claims.

We claim:

1. A retinotopic command network for choosing a visual point of light for fixation from a field of visual points of light comprising:
    a photo-detection means having a region for foveating light;
    a body for supporting the photo-detection means;
    motors for moving the photo-detection means to a position for foveating light;
    a choice mechanism for transforming a broad array of lights collected by the photo-detection means into a localized activation of a sector map, wherein the localized activation of the sector map generates spatially coded signals for activating motors which move the photo-detection means to a position which foveates the chosen visual point;
    a competitive choice means in communication with the photo-detection means and the sector map for converting a broadly distributed input pattern into a more narrowly focussed activity pattern;
    a means for conditioning the spatially coded signals transmitted to the motors by a conditionable movement circuit which corrects a previous inaccurate movement signal, the conditionable movement circuit comprising:
        a short term memory means for storing an internal marker indicative of the position of the chosen light on the photo-detection means before moving the photo-detection means; and
        an error signal generated by the chosen light on the photo-detection means after the photo-detection has moved; and
    a saccade generator which converts the conditioned spatially coded signals into a temporally coded signal that determines how long, and in what direction the motors will move the photo-detection means towards the chosen light.

2. A network for choosing a visual point of light for fixation from a field of visual points of light as claimed in claim 1, wherein the error signal is generated by comparing the location of the chosen light after the movement of the photo-detection means takes place with the position of the photo-detection mean which will foveate the chosen visual point.

3. A network for choosing a visual point of light for fixation from a field of visual points of light as claimed in claim 1 further comprising means for parallel processing of the spatially coded signals and error signals for conditioning movement signals transmitted to the motors for correcting previous errors which lead to an inaccurate movement of the photo-detection means.

4. A network for choosing a visual point of light for fixation from a field of visual points of light as claimed in claim 1 wherein the motors comprise three agonist-antagonist pairs of motors, wherein each motor is activated by a region of the section map.

5. A network for choosing a visual point of light for fixation from a field of visual points of light as claimed in claim 1 wherein the conditionable movement circuit is activated by explicit information signals generated by comparing a photo-detection map having coordinates which locate light detected by the photo-detection means with a photo-detection means position map having coordinates which locate the photo-detection means relative to the body supporting the detection means.

6. A network for choosing a visual point of light for fixation from a field of visual points of light as claimed in claim 1 wherein the conditionable movement pathway is activated by implicit information signals which are generated by a single invariant target position map having coordinates which locate the position of the chosen light on the photo-detection means for processing by the saccade generator.

7. A network for choosing a visual point of light for fixation from a field of visual points of light as claimed in claim 1 further comprising a head-muscle interface circuit means which mediates between target position coordinates computations and photo-detection coordinates computations to prevent new movement commands from being generated due to motion generated by the network choosing the visual point of light.

8. A network for choosing a visual point of light for fixation from a field of visual points of light as claimed in claim 1 wherein the sector map is subdivided into six equal sections, having a point in common with a region which foveates light, each of the six equal sections having a gradient of connections from each point in the section for communication with one of the motors such that the more eccentric points cause a more asymmetric movement of the light detection means.

9. A network for choosing a visual point of light for fixation from a field of visual points of light as claimed in claim 1 wherein a image stabilizer reflex means, which independently calculates the movement of the body and the movement of the photo-detection means to generate a total movement which compensates for the movement of the body, while maintaining the foveation of the chosen visual point.

10. A network for choosing a visual point of light for fixation from a field of visual points of light as claimed in claim 9 wherein the image stabilizing means are sufficiently slow to permit continuous registration of visual feedback to generate error signals.

11. A vector command network for computing vector differences comprising a head-muscle interface circuit which comprises a target position that is computed in head coordinates with a present photo-detection position computed in motor coordinates to generate a vector difference used to generate a movement signal for moving the photo-detection means to a position where the vector difference becomes zero, wherein the target position is encoded from head coordinates comprising a target position map into motor coordinates for comparison with the photo-detection position.

12. A vector command network for computing vector differences as claimed in claim 11 wherein the vector differences are encoded from motor coordinates into positional locations on the spatial map for making use of visually reactive movement commands that can be corrected using error signals.

13. A vector command network for computing vector differences as claimed in claim 11 wherein each target position in the target position map sends sampling signals to motor representations of all the motor position at the head-muscle interface.

14. A vector command network for computing vector differences as claimed in claim 11 wherein the position of the photo-detection means is determined by movement signals used to move and to hold the photo-detection means in position.

15. A vector command network for computing vector differences as claimed in claim 11 wherein an adaptive command system modifies the movement signals such that they are a linear function of the vector difference which gives rise to the movement signal.

16. A head-muscle interface circuit comprising;
a photo-detection means;
a means for receiving sampling signals over a conditionable circuit from an active population within a target position map;
a means for receiving corollary discharge signals which provide photo-detection position data that the conditionable circuit will learn for encoding the photo-detection position as a function of time such that the target position stored within the target position may can learn the photo-detection position that is attained by a subsequent movement of the photo-detection means;
wherein the conditionable pathways from the target position map to the head-muscle interface can learn only after a photo-detection movement is over; and
gating signals which is generated after a movement is over for modulating the learning that occurs within an adaptive weight system of active conditionable pathways.

17. A head-muscle interface circuit as claimed in claim 16 wherein the corollary discharge signals are in the form of a pattern of excitatory inputs for reading the position of the photo-detection means relative to a body supporting the photo-detection means.

18. A head-muscle interface circuit as claimed in claim 16 wherein the gating signals are activated after a saccade ends.

19. A vector command network for automatically compensating the difference between a present photo-detection position and a target photo-detection position comprising a head-muscle interface circuit which compares a target position that is computed in head coordinates with a present photo-detection position computed in motor coordinates to generate a vector difference used to generate a movement signal for moving the photo-detection means to a position where the vector difference becomes zero, wherein the target position is encoded from head coordinates comprising a target position map into motor coordinates for comparison with the photo-detection position.

20. A linearization network for linearizing the response of nonlinear motor means comprising:
inflow signals indicating the present position of the nonlinear motor means;
unconditional movement signals for initiating a movement signal for activating the nonlinear motor means;
an outflow-inflow stage which compares the unconditional movement signals with the inflow signals to generate error signals;
an adaptive gain stage which generates conditioned movement signals whose gain is dependent on the gain of the error signal and the unconditioned movement signal; and
a motorneuron stage for receiving the unconditioned movement signals and the conditioned movement signals to generate a total unconditioned movement signals which linearizes the response of the nonlinear motor means.

21. A linearization network for linearizing the movement of nonlinear motor means as claimed in claim 20, further comprising a head-muscle interface circuit which compares a target position with a present photo-detection means position determined by the unconditioned movement.

22. A linearization network for linearizing the movement of nonlinear motor means as claimed in claim 20, wherein the motorneurons are activated by tonic integrator cells which generate the unconditioned signals and medium lead burst cells which are target cells of a saccade generator which initiates a movement signal for moving the nonlinear motors.

23. A linearization network for linearizing the response of nonlinear motor means as claimed in claim 20 wherein the nonlinear motor means comprises at least one pair of nonlinear motors matched to form an agonist-antagonist pair, wherein competition between agonist and antagonist motor decreases the net antagonist output.

24. A linearization network for linearizing the movement of nonlinear motor means as claimed in claim 20, wherein the tonic cells generate corollary discharges to the head-muscle interface, excitatory signals to the outflow-inflow interface, and filter signals in communication with a photo-detection position map which samples error signals from the inflow-outflow interface to the adaptive gain stage.

25. A linearization network for linearizing the movement of nonlinear motor means as claimed in claim 20, wherein the outflow-inflow interface compensates for differences in the absolute size scales of the unconditional signals and the inflow signals by computing the relative sizes of the signals transmitted to the motors.

26. A linearization network for linearizing the movement of unlinear motor means as claimed in claim 20, further comprising an eye position map which recodes signals from the tonic cell, wherein the eye position map comprising a plurality of spatial locuses, each of which sends a separate sampling signal to the adaptive gain stage, wherein each separate sampling signal is adaptively encoded to reflect all gain changes that are caused by the error signal induced by the outflow-inflow interface.

27. A saccade generator circuit comprising:
   a long-lead burster which adds signals from a retinotopic map which encodes a photo-detection movement and from a photo-detection position map which encodes the present position of a photo-detection means;
   a medium-lead burster which receives the excitatory signals from the long-lead burster and first inhibitory signals which generate signals for activating tonic cells and motorneuron cells, wherein the tonic cells integrate their input signals and relay the integrated signals to the motorneuron cells which activates the motor for moving the photo-detection means;
   pause cells which generate the first inhibitory signals received by the medium-lead burster; and
   second inhibitory signals generated as a function of time by the long-head burster for inhibiting the pause cells from generating the first inhibitory signals;
   wherein the tonic cells generate inhibitory feedback signals to the long-lead burster for terminating the movement of the photo-detection means.

28. A saccade generator circuit as claimed in claim 27 further comprising a postural circuit for compensating for any imbalances that may exist after a photo-detection movement is over to prevent the photo-detection means from drifting away from its target position.

29. A predictive command network that is capable of encoding a predictive sequence of movements in long term memory, and of reading out this movement sequence, comprising:
   a first target position map for initially storing all relevant target positions in a short term memory means, wherein temporal order information of attended target positions is encoded by a spatial pattern of activation across the target positions with more intensely activated positions performed first;
   a second target position map for selecting and storing the most active target positions stored within the first target position map for controlling a command movement of a photo-detection means; and
   a head-muscle interface network in communication with the second target position map for generating output vectors, wherein the head-muscle interface network calculates matches and mismatches between target positions in the second target position map and present positions detected by the photo-detection means for regulating the sequential performance and learning of predictive movements.

30. A predictive command network as claimed in claim 29, wherein the chosen target position in the second target position map is stored in a first short term memory means until the movement corresponding to this chosen target is completed.

31. A predictive command network as claimed in claim 29, wherein a mismatch at the head-muscle interface generates a vector difference for generating an output pattern to a retinotopic map which stores the vector difference in a second short term memory means as a spatial location for generating signals to cause a photo-detection movement.

32. A predictive command network as claimed in claim 29, wherein a match at the head-muscle interface inhibits the stored target position in the second target position map from generating signals to the head-muscle interface which activates the next target position stored in the short term memory at the first target position map for storage in the second target position map.

33. A predictive command network for moving a photo-detection means to that a target light is foveated, comprising:
   a first target position map for storing a spatial pattern of temporal command information which simultaneously stores several target lights to be foveated in short term memory;
   a second target position map in communication with the first target position map for detecting and storing the most active target position detected in the first target position map in short term memory until the target light at that position is foveated; and
   a head-muscle interface circuit having means for detecting the present position of the target light stored in the second target position map and comparing the present position of the target light detected with the target light stored to generate a movement signal for moving the photo-detection means during a mismatch and triggering a read-out signal of the next most active target position stored in the first target position map for storage in the second target position map.

34. A self-organizing input position map comprising:
   a retinotopic map, which stores positions of light detected on a photo-detection means in a short term memory means before a movement begins;
   a first photo-detection position map, which stores an initial photo-detection means position in short term memory before a photo-detection movement begins;
   a retinotopic command network for improving the accuracy of the saccades;
   a second photo-detection position map for encoding a target position after the retinotopic command network has improved the accuracy of a photo-detection movement; and
   a now print gate means for allowing the retinotopic map and the first photo-detection position map to sample the locus of activity within the second photo-detection position map after each accurate movement of the photo-detection means.

35. A self-organizing target position map as claimed in claim 34 wherein the first photo-detection position map generates signals to a saccade generator for updating the position of the photo-detection means.

36. A self-organizing target position map as claimed in claim 34 wherein the retinotopic map generates signals for controlling direct unconditioned signals and indirect conditioned signals for generating visually reactive movements of the photo-detection means.

37. A system for coupling a retinotopic command network and a vector command network comprising:
- a first retinotopic map for registering light sensitive activations on a photo-detection means;
- a target position map in communication with the first retinotopic map having means activating a target position;
- a head-muscle interface circuit for comparing the target position map with the present position of the photo-detection means position to generate vector difference used for activating a movement signal, which reposition the photo-detection means;
- a second retinotopic map in communication with the head-muscle interface circuit for storing in short term memory a first light indicative of the target position until a photo-detection movement has terminated so that a second light, serving as an error signal, can be sampled;
- a third retinotopic map in communication with the photo-detection means for registering light sensitive activations on the photo-detection means, and in communication with the second retinotopic maps for distributing conditionable signals across the second retinotopic map when the retinotopic command network generates correct foveations;
- a long term memory trace which stores communication from the third retinotopic map to the second retinotopic map;
- an adaptive gain stage for sampling unconditioned movement signals generated by the third retinotopic map and generating a conditioned movement signal;
- a saccade generator for combining the unconditioned movement signals generated by the third retinotopic map and the conditioned movement signal generated by the adaptive gain stage for generating first movement signals;
- tonic cells in communication with the saccade generator for generating corollary discharge signals to the head-muscle interface indicating the position of the photo-detection means; and
- motorneurons in communication with the saccade generator and the tonic cells for combining the movement signals and corollary discharge signals to generate a total unconditional movement signal for moving the photo-detection means to a point which foveates the target.

38. A system for coupling a retinotopic command network and a vector command network comprising:
- a first retinotopic map for recording light sensitive activations on a photo-detection means;
- a first target position map in communication with the first retinotopic map having means for encoding several active target positions;
- a second target position map in communication with the first target position map for choosing the target position from the first target position map which achieves the largest activation and the storing of that target position until the movement of the photo-detection means has terminated;
- a target position map in communication with the first retinotopic map having means for receiving a spatial pattern of activated retinotopic positions such that a target position is activated;
- a head-muscle interface circuit in communication with the first target position map for comparing the target position map with the present position of the photo-detection means position to generator vector differences used for activating the direction and length of a movement signal which repositions the photo-detection means;
- a second retinotopic map in communication with the head-muscle interface circuit for storing in short term memory a first light indicative of the target position until movement of the photo-detection means has terminated so that a second light, serving as a visual error signal, can be sampled;
- a third retinotopic map in communication with the photo-detection means for recording and for determining the most intense light detected on the photo-detection means for generating an error signal;
- a fourth rectinotopic map in communication with the third retinotopic map having means for storing in short term memory the most intense light detected by the third retinotopic map until the resposition of the photo-detection means terminates, and having means for generating an unconditional signal;
- a long term memory trace which stores communication from the fourth retinotopic map to the second retinotopic map;
- an adaptive gain stage which samples unconditioned movement signals generated by the fourth retinotopic map and the error signal from the third retinotopic map for generating a conditioned movement signal;
- a saccade generator for combining the unconditioned movement signals generated by the fourth retinotopic map and the conditioned movement signal generated by the adaptive gain stage for generating the movement signals used for repositioning the photo-detection means;
- tonic cells in communication with the saccade generator for generating corollary discharge signals to the head-muscle interface indicating the position of the photo-detection means; and
- motorneurons in communication with the saccade generator and the tonic cells for combining the movement signals and corollary discharge signals to generate a total unconditional movement signal for moving the photo-detection means to a point which foveates the target.

39. A system for coupling a retinotopic command network and a vector command network as claimed in claim 38 wherein the first retinotopic map is in communication with the third retinotopic map for enhancing the retinotopic position that was chosen within the third retinotopic map and the fourth retinotopic map is in communication with the first retinotopic map for receiving the entire spatial pattern of positions from the first retinotopic map.

40. A network for moving a photo-detection means relative to a body supporting the photo-detection means in response to light detected by the photo-detection means comprising:
- a photo-detection position map for storing the position of the photo-detection means relative to the body;

a retinotopic map for storing light sensitive activations on the photo-detection means for generating a first unconditioned signal;

an adaptive gain stage in communication with the photo-detection position map and the retinotopic map for generating conditioned movement signals;

a saccade generator for combining the first unconditioned signal and the conditioned movement signal to generate a second unconditioned movement signal;

tonic cells in communication with the saccade generator for generating corollary discharge signals; and motorneurons in communication with the saccade generator, the tonic cells, and the adaptive gain stage for combining the movement signals, conditioned movement signals and the corollary discharge signals to generate a total movement signal for moving the photo-detection means relative to the body.

41. A tension equalization network for preventing post-movement drift comprising:

a photo-detection means;

a body supporting the photo-detection means;

motor means responsive to movement signals for moving the photo-detection means relative to the body;

tonic cells for detecting activity patterns from a visual field on the photo-detection means;

a photo-detection position map for spatially encoding the activity patterns detected by the tonic cells for generating conditionable signals;

an accessory optic system for generating error signals when motions of the whole visual field are detected;

an adaptive gain stage in communication with the photo-detection position map and the accessory optic system for processing the conditionable signals and the error signals to generate the movement signals; and means for generating a gating signal at the end of a movement of the photo-detection means relative to the body for activating the motor means so that it is receptive to the movement signals.

* * * * *

UNITED STATES PATENT AND TRADEMARK OFFICE
CERTIFICATE OF CORRECTION

PATENT NO. : 4,852,018
DATED : July 25, 1989
INVENTOR(S) : Stephen Grossberg and Michael Kuperstein It is certified that error appears in the above-indentified patent and that said Letters Patent is hereby corrected as shown below:

Column 1, after line 5:
Insert the following as the first paragraph under the heading "Government Support."

--This invention was made with Government support under Contract N00014-83-K-0337 awarded by the Department of the Navy. The Government has certain rights in the invention.--

In column 1, line 9, after "The Government" insert --also--.

In column 1, line 13, delete "ONRN00014-83-K0337 awarded by the Office of Naval Research,".

Signed and Sealed this

Eighth Day of March, 1994

Attest:

BRUCE LEHMAN

*Attesting Officer*  *Commissioner of Patents and Trademarks*